United States Patent
Kadlec et al.

(10) Patent No.: US 7,492,675 B2
(45) Date of Patent: *Feb. 17, 2009

(54) DIGITAL SERVO SYSTEM WITH CALIBRATED NOTCH FILTERS

(75) Inventors: Ron J. Kadlec, Longmont, CO (US); Hans B. Wach, Longmont, CO (US)

(73) Assignee: DPHI Acquisitions, Inc., Longmont, CO (US)

( * ) Notice: Subject to any disclaimer, the term of this patent is extended or adjusted under 35 U.S.C. 154(b) by 235 days.

This patent is subject to a terminal disclaimer.

(21) Appl. No.: 09/950,372

(22) Filed: Sep. 10, 2001

(65) Prior Publication Data
US 2002/0131342 A1 Sep. 19, 2002

Related U.S. Application Data

(60) Provisional application No. 60/264,351, filed on Jan. 25, 2001.

(51) Int. Cl.
*G11B 7/00* (2006.01)

(52) U.S. Cl. .................... 369/44.24; 369/44.39; 702/77; 700/280

(58) Field of Classification Search ............ 369/44.29, 369/44.32; 702/77; 318/636; 700/280; 36/44.32; G11B 7/00; G06F 19/00; G05B 21/02, G05B 23/00
See application file for complete search history.

(56) References Cited

U.S. PATENT DOCUMENTS

| | | | | |
|---|---|---|---|---|
| 4,268,905 | A | * | 5/1981 | Johann et al. ............... 703/113 |
| 4,513,407 | A | | 4/1985 | Bricot .......................... 369/44 |
| 4,677,602 | A | | 6/1987 | Okano et al. ................... 369/32 |
| 4,682,332 | A | | 7/1987 | Okamoto et al. .............. 371/38 |
| 4,730,295 | A | | 3/1988 | Bressers ....................... 369/46 |
| 4,744,042 | A | * | 5/1988 | Hyatt .......................... 708/404 |
| 4,761,776 | A | | 8/1988 | Opheij ......................... 369/54 |
| 4,785,451 | A | | 11/1988 | Sako et al. .................... 371/37 |
| 4,791,627 | A | | 12/1988 | Yonezawa ................... 369/109 |
| 4,856,108 | A | | 8/1989 | Tinet ........................... 369/46 |
| 4,862,447 | A | | 8/1989 | Opheij ........................ 369/270 |
| 4,864,118 | A | | 9/1989 | Opheij et al. ............... 250/202 |
| 4,866,692 | A | | 9/1989 | Saito et al. .................... 369/59 |

(Continued)

FOREIGN PATENT DOCUMENTS

JP 05-047125 * 2/1993

(Continued)

OTHER PUBLICATIONS

MAT (machine assited translation) of JP 05—47125.*

*Primary Examiner*—Aristotelis M Psitos
(74) *Attorney, Agent, or Firm*—Jonathan W. Hallman; MacPherson Kwok Chen & Heid LLP

(57) ABSTRACT

A system which calibrates notch filters in a digital servo system is presented. A notch filter can be calibrated by obtaining a frequency response curve of the digital servo system in a range of frequencies, searching the frequency response curve for at least one peak frequency, and adjusting parameters of the notch filter to filter out signals at the at least one peak frequency. The digital servo system, for example, can be a tracking servo system or a focus servo system of an optical disk drive.

8 Claims, 68 Drawing Sheets

U.S. PATENT DOCUMENTS

| | | | |
|---|---|---|---|
| 4,878,211 A * | 10/1989 | Suzuki et al. | 369/44.35 |
| 4,893,298 A | 1/1990 | Pasman et al. | 369/275 |
| 4,901,300 A | 2/1990 | Van Der Zande et al. | 369/47 |
| 4,942,564 A * | 7/1990 | Hofer et al. | 369/44.29 |
| 4,959,822 A | 9/1990 | Pasman et al. | 369/44.11 |
| 4,963,841 A * | 10/1990 | Sparagna | 333/202 |
| 4,972,401 A | 11/1990 | Carasso et al. | 369/59 |
| 5,014,274 A | 5/1991 | Higurashi et al. | 371/40.1 |
| 5,023,854 A | 6/1991 | Satoh et al. | 369/32 |
| 5,023,856 A | 6/1991 | Raaymakers et al. | 369/32 |
| 5,060,219 A | 10/1991 | Lokhoff et al. | 369/48 |
| 5,115,513 A * | 5/1992 | Nemirovsky et al. | 712/36 |
| 5,124,966 A | 6/1992 | Roth et al. | 369/47 |
| 5,140,580 A | 8/1992 | Ohara et al. | 369/116 |
| 5,146,443 A * | 9/1992 | Iwase et al. | 369/44.29 |
| 5,161,140 A * | 11/1992 | Terada | 369/44.28 |
| 5,247,494 A | 9/1993 | Ohno et al. | 369/13 |
| 5,295,127 A | 3/1994 | Verboom et al. | 369/58 |
| 5,333,126 A | 7/1994 | Fukuda et al. | 369/59 |
| 5,339,301 A | 8/1994 | Raaymakers et al. | 369/50 |
| 5,341,356 A | 8/1994 | Dieleman et al. | 369/47 |
| 5,377,178 A | 12/1994 | Saito et al. | 369/124 |
| 5,390,159 A | 2/1995 | Schylander | 369/48 |
| 5,408,454 A | 4/1995 | Hasegawa | 369/44.25 |
| 5,418,764 A | 5/1995 | Roth et al. | 369/32 |
| 5,434,834 A | 7/1995 | Shinoda et al. | 369/44.13 |
| 5,459,712 A | 10/1995 | Sugaya et al. | 369/275.4 |
| 5,467,335 A | 11/1995 | Braat | 369/100 |
| 5,479,388 A | 12/1995 | Gondou et al. | 369/47 |
| 5,491,677 A | 2/1996 | Sasaki | 369/44.36 |
| 5,570,330 A * | 10/1996 | Okawa | 369/44.32 |
| 5,587,991 A | 12/1996 | Nabeshima et al. | 369/275.3 |
| 5,610,880 A | 3/1997 | Watanabe et al. | 369/13 |
| 5,654,841 A * | 8/1997 | Hobson et al. | 360/75 |
| 5,654,947 A | 8/1997 | Roth et al. | 369/48 |
| 5,729,511 A | 3/1998 | Schell et al. | 369/44.27 |
| 5,740,143 A | 4/1998 | Suetomi | 369/60 |
| 5,742,568 A * | 4/1998 | Nakano et al. | 369/44.35 |
| 5,793,737 A | 8/1998 | Den Boef | 369/116 |
| 5,831,946 A | 11/1998 | De Bie | 369/33 |
| 5,835,462 A | 11/1998 | Mimnagh | 369/50 |
| 5,841,739 A | 11/1998 | Iida et al. | 369/32 |
| 5,850,382 A | 12/1998 | Koishi et al. | 369/275.3 |
| 5,875,158 A | 2/1999 | Schell | 369/44.34 |
| 5,878,005 A * | 3/1999 | Tonegawa et al. | 369/44.27 |
| 5,881,044 A | 3/1999 | Park et al. | 369/116 |
| 5,886,985 A | 3/1999 | Kobayashi et al. | 369/275.3 |
| 5,896,353 A | 4/1999 | Naohara | 369/44.25 |
| 5,995,462 A | 11/1999 | Harold-Barry | 369/54 |
| 6,084,740 A * | 7/2000 | Leonhardt et al. | 360/78.02 |
| 6,087,644 A | 7/2000 | Schell | 250/201.5 |
| 6,101,453 A * | 8/2000 | Suwa et al. | 702/56 |
| 6,211,640 B1 * | 4/2001 | Fujisaki et al. | 318/636 |
| 6,219,196 B1 * | 4/2001 | Semba et al. | 360/75 |
| 6,246,536 B1 * | 6/2001 | Galloway | 360/78.04 |
| 6,275,781 B1 * | 8/2001 | Maness et al. | 702/182 |
| 6,278,784 B1 * | 8/2001 | Ledermann | 381/58 |
| 6,590,843 B1 * | 7/2003 | Zhuang | 369/44.32 |
| 6,741,914 B1 * | 5/2004 | Tze Ming Pang | 700/276 |
| 6,809,995 B2 * | 10/2004 | Kadlec et al. | 369/44.29 |
| 6,901,037 B2 * | 5/2005 | Yak et al. | 369/44.37 |
| 6,904,007 B2 * | 6/2005 | Kadlec et al. | 369/44.29 |
| 6,937,543 B2 * | 8/2005 | Kadlec et al. | 369/44.25 |
| 6,958,957 B2 * | 10/2005 | Kadlec et al. | 369/44.32 |
| 7,116,621 B2 * | 10/2006 | Turner et al. | 369/53.28 |

FOREIGN PATENT DOCUMENTS

| WO | WO 99/31956 | * | 1/1999 |
|---|---|---|---|

* cited by examiner

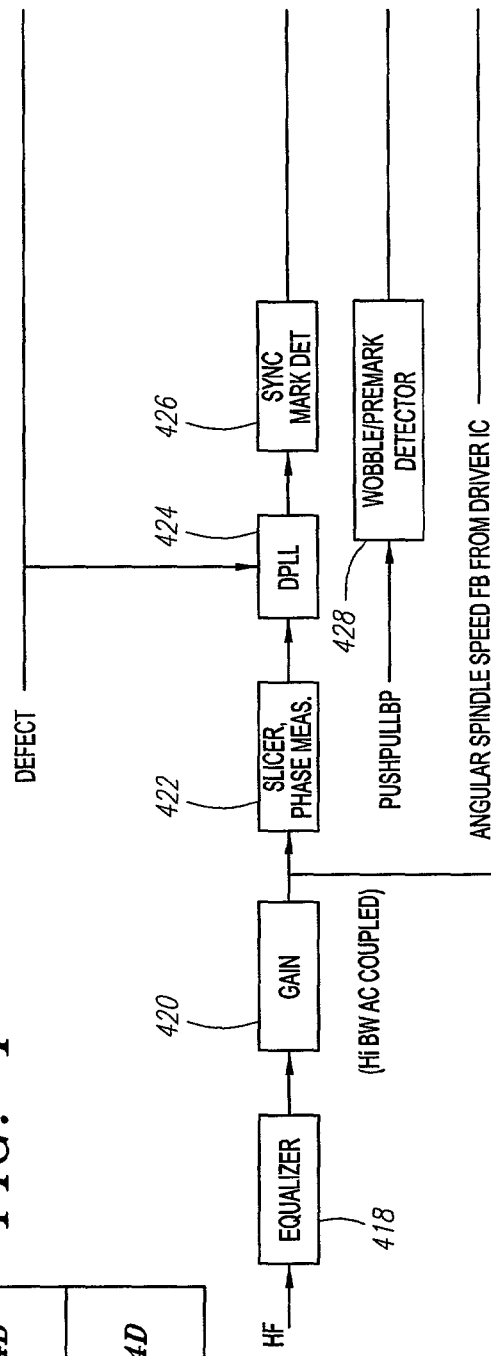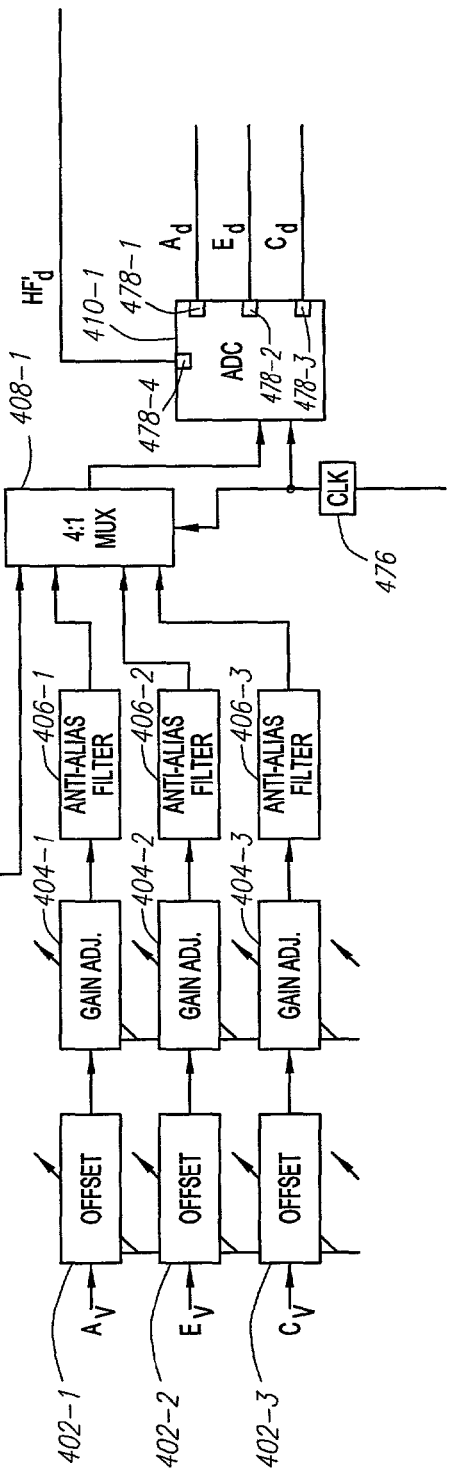

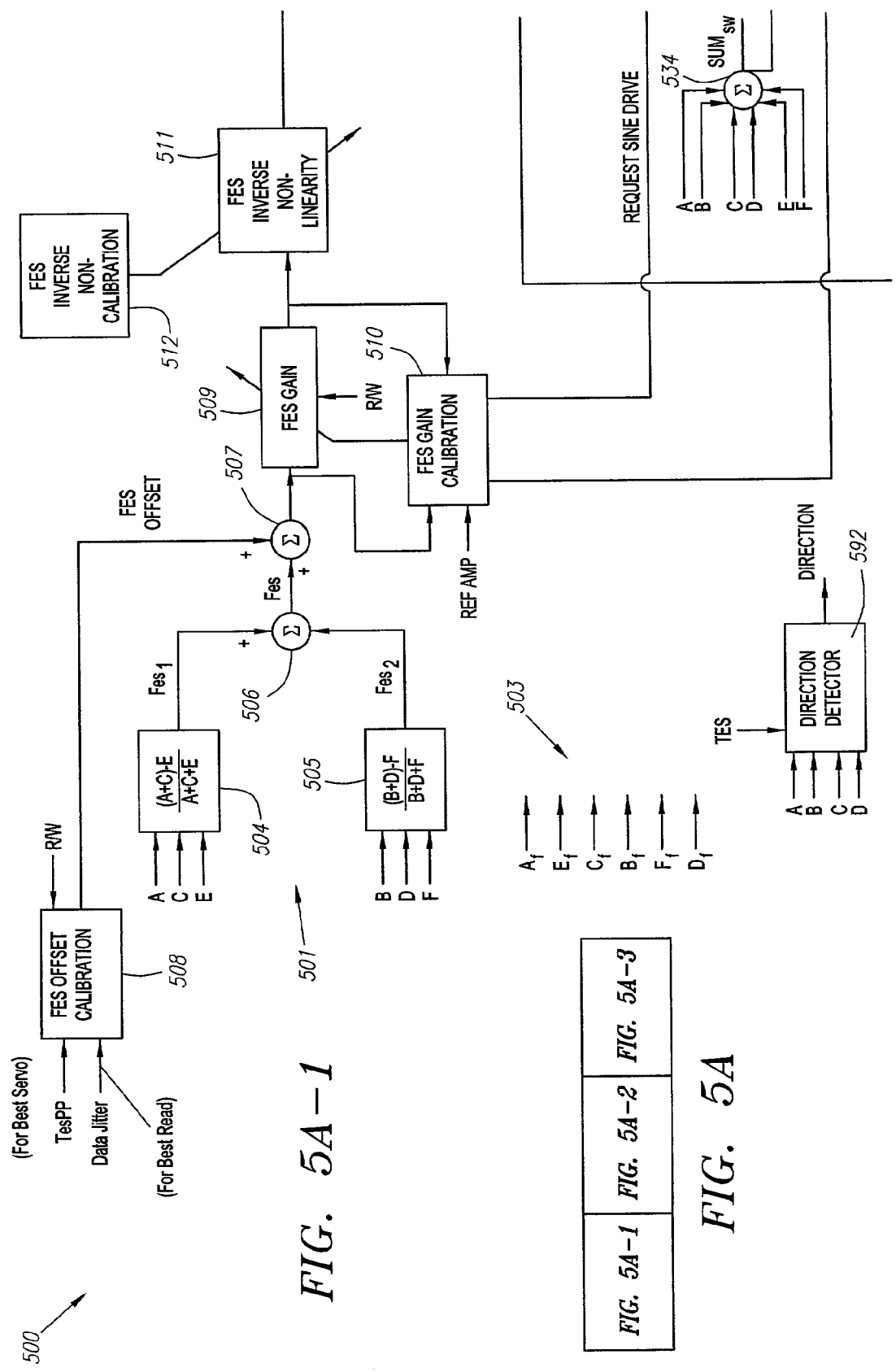

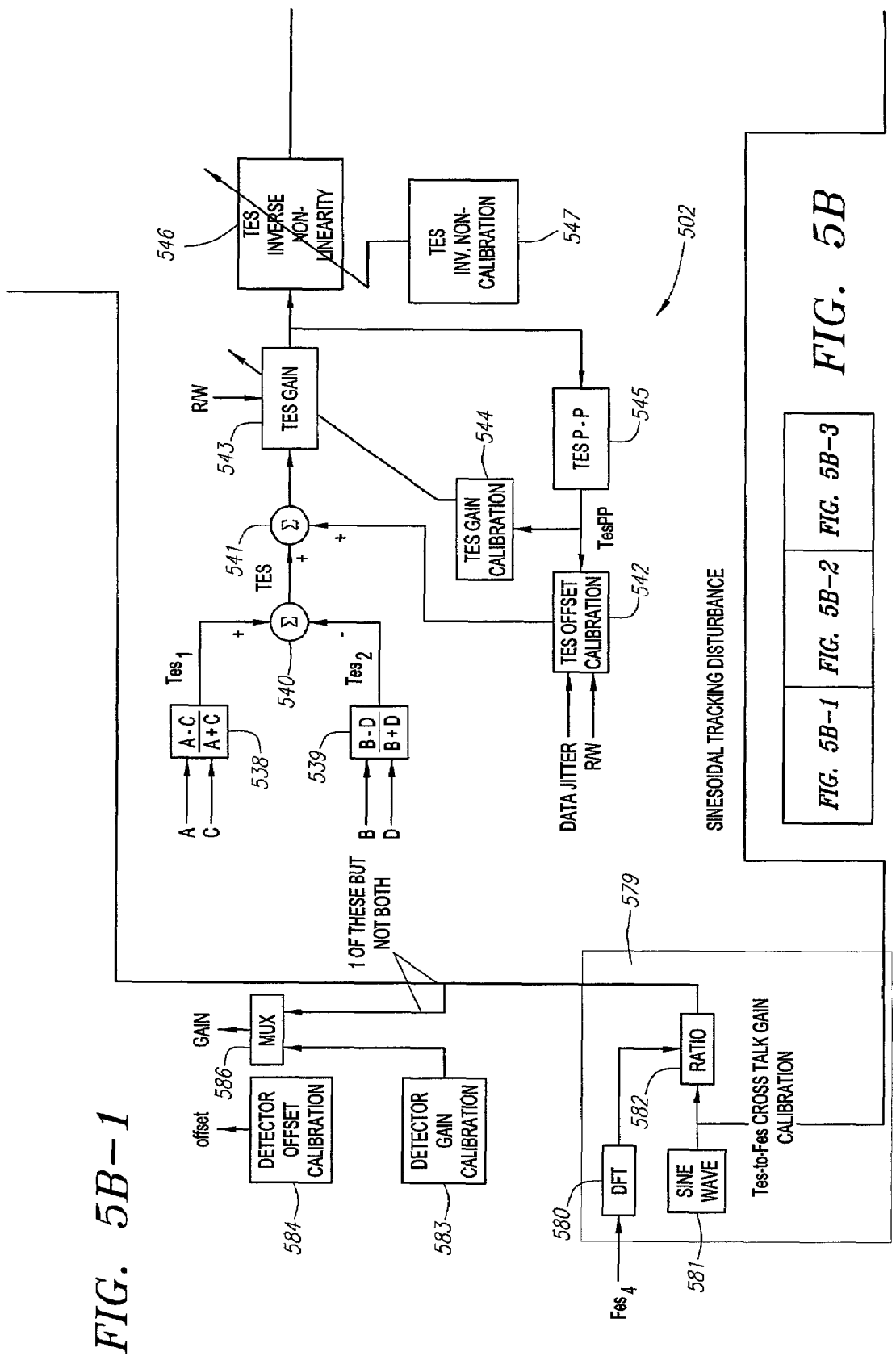

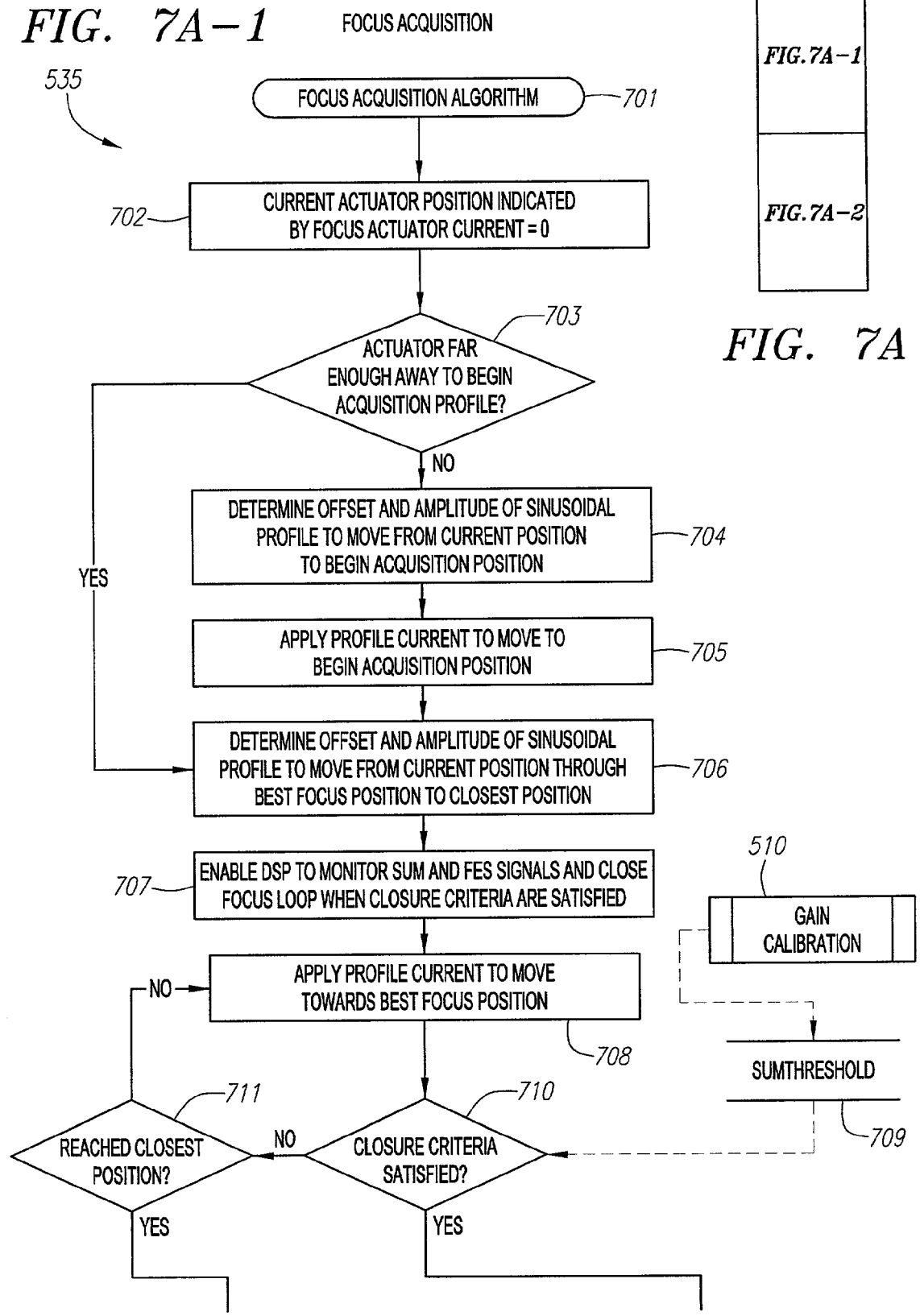

MULTI-TRACK SEEK FLOW CHART

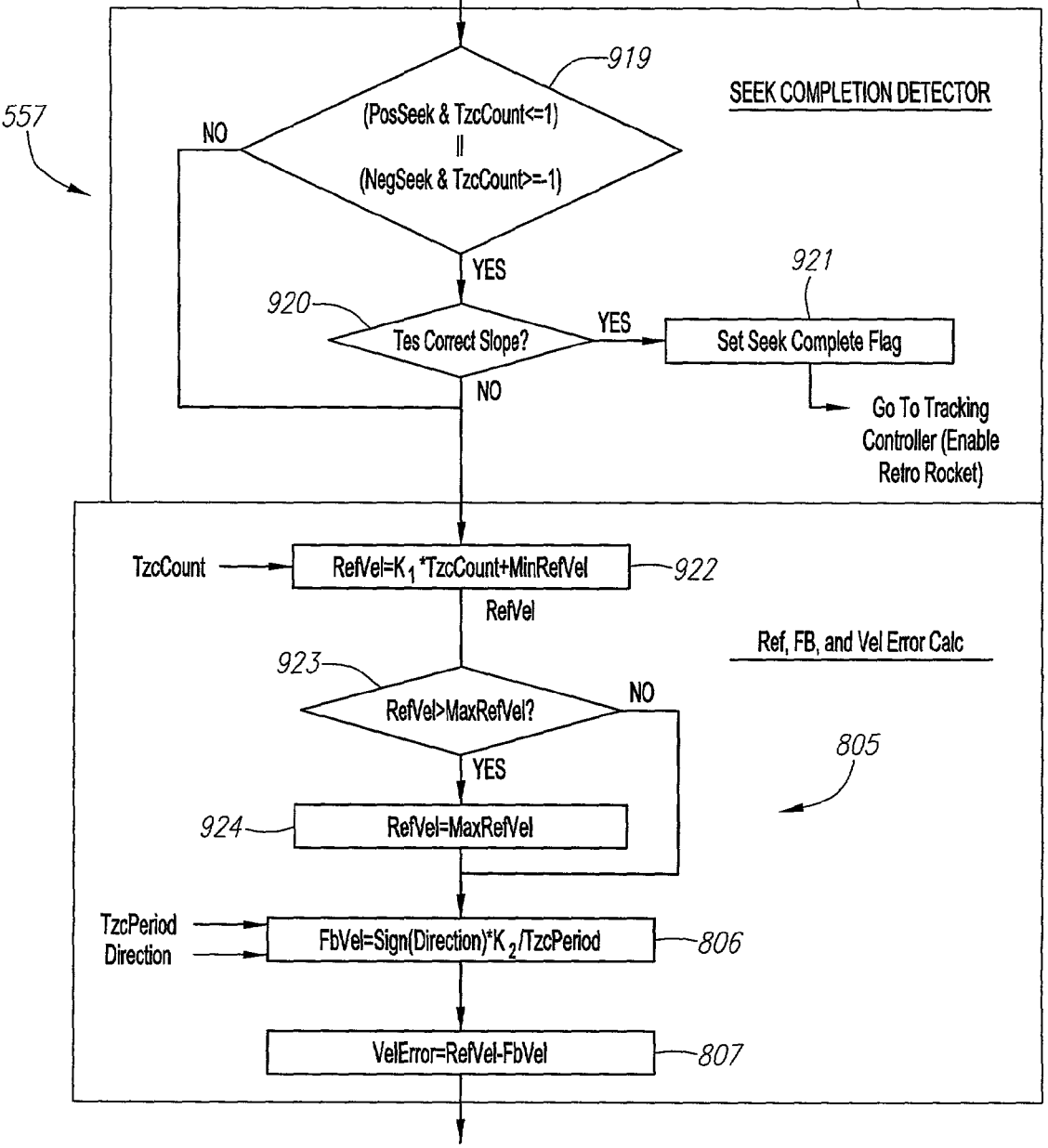

| CALIBRATION | MANUFACTURING | POWER ON | NEW MEDIA | ERROR RECOVERY |
|---|---|---|---|---|
| A-F OFFSETS READ GAIN | YES | YES | YES | YES |
| A-F OFFSETS WRITE GAIN | YES | YES | YES | YES |
| FOCUS SUM THRESHOLD | YES | YES | YES | YES |
| Fes GAIN MASTERED | YES | NO | YES | YES |
| Fes GAIN WRITEABLE READ MODE | YES | NO | YES | YES |
| Fes GAIN WRITEABLE WRITE MODE | YES | NO | YES | YES |
| Fes OFFSET MASTERED | YES | NO | YES | YES |
| Fes OFFSET WRITEABLE READ MODE | YES | NO | YES | YES |
| Fes OFFSET WRITEABLE WRITE MODE | YES | NO | YES | YES |
| Tes GAIN MASTERED | YES | YES | YES | YES |
| Tes GAIN WRITEABLE READ MODE | YES | YES | YES | YES |
| Tes GAIN WRITEABLE WRITE MODE | YES | YES | YES | YES |
| Tes OFFSET MASTERED | YES | YES | YES | YES |
| Tes OFFSET WRITEABLE READ MODE | YES | YES | YES | YES |
| Tes OFFSET WRITEABLE WRITE MODE | YES | YES | YES | YES |
| CrossTalk OFFSET MASTERED | YES | NO | NO | YES |
| CrossTalk OFFSET WRITEABLE READ MODE | YES | NO | NO | YES |
| CrossTalk OFFSET WRITEABLE WRITE MODE | YES | NO | NO | YES |
| TRACKING LOOP GAIN | YES | NO | NO | YES |
| FOCUS LOOP GAIN | YES | NO | NO | YES |
| NOTCH FREQUENCY | YES | NO | NO | YES |
| Fes INL | YES | NO | NO | YES |
| Tes INL | YES | NO | NO | YES |

*FIG. 12B*

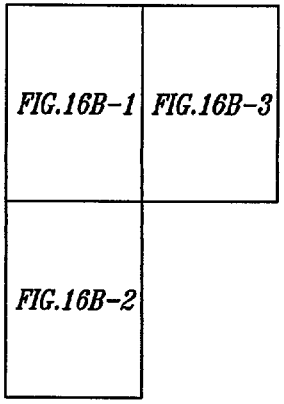
FIG. 16B
FIG. 16B-1
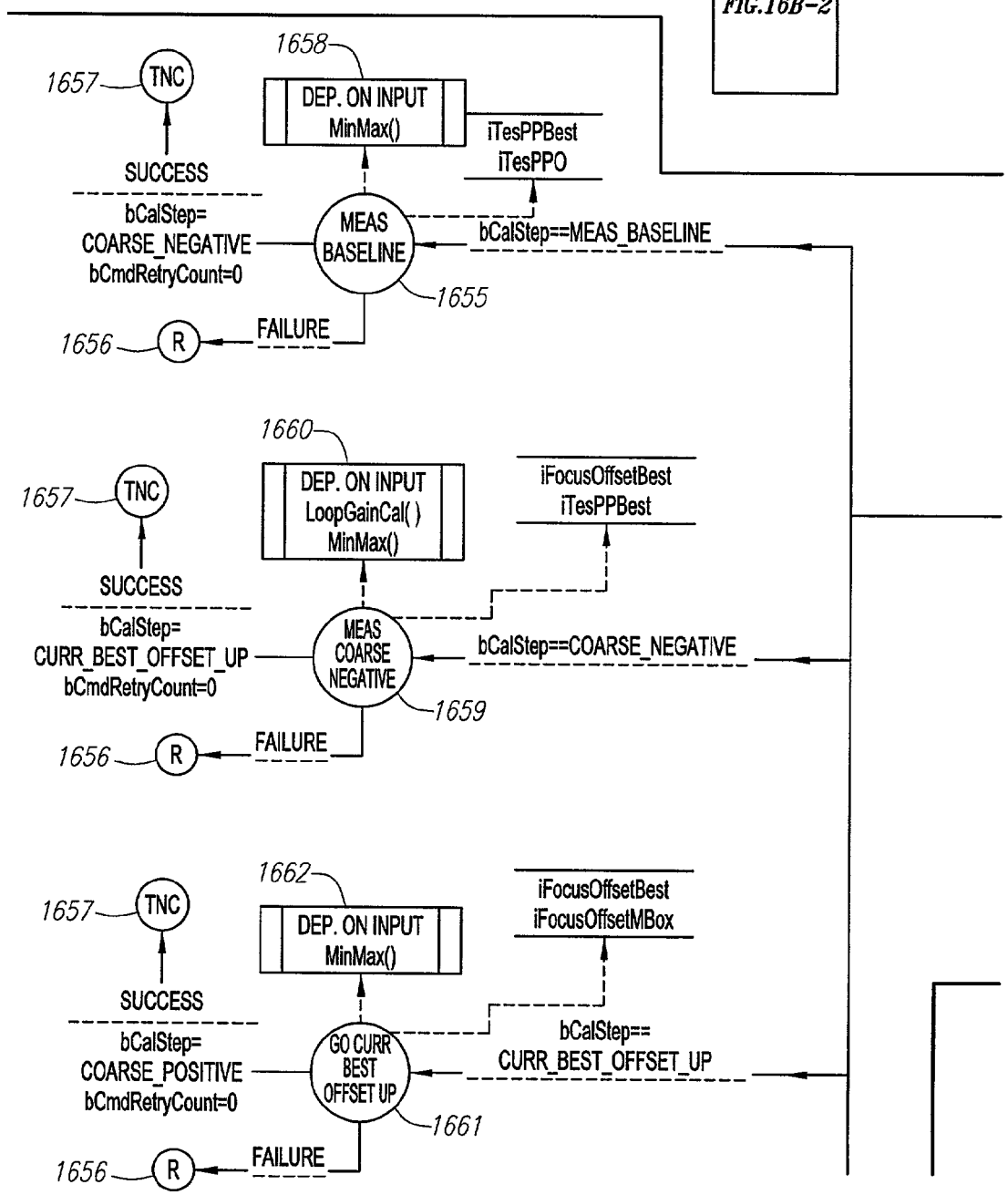

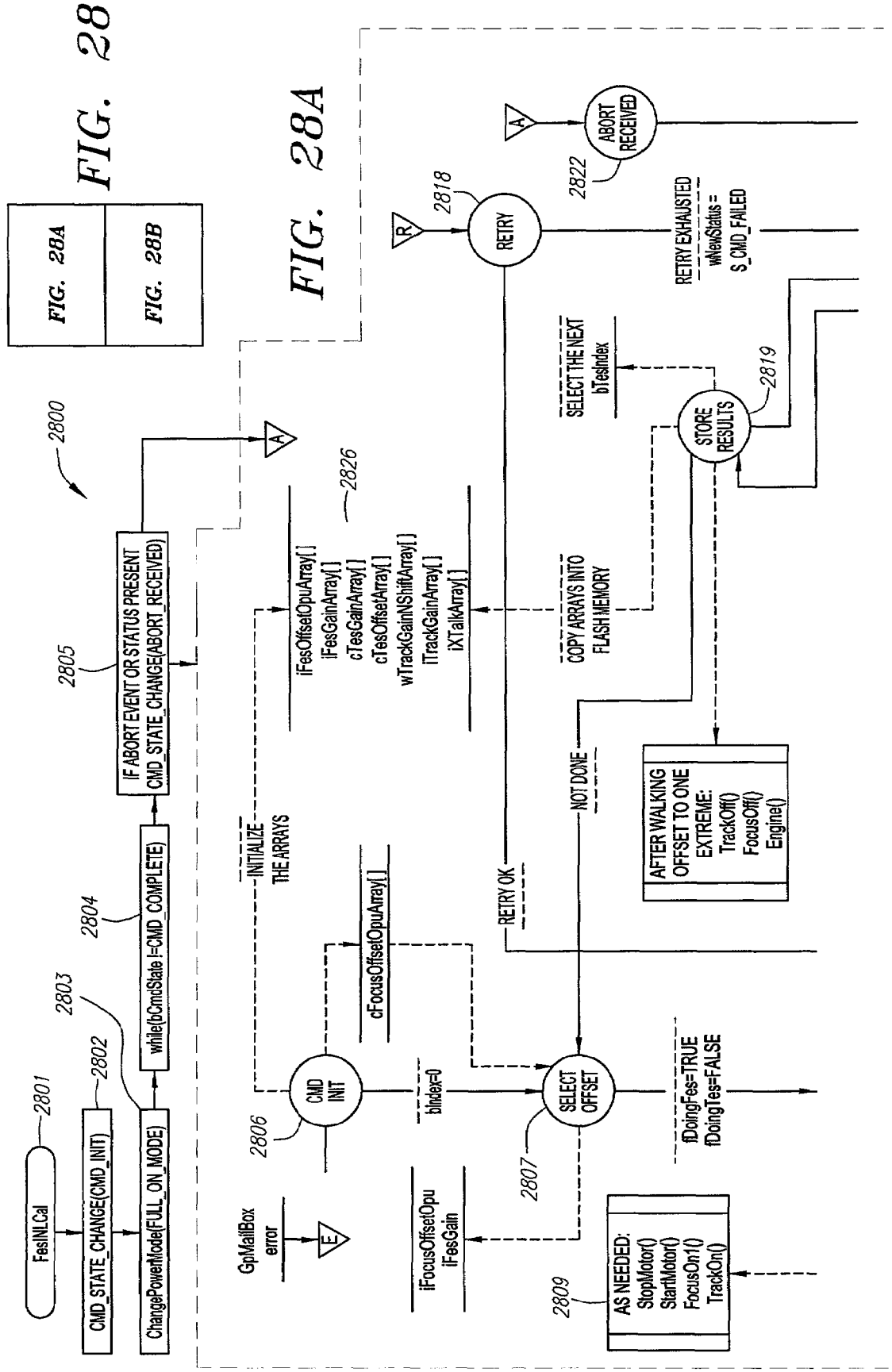

DIGITAL SERVO SYSTEM WITH CALIBRATED NOTCH FILTERS

RELATED APPLICATIONS

This application is related to provisional application Ser. No. 60/264,351, filed Jan. 25, 2001 entitled "Optical Disk Drive Servo System," by Ron J. Kadlec, Christopher J. Turner, Hans B. Wach, and Charles R. Watt, from which this application claims priority, herein incorporated by reference in its entirety.

CROSS-REFERENCE TO CD-ROM APPENDIX

CD-ROM Appendix A, which is a part of the present disclosure, is a CD-ROM appendix consisting of twenty two (22) text files. CD-ROM Appendix A is a computer program listing appendix that includes a software program executable on a controller as described below. The total number of compact disks including duplicates is two. Appendix B, which is part of the present specification, contains a list of the files contained on the compact disk. The attached CD-ROM Appendix A is formatted for an IBM-PC operating a Windows operating system.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

These and other embodiments are further discussed below.

BACKGROUND

1. Field of the Invention

The present invention relates to an optical disk drive and, in particular, to an optical disk drive with a digital servo system with calibrated notch filters.

2. Discussion of Related Art

The need for compact data storage is explosively increasing. The explosive increase in demand is fueled by the growth of multimedia systems utilizing text, video, and audio information. Furthermore, there is a large demand for highly portable, rugged, and robust systems for use as multimedia entertainment, storage systems for PDA's, cell phones, electronic books, and other systems. One of the more promising technologies for rugged, removable, and portable data storage is WORM (write once read many) optical disk drives.

One of the important factors affecting design of an optical system (such as that utilized in a WORM drive) is the optical components utilized in the system and the control of actuators utilized to control the optical system on the disk. The optical system typically includes a laser or other optical source, focusing lenses, reflectors, optical detectors, and other components. Although a wide variety of systems have been used or proposed, typical previous systems have used optical components that were sufficiently large and/or massive that functions such as focus and/or tracking were performed by moving components of the optical system. For example, some systems move the objective lens (e.g. for focus) relative to the laser or other light source. It was generally believed that the relatively large size of the optical components was related to the spot size, which in turn was substantially dictated by designs in which the data layer of a disk was significantly spaced from the physical surface of the disk. A typical optical path, then, passed through a disk substrate, or some other portion of the disk, typically passing through a substantial distance of the disk thickness, such as about 0.6 mm or more, before reaching a data layer.

Regardless of the cause being provided for relative movement between optical components, such an approach, while perhaps useful for accommodating relatively large or massive components, presents certain disadvantages for more compact usage. These disadvantages include a requirement for large form factors, the cost associated with establishing and maintaining optical alignment between components which must be made moveable with respect to one another, and the power required to perform operations on more massive drive components. Such alignment often involves manual and/or individual alignment or adjustment procedures which can undesirably increase manufacturing or fabrication costs for a reader/writer, as well as contributing to costs of design, maintenance, repair, and the like.

Many early optical disks and other optical storage systems provided relatively large format read/write devices including, for example, devices for use in connection with 12 inch (or larger) diameter disks. As optical storage technologies have developed, however, there has been increasing attention toward providing feasible and practical systems which are of relatively smaller size. Generally, a practical read/write device must accommodate numerous items within its form factor, including the media, media cartridge (if any), media spin motor, power supply and/or conditioning, signal processing, focus, tracking or other servo electronics, and components associated or affecting the laser or light beam optics. Accordingly, in order to facilitate a relatively small form-factor, an optical head occupying small volume is desirable. In particular, it is desirable that the optical head have a small dimension in the direction perpendicular to the surface of the spinning media. Additionally, a smaller, more compact, optical head provides numerous specific problems for electronics designed to control the position and focus of the optical head.

Additionally, although larger home systems have little concern regarding power usage, portable personal systems should be low power devices. Therefore, it is also important to have a system that conserves power (e.g., by optically overfilling lenses) in both the optical system and the electronic controlling system.

Therefore, there is a need for an optical head and optical media drive system with a small form factor and, in addition, a servo system for controlling the optical head and optical drive system so that data can be reliably read from and written to the optical media.

SUMMARY

In accordance with the present invention, notch filters in a digital servo system are calibrated. The optical disk drive system includes a spin motor on which an optical media is positioned, an optical pick-up unit positioned relative to the optical media, an actuator arm that controls the position of the optical pick-up unit, and a control system for controlling the spin motor, the actuator arm, and the laser. The control system can include a read/write channel coupled to provide control signals to a servo system.

The optical media can be a relatively small-sized disk with readable data present on the surface of the disk. Furthermore, the optical disk may have a pre-mastered portion and a writeable portion. The pre-mastered portion is formed when the disk is manufactured and contains readable data such as, for example, audio, video, text or any other data that a content provider may wish to include on the disk. The writeable portion is left blank and can be written by the disk drive to contain user information (e.g., user notes, interactive status (for example in video games), or other information that the drive or user may write to the disk). Because there may be optical differences, for example in reflectivity, and in the data storage and addressing protocols between the pre-mastered portion of the disk and the writable portion of the disk, a control system according to the present invention may have different operating parameters in the different areas of the disk.

The optical pick-up unit can includes a light source, reflectors, lenses, and detectors for directing light onto the optical media. The detectors can include laser power feed-back detectors as well as data detectors for reading data from the optical media. The optical pick-up unit can be mechanically mounted on the actuator arm. The actuator arm includes a tracking actuator for controlling lateral movement across the optical media and a focus actuator for controlling the position of the optical pick-up unit above the optical medium. The tracking and focus actuators of the optical pick-up unit are controlled by the controller.

The servo system includes various servo loops for controlling the operation of aspects of the optical disk drive, for example the spin motor, the optical pick-up unit, and the controller. The servo loops, for example, can include combinations of a tracking servo loop and a focus servo loop.

A method of calibrating a notch filter in a digital servo system includes obtaining a frequency response curve of the digital servo system over a range of frequencies; searching the frequency response curve for at least one frequency having a peak frequency response; and setting notch filter parameters of the notch filter to filter signals in the digital servo system at the at least one frequency. The notch filter may be included in a tracking servo system or a focus servo system. The frequency response curve can be obtained by perturbing the digital servo system with selected frequencies within the range of frequencies and calculating the discreet Fourier transform amplitude of the frequency response at each of the selected frequencies. In some embodiments, the frequency response curve is calculated from an error signal which is coupled to provide an input signal to the notch filter. Additionally, in some embodiments perturbing the digital servo system includes adding a sinusoidal control signal to a control signal derived from an output signal from the notch filter.

A digital servo system according to the present invention includes an optical pick-up unit, an analog processor coupled to receive signals from detectors in the optical pick-up unit and provide digital signals, at least one processor coupled to receive the digital signals and calculate a control signal, and a driver coupled to control a position of the optical pick-up unit in response to the control signal. The at least one processor can execute an algorithm that provides a notch filter in the digital servo system; obtains a frequency response curve of the digital servo system over a range of frequencies; searches the frequency response curve for at least one frequency having a peak frequency response; and sets notch filter parameters of the notch filter to filter signals in the digital servo system at the at least one frequency.

These and other embodiments of the invention are further described below with respect to the following figures.

SHORT DESCRIPTION OF THE FIGURES

FIGS. 2M, 2N, 2O, 2P, 2Q, and 2R illustrate development of a tracking error signal (TES) as a function of position of the optical pick-up unit over the surface of the optical media in some embodiments of the present invention.

Figure 3A:
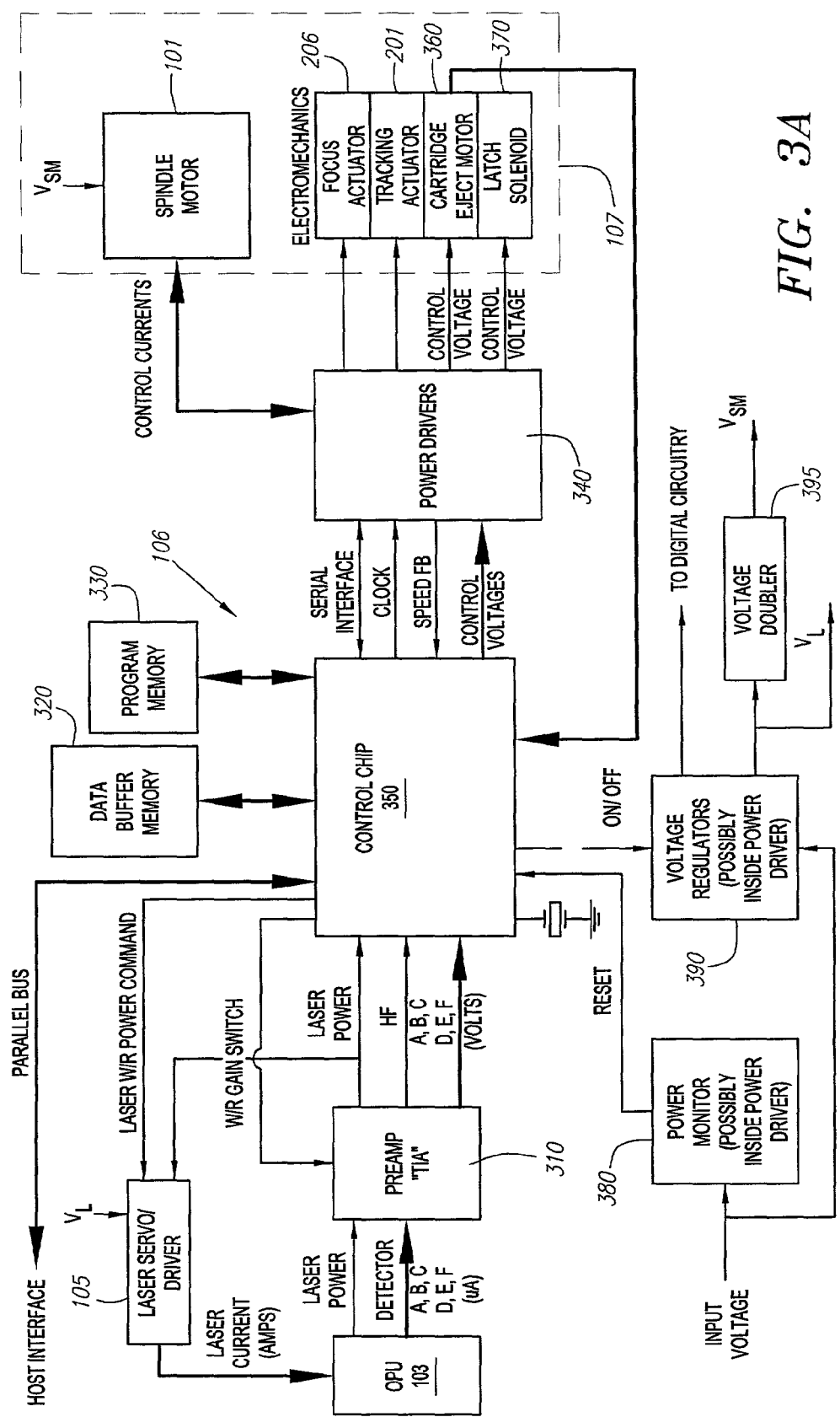

FIG. 3A shows a block diagram of a servo system control system of an optical drive according to some embodiments of the present invention.

Figure 3B:
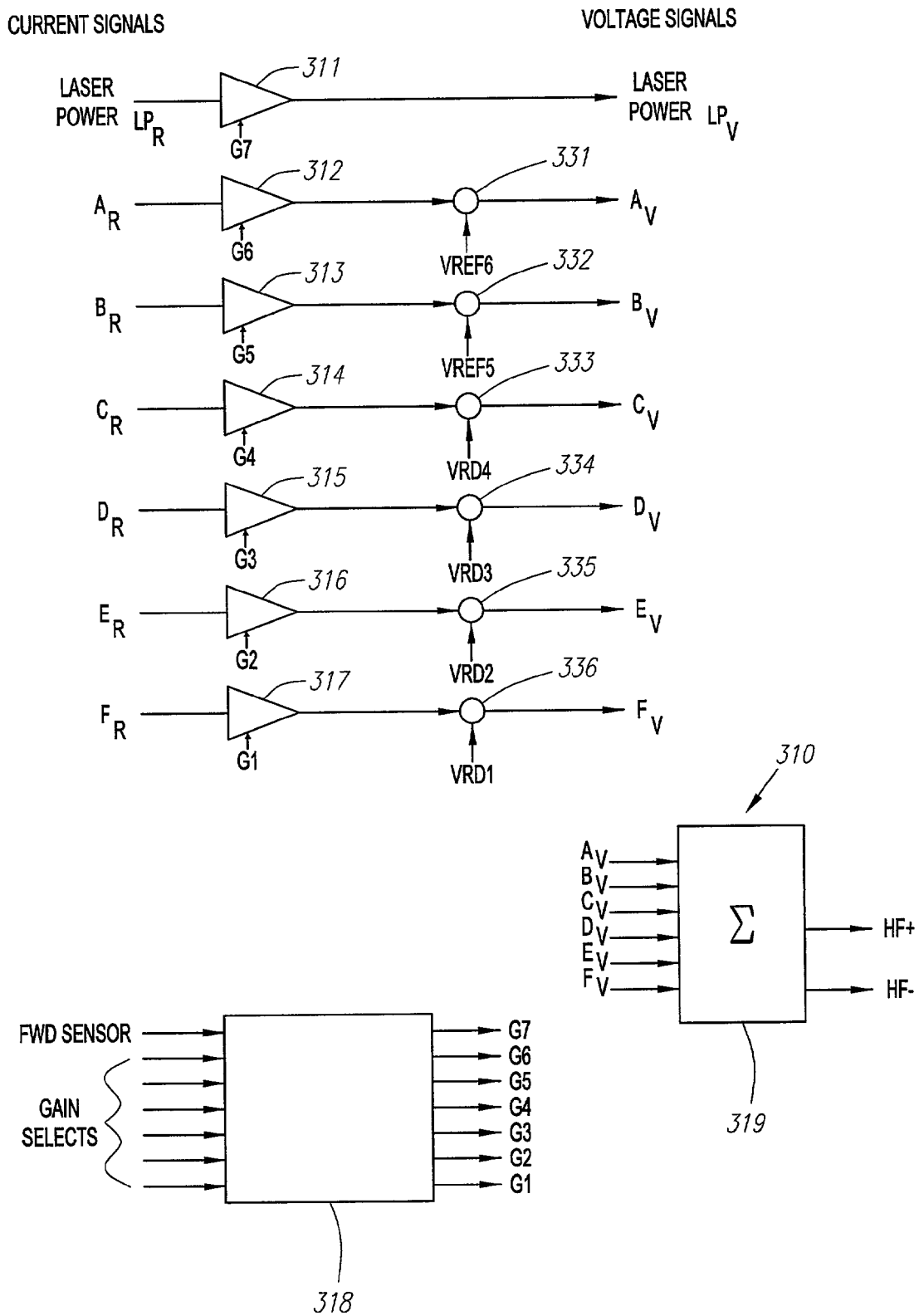

FIG. 3B shows a block diagram of a preamp of FIG. 3A.

Figure 4B:
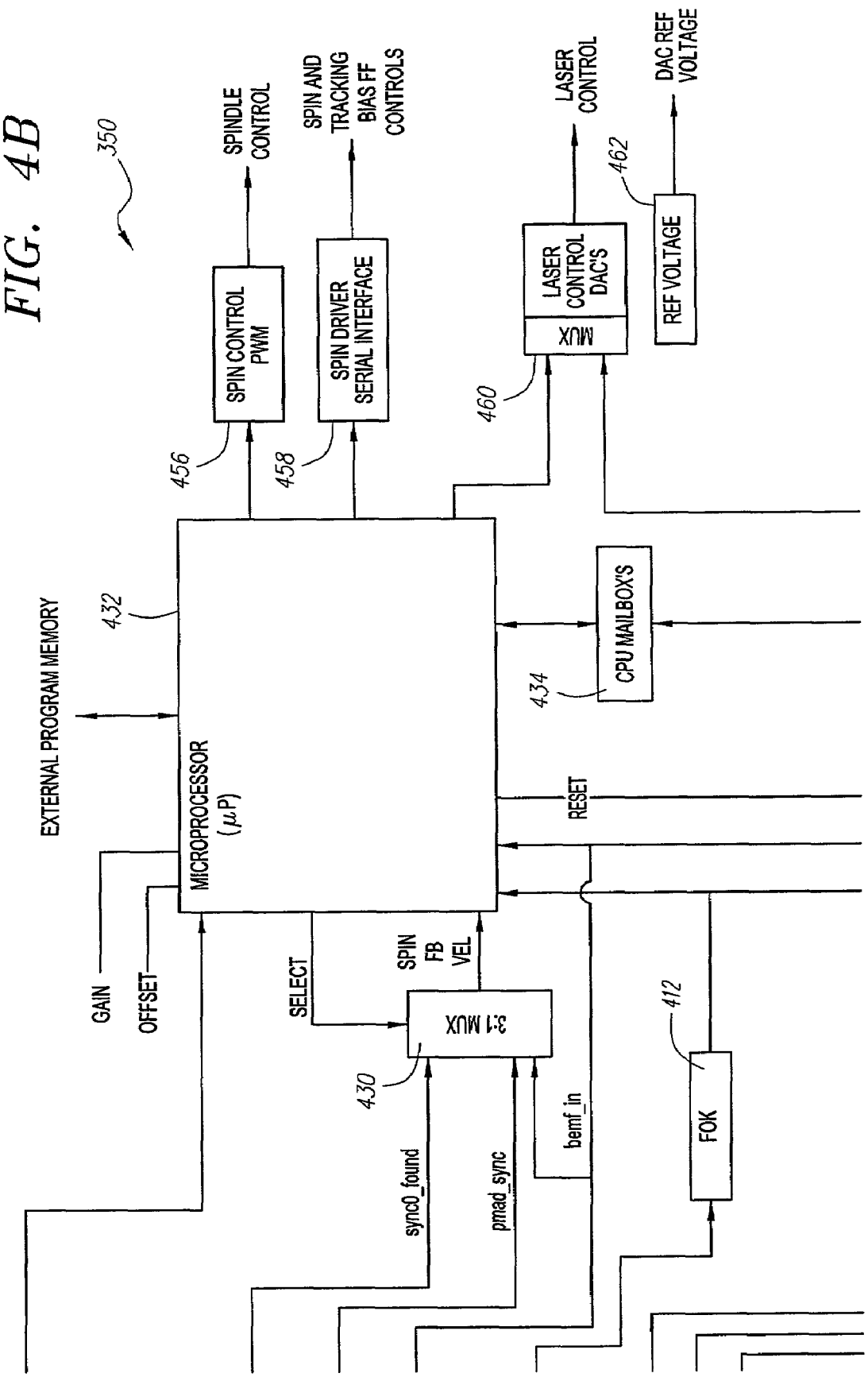
Figure 4C:
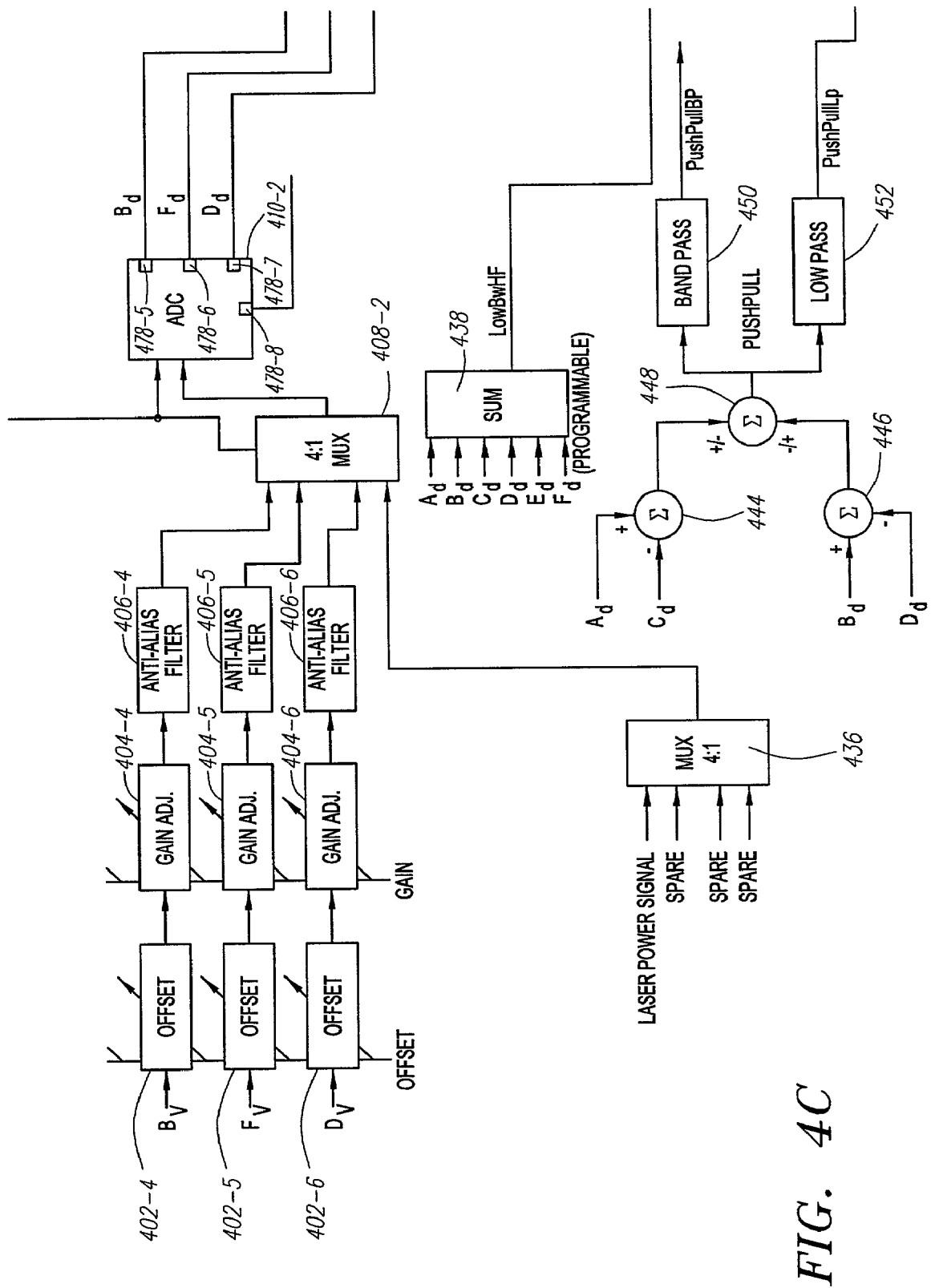
Figure 4D:
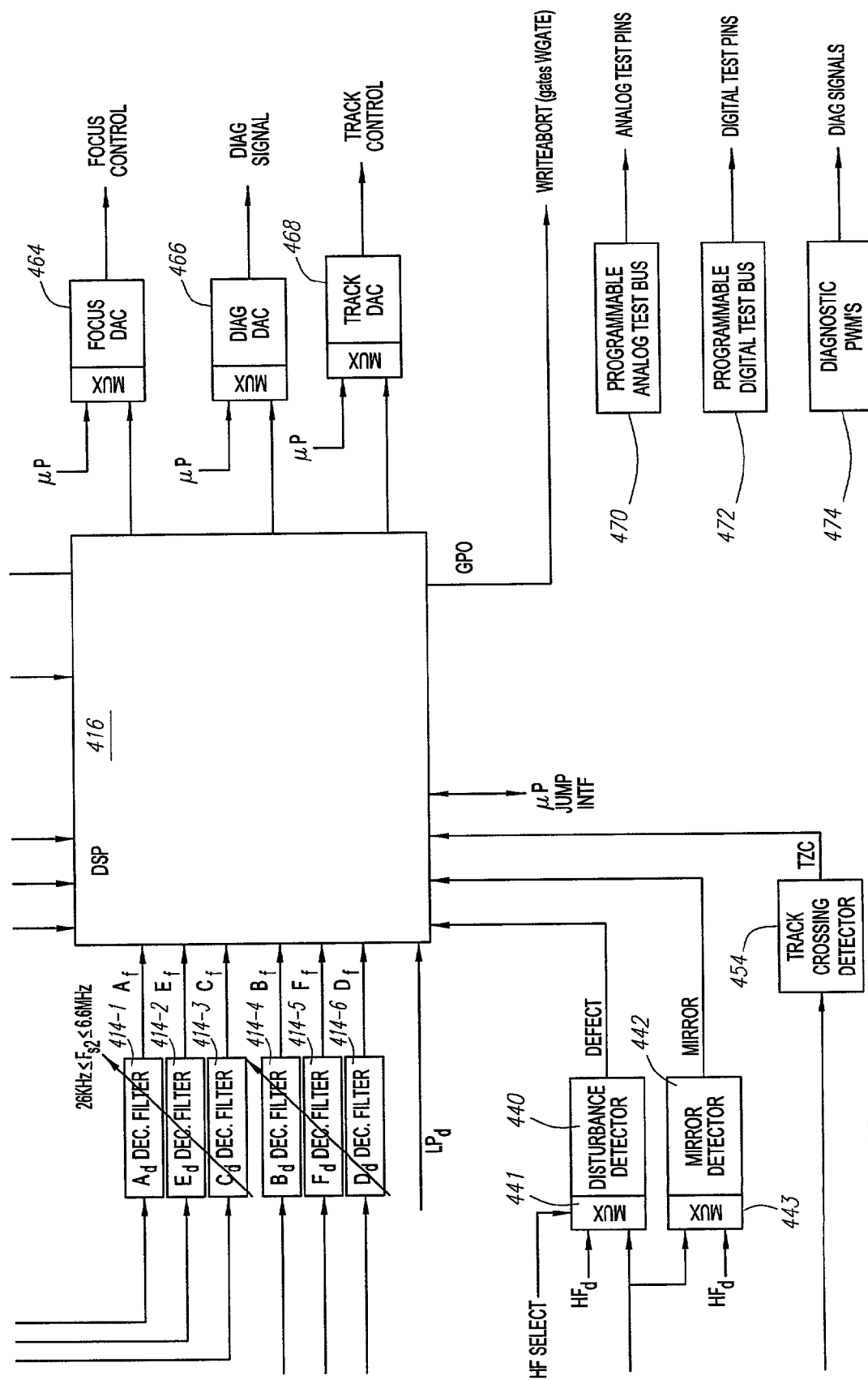

FIG. 4 shows a block diagram of an embodiment of the controller chip shown in the block diagram of FIG. 3A according to some embodiments of the present invention.

Figures 2, 5A:
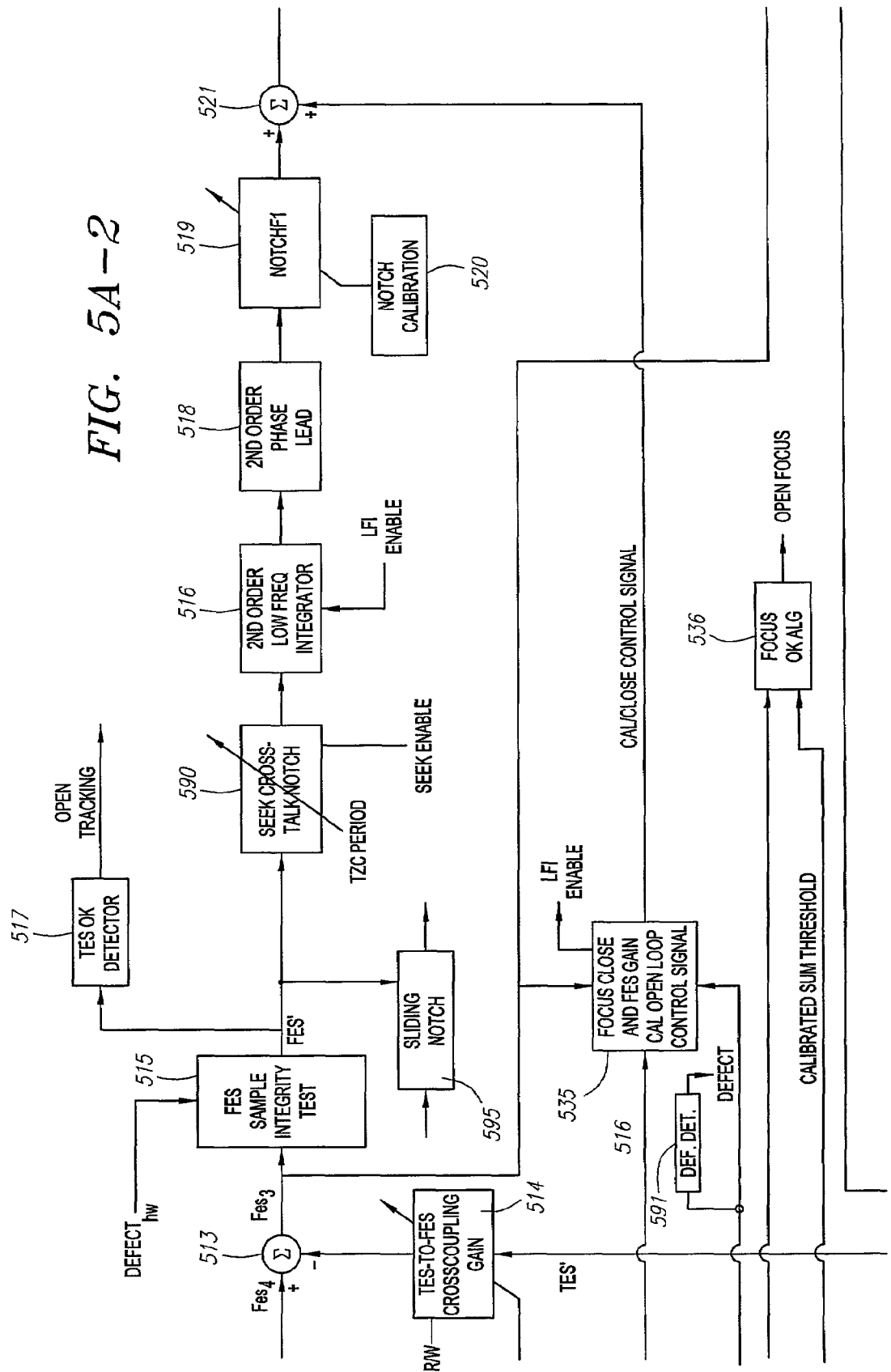
Figures 3, 5A:
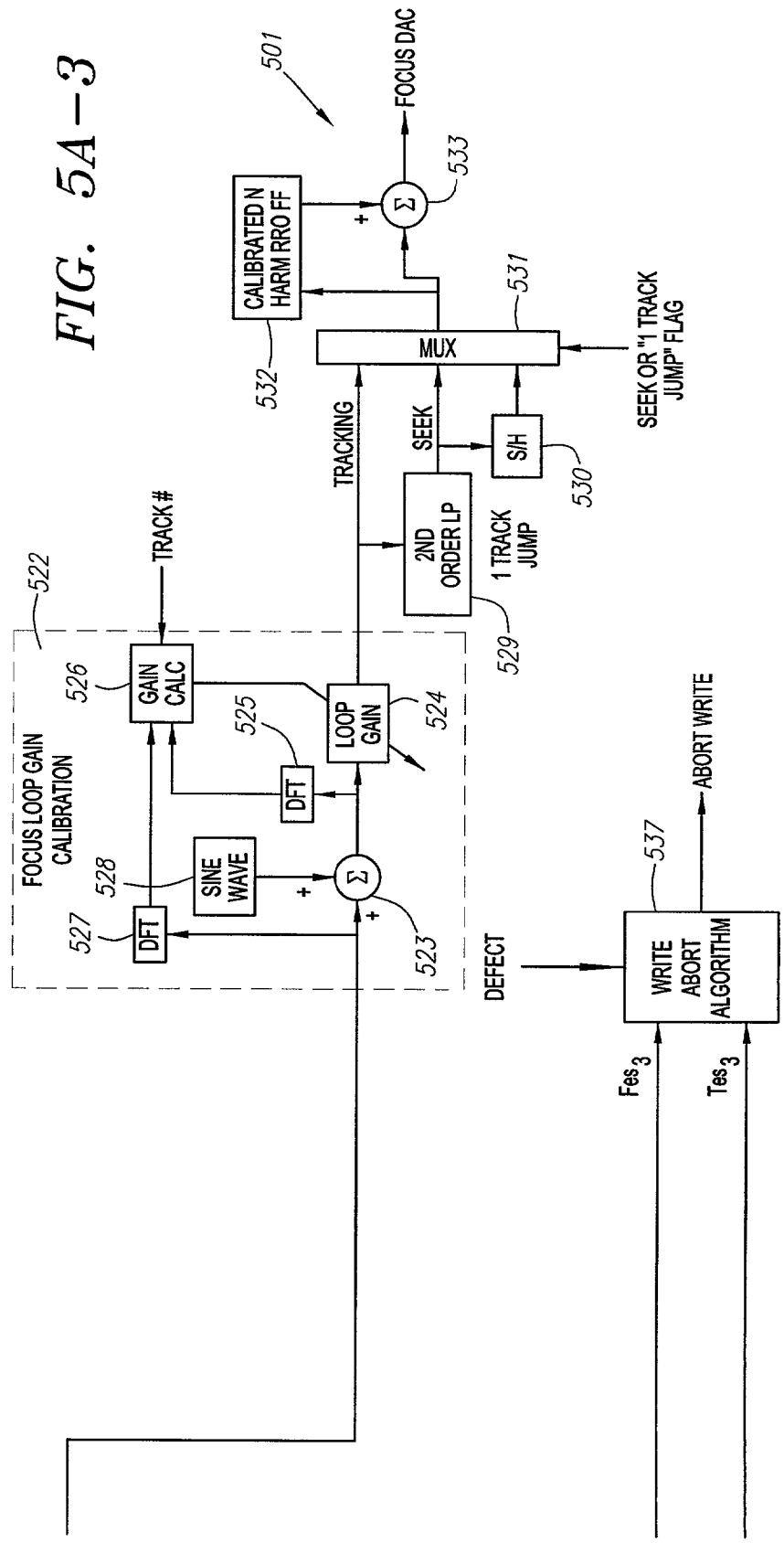
Figures 2, 5B:
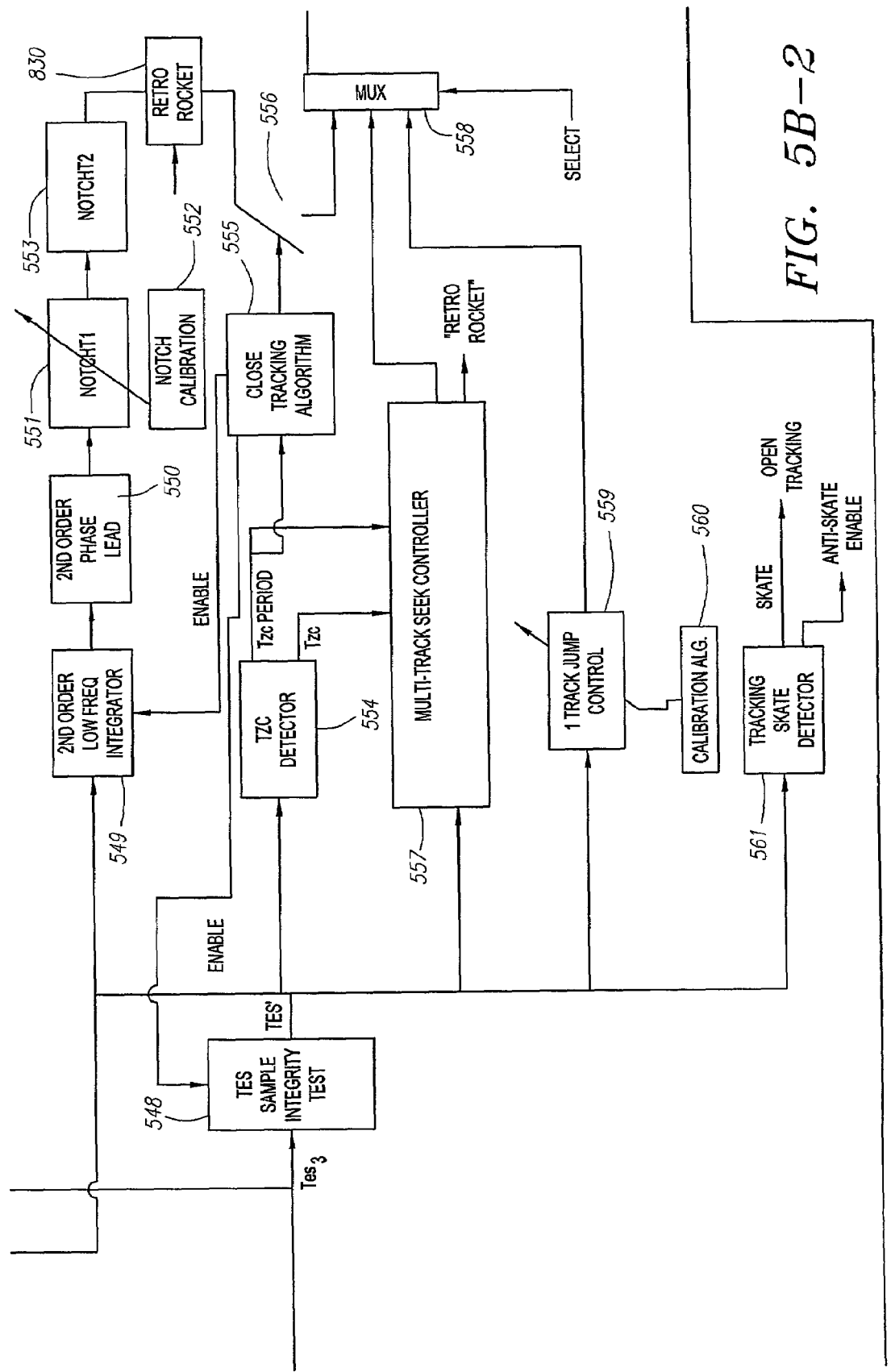
Figures 3, 5B:
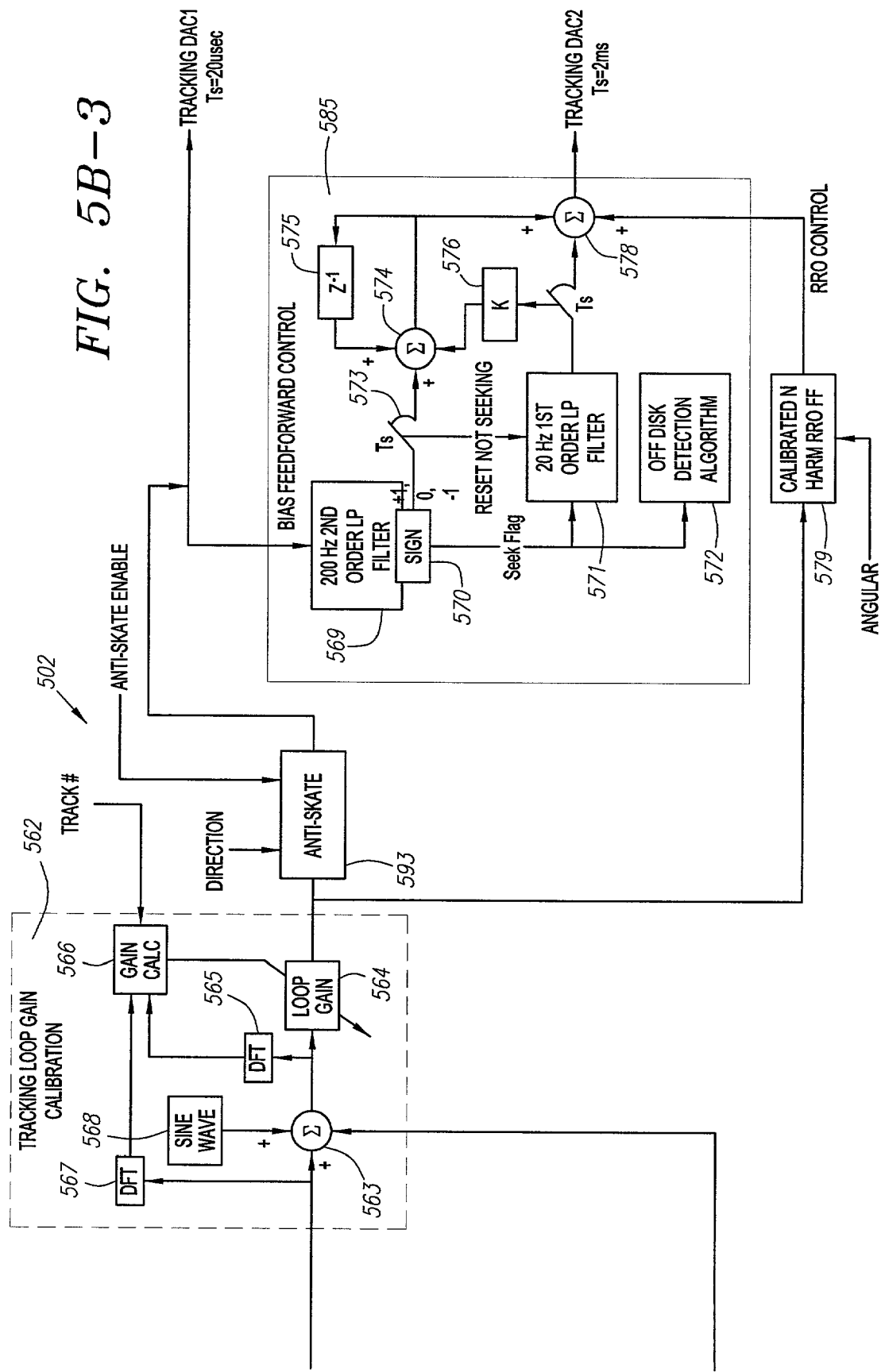

FIGS. 5A and 5B show a function block diagram of embodiments of a focus and tracking servo algorithms according to some embodiments of the present invention.

Figure 5C:
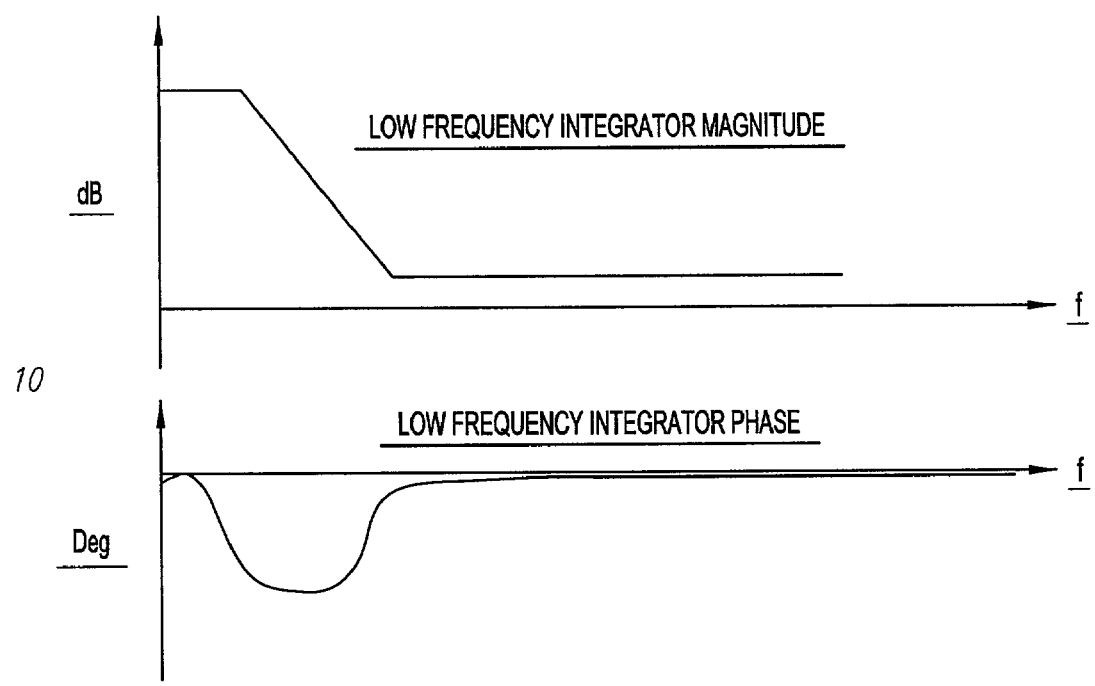

FIG. 5C shows an example transfer function for a low frequency integrator as shown in FIGS. 5A and 5B.

Figure 5D:
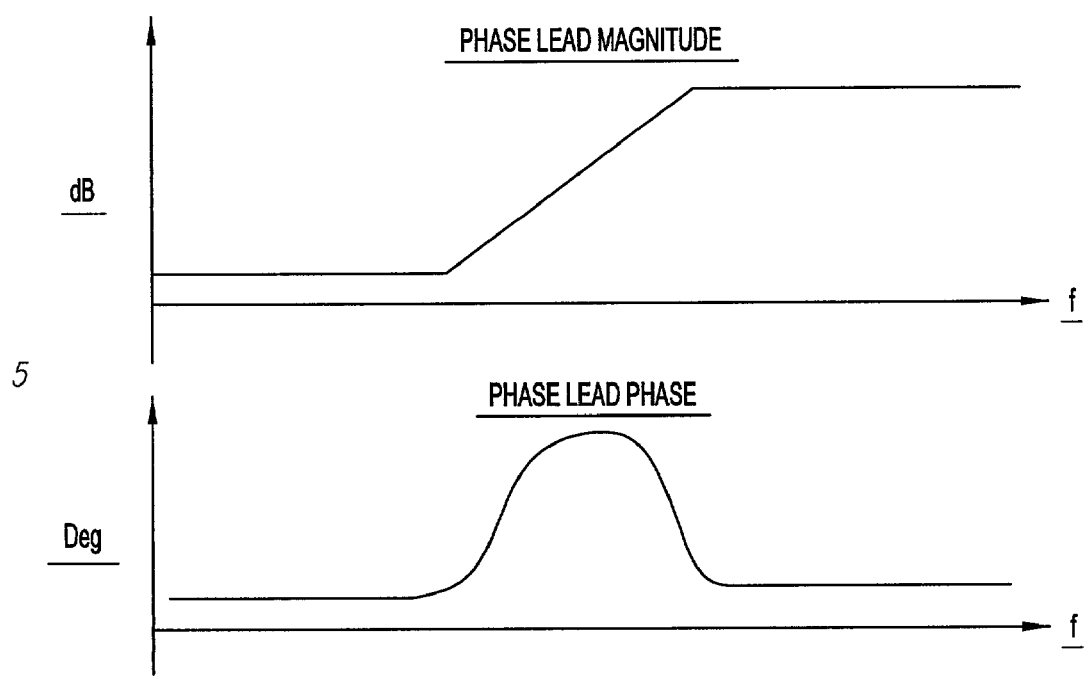

FIG. 5D shows an example transfer function for a phase lead as shown in FIGS. 5A and 5B.

Figure 5E:
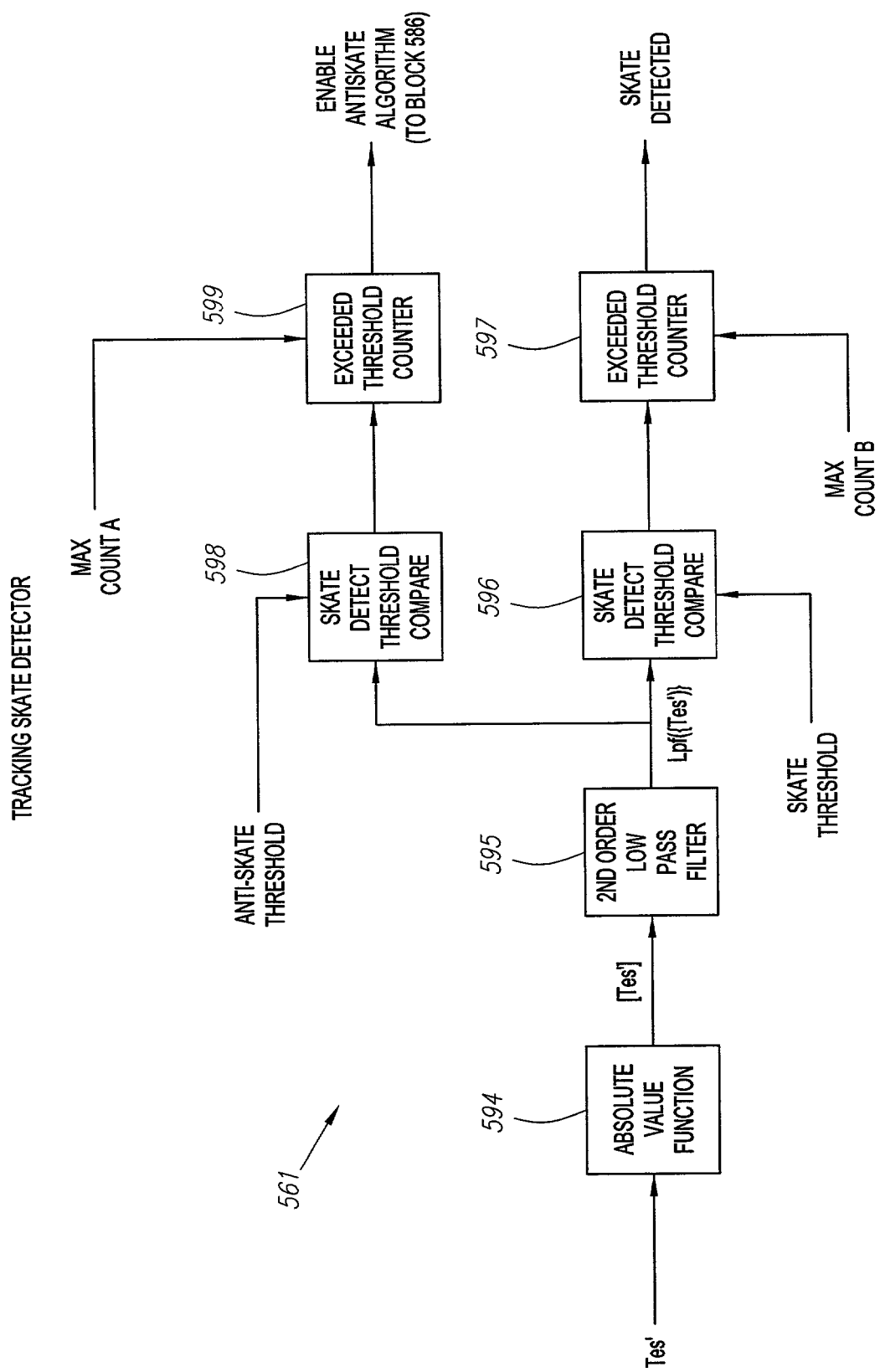
Figure 5F:
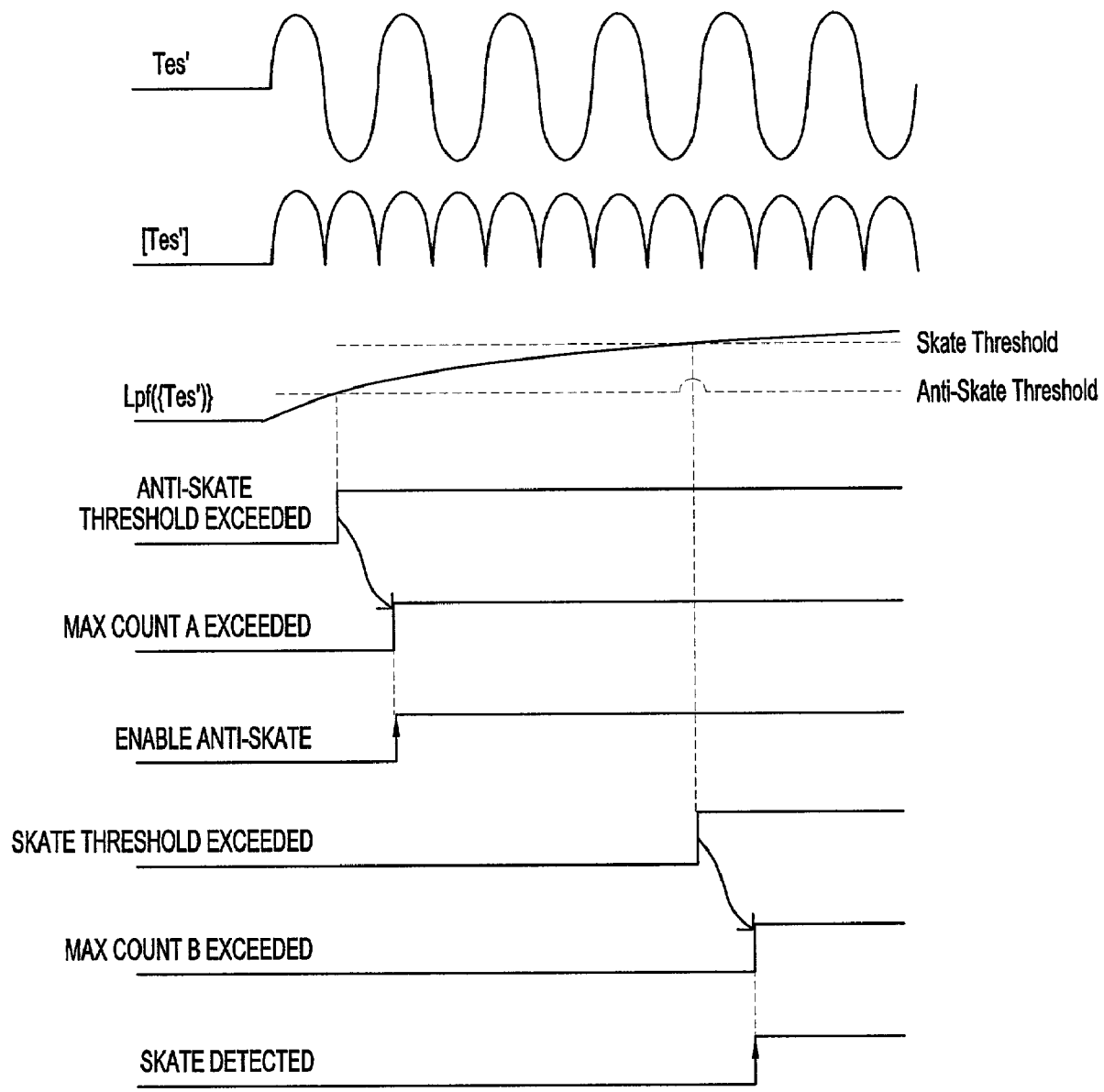

FIGS. 5E and 5F shows an example of a tracking skate detector according to some embodiments of the present invention.

Figure 5G:
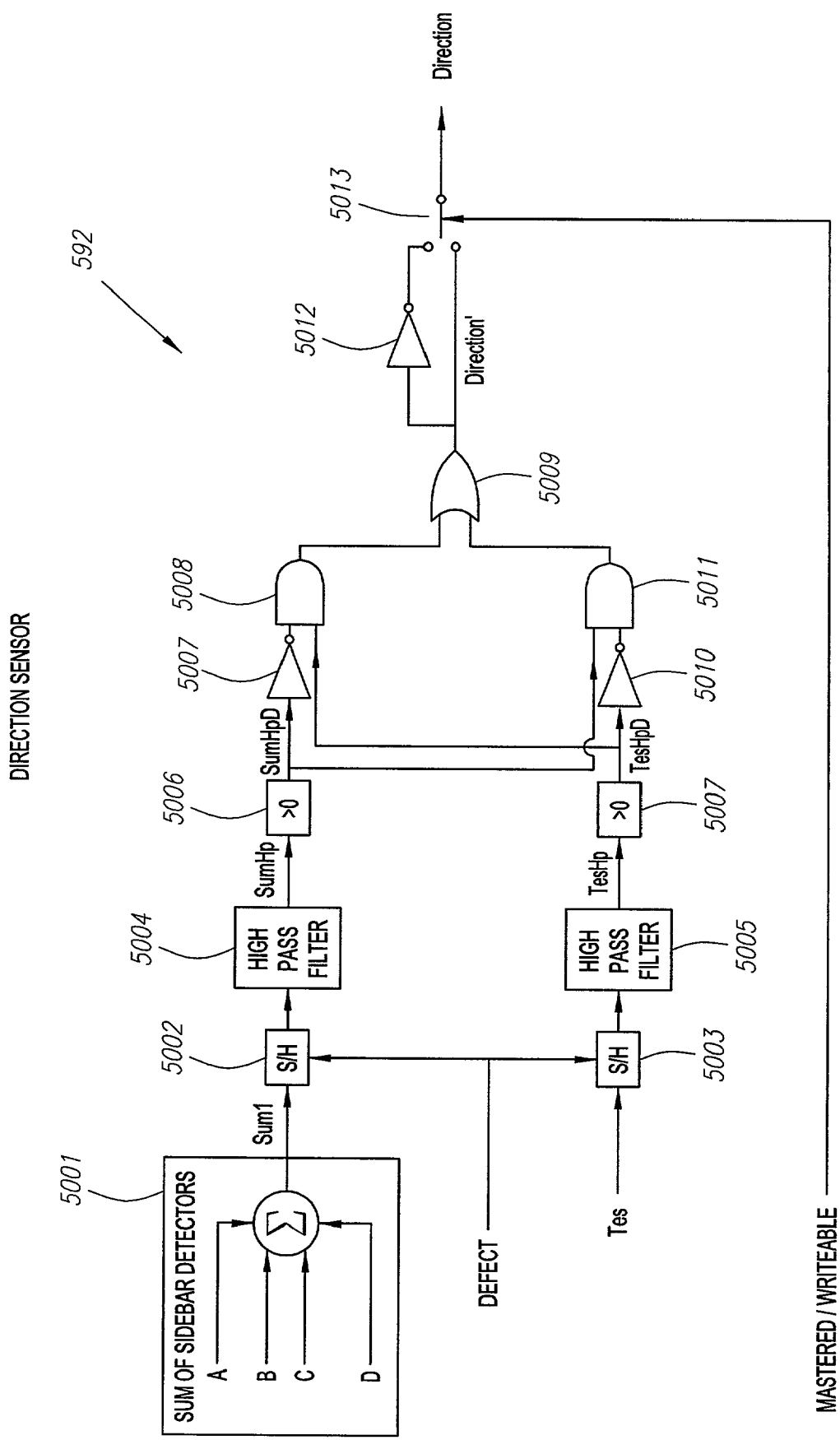

FIG. 5G shows an embodiment of a direction sensor according to some embodiments of the present invention.

Figure 6:
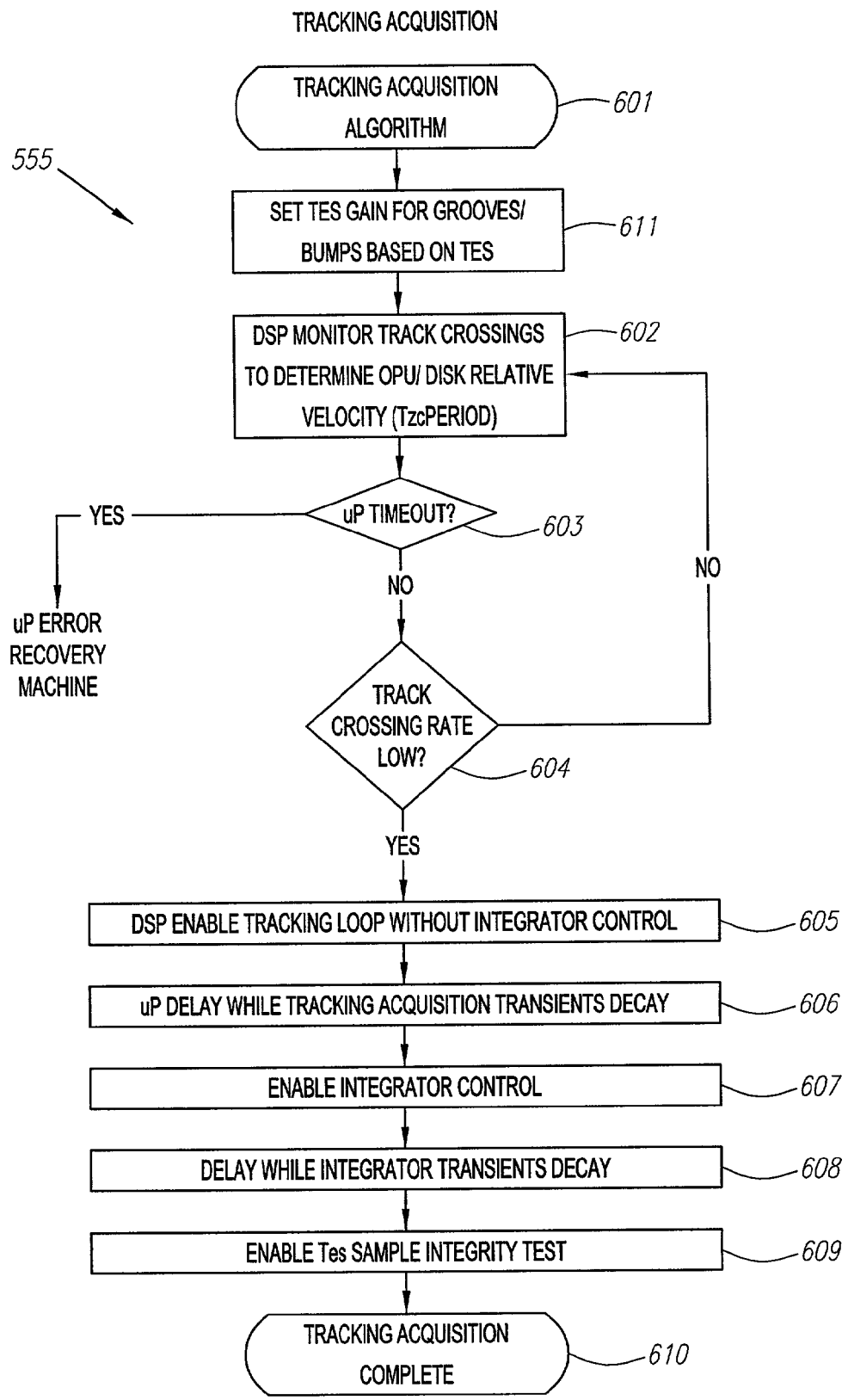

FIG. 6 shows an embodiment of a tracking acquisition algorithm executed with the algorithms shown in FIGS. 5A and 5B.

FIGS. 7A, 7B, 7C, and 7D show an embodiment of a focus acquisition algorithm executed with the algorithms shown in FIGS. 5A and 5B according to some embodiments of the present invention.

Figure 8A:
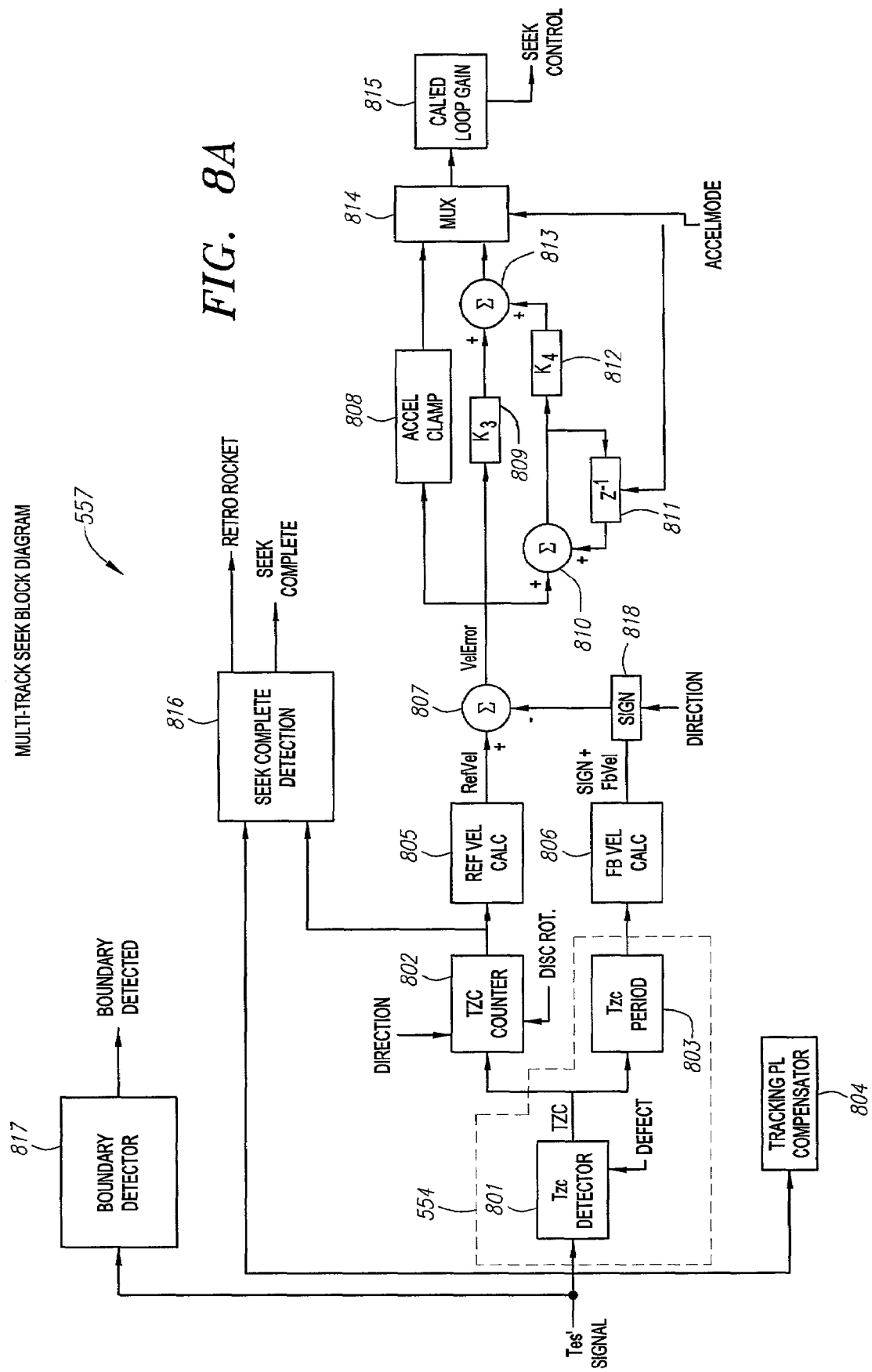
Figure 8B:
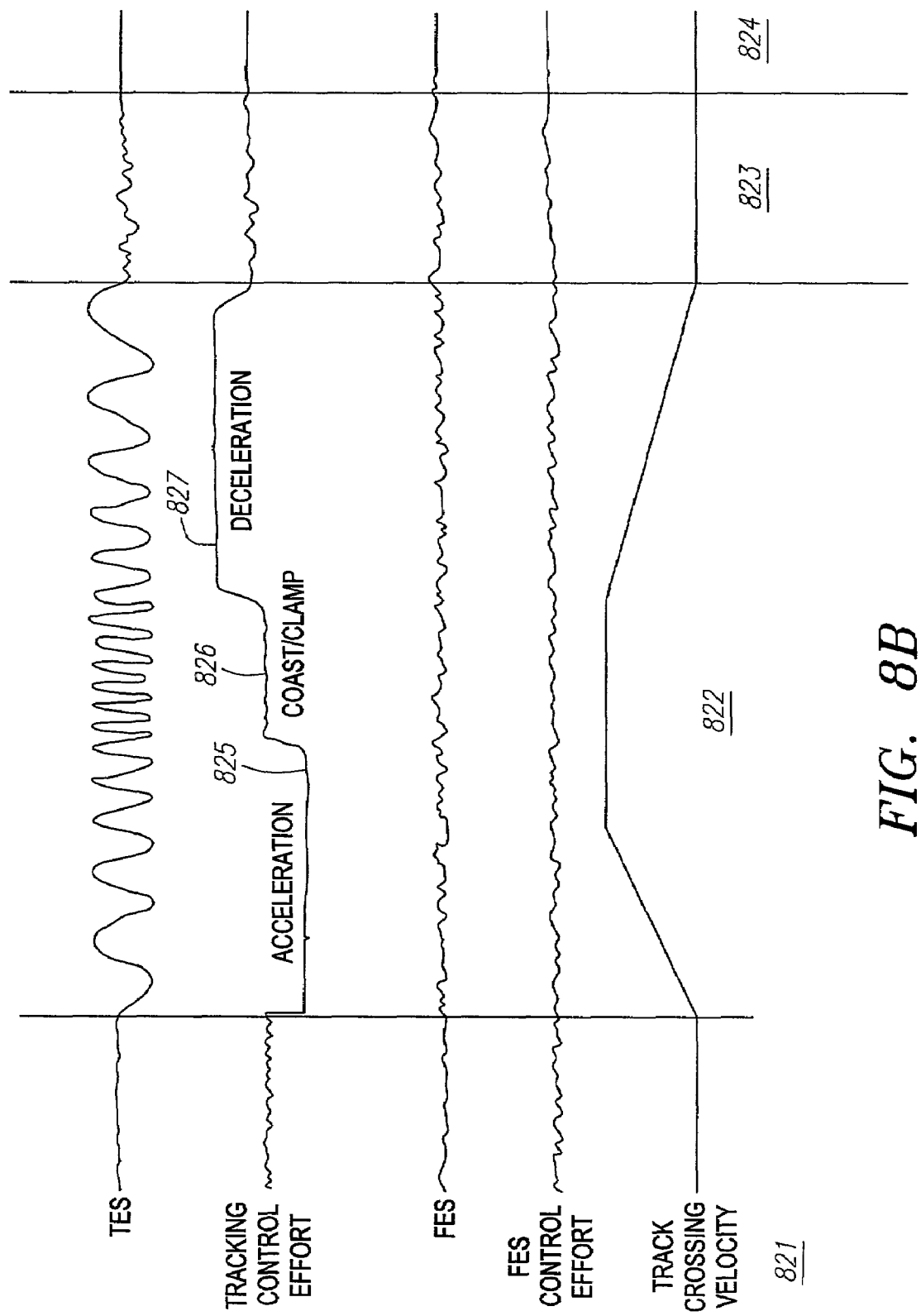

FIGS. 8A and 8B shows an embodiment of a multi-track seek algorithm according to some embodiments of the present invention.

Figures 1, 9A:
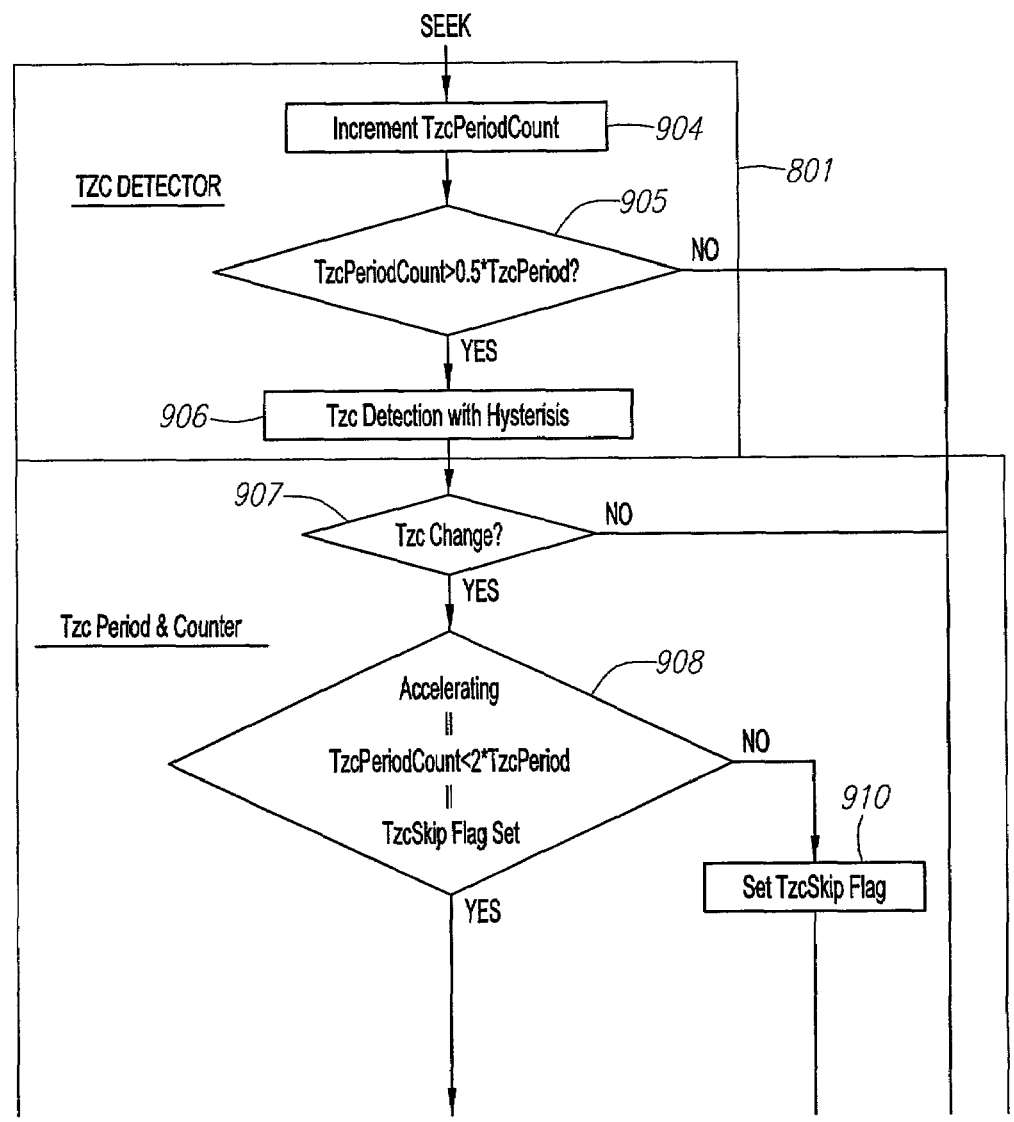
Figures 2, 9A:
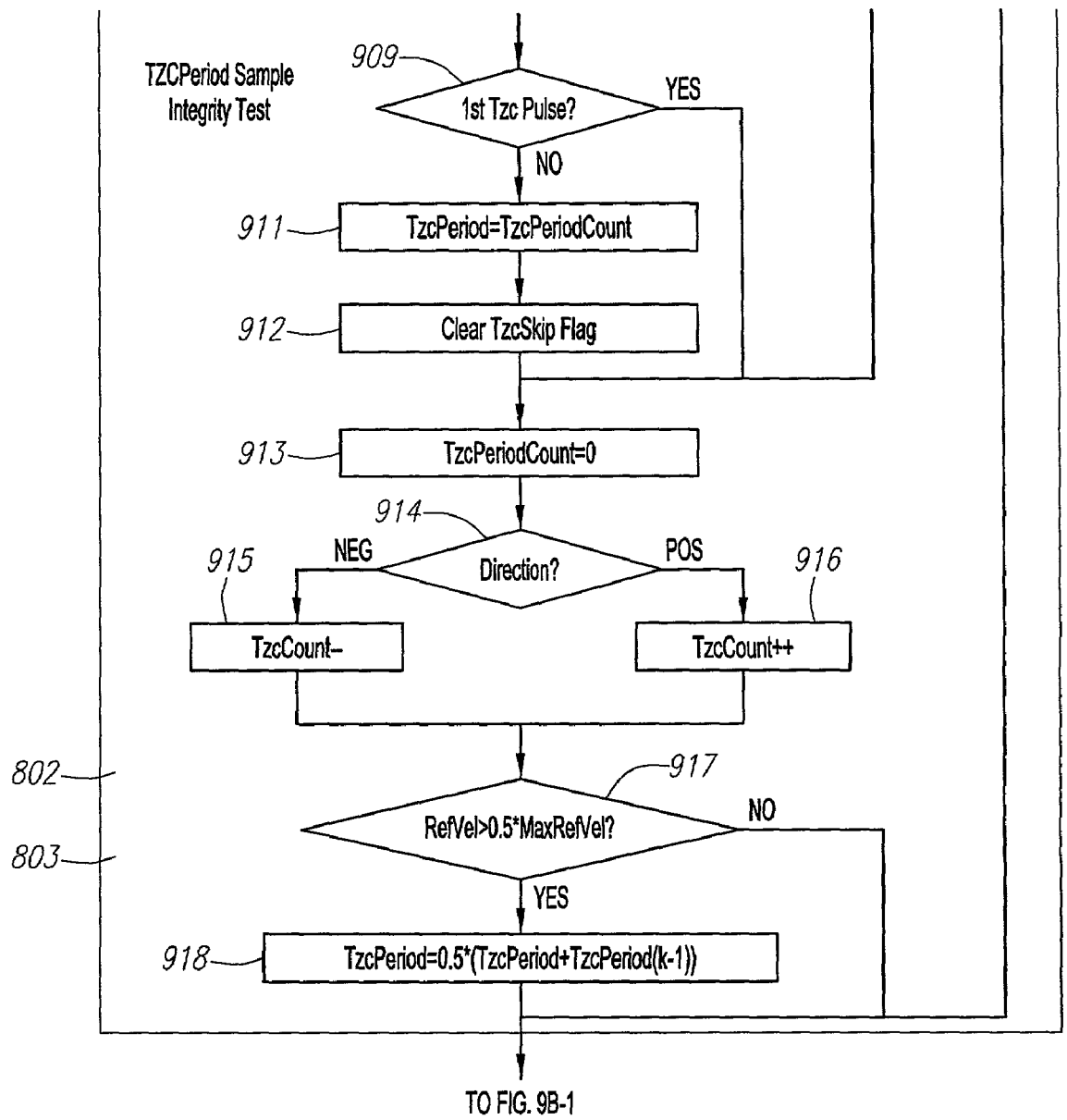
Figures 2, 9B:
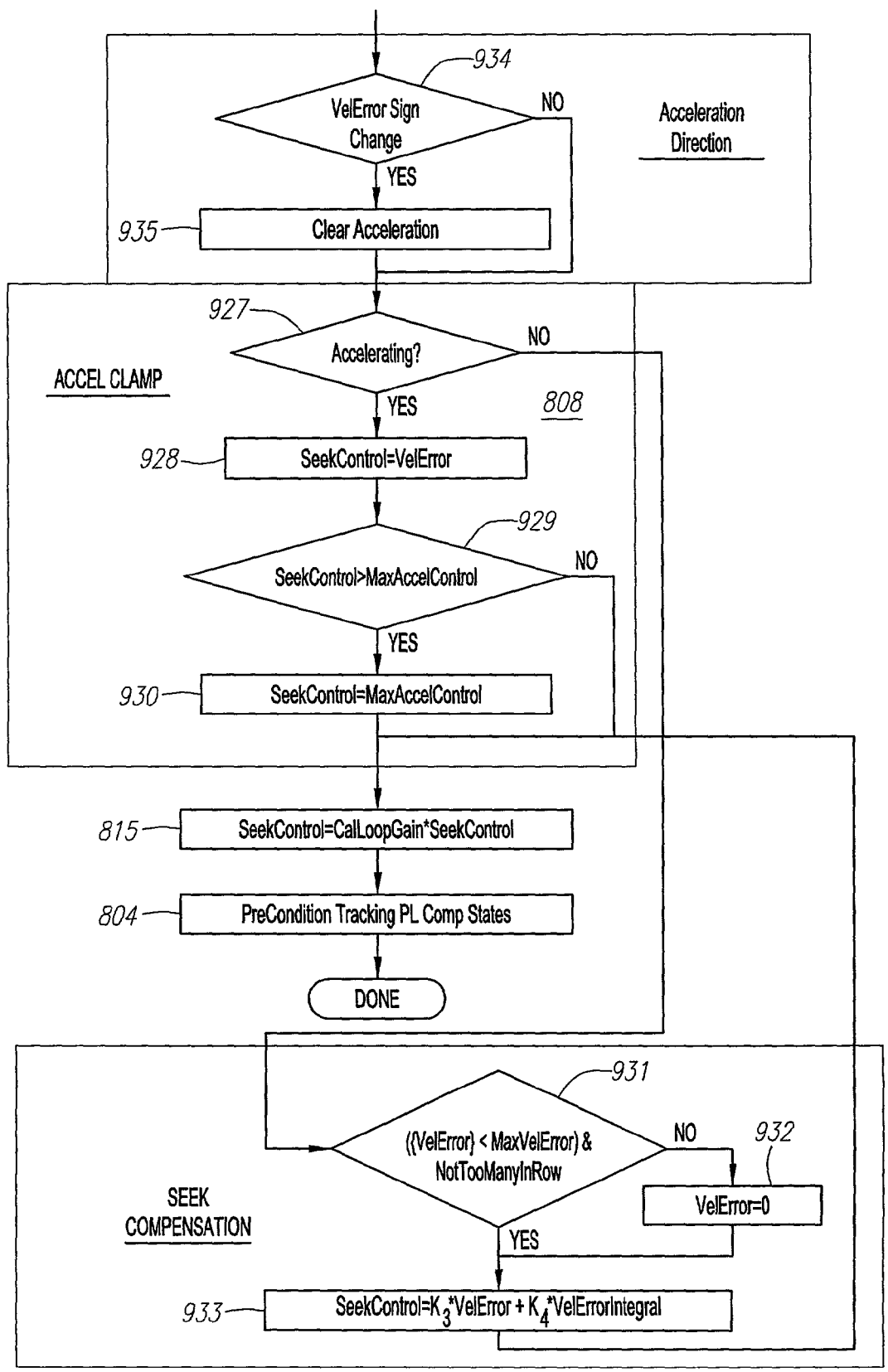

FIGS. 9A and 9B show an embodiment of a multi-track seek algorithm executed with the algorithms illustrated in the functional block diagram shown in FIGS. 8A and 8B in some embodiments of the present invention.

Figure 9C:
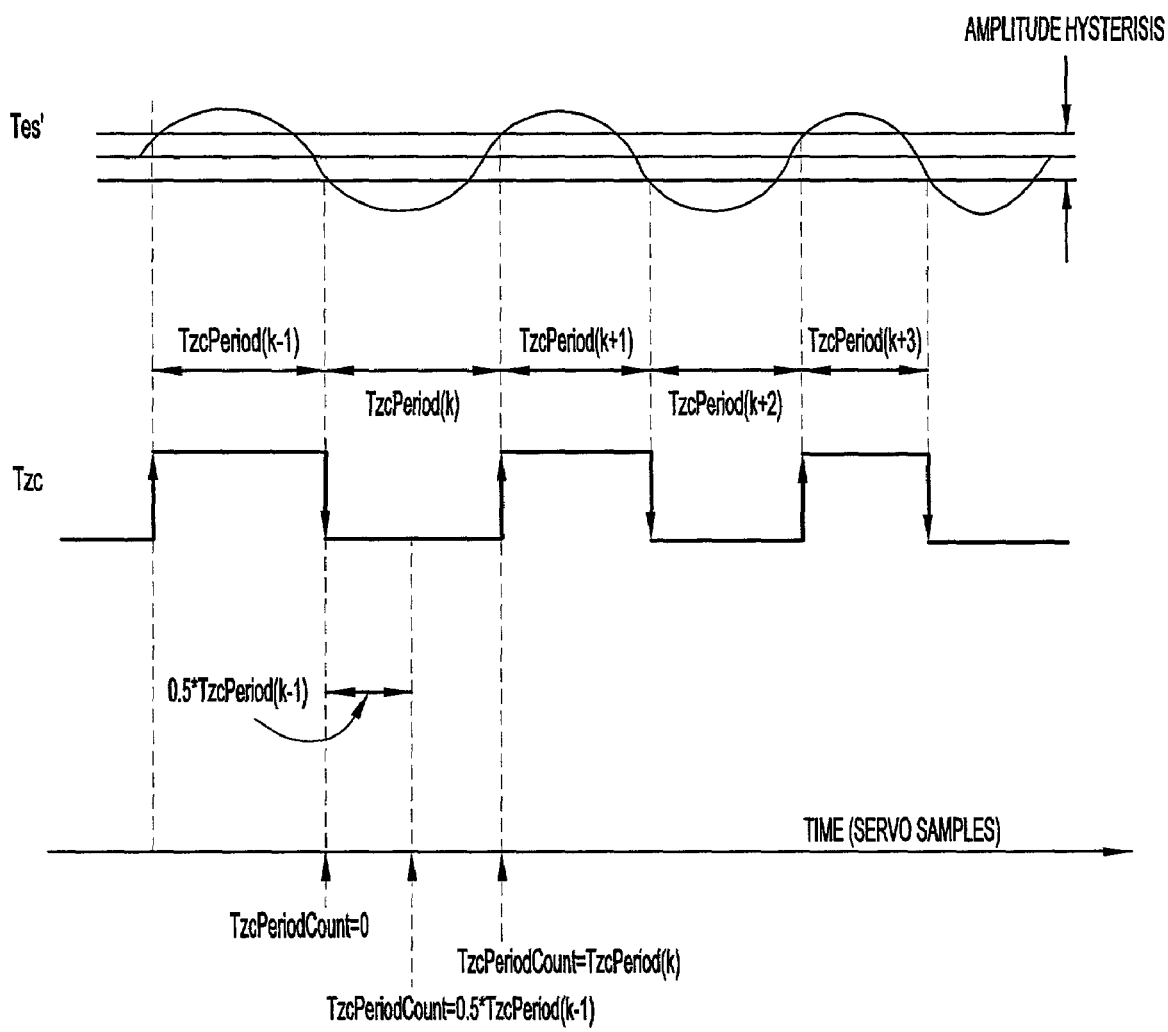

FIG. 9C illustrates the temporal hysterisis and amplitude hysterisis of tracking zero cross detection of FIGS. 9A and 9B.

Figure 10A:
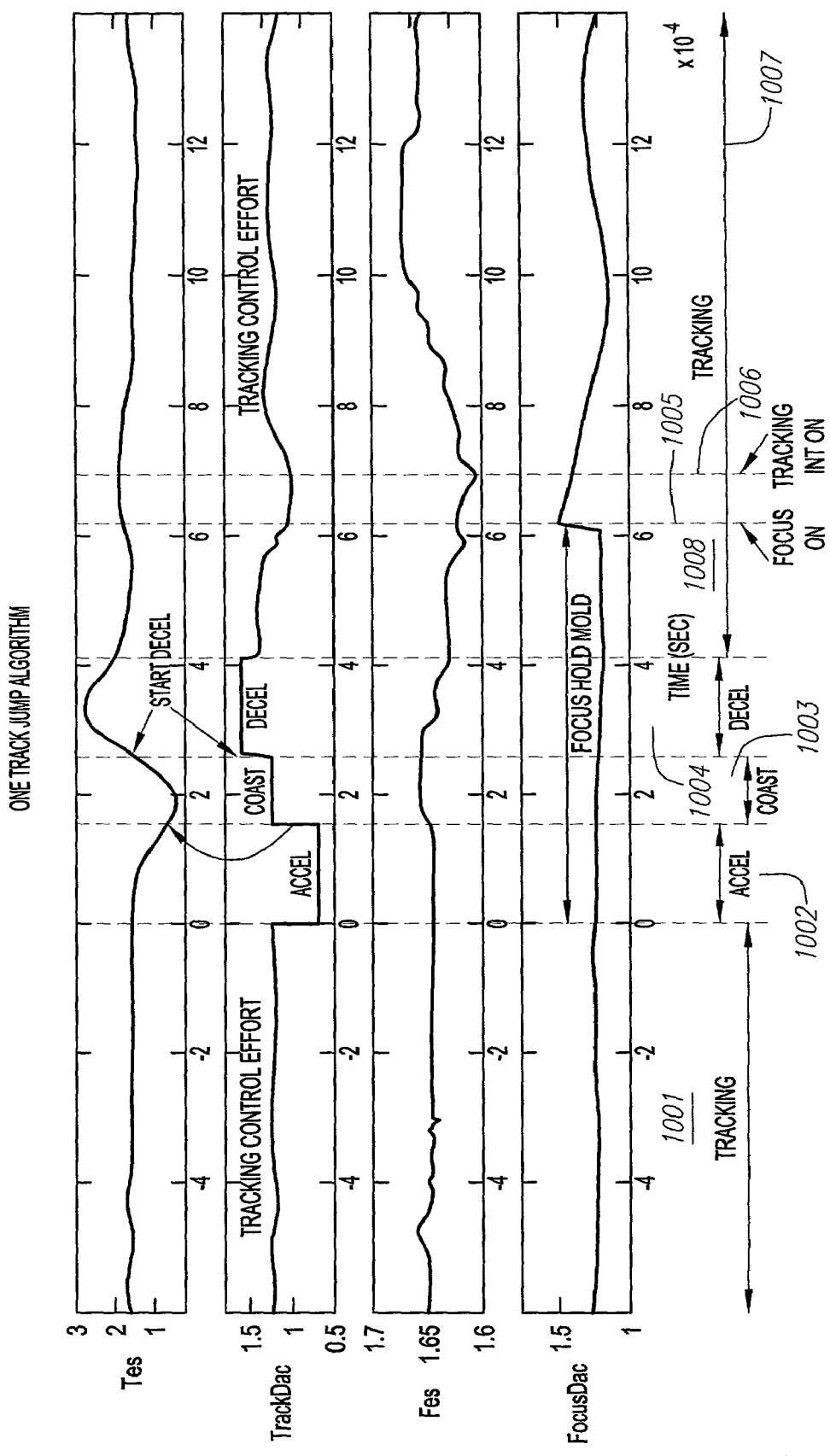
Figure 10B:
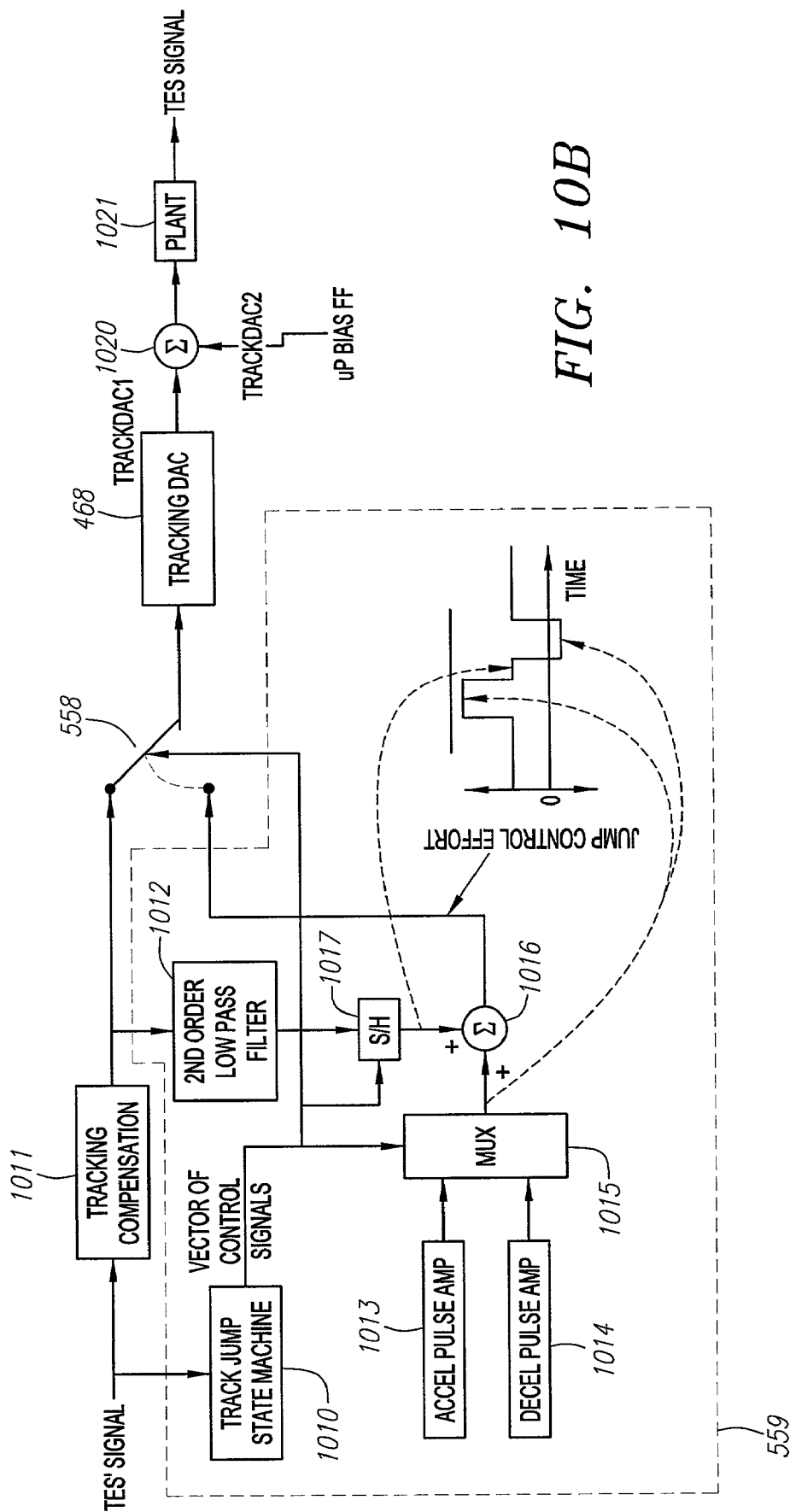

FIGS. 10A and 10B show demonstrative control signals and a block diagram of a one-track jump algorithm of FIGS. 5A and 5B according to some embodiments of the present invention.

Figure 11:
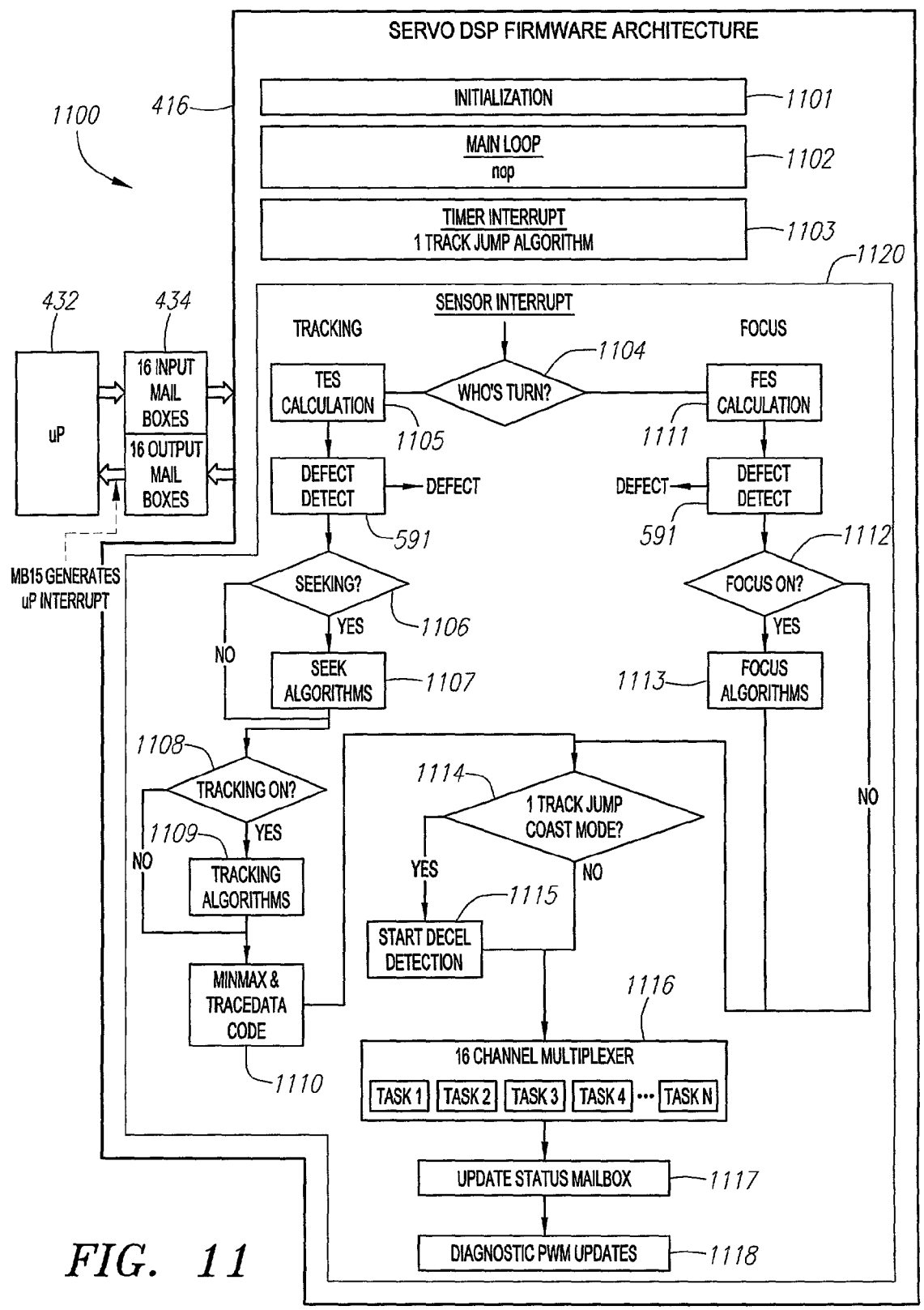

FIG. 11 shows an embodiment of the DSP firmware architecture for controlling and monitoring focus and tracking according to some embodiments of the present invention.

Figure 12A:
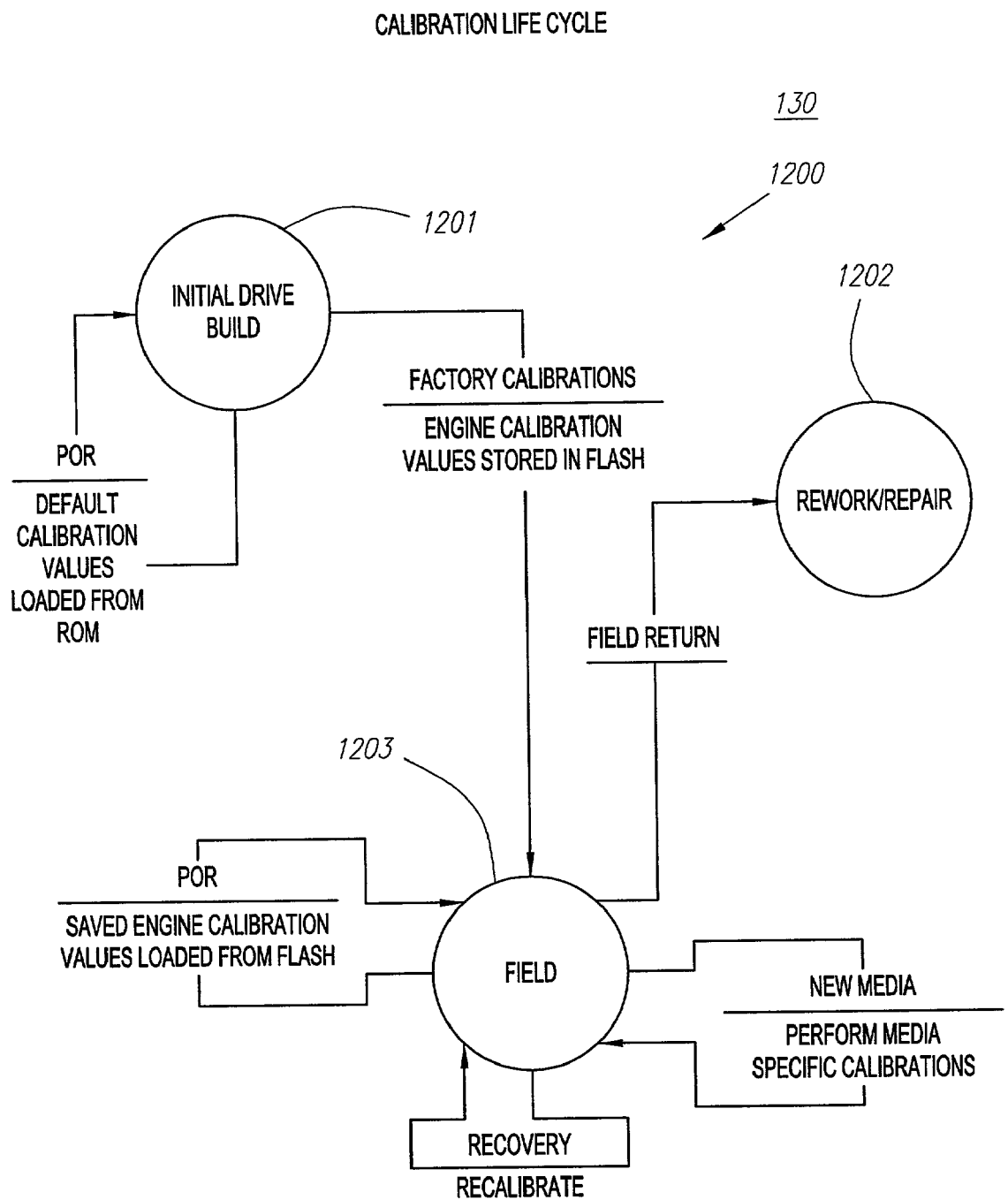

FIG. 12A shows a block diagram of an embodiment of a calibration lifetime for a drive according to some embodiments of the present invention.

FIG. 12B shows a chart of parameters and when those parameters are calibrated through the lifetime of an example drive according to some embodiments of the present invention.

Figure 13A:
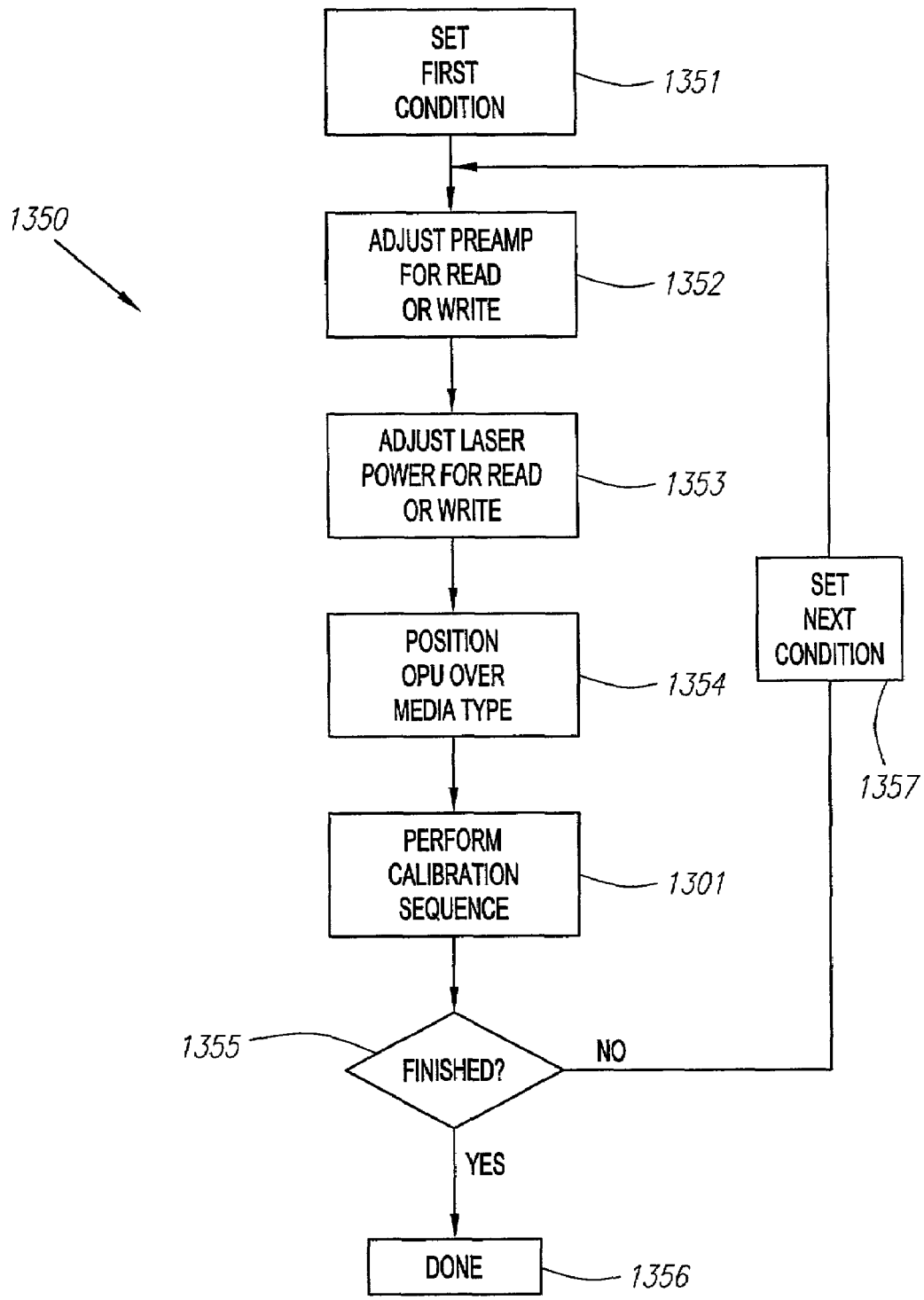

FIG. 13A shows a block diagram of an embodiment of a calibration algorithm according to some embodiments of the present invention which obtains calibration parameters over various media types and under different conditions.

Figure 13B:
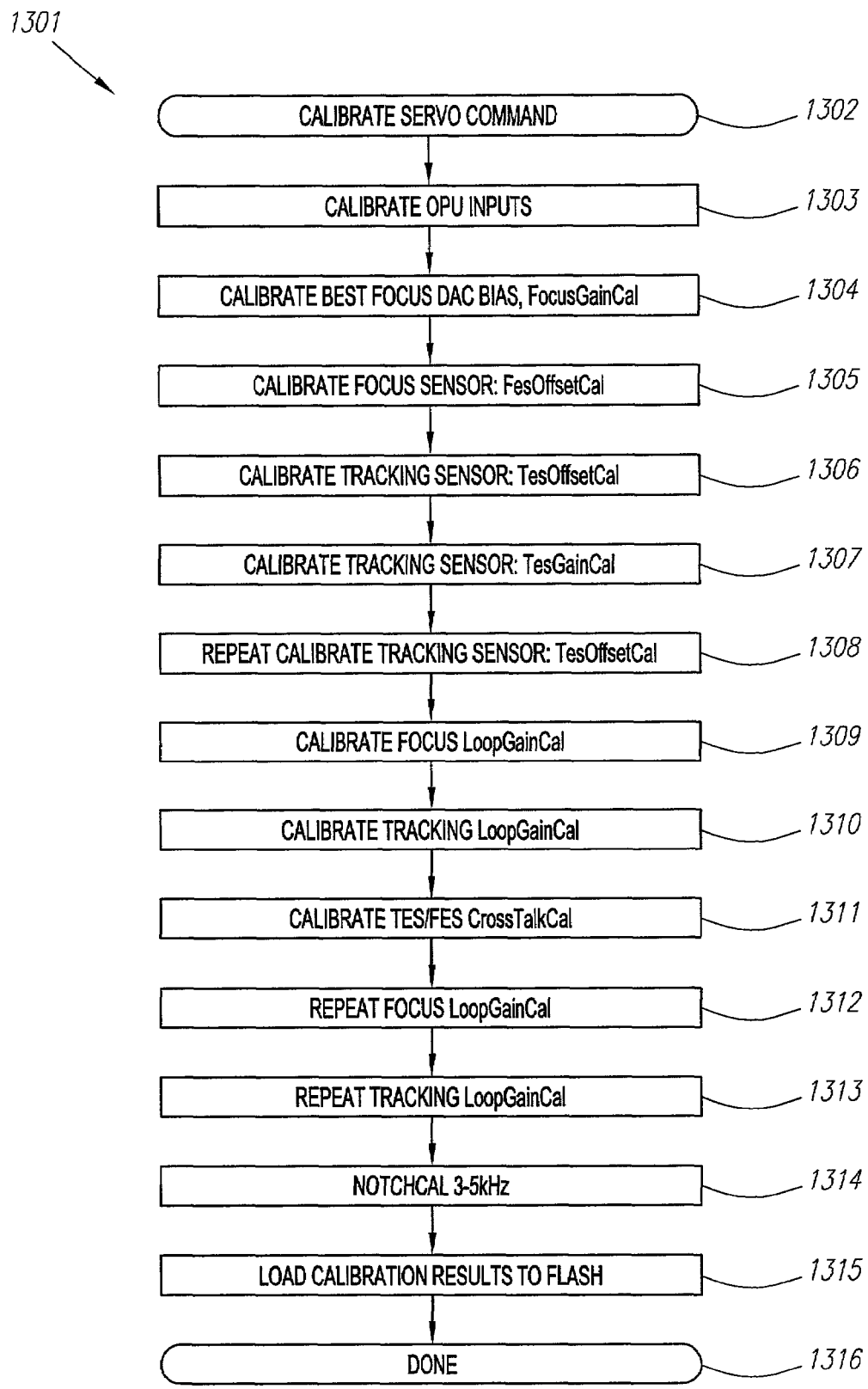

FIG. 13B shows a block diagram of an embodiment of a calibration algorithm according to some embodiments of the present invention.

Figure 14A:
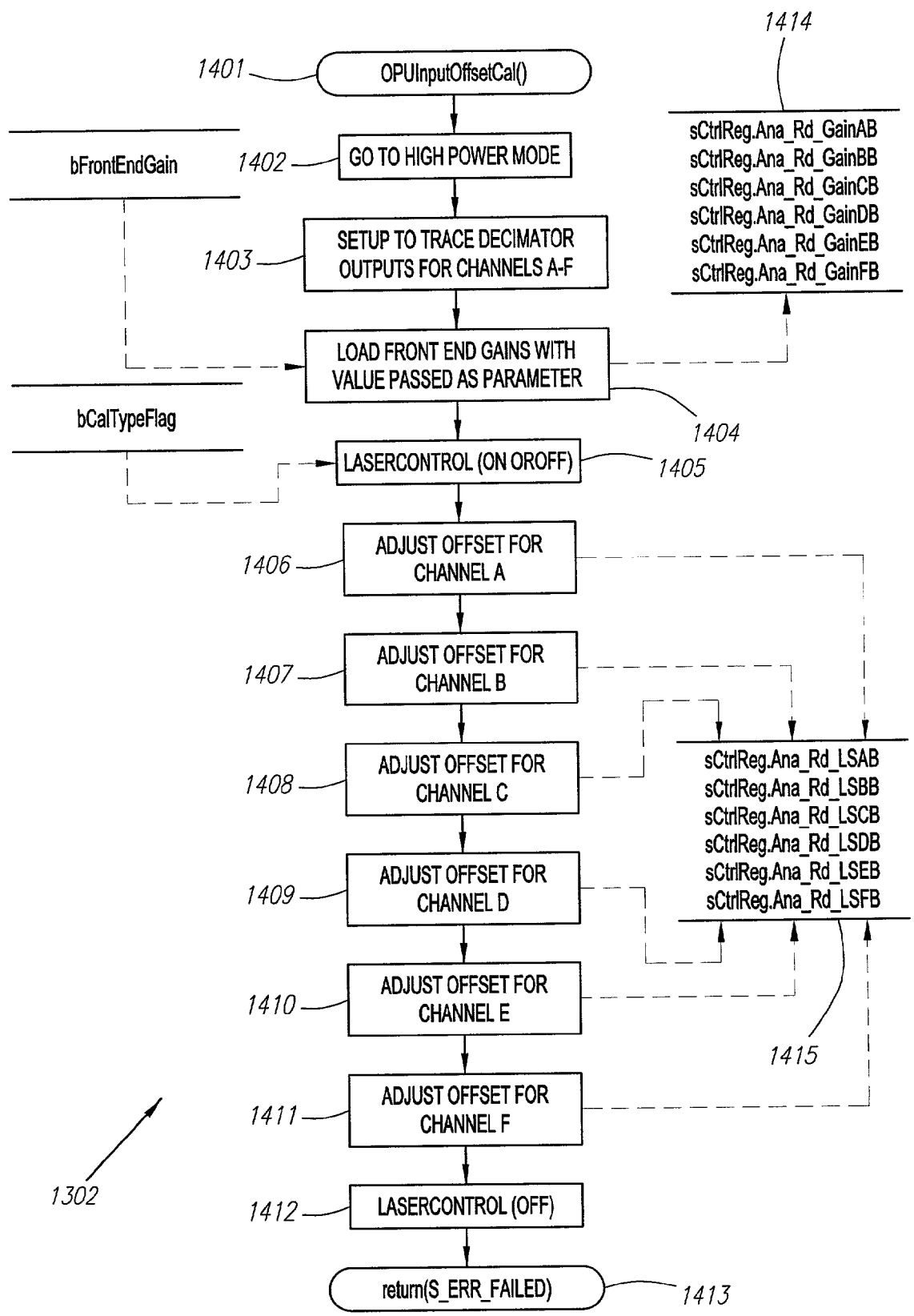

FIG. 14A shows a block diagram of an embodiment of a calibration algorithm according to some embodiments of the present invention for calibrating the detector input offset and gain values.

Figure 14B:
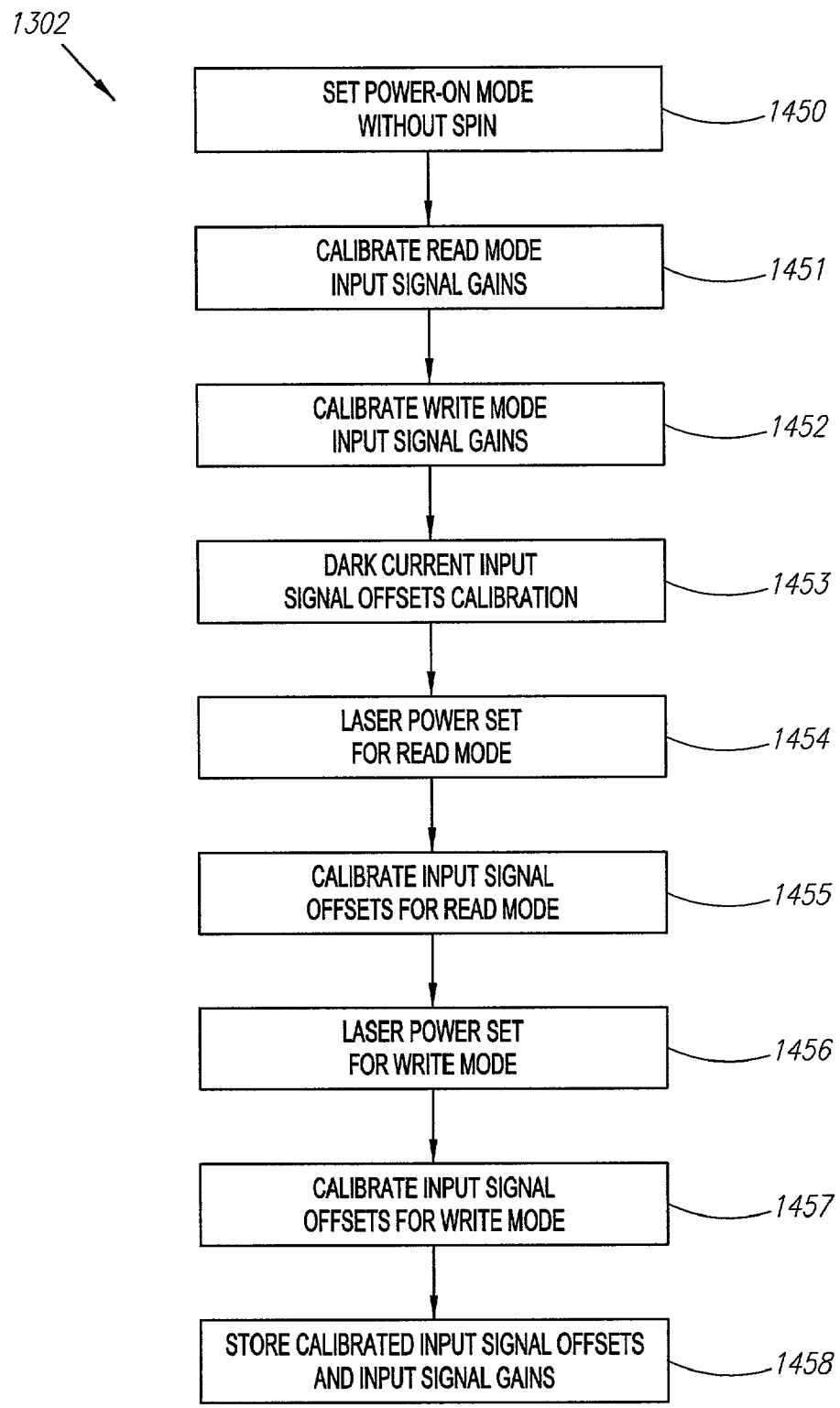

FIG. 14B shows a block diagram of an embodiment of a calibration algorithm according to some embodiments of the present invention for calibrating the detector input offsets with light scattering.

Figure 15A:
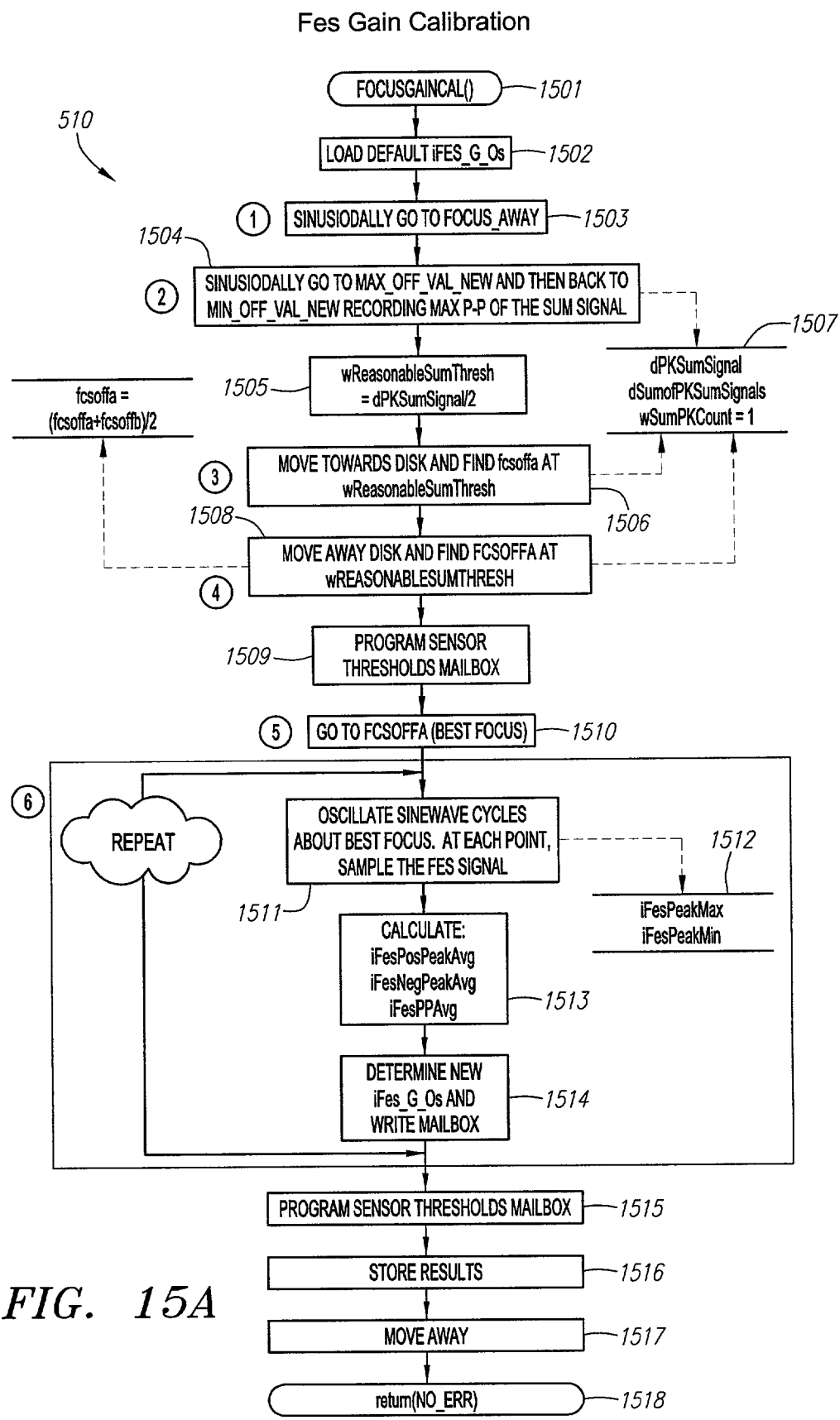
Figure 15B:
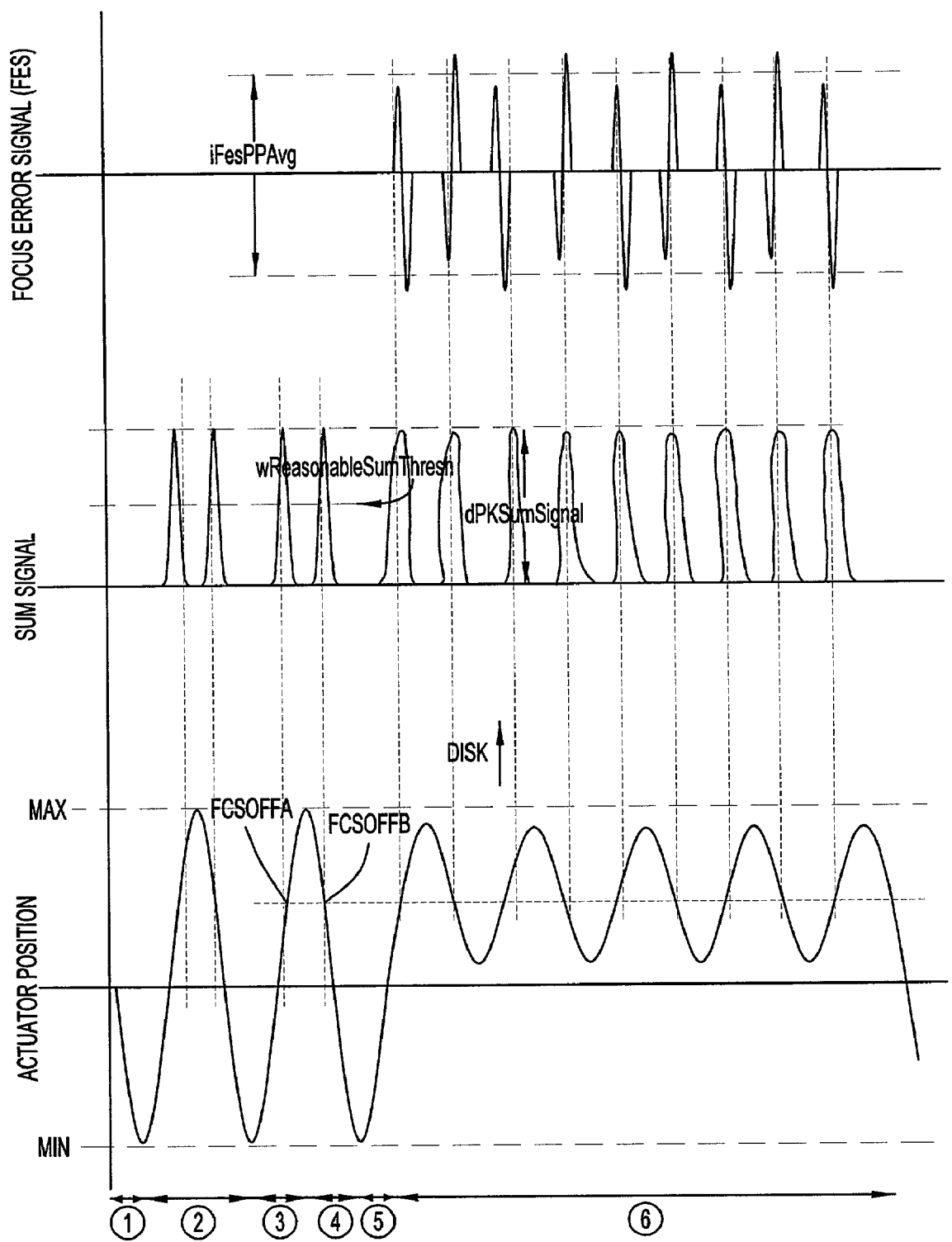

FIGS. 15A and 15B show a block diagram of an embodiment of a FES gain calibration algorithm according to some embodiments of the present invention and input signals measured or generated during the calibration.

Figure 16A:
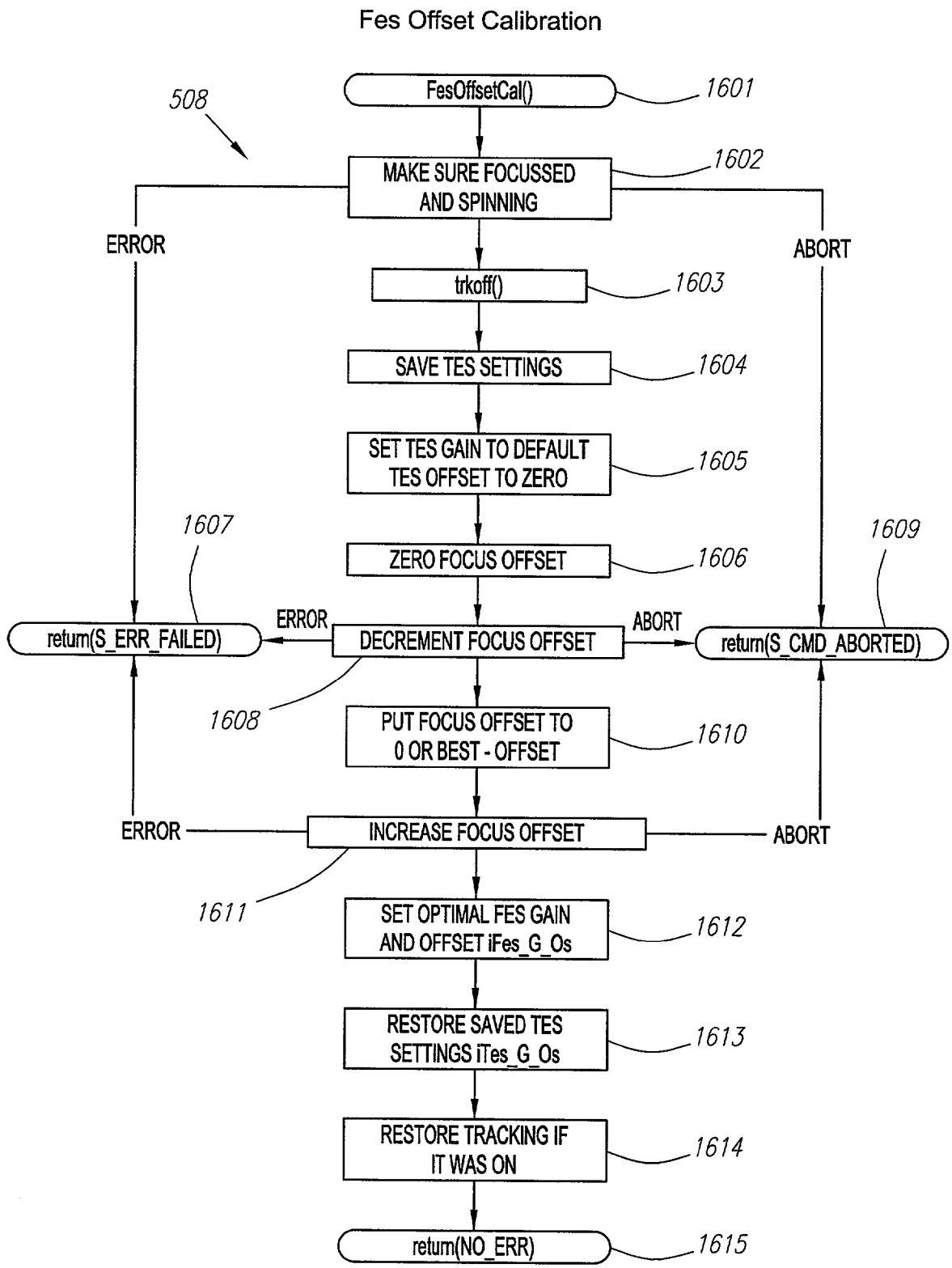

FIG. 16A shows an embodiment of a FES offset calibration algorithm according to some embodiments of the present invention.

Figures 2, 16B:
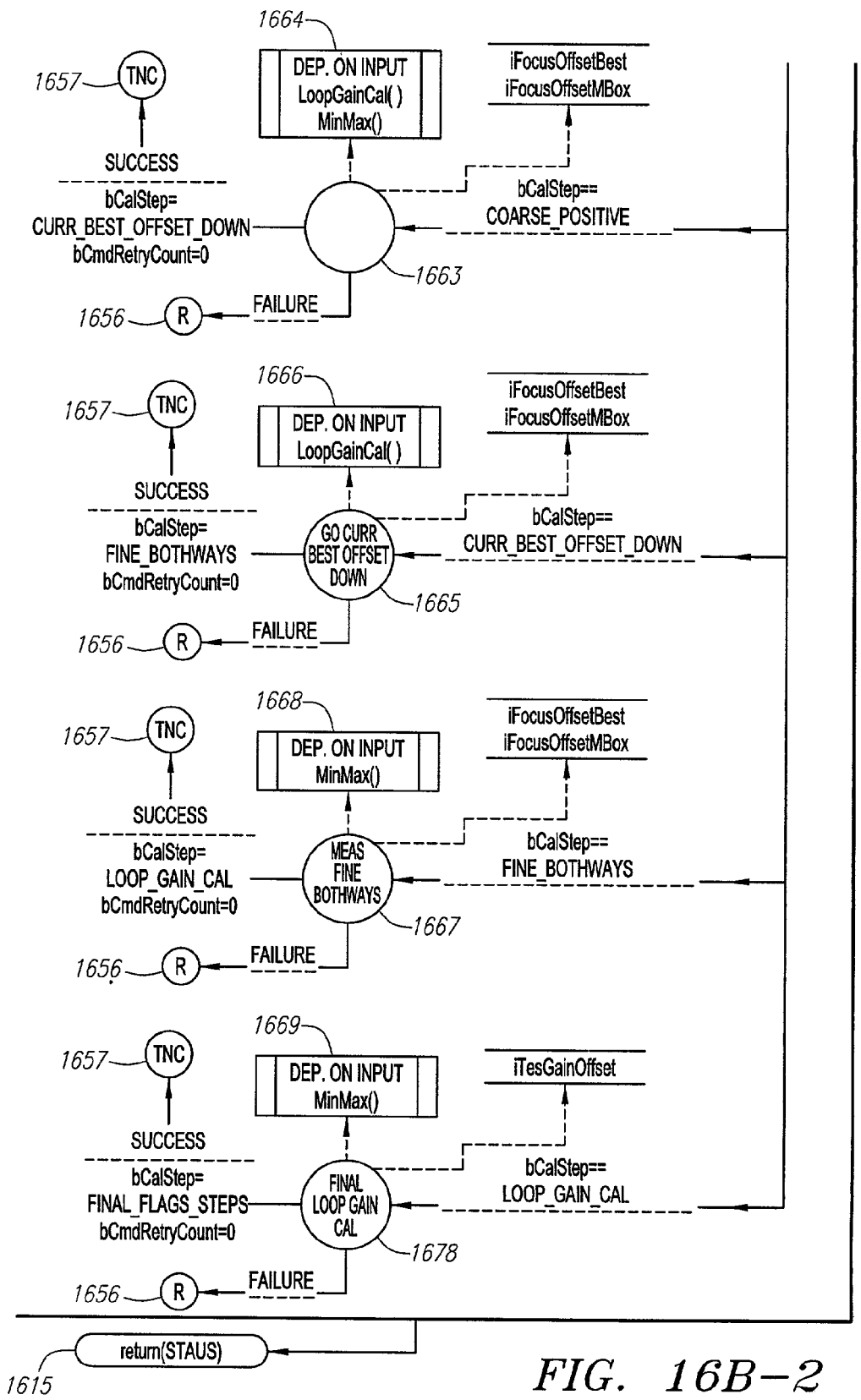
Figures 3, 16B:
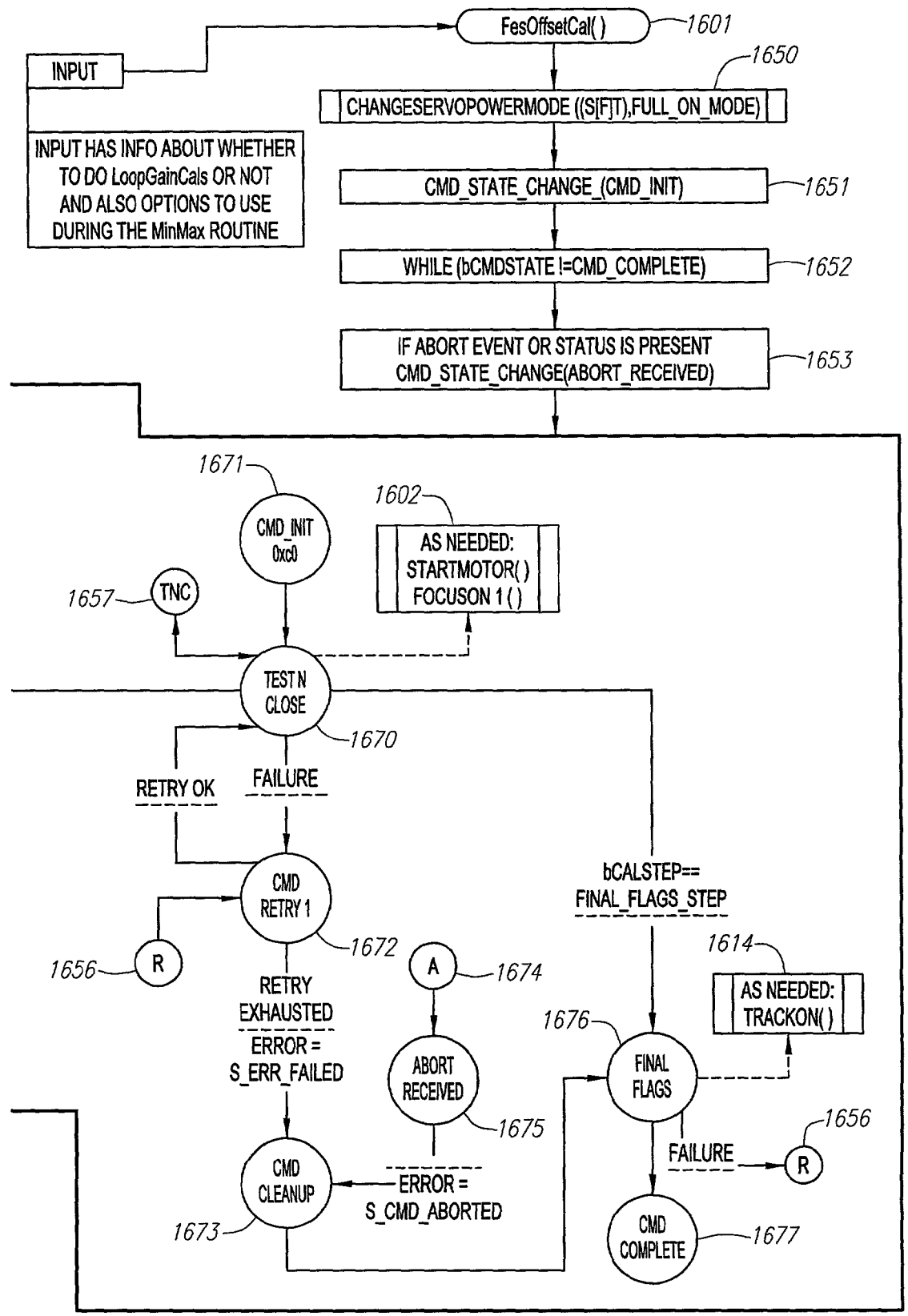

FIG. 16B shows another embodiment of an FES offset calibration algorithm according to some embodiments of the present invention.

Figure 16C:
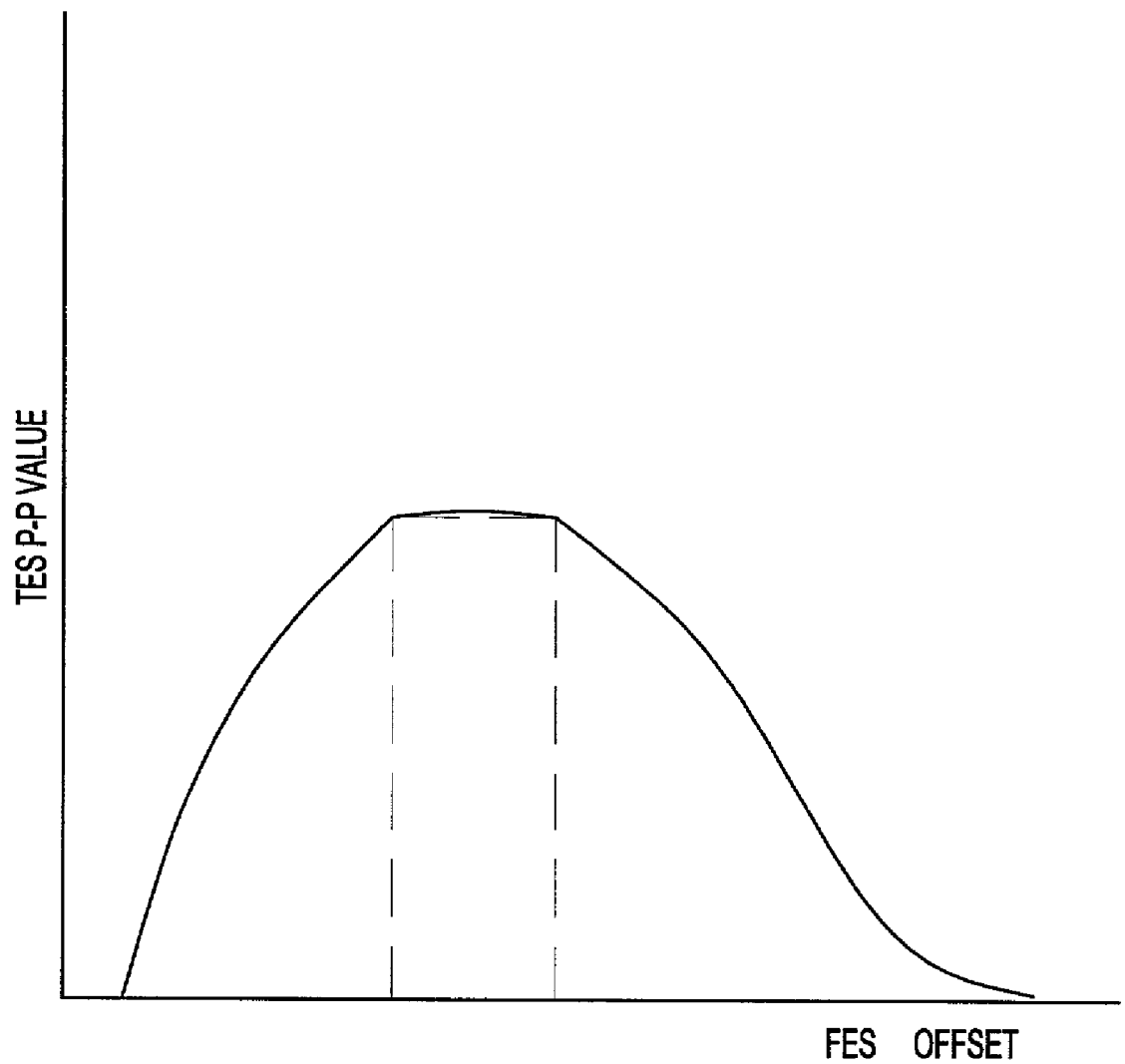

FIG. 16C shows a graph of the TES peak-to-peak signal as a function of FES offset illustrating a calibration of the TES offset according to some embodiments of the present invention.

Figure 17:
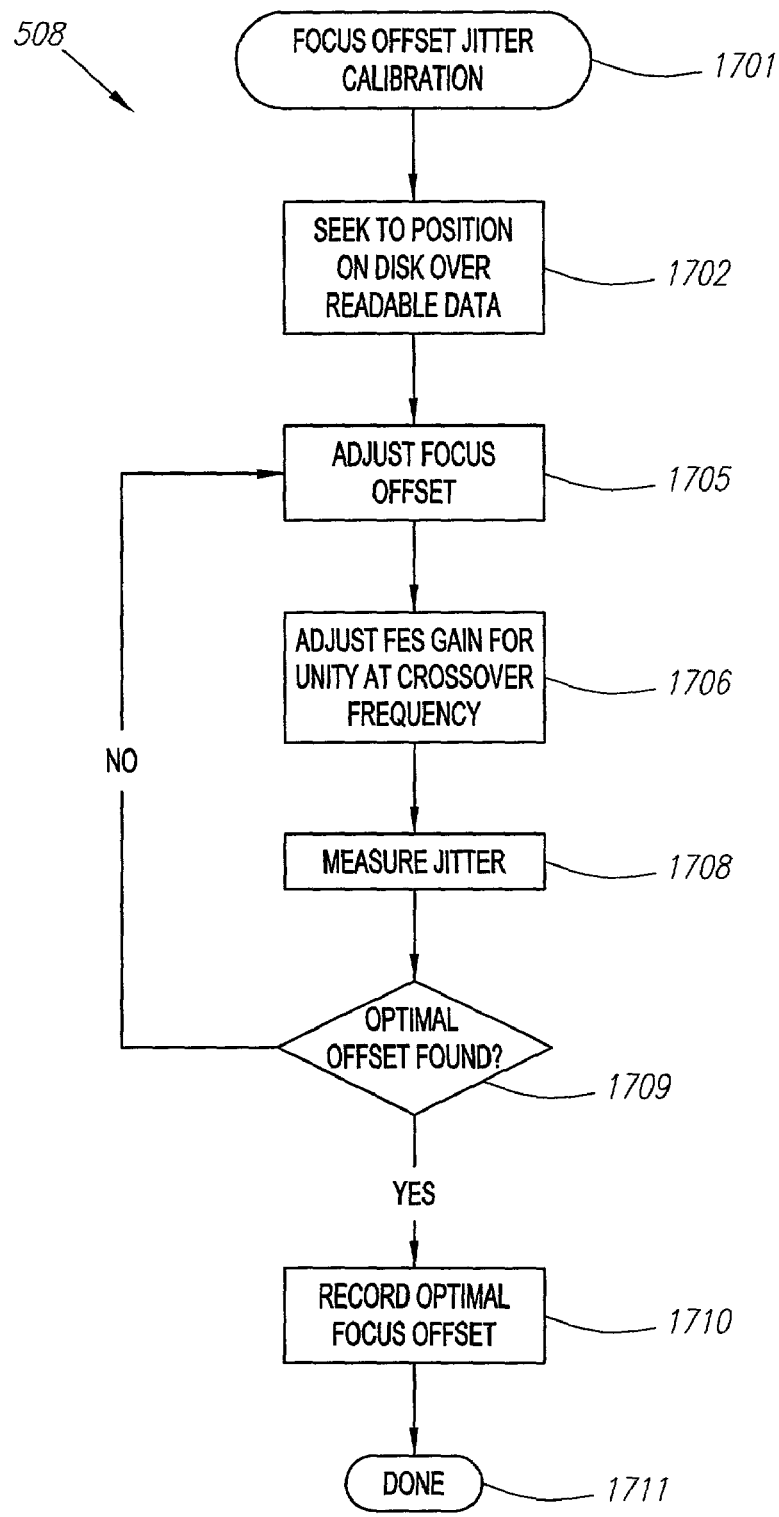

FIG. 17 shows another embodiment of a FES offset calibration algorithm according to some embodiments of the present invention.

Figure 18:
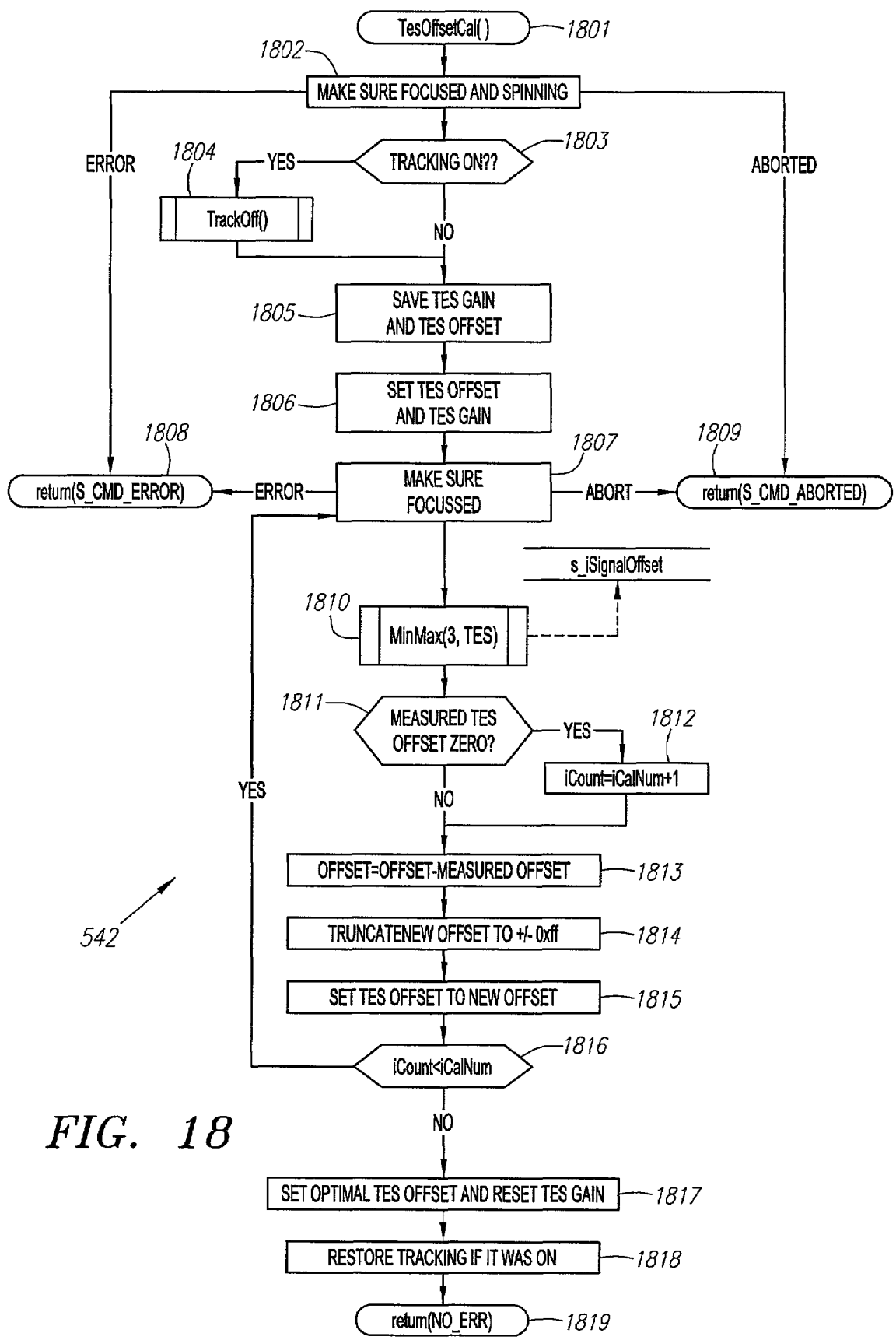

FIG. 18 shows an embodiment of a TES offset calibration algorithm according to some embodiments of the present invention.

Figure 19:
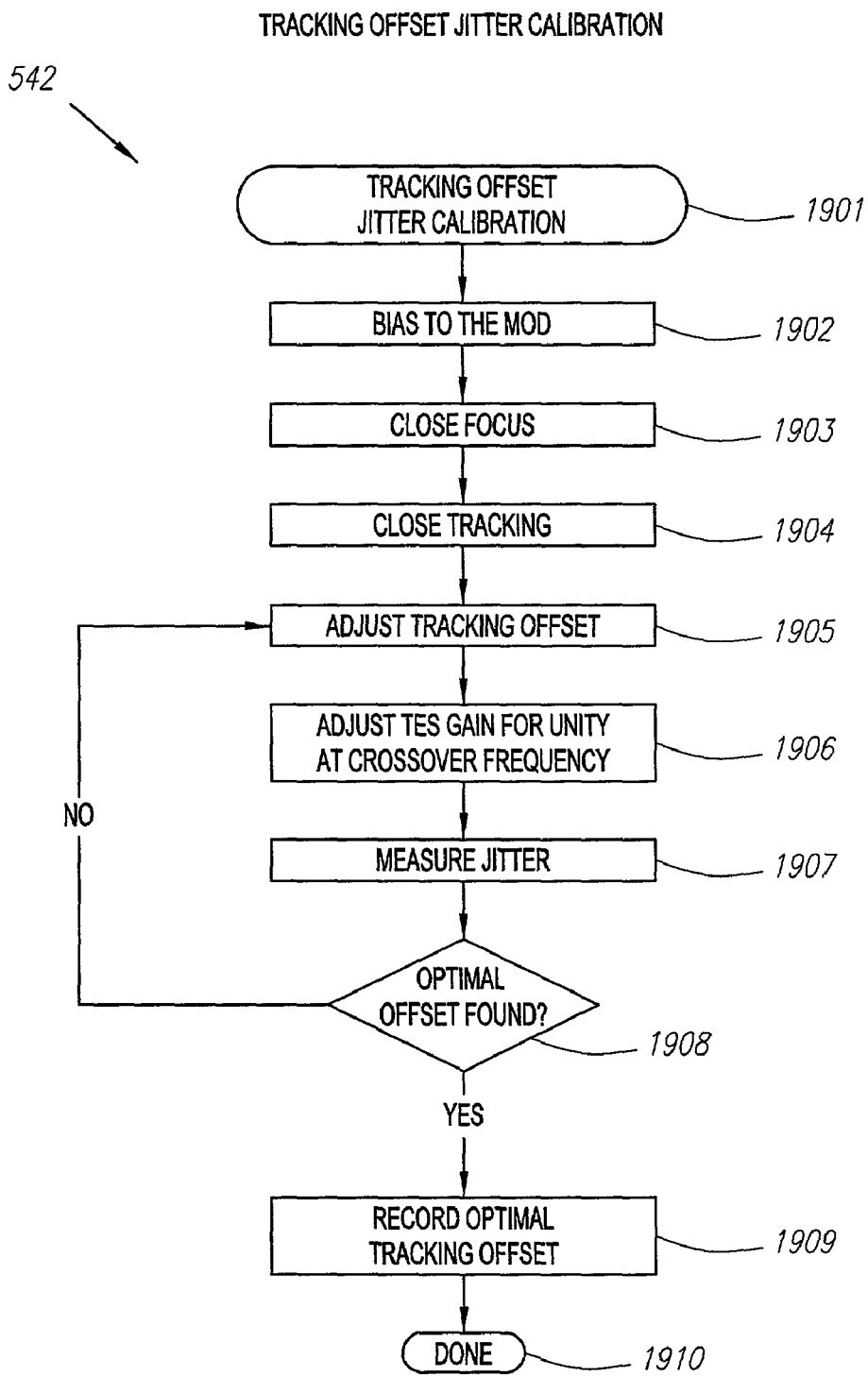

FIG. 19 shows another embodiment of a TES offset calibration algorithm according to some embodiments of the present invention.

Figure 20:
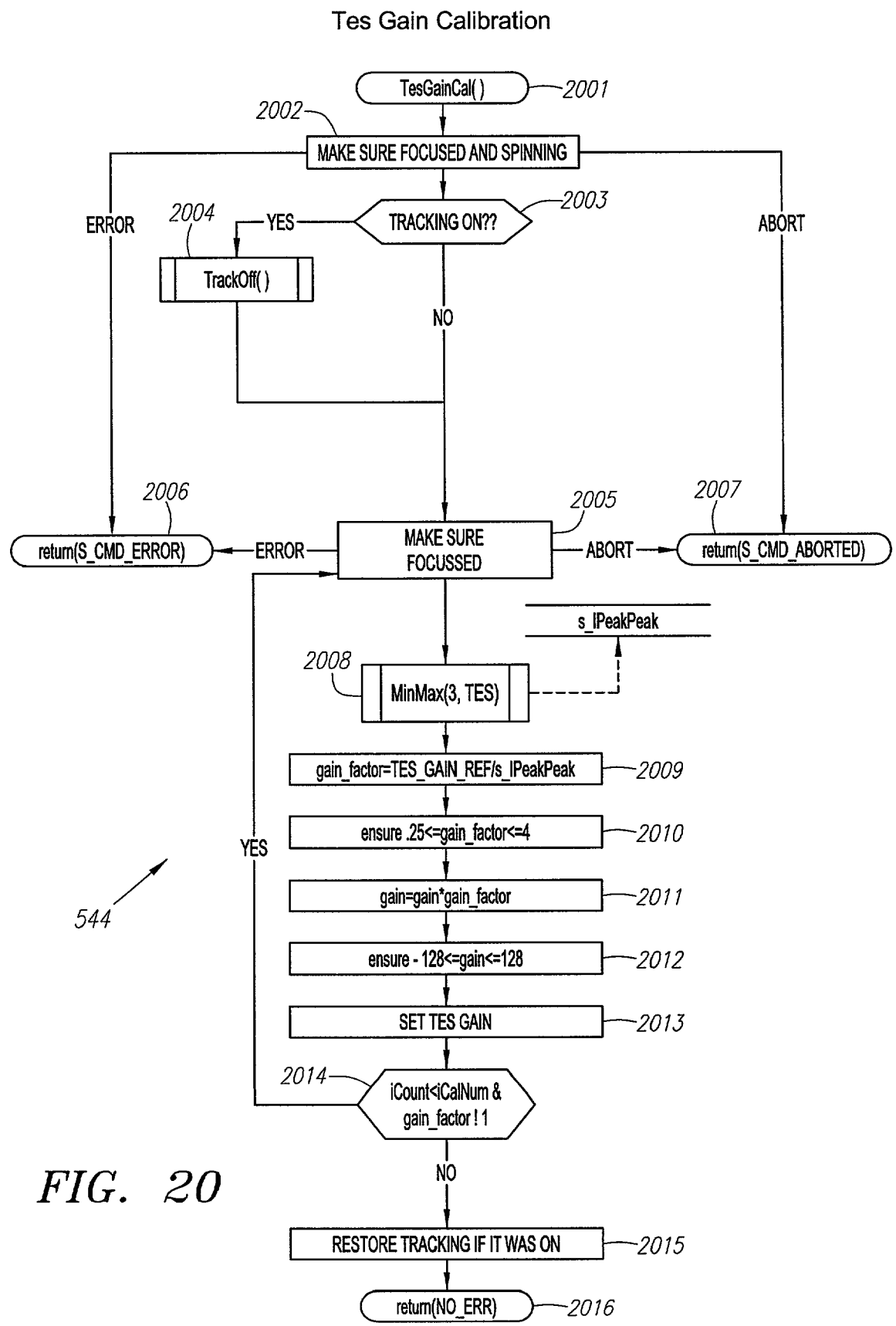

FIG. 20 shows an embodiment of a TES Gain calibration algorithm according to some embodiments of the present invention.

Figure 21:
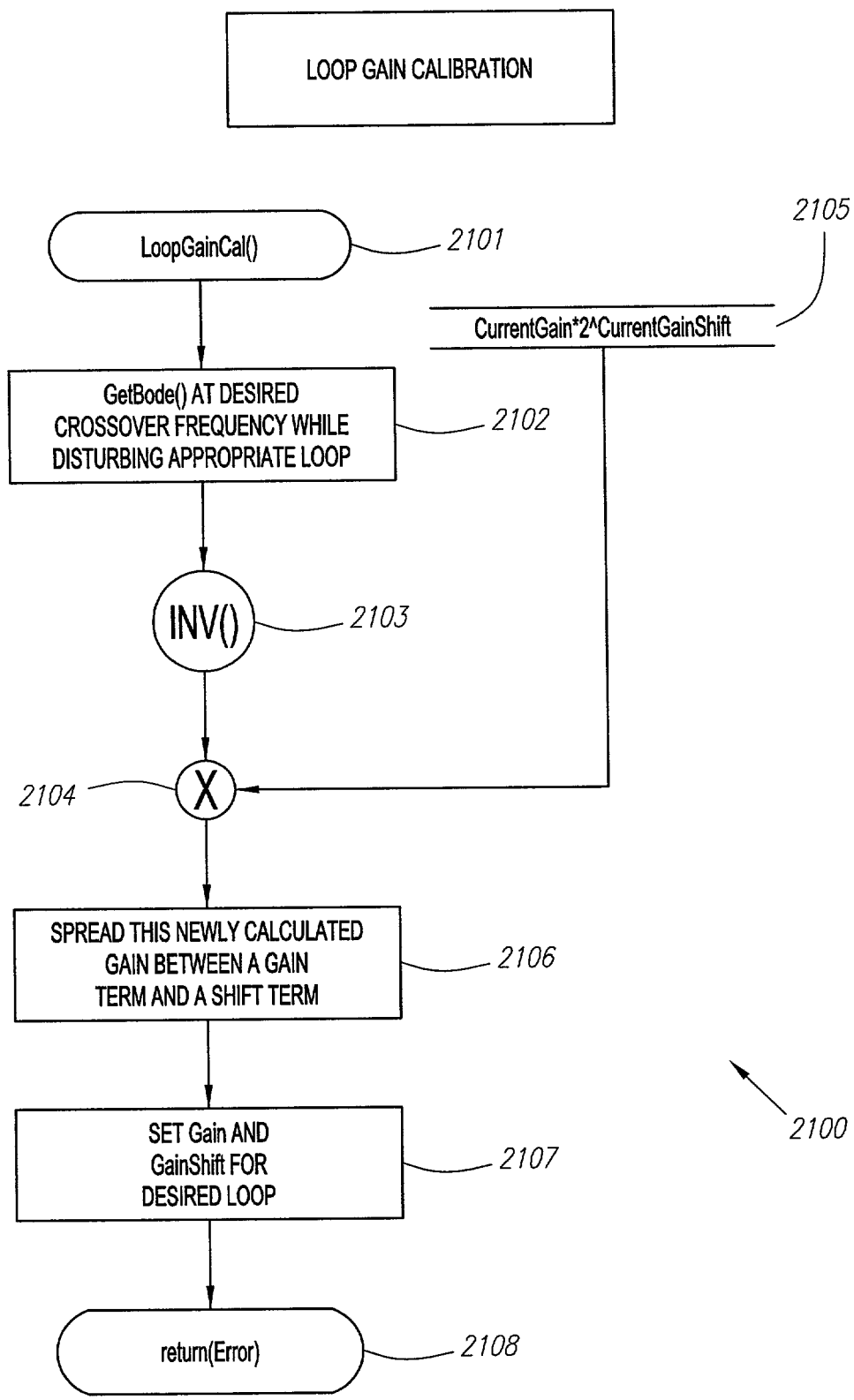

FIG. 21 shows an embodiment of a loop gain calibration algorithm according to some embodiments of the present invention.

Figure 22:
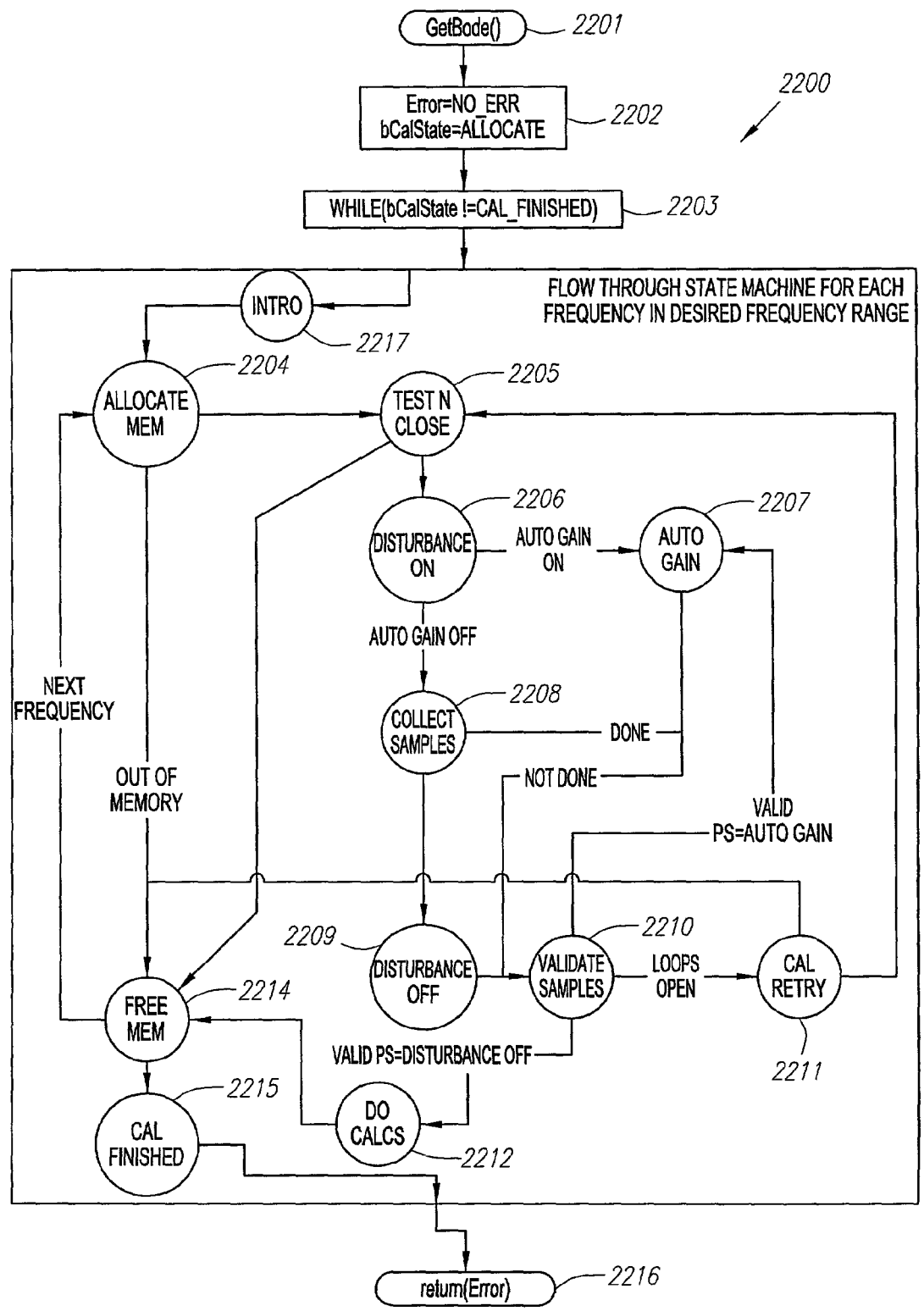

FIG. 22 shows an embodiment of a Bode algorithm according to some embodiments of the present invention.

Figure 23:
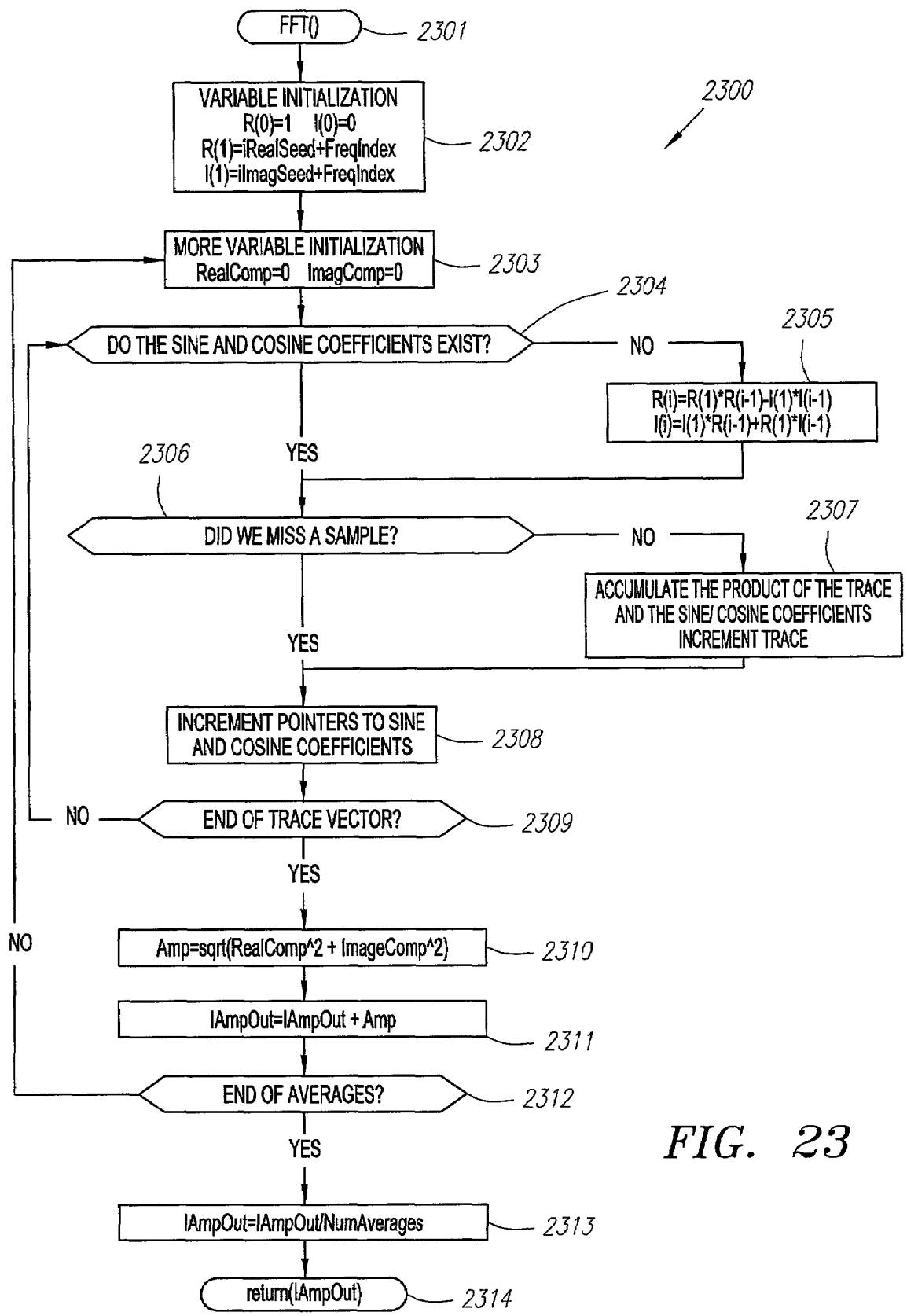

FIG. 23 shows an embodiment of a Fourier transform algorithm according to some embodiments of the present invention.

Figure 24:
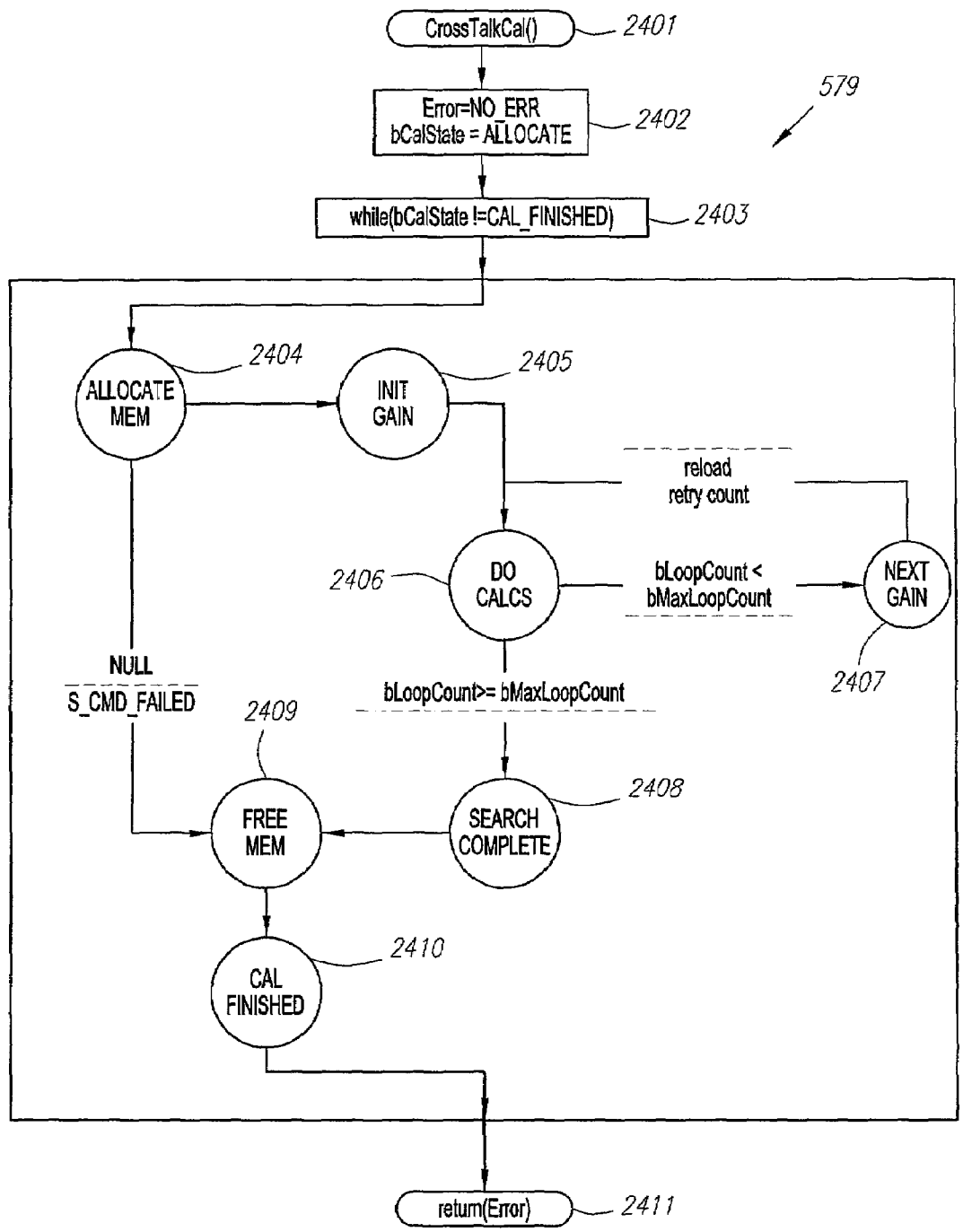

FIG. 24 shows an embodiment of a TES-FES crosstalk calibration algorithm according to some embodiments of the present invention.

Figure 25:
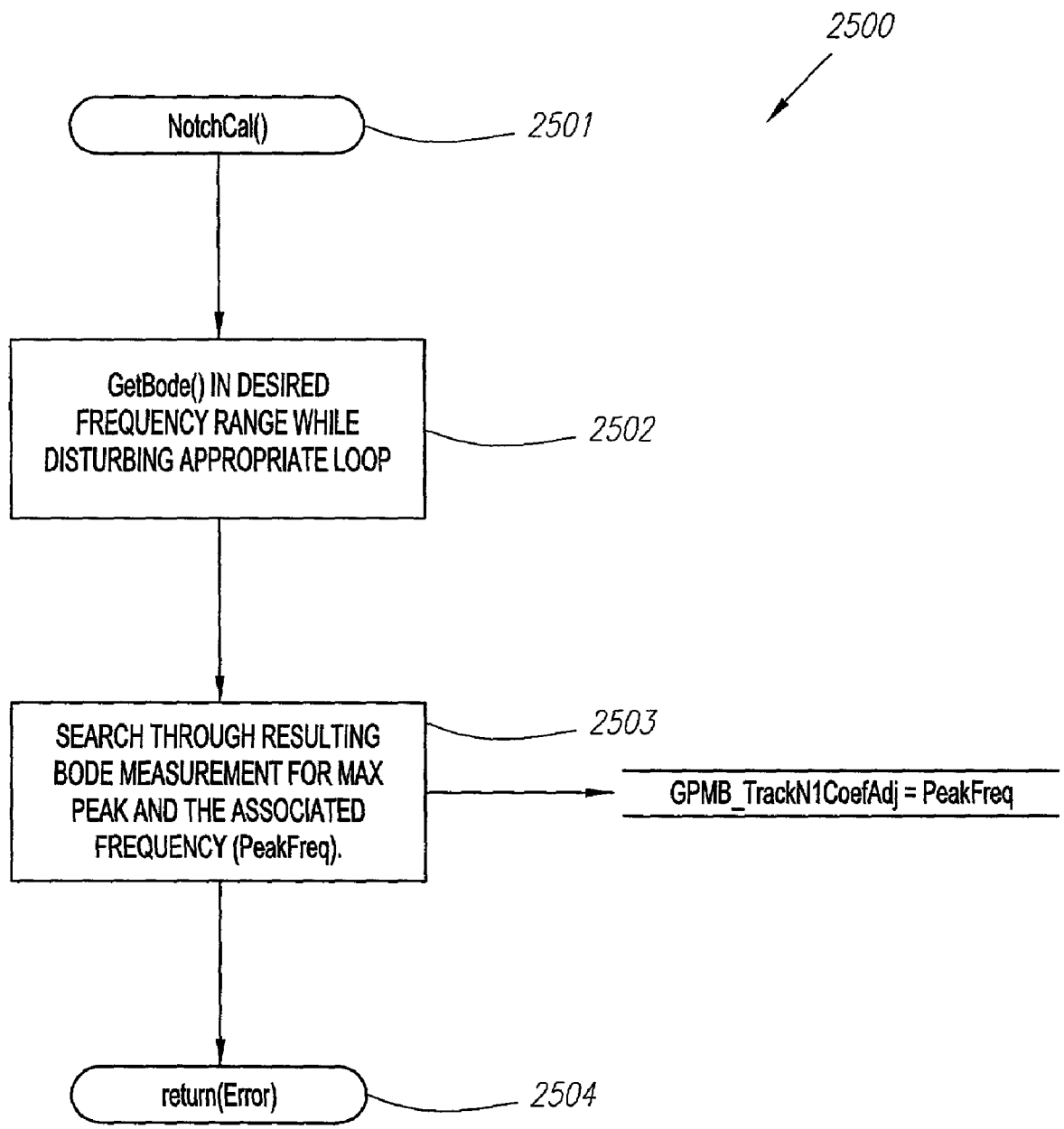

FIG. 25 shows an embodiment of a notch filter calibration algorithm according to some embodiments of the present invention.

Figure 26:
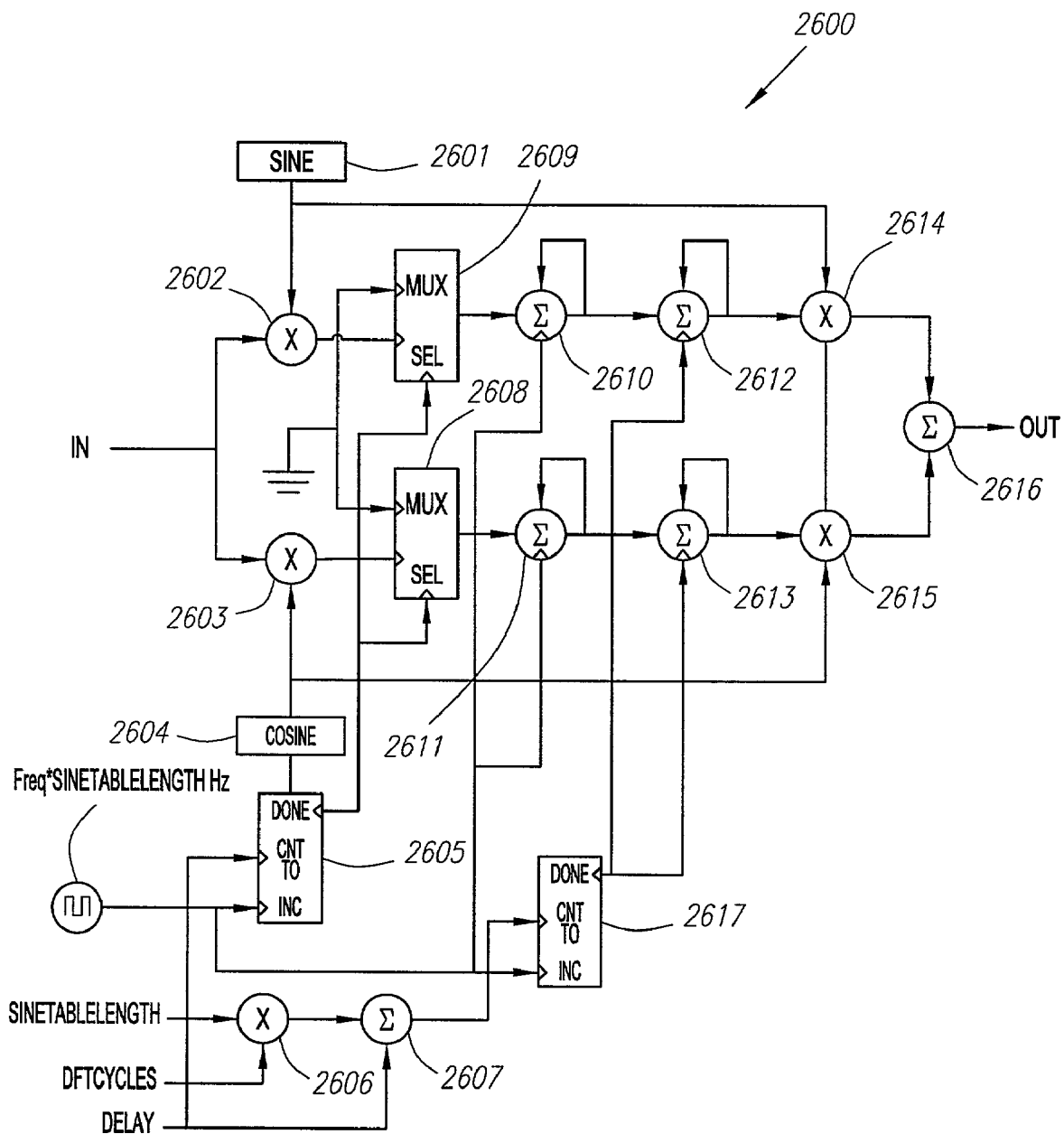

FIG. 26 shows an embodiment of a feed-forward correction algorithm according to some embodiments of the present invention.

Figure 27A:
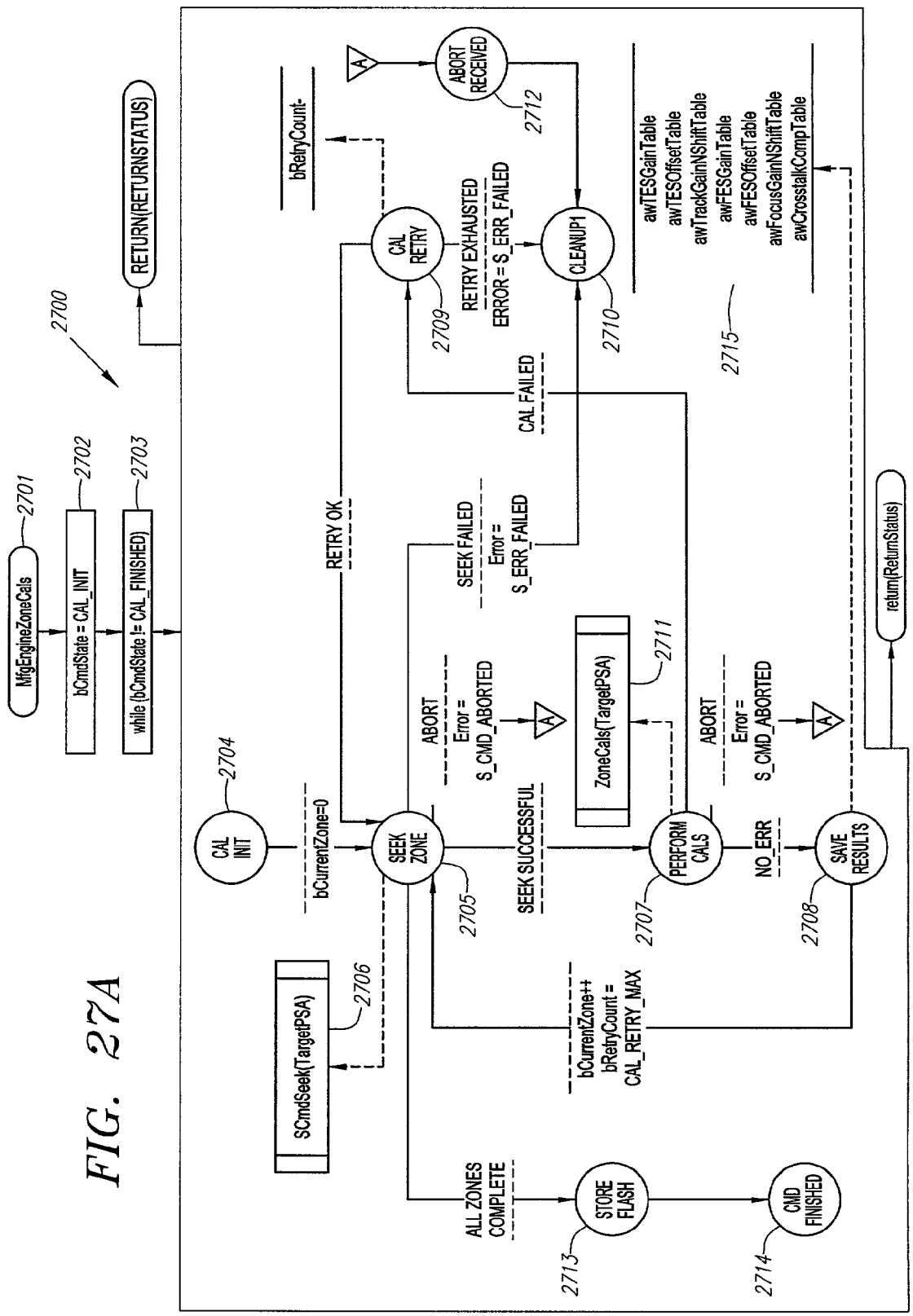
Figure 27B:
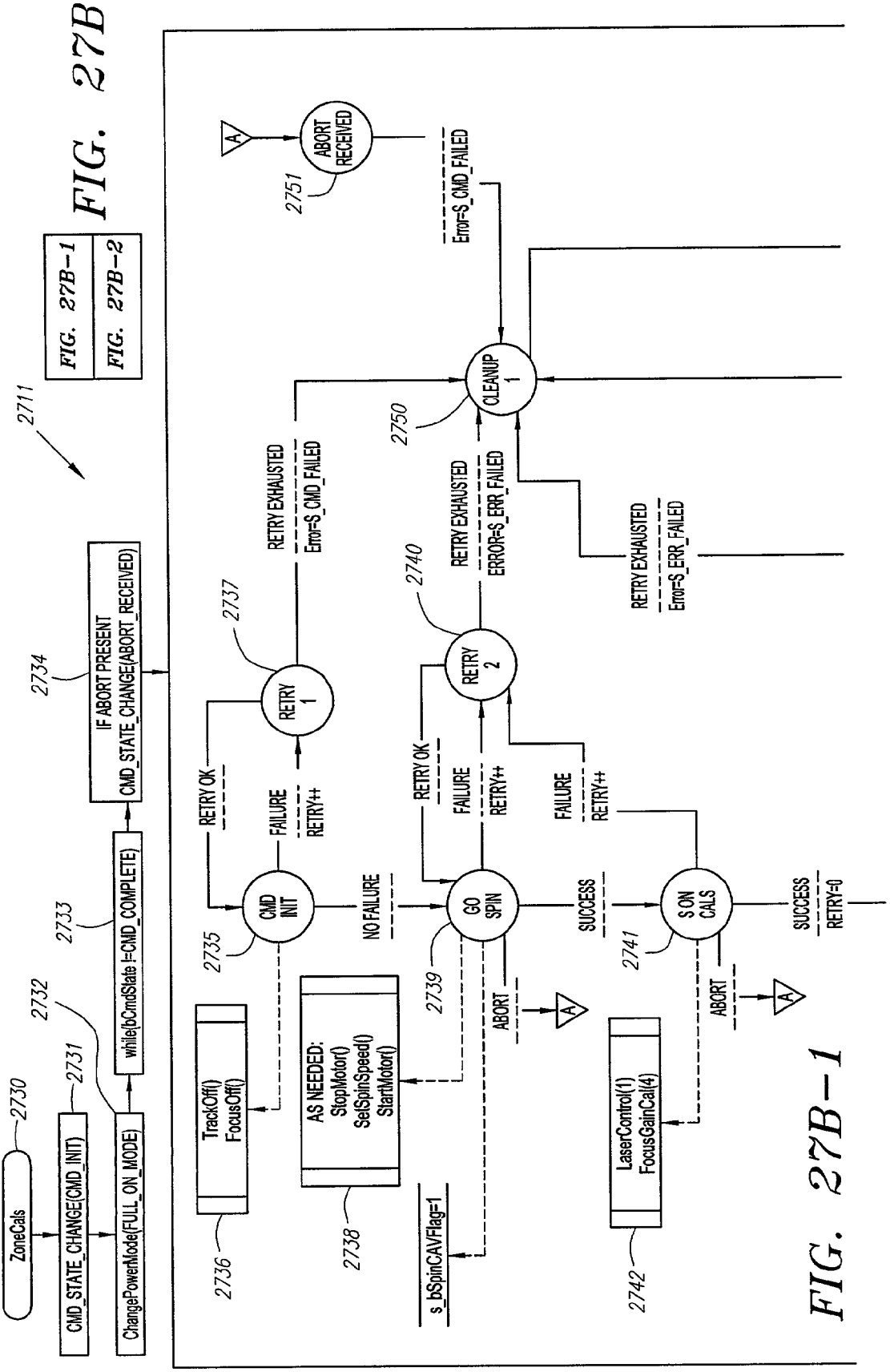

FIGS. 27A and 27B show an embodiment of a zone-calibration algorithm according to some embodiments of the present invention.

Figure 28B:
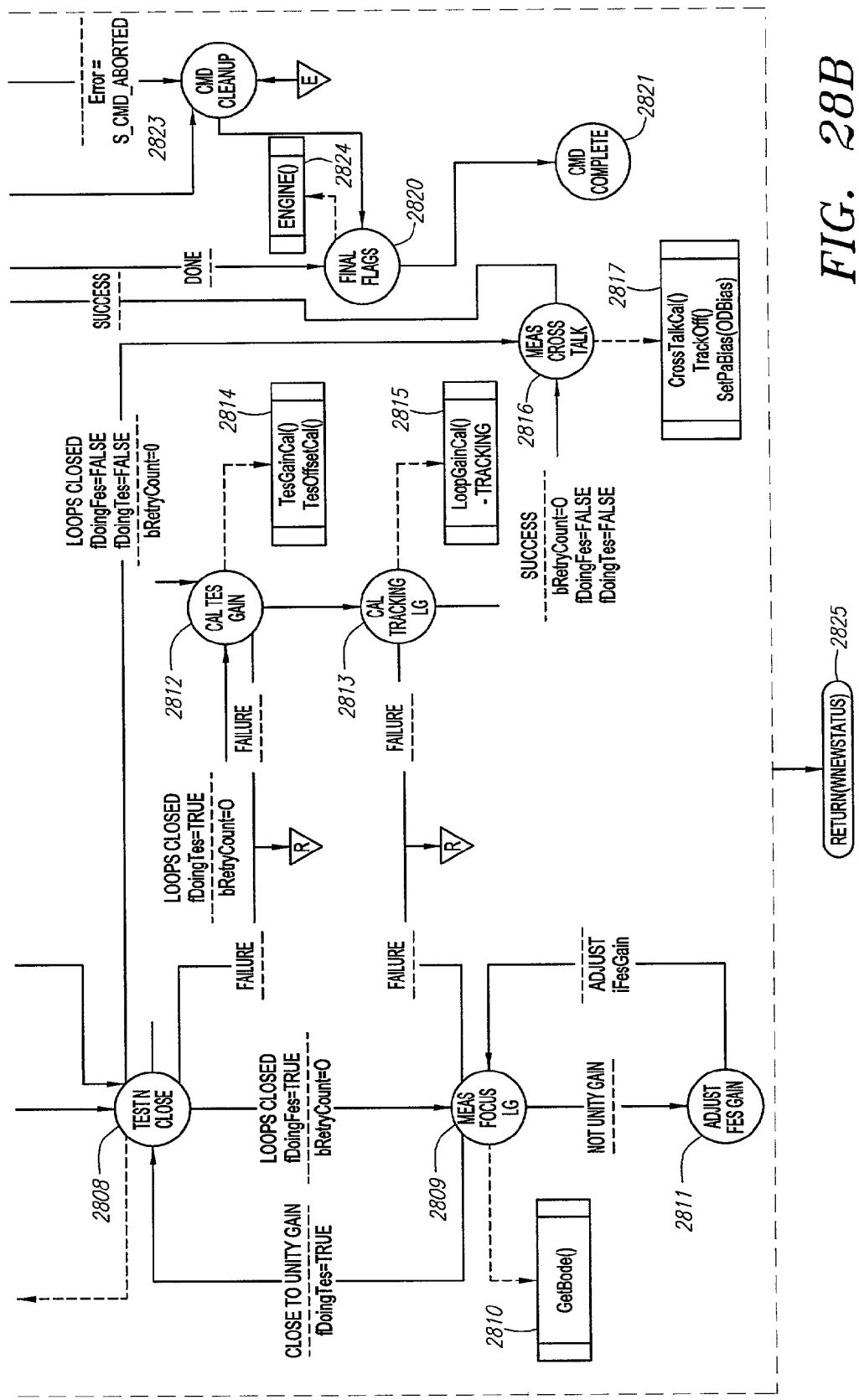

FIG. 28 shows an embodiment of an inverse non-linearity calibration algorithm according to some embodiments of the present invention.

Figure 29:
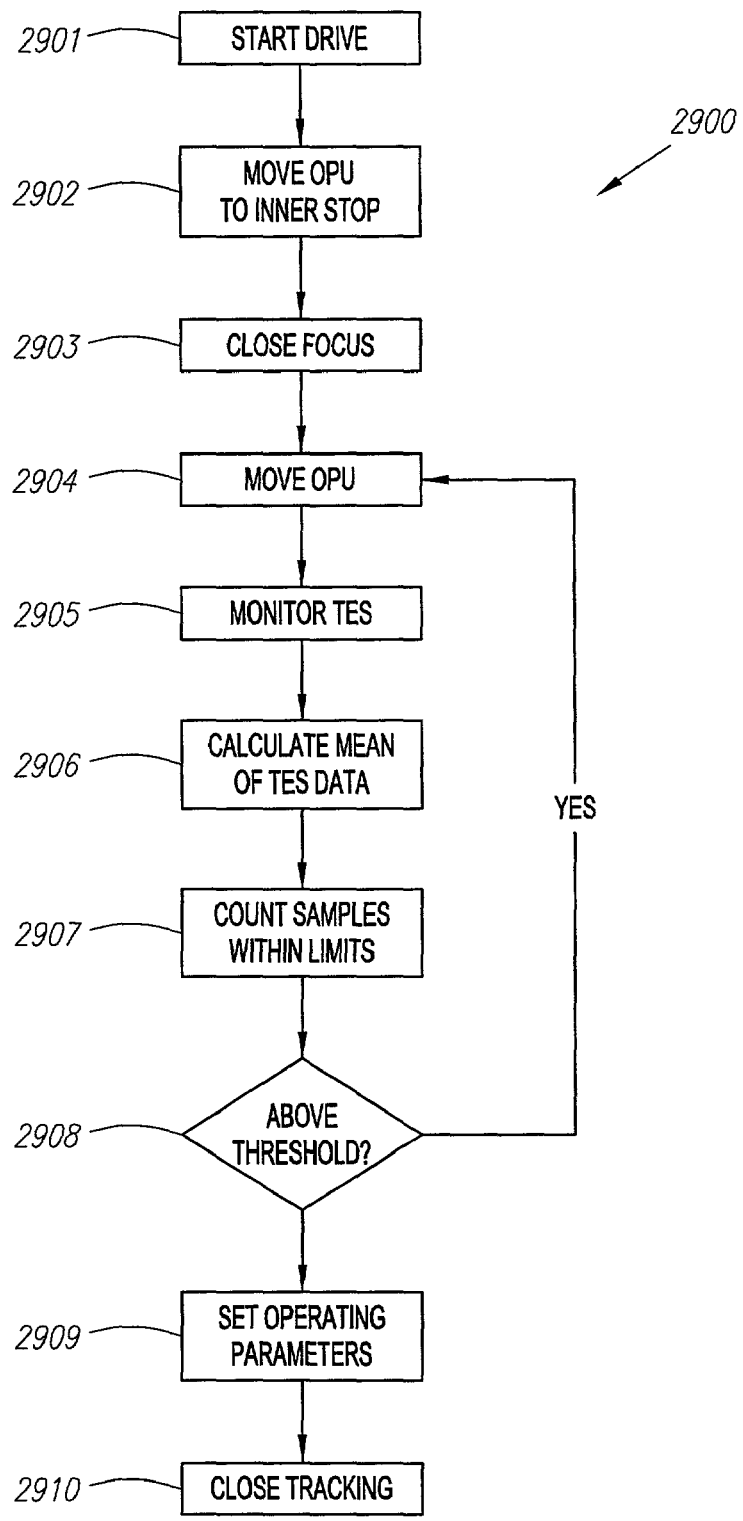

FIG. 29 shows an embodiment of a head load algorithm according to some embodiments of the present invention.

Figure 30A:
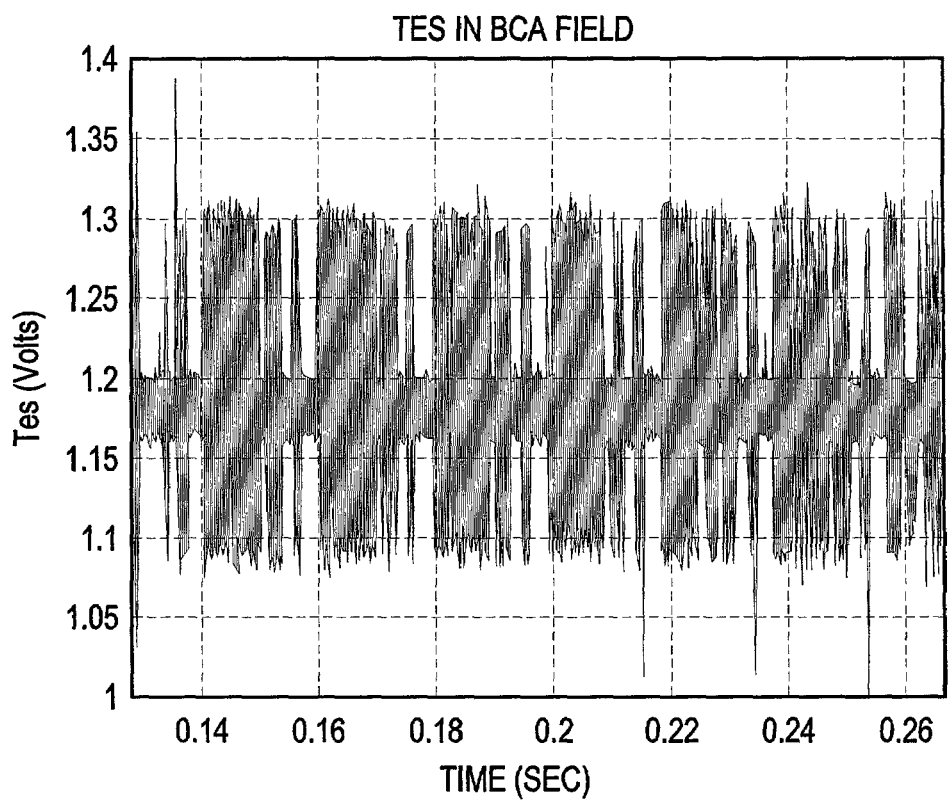
Figure 30B:
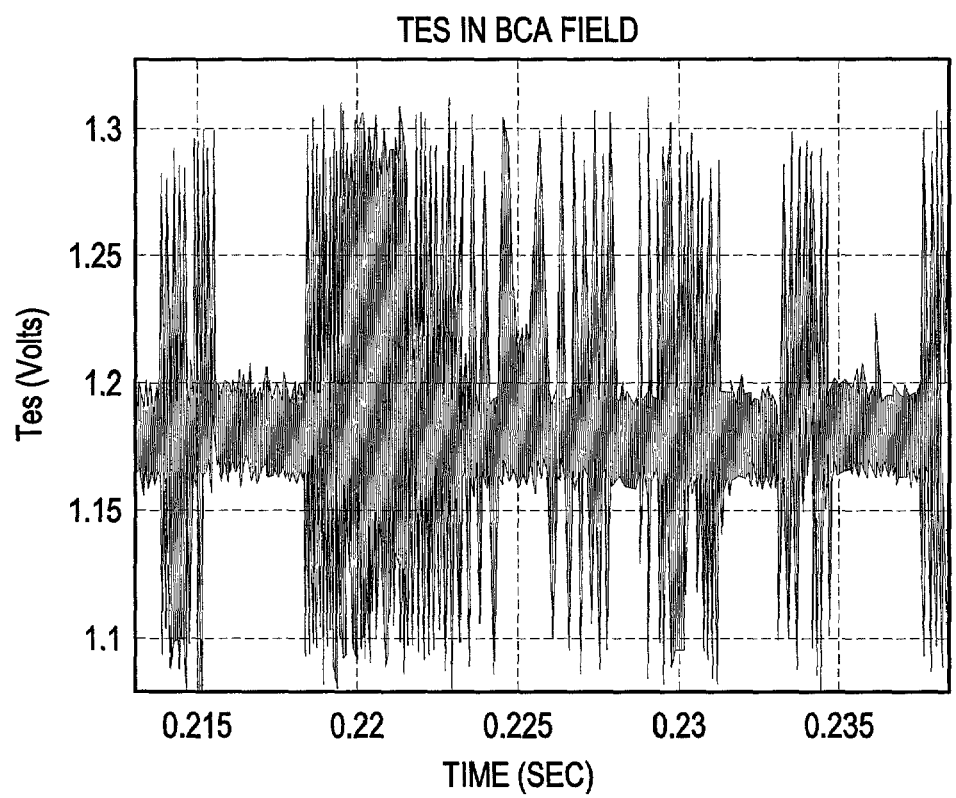

FIGS. 30A and 30B show examples of a tracking error signal over the bar code area.

Figure 30C:
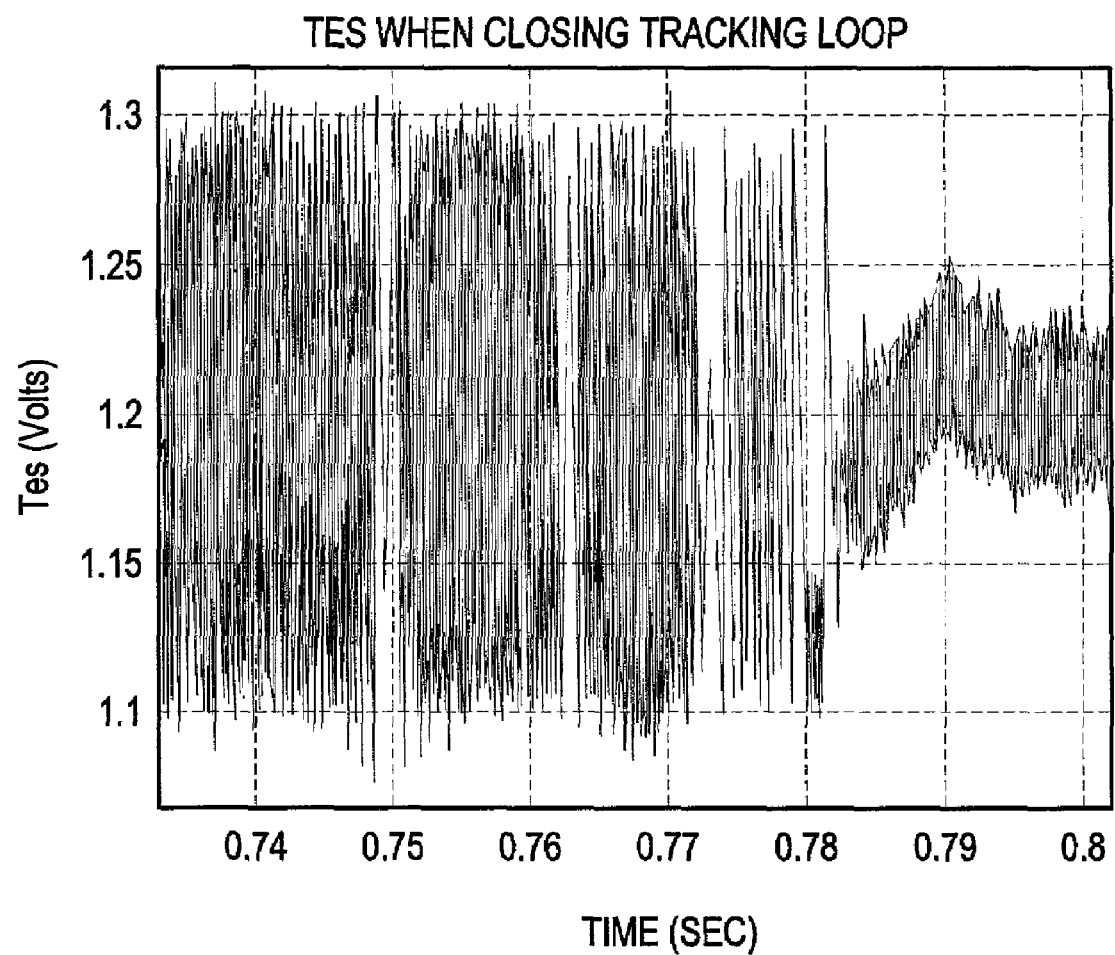

FIG. 30C shows an example of a tracking error signal during a close tracking operation.

In the figures, elements having the same designation in multiple figures have the same or similar functions.

DETAILED DESCRIPTION OF THE FIGURES

The present disclosure was co-filed with the following sets of disclosures: the "Tracking and Focus Servo System" disclosures, the "Servo System Calibration" disclosures, the "Spin Motor Servo System" disclosures, and the "System Architecture" disclosures; each of which was filed on the same date and assigned to the same assignee as the present disclosure, and are incorporated by reference herein in their entirety. The Tracking and Focus Servo System disclosures include U.S. patent application Ser. Nos. The Tracking and Focus Servo System disclosures include U.S. Disclosure Ser. Nos. 09/950,329, 09/950,408, 09/950,444, 09/950,394, 09/950,413, 09/950,397, 09/950,914, 09/950,410, 09/950,441, 09/950,425, 09/950,414, 09/950,378, 09/950,513, 09/950,331, 09/950,395, 09/950,376, 09/950,393, 09/950,432, 09/950,379, 09/950,515, 09/950,411, 09/950,412, 09/950,361, 09/950,540, and 09/950,519. The Servo System Calibration disclosures include U.S. patent application Ser. Nos. 09/950,398, 09/950,396, 09/950,360, 09/950,541, 09/950,409, 09/950,520, 09/950,377, 09/950,367, 09/950,512, 09/950,415, 09/950,548, 09/950,392, and 09/950,514. The Spin Motor Servo System disclosures include U.S. Disclosure Ser. Nos. 09/951,108, 09/951,869, 09/951,330, 09/951,930, 09/951,328, 09/951,325 and 09/951,475. The System Architecture disclosures include U.S. Disclosure Ser. Nos. 09/951,947, 09/951,339, 09/951,469, 09/951,337, 09/951,329, 09/951,332, 09/951,931, 09/951,850, 09/951,333, 09/951,331, 09/951,156, 09/951,340 and 09/951,940.

Example of an Optical Disk Drive

Figure 1A:
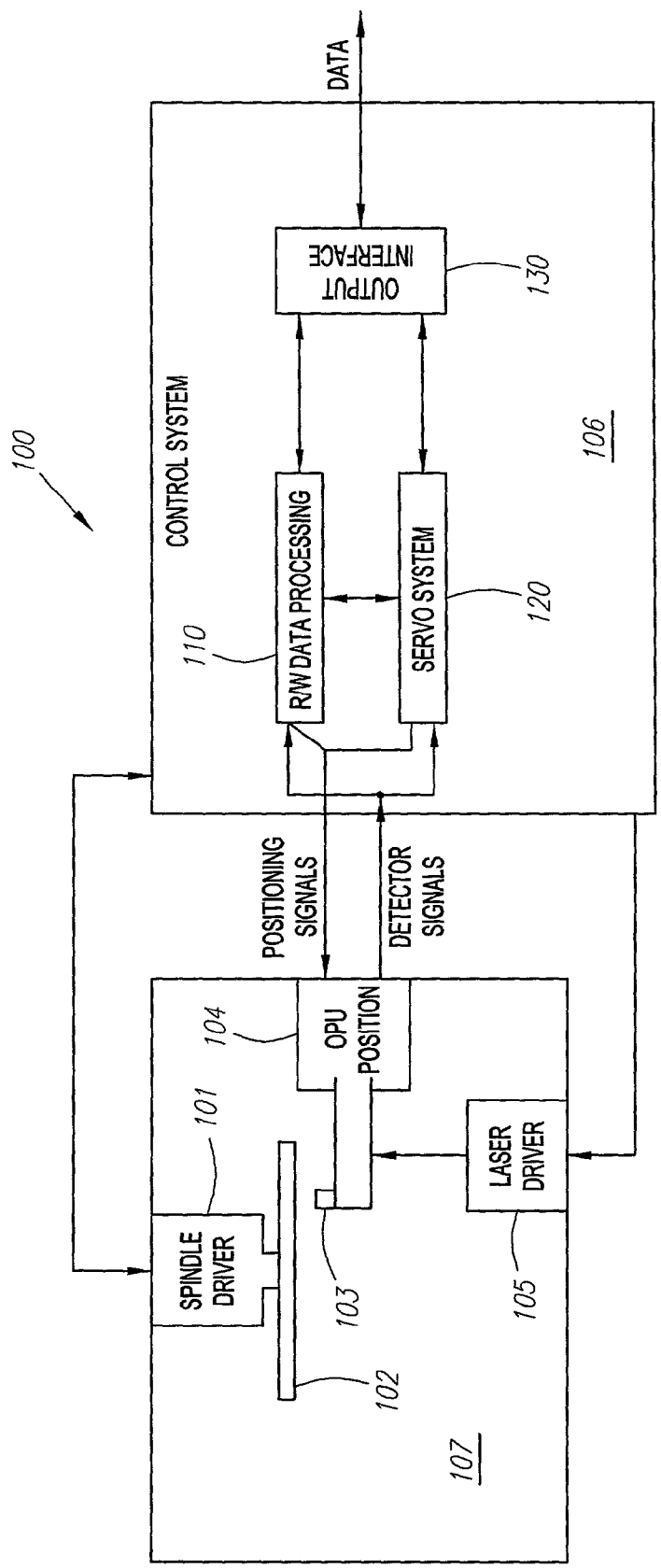
FIG. 1A shows an embodiment of an optical drive according to the present invention.

FIG. 1A shows an embodiment of an optical drive 100 according to the present invention. Optical drive 100 of FIG. 1A includes a spindle motor 101 on which an optical media 102 is mounted. Drive 100 further includes an optical pick-up unit (OPU) 103 mechanically controlled by an actuator arm 104. OPU 103 includes a light source electrically controlled by laser driver 105. OPU 103 further includes optical detectors providing signals for controller 106. Controller 106 can control the rotational speed of optical media 102 by controlling spindle motor 101, controls the position and orientation of OPU 103 through actuator arm 104, and controls the optical power of the light source in OPU 103 by controlling laser driver 105.

Controller 106 includes R/W processing 110, servo system 120, and interface 130. R/W processing 110 controls the reading of data from optical media 102 and the writing of data to optical media 102. R/W processing 110 outputs data to a host (not shown) through interface 130. Servo system 120 controls the speed of spindle motor 101, the position of OPU 103, and the laser power in response to signals from R/W processing 110. Further, servo system 120 insures that the operating parameters (e.g., focus, tracking, spindle motor speed and laser power) are controlled in order that data can be read from or written to optical media 102.

Figure 1B:
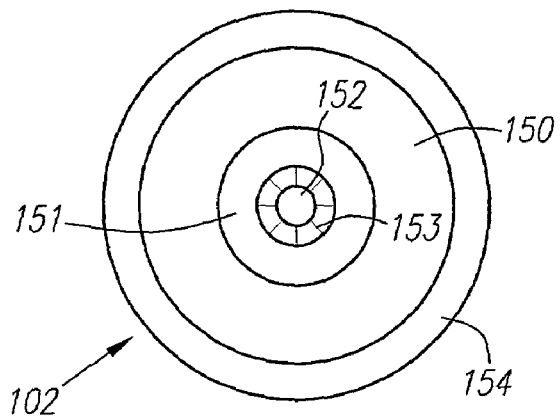
FIG. 1B shows an example of an optical media that can be utilized with an optical drive according to the present invention.

FIG. 1B shows an example of optical media 102. Optical media 102 can include any combinations of pre-mastered portions 150 and writeable portions 151. Premastered portions 150, for example, can be written at the time of manufacture to include content provided by a content provider. The content, for example, can include audio data, video data, text data, or any other data that can be provided with optical media 102. Writeable portion 151 of optical media 102 can be written onto by drive 100 to provide data for future utilization of optical media 102. The user, for example, may write notes, keep interactive status (e.g. for games or interactive books) or other information on the disk. Drive 100, for example, may write calibration data or other operating data to the disk for future operations of drive 100 with optical media 102. In some embodiments, optical media 102 includes an inner region 153 close to spindle access 152. A bar code can be written on a portion of an inner region 153. The readable portion of optical media 102 starts at the boundary of region 151 in FIG. 1B. In some embodiments, writeable portion 151 may be at the outer diameter rather than the inner diameter. In some embodiments of optical media 102, an unusable outer region 154 can also be included.

An example of optical media 102 is described in U.S. application Ser. No. 09/560,781 for "Miniature Optical Recording Disk", herein incorporated by reference in its entirety. The R/W Data Processing 110 can operate with many different disk formats. One example of a disk format is provided in U.S. application Ser. No. 09/527,982, for "Combination Mastered and Writeable Medium and Use in Electronic Book Internet Appliance," herein incorporated by reference in its entirety. Other examples of disk data formats are provided in U.S. application Ser. No. 09/539,841, "File System Management Embedded in a Storage Device; " U.S. application Ser. No. 09/583,448, "Disk Format for Writeable Mastered Media; " U.S. application Ser. No. 09/542,181, "Structure and Method for Storing Data on Optical Disks; " U.S. application Ser. No. 09/542,510 for "Embedded Data Encryption Means;" U.S. application Ser. No. 09/583,133 for "Read Write File System Emulation; " and U.S. application Ser. No. 09/583,452 for "Method of Decrypting Data Stored on a Storage Device Using an Embedded Encryption/Decryption Means," each of which is herein incorporated by reference in its entirety.

Drive 100 can be included in any host, for example personal electronic devices. Examples of hosts that may include drive 100 are further described in U.S. patent application Ser. No. 09/315,398 for Removable Optical Storage Device and System, herein incorporated by reference in its entirety. Further discussions of hosts that may include drive 100 is provided in U.S. application Ser. Nos. 09/950,516 and 09/950,365 each of which is herein incorporated by reference in its entirety. In some embodiments, drive 100 can have a relatively small form factor such as about 10.5 mm height, 50 mm width and 40 mm depth.

Figure 2A:
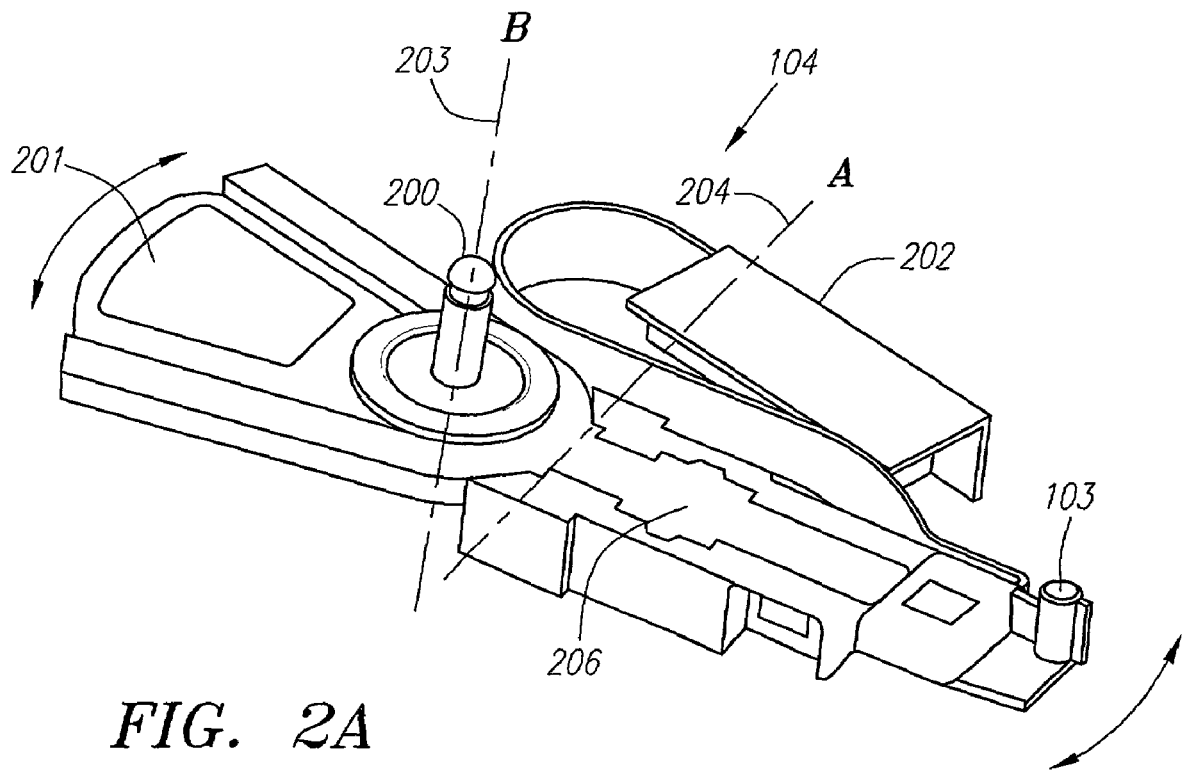
FIG. 2A shows an embodiment of an optical pick-up unit mounted on an actuator arm according to some embodiments of the present invention.

FIG. 2A shows an embodiment of actuator arm 104 with OPU 103 mounted on one end. Actuator arm 104 in FIG. 2A includes a spindle 200 which provides a rotational pivot about axis 203 for actuator arm 104. Actuator 201, which in some embodiments can be a magnetic coil positioned over a permanent magnet, can be provided with a current to provide a rotational motion about axis 203 on spindle 200. Actuator arm 104 further includes a flex axis 204. A motion of OPU 103 substantially perpendicular to the rotational motion about axis 203 can be provided by activating actuator coil 206. In some embodiments, actuators 206 and 201 can be voice coil motors.

Figure 2B:
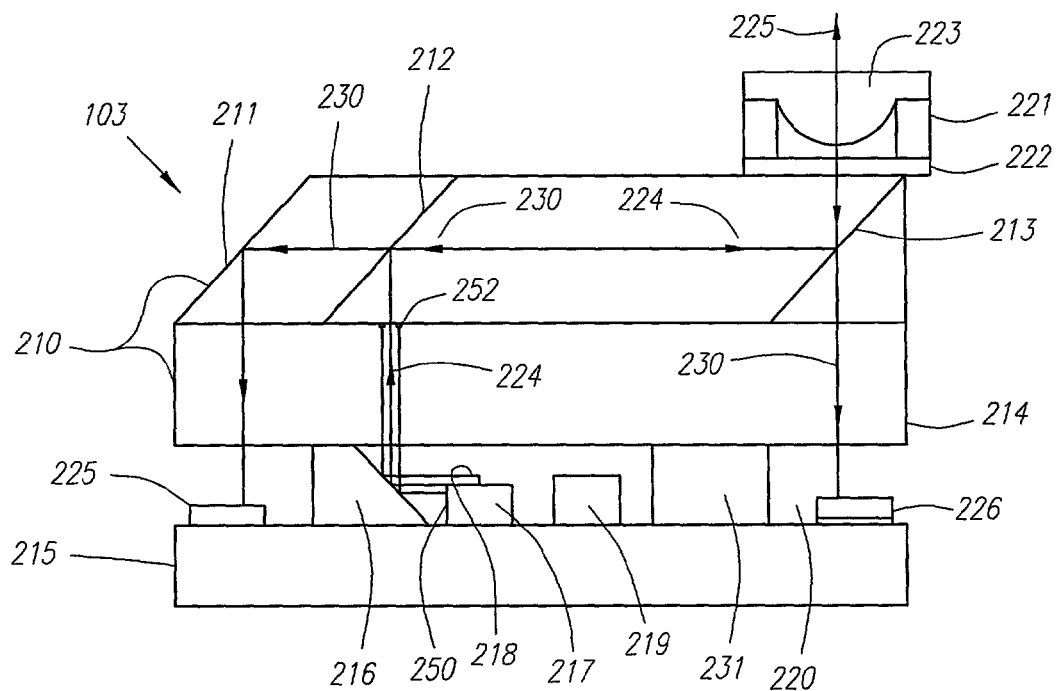
FIG. 2B shows an embodiment of an optical pick-up unit according to some embodiments of the present invention.
Figure 2C:
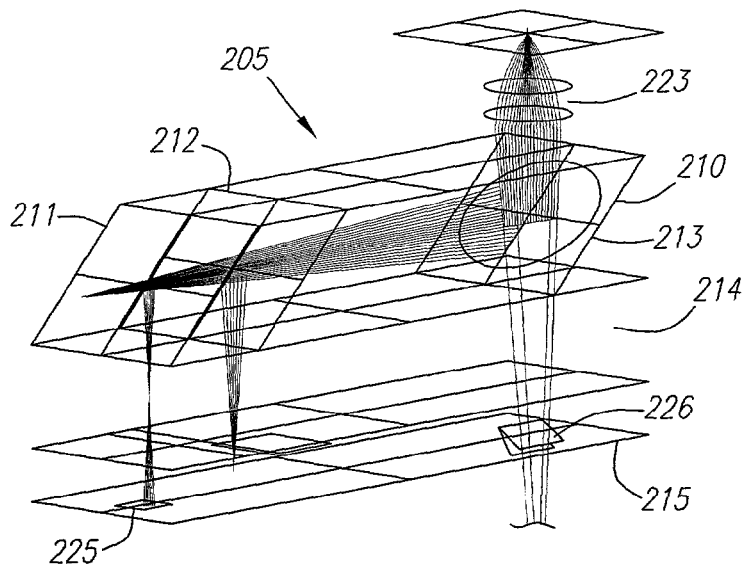
FIG. 2C illustrates the optical path through the optical pick-up unit of FIG. 2B.

FIGS. 2B and 2C show an embodiment of OPU 103 and an optical ray trace diagram of OPU 103, respectively. OPU 103 of FIG. 2B includes a periscope 210 having reflecting surfaces 211, 212, and 213. Periscope 210 is mounted on a transparent optical block 214. Object lens 223 is positioned on spacers 221 and mounted onto quarter wave plate (QWP) 222 which is mounted on periscope 210. Periscope 210 is, in turn, mounted onto turning mirror 216 and spacer 231, which are mounted on a silicon submount 215. A laser 218 is mounted on a laser mount 217 and positioned on silicon submount 215. Detectors 225 and 226 are positioned and mounted on silicon substrate 215. In some embodiments, a high frequency oscillator (HFO) 219 can be mounted next to laser 218 on silicon submount 215 to provide modulation for the laser beam output of laser 218.

Laser 218 produces an optical beam 224 which is reflected into transparent block 214 by turning mirror 216. Beam 224 is then reflected by reflection surfaces 212 and 213 into lens 223 and onto optical medium 102 (see FIG. 1A). In some embodiments, reflection surfaces 212 and 213 can be polarization dependent and can be tuned to reflect substantially all of polarized optical beam 224 from laser 218. QWP 222 rotates the polarization of laser beam 224 so that a light beam reflected from optical media 102 is polarized in a direction opposite that of optical beam 224.

The reflected beam 230 from optical medium 102 is collected by lens 223 and focused into periscope 210. A portion (in some embodiments about 50%) of reflected beam 230, which is polarized opposite of optical beam 224, passes through reflecting surface 213 and is directed onto optical detector 226. Further, a portion of reflected beam 230 passes through reflecting surface 212 and is reflected onto detector 225 by reflecting surface 211. Because of the difference in path distance between the positions of detectors 225 and 226, detector 226 is positioned before the focal point of lens 223 and detector 225 is positioned after the focal point of lens 223, as is shown in the optical ray diagram of FIG. 2C through 2F.

In some embodiments, optical surface 212 is nearly 100% reflective for a first polarization of light and nearly 100% transmissive for the opposite polarization. Optical surface 213 can be made nearly 100% reflective for the first polarization of light and nearly 50% reflective for the opposite polarization of light, so that light of the opposite polarization incident on surface 213 is approximately 50% transmitted. Optical surface 211 can, then, be made nearly 100% reflective for the opposite polarization of light. In that fashion, nearly 100% of optical beam 224 is incident on optical media 102 while 50% of the collected return light is incident on detector 226 and about 50% of the collected return light is incident on detector 225.

A portion of laser beam 224 from laser 218 can be reflected by an annular reflector 252 positioned in periscope 210 on the surface of optical block 214. Annular reflector 252 may be a holographic reflector written into the surface of optical block 214 about the position that optical beam 224 passes. Annular reflector 252 reflects some of the laser power back onto a detector 250 mounted onto laser block 217. Detector 250 provides a laser power signal that can be used in a servo system to control the power of laser 218.

Figure 2D:
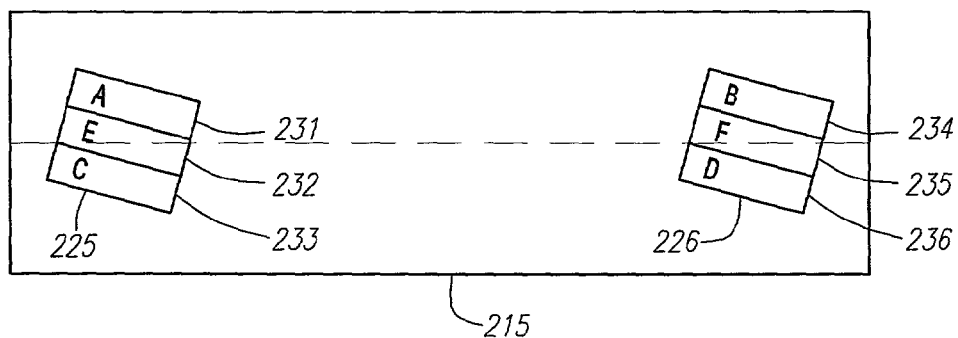
FIG. 2D shows an embodiment of optical detector positioning of the optical pick-up unit of FIG. 2B.

FIG. 2D shows an embodiment of detectors 225 and 226 which can be utilized with some embodiments of the present invention. Detector 225 includes an array of optical detectors 231, 232, and 233 positioned on a mount 215. Each individual detector, detectors 231, 232, and 233, is electrically coupled to provide raw detector signals $A_R$, $E_R$ and $C_R$ to controller 106. Detector 226 also includes an array of detectors, detectors 234, 235 and 236, which provide raw detector signals $B_R$, $F_R$, and $D_R$, respectively, to controller 106. In some embodiments, center detectors 232 and 235, providing signals $E_R$ and $F_R$, respectively, are arranged to approximately optically align with the tracks of optical media 102 as actuator arm 104 is rotated across optical media 102. In some embodiments, the angle of rotation of detectors 225 and 226 with respect to mount 215 is about 9.9 degrees and is chosen to approximately insure that the interference patterns of light beam 225 reflect back from optical media 102 is approximately symmetrically incident with segments 231, 232, 233 of detector 225 and segments 234, 235 and 236 of detector 226. Non-symmetry can contribute to optical cross-talk between derived servo signals such as the focus error signal and the tracking error signal.

A focus condition will result in a small diameter beam 230 incident on detectors 225 and 226. The degree of focus, then, can be determined by measuring the difference between the sum of signals $A_R$ and $C_R$ and the center signal $E_R$ of detector 225 and the difference between the sum of signals $B_R$ and $D_R$ and the center signal $F_R$ of detector 226. Tracking can be monitored by measuring the symmetric placement of beams 230 on detectors 225 and 226. A tracking monitor can be provided by monitoring the difference between signals $A_R$ and $C_R$ of detector 225 and the difference between signals B and D of detector 226. Embodiments of OPU 103 are further described in application Ser. No. 09/540,657 for "Low Profile Optical Head," herein incorporated by reference in its entirety.

Figure 2E:
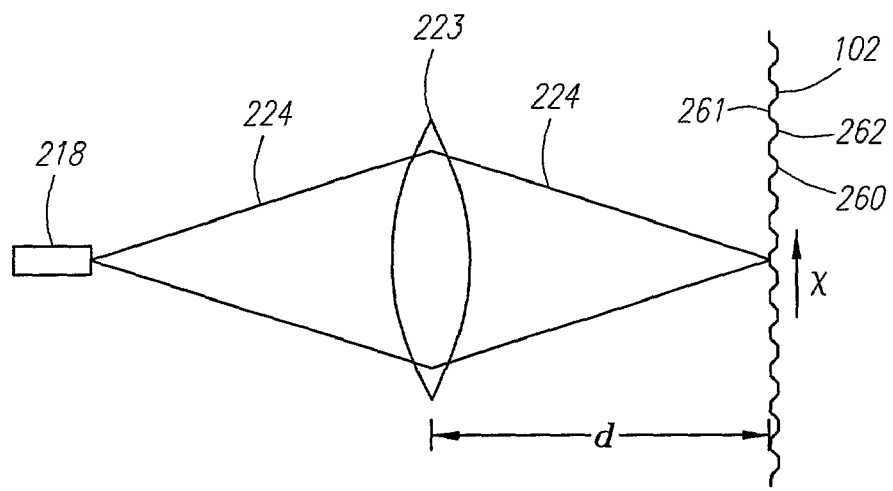
FIGS. 2E and 2F show simplified optical paths as shown in FIG. 2C.

FIG. 2E shows an effective optical ray diagram for light beam 224 traveling from laser 218 (FIG. 2B) to optical media 102 (FIG. 1A) in drive 100. Lens 223 focuses light from laser 218 onto optical media 102 at a position x on optical media 102. The distance between lens 223 and the surface of optical media 102 is designated as d. In some embodiments of the invention, data is written on the front surface of optical media 102. In some embodiments, data can be written on both sides of optical media 102. Further, optical media 102 includes tracks that, in most embodiments, are formed as a spiral on optical media 102 and in some embodiments can be formed as concentric circles on optical media 102. Tracks 260 can differ between premastered and writeable portions of optical media 102. For example, tracks 260 in writeable portions 151 of optical media 102 include an addressing wobble while tracks in premastered portion 150 of optical media 102 do not. Data can be written either on the land 261 or in the groove 262. For discussion purposes only, in this disclosure data is considered to be written on land 261 so that focus and tracking follow land 261. However, one skilled in the art will recognize that the invention disclosed here is equally applicable to data written in groove 262.

In premastered portion 150 of optical media 102 (FIG. 1B), data is written as pits or bumps so that the apparent reflective property of reflected beam 230 changes. Although the actual reflectivity of a bump is the same as the reflectivity elsewhere on the disk, the apparent reflectivity changes because a dark spot over the premastered marks is created due to phase differences in light reflected from the bump versus light reflected from land 261 around in the bump. The phase difference is sufficient to cause destructive interference, and thus less light is collected. Another factor in reducing the amount of light detected from optical media 102 at a bump includes the additional scattering of light from the bump, causing less light to be collected.

In writeable portion 151 of optical media 102 (FIG. 1B), a film of amorphous silicon provides a mirrored surface. The amorphous silicon can be written by heating with a higher powered laser beam to crystallize the silicon and selectively enhances, because the index of refraction of the material is changed, the reflectivity and modifies the phase properties of the writeable material in writeable portion 151 of optical media 102.

Figure 2F:
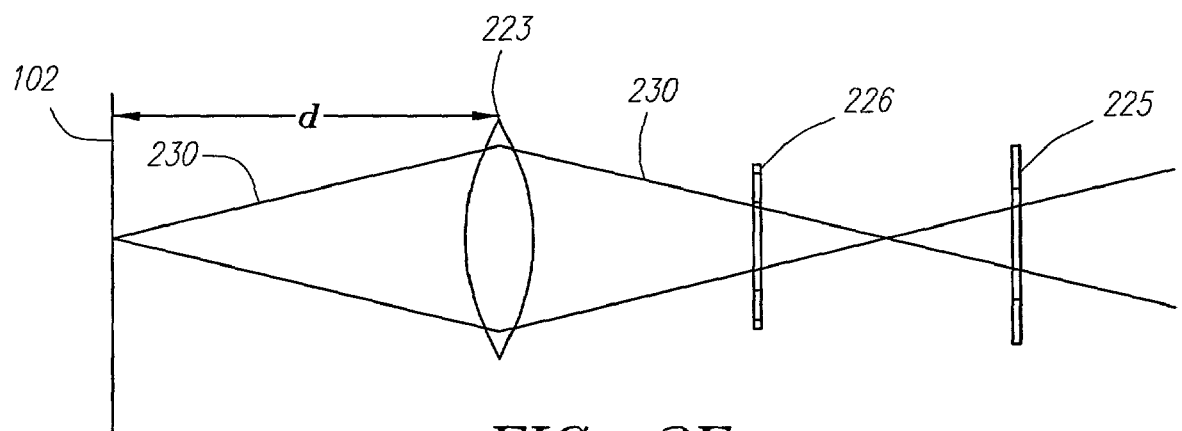

FIG. 2F shows the reflection of light beam 230 from optical media 102 onto detector arrays 225 and 226 of OPU 103. Reflected light beam 230 from optical media 102 is collected by lens 223 and focused on detectors 225 and 226 in OPU 103. Detector 226 is positioned before the focal point of lens 223 while detector 225 is positioned after the focal point of lens 223. As shown in FIG. 2B, the light beam reflected from optical media 102 is split at surface 213 to be reflected onto each of detectors 225 and 226. Detectors 225 and 226 can then be utilized in a differential manner to provide signals to a servo control that operates actuators 201 and 206 to maintain optimum tracking and focus positions of OPU 103.

Figure 2G:
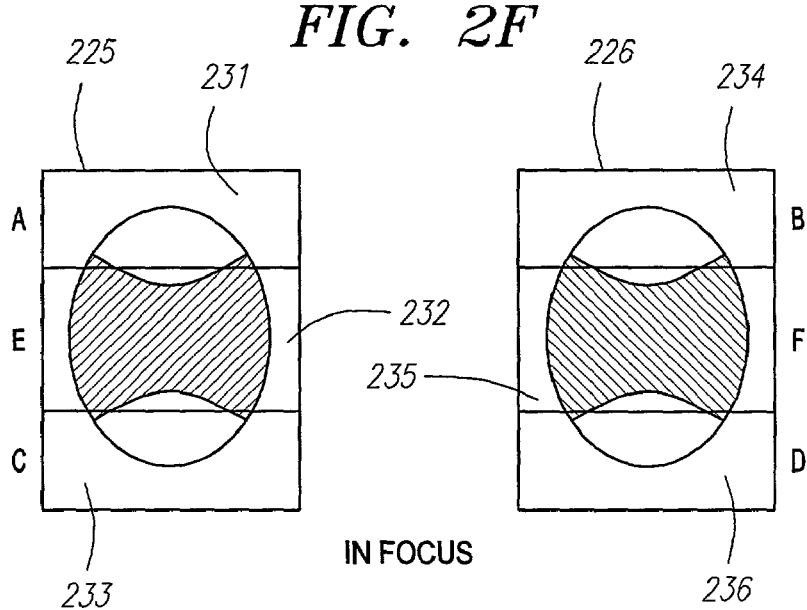
FIGS. 2G, 2H, 2I, 2J, 2K and 2L illustrate development of a focus error signal (FES) as a function of distance between the optical pick-up unit and the surface of the optical media in some embodiments of the present invention.
Figure 2H:
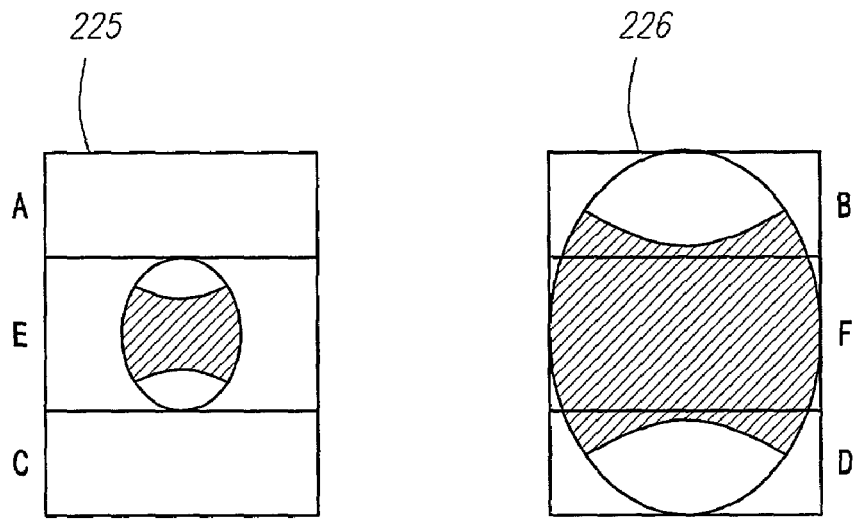
Figure 2I:
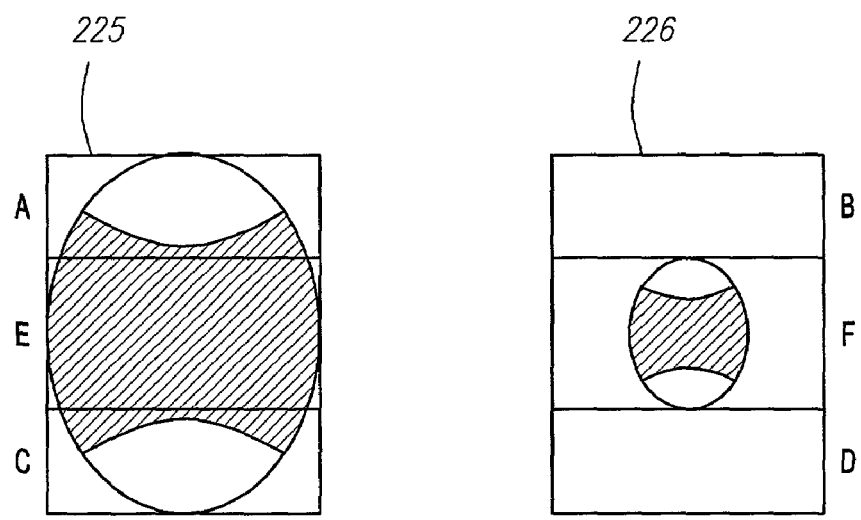
Figure 2J:
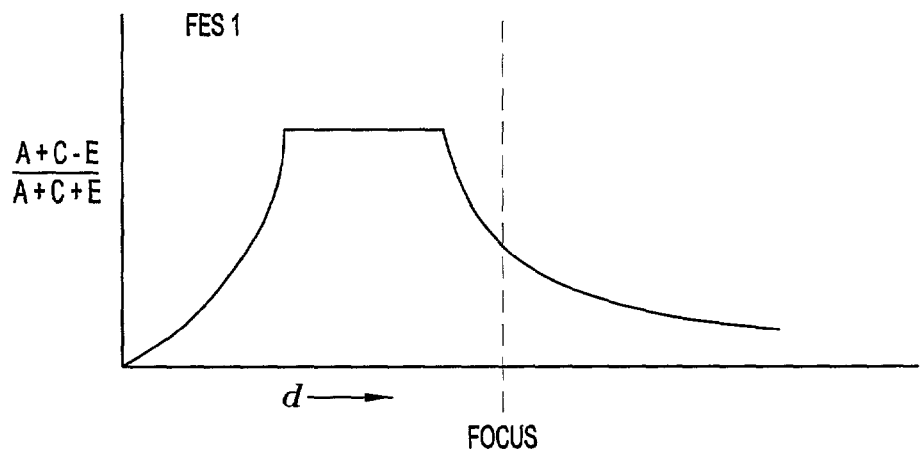
Figure 2K:
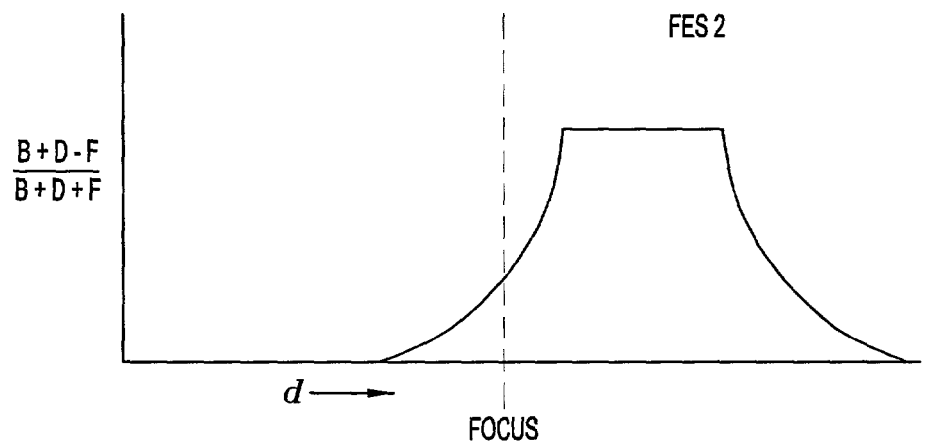
Figure 2L:
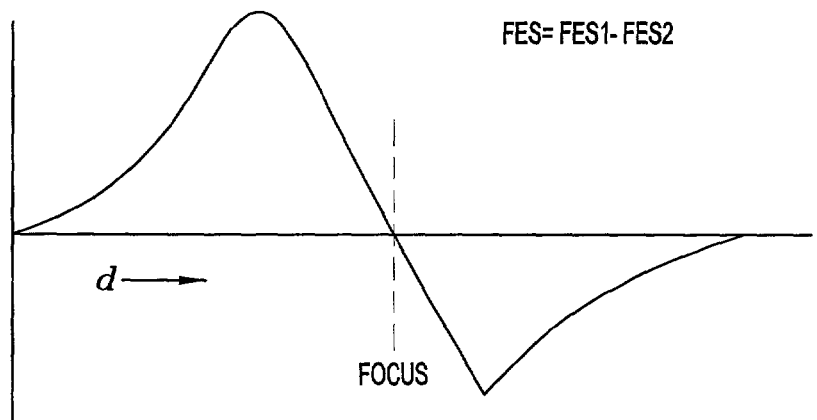

FIG. 2G shows light beam 230 on optical detectors 225 and 226 when d, the distance between lens 223 and the surface of optical media 102, is at an optimum in-focus position. The light intensity of light beam 230 reflected from optical media 102 onto detectors 225 and 226 is evenly distributed across segments 231, 232, and 233 of detector 225 and across segments 234, 235, and 236 of detector 226. FIG. 2H shows the light beams on detectors 225 and 226 when d is lengthened. The beam on detector 226 gets larger while the beam on detector 225 gets smaller. As shown in FIG. 2I, the opposite case is true if distance d is shortened. A focus signal on detector 225, then, can be formed by adding signals A and C and subtracting signal E. In some embodiments, the resulting signal is normalized by the sum of signals A, C and E. FIG. 2J shows the relationship of quantity A+C−E as a function of d. FIG. 2K shows the relationship of corresponding quantity B+D−F as a function of d. The difference between the two functions shown in FIGS. 2J and 2K is shown in FIG. 2L. In FIG. 2L, the focus point can be at the zero-crossing of the curve formed by taking the difference between the graphs of FIGS. 2J and 2K as a function of focus distance d. In the preceding discussion, subscripts are dropped from the detector signals A, C, E, B, D, and F to indicate that the discussion is valid for the analog or digital versions of these signals.

Figure 2M:
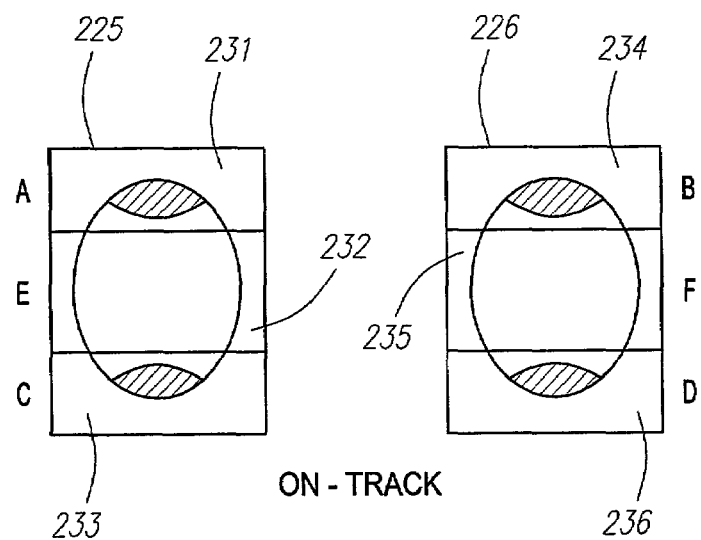
Figure 2N:
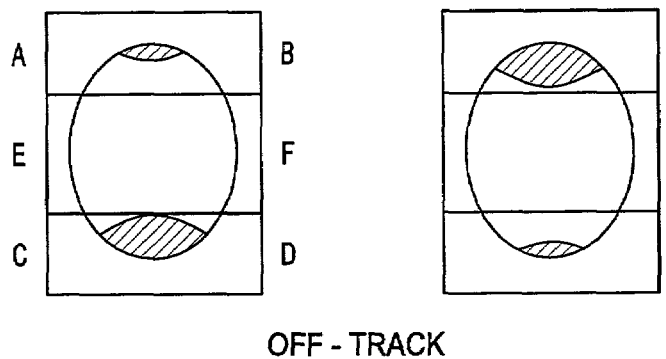
Figure 2O:
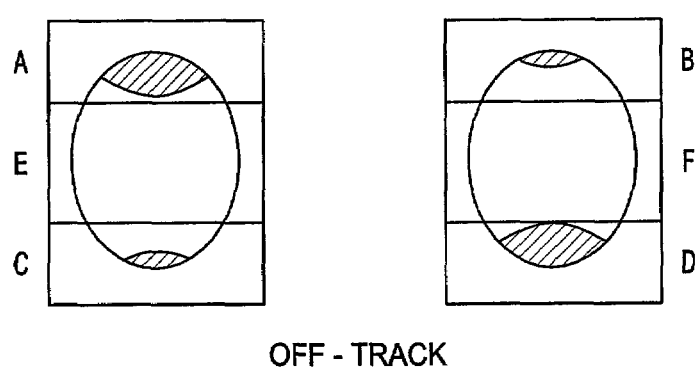
Figure 2P:
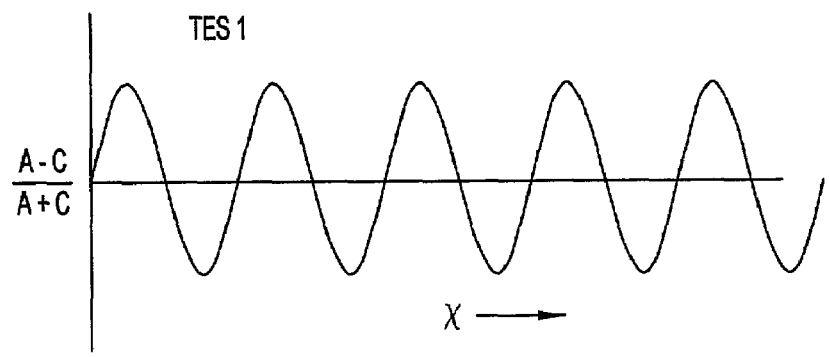
Figure 2Q:
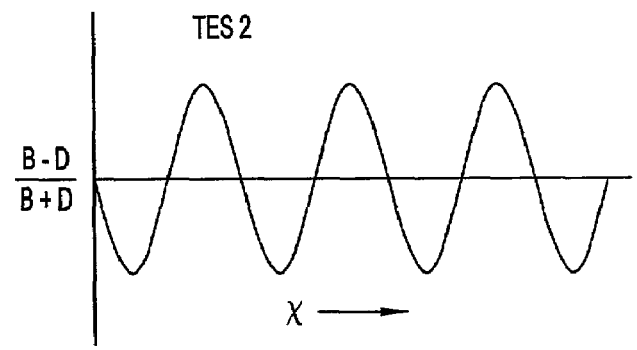
Figure 2R:
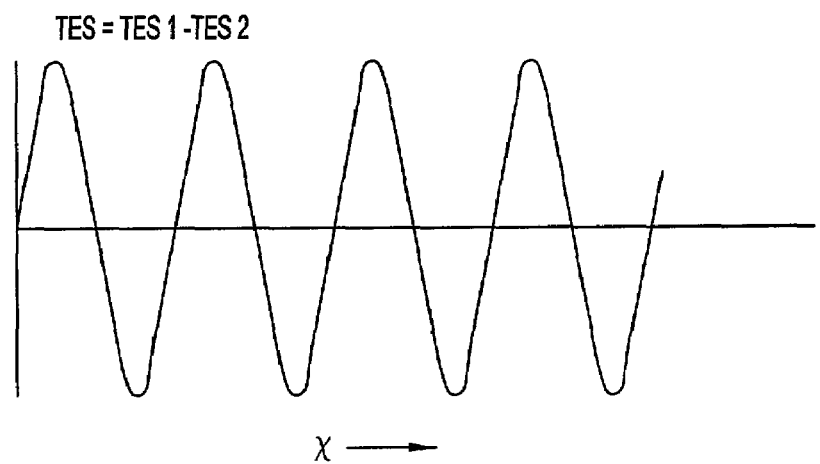

FIG. 2M shows beam of light 230 on each of detectors 225 and 226 in an on-track situation. As shown in FIG. 2E, light from laser 218 is incident on optical media 102 which has tracks 260 with lands 261 and grooves 262. The beam is broad enough that interference patterns are formed in the reflected light beam that, as shown in FIG. 2F, is incident on detectors 226 and 225. As shown in FIG. 2M, the interference pattern forms an intensity pattern with most of the intensity centered on elements 232 and 235, the center elements of detectors 225 and 226, respectively, where constructive interference from tracks 260 is formed. Lower intensity light, where destructive interference is formed, is incident on outside elements 231 and 233 of detectors 225, 234 and 236 of detector 226. If light beam 224 from laser 218 is focused on edges of tracks 260, the interference pattern shifts. FIGS. 2N and 2O show interference patterns indicative of light at edges of tracks 260. Since, when the light beam is "on-track" the intensity of light in outside elements 231 and 233 and outside elements 234 and 236 are the same, a tracking signal can be formed by the difference in signals A and C and B and D. FIG. 2P shows the normalized value A−C as a function of x as light beam 224 from laser 218 is moved over the surface of optical media 102. FIG. 2Q shows the normalized value of B−D as a function of x. In each case, a sinusoidal function is generated where an on-track condition is met at zero-crossings. Because detectors 225 and 226 are differential in nature, and because the relationship shown in FIG. 2Q is out of phase with that shown in FIG. 2P, an overall tracking error signal can be formed by taking the difference between the calculations shown in FIG. 2P and the calculations shown in FIG. 2Q as an indication of tracking error. Variation over a complete period of the sine wave shown in FIG. 2Q indicates a full track crossing. In other words, a zero-crossing will indicate either land 261 or groove 262 of track 260. The slope of the tracking error signal (TES) at the zero crossing can indicate whether the crossing is through a groove or through a land in track 260.

Utilizing detectors 225 and 226 in a normalized and differential manner to form tracking and focus error signals minimizes the sensitivity of drive 100 to variations in laser power or to slight differences in reflectivity as optical media 102 is rotated. Variations common to both detectors 225 and 226 are canceled in a differential measurement. Further, although best tracking and best focus may occur at zero points in the TES or FES signals, these locations may not be optimum for the best reading or writing of data. Since the purpose of drive 100 is to read and write data to optical media 102, in some embodiments different operating points may be made thus allowing drive 100 to switch between optimum servo function and optimum data read function. This factor is further discussed below with respect to the TES and FES servo algorithms.

Further, there can be significant cross-talk between the TES and FES signals as described above with FIGS. 2A through 2R. FES, as defined above for each of detectors 225 and 226, will depend on TES as OPU 103 passes over tracks on optical media 102. With the observation that the cross-talk intensity changes are concentrated on the outer elements (e.g., elements 231 and 233 of detector 225) and that the sum signal is not dependent on spot size, so long as the spot stays on detector 225, then FES can be defined such that cross-talk is reduced or eliminated. For example, with detector 225 FES is defined as (A+C−E)/(A+C+E). Since the cross-talk in the outer elements (elements 231 and 233) have a large crosstalk the cross-talk in the central element, element 232, is smaller and out of phase with the cross-talk in the outer elements, then cross-talk can be reduced by defining a new FES, NFES, as FES−SUM, where SUM is A+C+E. In some embodiments, NFES can be FES−HP(SUM), where HP(SUM) is a high-pass filtered sum signal with a filter gain chosen to reduce crosstalk. In some embodiments, NFES can be normalized with the SUM signal or with a low-pass filtered SUM signal. In differential mode, i.e. with both detectors 225 and 226, the new FES signal with reduced cross-talk can be defined, as above, by the difference between the FES signal calculated from detector 225 and the FES signal calculated from detector 226.

Embodiments of drive 100 (FIG. 1A) present a multitude of challenges in control over conventional optical disk drive systems. A conventional optical disk drive system, for example, performs a two-stage tracking operation by moving the optics and focusing lens radially across the disk on a track and performs a two-stage focusing operation by moving a focusing lens relative to the disk. Actuators 201 and 206 of actuator arm 104 provide a single stage of operation that, nonetheless in some embodiments, performs with the same performance as conventional drives with conventional optical media. Further, conventional optical disk drive systems are much larger than some embodiments of drive 100. Some major differences include the actuator positioning of actuator arm 104, which operates in a rotary fashion around spindle 200 for tracking and with a flexure action around axis 204 for focus. Further, the speed of rotation of spindle driver 101 is dependent on the track position of actuator arm 104. Additionally, the characteristics of signals $A_R$, $B_R$, $C_R$, $D_R$, $E_R$, and $F_R$ received from OPU 103 differ with respect to whether OPU 103 is positioned over a premastered portion of optical media 102 or a writeable portion of optical media 102. Finally, signals $A_R$, $B_R$, $C_R$, $D_R$, $E_R$, and $F_R$ may differ between a read operation and a write operation.

It may generally be expected that moving to a light-weight structural design from the heavier and bulkier conventional designs, such as is illustrated with actuator arm 104, for example, may reduce many problems involving structural resonances. Typically, mechanical resonances scale with size so that the resonant frequency increases when the size is decreased. Further, focus actuation and tracking actuation in actuator arm 104 are more strongly cross-coupled in actuator arm 104, whereas in conventional designs the focus actuation and tracking actuation is more orthogonal and therefore more decoupled. Further, since all of the optics in drive 100 are concentrated at OPU 103, a larger amount of optical cross-coupling between tracking and focus measurements can be experienced. Therefore, servo system 120 has to push the bandwidth of the servo system as hard as possible so that no mechanical resonances in actuator arm 104 are excited while not responding erroneously to mechanical and optical cross couplings. Furthermore, due to the lowered bandwidth available in drive 100, nonlinearities in system response can be more severe. Further, since drive 100 and optical media 102 are smaller and less structurally exact, variations in operation between drives and between various different optical media can complicate control operations on drive 100.

One of the major challenges faced by servo system 120 of control system 106, then, includes operating at lower bandwidth with large amounts of cross coupling and nonlinear system responses, and significant variation in servo characteristics between different optical media and between different optical drives. Additionally, the performance of drive 100 should match or exceed that of conventional CD or DVD drives in terms of track densities and data densities. Additionally, drive 100 needs to maintain compatibility with other similar drives so that optical media 102 can be removed from drive 100 and read or written to by another similar drive.

Conventional optical drive servo systems are analog servos. In an analog environment, the servo system is limited with the constraints of analog calculations. Control system 106, however, can include substantially a digital servo system. A digital servo system, such as servo system 120, has a higher capability in executing solutions to problems of system control. A full servo loop is formed when servo system 120 is coupled with actuator 104, OPU 103, spin motor 101 and optical media 102, where the effects of a control signal generated by servo system 120 is detected. A full digital servo system is limited only by the designer's ability to write code, the memory storage available in which to store data and code, and processor capabilities. Embodiments of servo system 120, then, can operate in the harsher control environment presented by disk drive 100 and are capable of higher versatility towards upgrading servo system 120 and for refinement of servo system 120 than in conventional systems.

Drive 100 can also include error recovery procedures. Embodiments of drive 100 which have a small form factor can be utilized in portable packages and are therefore subject to severe mechanical shocks and temperature changes, all of which affect the ability to extract data (e.g., music data) from optical media 102 reliably or, in some cases, write reliably to optical media 102. Overall error recovery and control system 106 is further discussed in the System Architecture disclosures, while tracking, focus and seek algorithms are discussed below, and in the Tracking and Focus Servo System disclosures. Further, since drive 100, therefore, has tighter tolerances than conventional drives, some embodiments of servo-system 120 include dynamic calibration procedures, which is further described in the Servo System Calibration disclosures. Control of the spin motor 101 is described in the Spin Motor Servo System disclosures. The System Architecture disclosures, the Tracking and Focus Servo System disclosures, the Servo System Calibration disclosures, and the Spin Motor Servo System disclosures have been incorporated by reference into this disclosure.

Example Embodiment of an Optical Drive Controller

FIG. 3A shows a block diagram of an embodiment of controller 106 according to the present invention. Optical signals are received from OPU 103 (see FIGS. 2B-2D). As discussed above with FIGS. 2B, 2C and 2D, some embodiments of OPU 103 include two detectors with detector 225 including detectors 231, 232, and 233 for providing detector signals $A_R$, $E_R$, and $C_R$, respectively, and detector 226 having detectors 234, 235 and 236 providing detector signals $B_R$, $F_R$, and $D_R$, respectively. Further, some embodiments of OPU 103 include a laser power detector 250 mounted to receive reflected light from an annular reflector 252 positioned on periscope 210, as discussed above, and therefore provides a laser power signal $LP_R$ as well.

Detector signals received from OPU 103 are typically current signals. Therefore, the detector signals from OPU 103 are converted to voltage signals in a preamp 310. Preamp 310 includes a transimpedance amplifier, which converts current signals to voltage signals. Further, preamp 310 generates a high frequency (HF) signal based on the detector signals from OPU 103. The HF signal can be utilized as the data signal and is formed by the analog sum of the signals from OPU 103 (signals $A_v$, $B_v$, $C_v$, $D_v$, $E_v$ and $F_v$ in FIG. 3A).

FIG. 3B shows a block diagram of an embodiment of preamp 310. Preamp 310 includes an array of transimpedance amplifiers, amplifiers 311, 312, 313, 314, 315, 316 and 317 in FIG. 3B. Amplifier 311 receives the laser power signal $LP_R$ from OPU 103 and amplifiers 312 through 317 receive signals $A_R$ through $F_R$, respectively, from OPU 103. In general, preamp 310 can receive any number of detector signals from OPU 103. In some embodiments, each of signals $A_R$ through $F_R$ and laser power $LP_R$ are current signals from detectors 225, 226 and 250 of OPU 103. Amplifiers 311 through 317 output voltage signals $LP_v$, $A_v$, $B_v$, $C_v$, $D_v$, $E_v$ and $F_v$, respectively. The gain of each of amplifiers 311 through 317, G1 through G7, can be set by gain conversion 318. Gain conversion 318 can receive a W/R gain switch that indicates a read or a write condition and can adjust the gains G1 through G7 of amplifiers 311 through 317 accordingly. In some embodiments, gain conversion 318 receives gain selects for each of gains G1 through G7 and a forward sensor FWD sensor. In some embodiments, gains G1 and G2 are the same and gains G3 through G6 are the same. In some embodiments, gains G3 through G6 are approximately ½ of gains G1 and G2.

Since the laser power required for a write operation is much higher than the laser power required for a read operation, the gains G1 through G7 can be set high for a read operation and can be lowered for a write operation. In some embodiments, gain conversion 318 outputs one of a number (e.g., two) of preset gains for each of gains G1 through G7 in response to the W/R gain switch setting. Summer 319 receives each of the signals $A_v$, $B_v$, $C_v$, $D_v$, $E_v$, and $F_v$ from amplifiers 312 through 317, respectively, and outputs a differential HF signal. In some embodiments, the differential HF signal is the analog sum of signals $A_v$, $B_v$, $C_v$, $D_v$, $E_v$, and $F_v$. The differential HF signal indicates the total light returned from optical medium 102 (see FIG. 1) and therefore includes, in a read operation, the actual data read from optical medium 102.

In some embodiments, preamplifier 308 can include summers 331 through 336, which receives the output signals from amplifiers 312 through 317, respectively, and offsets the output values from amplifiers 312 through 317, respectively, by reference voltages VREF6, VREF5, VRD4, VRD3, VRD2, and VRD1, respectively. In some embodiments VRD1 through VRD4 are the same and VREF5 and VREF6 are the same. The input signals to differential summer 319, then, are the output signals from adders 331 through 336 and the output signal from amplifier 311.

As shown in FIG. 3A, the voltage signals $LP_v$, $A_v$, $B_v$, $C_v$, $D_v$, $E_v$, $F_v$, and HF from preamp 310 are input signals to control chip 350. Control chip 350 can be a digital and analog signal processor chip which digitally performs operations on the input signals $A_v$, $B_v$, $C_v$, $D_v$, $E_v$, $F_v$, HF, and $LP_v$ to control the actuators of actuator arm 104 (FIG. 1), the laser power of laser 218 (FIG. 2B), and the motor speed of spindle motor 101 (FIG. 1). Control 350 also operates on the HF signal to obtain read data and communicate data and instructions with a host (not shown). In some embodiments, control 350 can be a ST Microelectronics 34-00003-03.

The laser power signal $LP_v$ is further input to laser servo 105 along with a W/R command, indicating a read or a write operation. In some embodiments, laser servo 105 is an analog servo loop that controls the power output of laser 218 of OPU 103. In some embodiments, the laser power can also be included in a digital servo loop controlled by control chip 350. The laser power of laser 218 is high for a write operation and low for a read operation. Laser servo 105, then, holds the power of laser 218 to a high power of low power in response to the laser W/R power control signal from control chip 350. Analog servo systems for utilization as laser servo 105 are well known to one skilled in the art. In some embodiments, laser servo 105 can also be a digital servo system.

Control chip 350 is further coupled with data buffer memory 320 for buffering data to or from the host and program memory 330. Program memory 330 holds program code for, among other functions, performing the servo functions for controlling focus and tracking functions, laser power, and motor speed. Data read through OPU 103 can be buffered into data buffer memory 320, which assists in power savings and allows more time for error recovery if drive 100 suffers a mechanical shock or other disturbing event. In some embodiments, control chip 350 activates mechanical components 107 of drive 100 when data buffer 320 is depleted and deactivates mechanical portions 107 when buffer 320 is filled. Servo system 120, then, needs only to be active while mechanical portions 107 are active.

In some embodiments, control chip 350 is a low power device that operates at small currents. Therefore, control voltages for controlling focus and tracking actuators (through coils 206 and 201, respectively) are input to power driver 340. Power driver 340 outputs the current required to affect the focus and tracking functions of actuator arm 104 through focus actuator 206 and tracking actuator 201. In some embodiments, as described above, focus actuator 206 and tracking actuator 201 are voice coil motors mounted on actuator arm 104 so that tracking actuator 201 moves OPU 103 over tracks of optical media 102 and focus actuator 206 flexes actuator arm 104 to affect the distance between OPU 103 and optical media 102.

Driver 340 can also provide current to drive spindle motor 101. Spindle motor 101 provides sensor data to a servo system and can also be responsive to the tracking position of OPU 103 so that the speed of spindle motor 101 is related to the track. In some embodiments, the data rate is held constant by controlling the speed of spindle motor 101 as OPU 103 tracks across optical media 102. A servo system for controlling spindle motor 101 is further described in the Spin Motor Servo System disclosures.

Further, power drivers 340 can also control a cartridge eject motor 360 and latch solenoid 370 in response to commands from control chip 350. Cartridge eject motor 360 mounts and dismounts optical media 102 onto spindle motor 101. Latch solenoid 370 provides a secured latch so that the OPU 103 does not contact optical media 102 during non-operational shock conditions.

Finally, system 300 can include power monitor 380 and voltage regulators 390. Power monitor 380 provides information about the power source to control chip 350. Control chip 350, for example, can be reset by power monitor 380 if there is a power interruption. Voltage regulators 390, in response to an on/off indication from control chip 350, provides power to drive laser 218, as well as control chip 350 and pre-amp 310. Spindle motor 101, actuators 206 and 201, cartridge eject motor 360, and latch solenoid 370 can be powered directly from the input voltage.

FIG. 4 shows an embodiment of control chip 350 of control system 300. The embodiment of control chip 350 shown in FIG. 4 includes a microprocessor 432 and a digital signal processor (DSP) 416. Since DSP 416 operates much faster, but has lower overall capabilities (e.g., code and data storage space), than microprocessor 432, in some embodiments real time digital servo system algorithms can be executed on DSP 416 while other control functions and calibration algorithms can be executed on microprocessor 432. A control structure for embodiments of control chip 350, and interactions between DSP 416 and microprocessor 432, are further discussed in the System Architecture disclosures.

Control chip 350 receives voltage signals $A_V$, $E_V$, $C_V$, $B_V$, $F_V$, $D_V$, HF, and $LP_V$ from preamp 310 (see FIG. 3A). Signals $A_V$, $E_V$, $C_V$, $B_V$, $F_V$, and $D_V$ are input into offset blocks 402-1 through 402-6, respectively. Offset blocks 402-1 through 402-6 provide a variable offset for each of input signals $A_V$, $E_V$, $C_V$, $B_V$, $F_V$, and $D_V$. The value of the offset is variable and can be set by a calibration routine executed in microprocessor 432 or DSP 416, which is further described below.

In some embodiments, the offset values can be set so that when the power of laser 218 is off the output signal from each of offsets 402-1 through 402-6 is zero, i.e. a dark-current calibration. In some embodiments, the effects of light scattering in OPU 103 may also be deducted in offset 402-1 through 402-6.

The signals output from offsets 402-1 through 402-6 are input to variable gain amplifiers 404-1 through 404-6, respectively. Again, the gains of each of variable gain amplifiers 404-1 through 404-6 are set by a calibration routine executed in microprocessor 432 or DSP 416, as further described below. In some embodiments, the gains of amplifiers 404-1 through 404-6 can be set so that the dynamic range of analog-to-digital converters 410-1 and 410-2 are substantially fully utilized in order to reduce quantization error.

The offsets and gains of offsets 402-1 through 402-6 and 404-1 through 404-6, respectively, may be different for each of signals $A_V$, $E_V$, $C_V$, $B_V$, $F_V$, and $D_V$. Further, the gains and offsets may be different for read operations and write operations and may be different for pre-mastered verses writeable portions of optical media 102. Further, the offsets and gains may vary as a function of tracking position on optical media 102 (in addition to simply varying between premastered or writeable regions). Some factors which may further lead to different offset and gain settings include light scattering onto detectors, detector variations, detector drift, or any other factor which would cause the output signal from the detectors of OPU 103 to vary from ideal output signals. Various calibration and feedback routines can be operated in microprocessor 432 and DSP 416 to maintain efficient values of each of the offset and gain values of offsets 402-1 through 402-6 and amplifiers 404-1 through 404-6, respectively, over various regions of optical media 102, as is further discussed below.

Therefore, in some embodiments the offset and gain values of offsets 402-1 through 402-6 and amplifiers 404-1 through 404-6 can be varied by microprocessor 432 and DSP 416 as OPU 103 is positionally moved over optical media 102. Additionally, in some embodiments microprocessor 432 and DSP 416 monitor the offset and gain values of offset 402-1 through 402-6 and amplifiers 404-1 through 404-6 in order to dynamically maintain optimum values for the offset and gain values as a function of OPU 103 position over optical media 102. In some embodiments, offset and gain values are set in a calibration algorithm. In some embodiments, the offset values of offsets 402-1 through 402-6 are determined such that the dynamic range of the respective input signals are centered at zero. Further, the gains of amplifiers 404-1 through 404-6 are set to fill the dynamic range of analog-to-digital converters 410-1 and 410-2 in order to reduce quantization error. In some embodiments, the gains of amplifiers 404-1 through 404-6 can be modified in error recovery routines. See the System Architecture disclosures. In some embodiments, the gains of amplifiers 404-1 through 404-6 can be optimized through continuous performance monitoring. See the Servo System Calibration disclosures.

The output signals from variable gain amplifiers 404-1 through 404-6 are input to anti-aliasing filters 406-1 through 406-6, respectively. Anti-aliasing filters 406-1 through 406-6 are low-pass filters designed to prevent aliasing. In some embodiments, the output signals from each of anti-aliasing filters 406-1 through 406-5 are input to analog-to-digital converters. In other embodiments, a limited number of analog-to-digital converters are utilized. In the embodiment shown in FIG. 4, the output signals from anti-aliasing filters 406-1 through 406-5 are input to multiplexers 408-1 and 408-2. The output signals from anti-aliasing filters 406-1 through 406-3 are input to multiplexer 408-1 and the output signals from anti-aliasing filters 406-4 through 406-6 are input to multiplexer 408-2.

The HF signal from preamp 310 (see FIG. 3A) can be input to equalizer 418. Equalizer 418 equalizes the HF signal by performing a transform function that corrects systematic errors in detecting and processing data read from optical media 102. In some embodiments, equalizer 418 operates as a band-pass filter. The output signal from equalizer 418 is input to amplifier 420. The output signal from amplifier 420 can be input as a fourth input to multiplexer 408-1.

The laser power signal $LP_V$ can be input to multiplexer 436 where $LP_V$ can be multiplexed with other signals that may require digitization. The output signal from multiplexer 436 can then be input as a fourth input to multiplexer 408-2. One skilled in the art will recognize that if no other signals are being digitally monitored, multiplexer 436 can be omitted. Further, one skilled in the art will recognize that any number of analog-to-digital converters can be utilized and any number of signals can be multiplexed to utilize the available number of analog-to-digital converters. The particular embodiment shown here is exemplary only.

The output signal from multiplexer 408-1 is input to analog-to-digital converter 410-1. The output signal from multiplexer 408-2 is input to analog-to-digital converter 410-2. Analog-to-digital converters 410-1 and 410-2 can each include registers 478 for the storage of digitized values. ADC 410-1 includes registers 478-1 through 478-4 and ADC 410-2 includes registers 478-5 through 478-8. Further, multiplexers 408-1 and 408-2 and ADC 410-1 and 410-2 are coupled to a clock 476 which determines which signals from multiplexers 408-1 and 408-2 are currently being digitized and, therefore, in which of register 478-1 through 478-4 the result of that digitization should be stored. In some embodiments, analog-to-digital converters 410-1 and 410-2 can be, for example, 10 bit converters sampling at a rate of about 26 Mhz, with each sample being taken from a different input of multiplexers 408-1 and 408-2, respectively. In some embodiments ADC 410-1 and 410-2 can sample the output signals from anti-aliasing filters 406-1 through 406-6 at a higher rate than other signals, for example the $LP_v$ signal or the output signal from gain 420. In some embodiments, for example, ADC 410-1 and 410-2 may sample each of the output signals from anti-aliasing filters 406-1 through 406-6 at an effective sampling rate of about 6.6 MHz.

The digitized signals from analog-to-digital converts 410-1 and 410-2, then, are the digitized and equalized HF signal $HF_d$, the digitized laser power signal $LP_d$, and digitized detector signals $A_d$, $E_d$, $C_d$, $B_d$, $F_d$, and $D_d$. Digitized laser power signal $LP_d$ is input to DSP 416 and can be utilized in a digital servo loop for controlling laser power or in determination of gain and offset values for various components. Alternatively, DSP 416 or microprocessor 432 can monitor $LP_d$ to determine error conditions.

The digitized HF signal $HF_d$ can be input to focus OK (FOK) 412, which outputs a signal to DSP 416 and microprocessor 432 indicating whether focus is within a useful range. Detectors 225 and 226 are sized such that, when OPU 103 is seriously out of focus, light is lost off detectors 225 and 226. Therefore, FOK 412 determines if the total intensity of light on detectors 225 and 226 is above a FOK threshold value indicating a near in-focus condition. In some embodiments, this function can also be executed in software rather than hardware. Further, the FOK threshold value can be fixed or can be the result of a calibration algorithm. In some embodiments, the FOK threshold value can be dependent upon the type of media on optical media 102 that OPU 103 is currently over.

Digitized detector signals $A_d$, $E_d$, $C_d$, $B_d$, $F_d$, and $D_d$ are input to decimation filters 414-1 through 414-6, respectively. Decimation filters 414-1 through 414-6 are variable filters which down-sample the digitized detector signals $A_d$, $E_d$, $C_d$, $B_d$, $F_d$, and $D_d$ to output signals $A_f$, $E_f$, $C_f$, $B_f$, $F_f$ and $D_f$ which are input to DSP 416. In some embodiments, for example, each of signals $A_d$, $E_d$, $C_d$, $B_d$, $F_d$, and $D_d$ has effectively been sampled at 6.6 MHz by ADC 410-1 and 410-2. Decimation filters 414-1 through 414-6 can then down-sample to output signals $A_f$, $E_f$, $C_f$, $B_f$, $F_f$ and $D_f$ at, for example, about 70 kHz. Embodiments of decimation filters 414-1 through 414-6 can down-sample to any sampling rate, for example from about 26 kHz to about 6.6 MHz.

The effects of down-sampling in decimation filters 414-1 through 414-6 include an averaging over several samples of each of signals $A_d$, $E_d$, $C_d$, $B_d$, $F_d$, and $D_d$. This averaging provides a low-pass filtering function and provides higher accuracy for signals $A_f$, $E_f$, $C_f$, $B_f$, $F_f$ and $D_f$ which are actually read by DSP 416 and utilized in further calculations. In some embodiments, the accuracy is effectively increased to 13 bits from the 10 bit output signals from ADC 410-1 and 410-2.

Further, although the data signals included in the HF signal can be at high frequency (e.g., several MHz), the servo information is at much lower frequencies. In some embodiments, the mechanical actuators 206 and 201 of actuator arm 104 can respond to changes in the hundreds of hertz range yielding servo data in the 10s of kilohertz range, rather than in the Megahertz ranges of optical data. Further, mechanical resonances of actuator arm 104 can occur in the 10's of kilohertz range. Therefore, down-sampling effectively filters out the high frequency portion of the spectrum that is not of interest to servo feedback systems. Further, a much cleaner and more accurate set of digital servo signals $A_f$, $E_f$, $C_f$, $B_f$, $F_f$ and $D_f$ are obtained by the averaging performed in decimation filters 414-1 through 414-6, respectively. In some embodiments, decimation filters 414-1 through 414-6 can be programmed by microprocessor 432 or DSP 416 to set the output frequency, filtering characteristics, and sampling rates.

In particular, a tracking wobble signal at about 125 KHz in the track on writeable portions 151 of optical media 102 results from a slight modulation in the physical track in that region. This wobble is filtered out of signals $A_f$, $E_f$, $C_f$, $B_f$, $F_f$, and $D_f$ by filtering provided in decimation filters 414-1 through 414-6. Actuator arm 104 cannot respond to control efforts in this frequency range. Similarly, a stabilizing frequency on laser power at 500 MHz, from modulator 219 (see FIG. 2B), is filtered out of signals $A_f$, $E_f$, $C_f$, $B_f$, $F_f$ and $D_f$ by filtering provided in decimation filters 414-1 through 414-6. For servo purposes, only the lower frequency region of the signals are important. Then, the signals $A_f$, $E_f$, $C_f$, $B_f$, $F_f$ and $D_f$ only include sensor noise and real disturbances that can be followed by a servo system operating on, for example, actuator arm 104. Those disturbances can include physical variations due to stamping errors in the mastering process, since tracks will not be perfectly laid. In addition, spindle motor 101 may provide some errors through bearings that cause vibration. Additionally, optical media 102 may not be flat. Tracking and focus servo functions, as well as the servo systems tracking laser power and the rotational speed of spindle motor 101, can follow these errors. Further, it is important that the spectral response of a servo system be responsive to the frequency range of the errors that are being tracked. If not, then the servo system may make the tracking and focus environments worse. Further, embodiments of drive 100 operate in extremes of physical abuse and environmental conditions that may alter the resonant frequency characteristics and response characteristics of spindle motor 101, optical media 102, and actuator arm 104 during operation in the short term or during the lifetime of drive 100 or optical media 102. A servo system according to the present invention should be insensitive to these changing conditions.

The digital output signals $A_d$, $E_d$, $C_d$, $B_d$, $F_d$, and $D_d$ are further input to summer 438. Summer 438 can be a programmable summer so that a sum of particular combinations of inputs $A_d$, $E_d$, $C_d$, $B_d$, $F_d$, and $D_d$ can be utilized. Summer 438 sums a selected set of signals $A_d$, $E_d$, $C_d$, $B_d$, $F_d$, and $D_d$ to form a low-bandwidth digitized version of the HF signal. The output signal from summer 438 is multiplexed in multiplexer 441 and multiplexer 443 with the digitized HF signal $HF_d$ output from ADC 410-1. A HF select signal input to each of multiplexer 441 and 443 selects which of $HF_d$ or the output signal from summer 438 are chosen as the output signal from multiplexer 441 and 443. The output signal from multiplexer 441 is input to disturbance detector 440. Disturbance detector 440 detects defects on media 102 by monitoring the data signal represented by $HF_d$ or the output from summer 438 and alerts DSP 416 of a defect. A defect can include a scratch or speck of dust on optical media 102. Results of defects manifest themselves as sharp spikes in the input signal. In some embodiments, disturbance detector 440 can include a low pass filter. The input signal to disturbance detector 440 is low pass filtered and the filtered signal is compared with the unfiltered input signal. If the difference exceeds a pre-set defect threshold signal, then a defect flag is set. The defect flag can be input to DSP 416 or microprocessor 432.

The output signal from multiplexer 443 is also input to mirror detector 442. Mirror detector 442 provides a signal similar to the TES, but 90 degrees out of phase. DSP 416 receives the mirror signal and, in combination with the TES calculated within DSP 416, can determine direction of motion while track seeking. The TES is a sine wave that indicates a track jump over one period of the wave. If a tracking servo system attempts to track at the zero-crossing with an improper slope, the servo system will simply move actuator arm 104 away from that zero-crossing. The mirror signal can be utilized to indicate if the motion is in the proper direction.

Additionally, signals $A_d$ and $C_d$ are received in summer 444, which calculates the value $A_d$–$C_d$. Further, signals $B_d$ and $D_d$ are input to summer 446 which calculates the value $B_d$–$D_d$. The output signals from summer 444 and summer 446 are input to summer 448, which takes the difference between them forming a version of tracking error signal, TES, from the digitized detector output signals. The output signal from summer 448 is input to a bandpass filter 450. The output signal from bandpass filter 450 is PushPullBP. The output signal from summer 448 is further input to a lowpass filter 452. The output signal from lowpass filter 452 is input to track crossing detector 454 which determines when the TES calculated by summer 448 indicates that OPU 103 has crossed a track on optical media 102. The output signal from track crossing detector 454 is the TZC signal and is input to DSP 416.

The low-pass filtered TES is a sine wave as a function of position of OPU 103 over optical media 102. (See, e.g., FIG. 2R). A one-period change in TES indicates a track crossing. Then, in some embodiments track crossing detector 454 can output a TZC pulse whenever the TES crosses zero (which results in two pulses per track crossing). In some embodiments, track crossing detector 454 can generate a pulse whenever a zero crossing having the proper slope in the TES curve is detected.

The signal PushPullBP can be input to Wobble/PreMark detector 428. In some embodiments, in the writeable portion of optical media 102 the tracks have a predetermined wobble, resulting from an intentional modulation in track position, which has a distinct frequency. In some embodiments, the wobble frequency of PushPullBP is in the 100 kHz range (in some embodiments around 125 kHz) and therefore, with decimation filters 414-1 through 414-6 operating as a low-pass filter at around 70 kHz, is filtered out of signals $A_f$, $E_f$, $C_f$, $B_f$, $F_f$, and $D_f$. Bandpass filter 450 can be set to pass TES signals of that frequency so that detector 428 detects the wobble in the track.

The frequency of wobble in the track from detector 428 is indicative of the rotational speed of spindle driver 101. Further, a spindle speed indication from spindle motor 101 itself can be directly input to microprocessor 432 and DSP 416. Further, the signal from gain 420 can be input to slicer 422, DPLL 424, and Sync Mark Detector 426 to provide a third indication of the speed of spindle motor 101. Slicer 422 determines a digital output in response to the output signal from equalizer 418 and amplifier 420. Slicer 422 simply indicates a high state for an input signal above a threshold value and a low state for an input signal below the threshold. DPLL 424 is a digital phase-locked loop, which basically servos a clock to the read back signal so that sync marks on the tracks can be detected. Sync mark detector 426, then, outputs a signal related to the period between detected sync marks, which indicates the rotational speed of spindle driver 101.

Each of these speed indications can be input to multiplexer 430, whose output is input to microprocessor 432 as the signal indicating the rotational speed of spindle motor 101. Microprocessor 432 can choose through a select signal to multiplexer 430 which of these rotational speed measurements to use in a digital servo loop for controlling the rotational speed of spindle driver 101.

Microprocessor 432 and DSP 416 output control efforts to drivers that affect the operation of drive 100 in response to the previously discussed signals from actuator arm 104 and spindle driver 101. A control effort from microprocessor 432 is output to spin control 456 to provide a spin control signal to driver 340 (see FIG. 3A) for controlling spindle driver 101. A digital servo system executed on microprocessor 432 or DSP 416 is further discussed in the Spin Motor Servo System disclosures. In some embodiments, as is further discussed below, microprocessor 432 outputs a coarse tracking control effort to serial interface 458.

In embodiments of drive 100 with a digital servo loop for controlling laser power, a signal from microprocessor 432 or DSP 416 is input to a laser control digital to analog converter 460 to provide a control effort signal to the laser driver of laser servo 105 (see FIG. 3A). A focus control signal can be output from either microprocessor 432 or DSP 416 to a focus digital to analog converter 464 to provide a focus control signal to power driver 340 (see FIG. 3A). A tracking control signal, which in some embodiments can be a fine tracking control effort, can be output from either microprocessor 432 or DSP 416 to a tracking digital to analog converter 468 to provide a tracking control signal to power drivers 340. A diagnostic digital to analog converter 466 and other diagnostic functions, such as analog test bus 470, digital test bus 472, and diagnostic PWM's 474, may also be included. Further a reference voltage generator 462 may be included to provide a reference voltage to digital-to-analog converters 460, 464, 466, and 468.

Microprocessor 432 and DSP 416 can communicate through direct connection or through mailboxes 434. In some embodiments, DSP 416 operates under instructions from microprocessor 432. DSP 416, for example, may be set to perform tracking and focus servo functions while microprocessor 432 provides oversight and data transfer to a host computer or to buffer memory 320. Further, microprocessor 432 may provide error recovery and other functions. Embodiments of control architectures are further discussed in the System Architecture disclosures. DSP 416, in some embodiments, handles only tracking and focus servo systems while microprocessor 432 handles all higher order functions, including error recovery, user interface, track and focus servo-loop closings, data transport between optical media 102 and buffer memory 320, and data transfer between buffer memory 320 and a host, read and write operations, and operational calibration functions (including setting offset and gain values for offset 402-1 through 402-6 and amplifiers 404-1 through 404-6 and operational parameters for decimation filters 414-1 through 414-6).

Tracking and Focus Servo Algorithms

FIGS. 5A and 5B together show a block diagram of an embodiment of tracking, focus and seek algorithms 500. Algorithms 500 shown in FIGS. 5A and 5B can be, for example, primarily executed on DSP 416 of FIG. 4. In some embodiments, real-time tracking and focus algorithms are executed on DSP 416 whereas other functions, including calibration and high-level algorithm supervision, are executed on microprocessor 432. In some embodiments, microprocessor 432 can also manage which algorithms are executed on DSP 416. Algorithm 500 includes a focus servo algorithm 501 and a tracking algorithm 502. Further algorithms include a multi-track seek algorithm 557 and a one-track jump algorithm 559.

Focus servo algorithm 501, as shown in FIGS. 5A and 5B, includes, when fully closed, summer 506, offset summer 507, FES gain 509, inverse non-linearity correction 511, cross-coupling summer 513, FES sample integrity test 515, low frequency integrator 516, phase lead 518, notch filter 519, focus close summer 521, loop gain 524, and feed-forward summer 533. Similarly, tracking servo loop 502, when fully closed, includes summer 540, offset summer 541, TES gain 543, TES inverse non-linearity correction 546, TES sample integrity test 548, low frequency filter 549, phase lead 550, notch filters 551 and 553, and loop gain amplifier 564.

Further, algorithm 500 includes detector offset calibration 584 and detector gain calibration 583. Along with other calibration procedures shown in algorithm 500, these calibrations are discussed further below.

As shown in block 503, digitized and filtered signals $A_f$, $E_f$, $C_f$, $B_f$, $F_f$, and $D_f$ from decimation filters 414-1 through 414-6 as shown in FIG. 4. For purposes of discussion, signals $A_f$, $E_f$, $C_f$, $B_f$, $F_f$, and $D_f$ have been relabeled in subsequent Figures to be A, E, C, B, F, and D, respectively. Block 504 receives signals A, C, and E and calculates an $FES_1$ signal as $FES_1 = (A+C-E)/(A+C+E)$, as was previously discussed with FIG. 2J with the analog versions of signals A, C, and E. Block 505 receives signals B, D, and F and calculates an $FES_2$ signal according to $FES_2 = (B+D-F)/(B+D+F)$, as was previously discussed with FIG. 2K with the analog versions of signals B, D, and F. Summer 506 calculates the differential FES signal according to $FES = FES_1 - FES_2$.

As was previously discussed, FIG. 2L shows the FES signal as a function of distance between OPU 103 and optical media 102. As previously discussed, in some embodiments further processing can be performed on TES and FES signals, for example to reduce cross-talk.

The FES signal is input to offset adder 507, which adds an FES offset from offset calibration 508. The best position on the FES curve (see FIG. 2L) around which a servo system should operate can be different for the servo system than it is for read or write operations. In other words, optimum read operations may occur around a position on the FES curve that differs from the optimum position utilized for best servo operation. FES offset calibration 508, which inputs the peak-to-peak tracking error signal TES P-P and a data jitter value and outputs an FES offset value, is further discussed below.

The output signal from offset adder 507 is input to FES Gain 509. The gain of FES gain 509 is determined by FES gain calibration 510. The gain of FES gain 509 is such that the output value of gain 509 corresponds to particular amounts of focus displacement at focus actuator 206. Fixing the correlation of the magnitude of the output signal from gain 509 with particular physical displacements of OPU 103 allows the setting of thresholds that determine whether or not focus loop 501 is sufficiently closed to transfer data. Although discussed further below, FES gain calibration 510 can determine an appropriate value of the gain for FES gain 509 by varying the distance between OPU 103 and optical media 102 and monitoring the peak-to-peak value of the resulting FES signal. In some embodiments, the gain of FES gain 509 can be fixed.

As a result of the calibrated gain of FES gain 509, the FES signal output from FES gain 509 can have a set peak-to-peak value. Between the peaks of the amplified FES signal from FES gain 509 is a near linear region of operation. Focus servo algorithm 501 operates in this region unless a shock sufficient to knock focus out of the linear region is experienced. It is beneficial if, between separate drives and between different optical media 102 on drive 100, along with any differences in detectors and actuator response between drives, that the FES output from FES gain 509 be normalized. This allows for threshold values independent of particular drive or particular optical media to be set based on the amplified FES to determine ability to read or write to optical media 102. In some embodiments, for example, the peak-to-peak motion of OPU 103 relative to optical media 102 may correspond to about a 10 μm movement.

However, although the amplified FES output from FES gain 509 can be normalized to a particular peak-to-peak value corresponding to particular displacements of OPU 103 relative to optical media 102, the amplified FES output can be non-linear between those peaks. FES inverse non-linearity 511 operates to remove the potentially destabilizing effects of non-linearity of the amplified FES. In some embodiments, calibration 512 may create a table of gains related to the slope of the FES as a function of the FES offset value. In that case, if a shock occurs and the servo is on a different offset value of the FES curve, then FES inverse non-linearity 511 can obtain a linearizing gain value from the table of gains. In that fashion, FES inverse non-linearity 511 can help quickly react to a shock to recover focus. In some embodiments, the FES curve can be recorded and the gain of FES non-linearity 511 can be set according to the recorded FES curve. In either case, the gain setting of inverse non-linearity 511 is set depending on the FES offset voltage, which determines the point on the FES curve about which servo system 501 is operating.

The output signal from FES inverse non-linearity 511 is input to coupling summer 513. An estimate of the optical cross-coupling with a corresponding TES signal is subtracted from the FES at summer 513. The estimated correction is determined by Tes-to-Fes Cross-Coupling Gain 514. TES-to-FES cross-coupling gain 514 may, in some embodiments, determine the amount of TES to subtract in summer 513 from a ratio produced by TES-to-FES Cross Talk Gain Calibration 579. As discussed further below, calibration 579 can insert a small test component (e.g., a sine wave) to the tracking control effort signal and measure the effects on the FES signal at the input of summer 513 in order to determine the ratio used in cross-coupling gain 514.

Therefore, a certain percentage of the TES signal is subtracted from the FES signal in summer 513. In some embodiments, the particular percentage (indicated by the gain of gain block 514) can be fixed. In some embodiments, a TES-to-FES cross-talk gain calibration 579 determines the gain of gain block 514. Cross-talk gain calibration 579 is further discussed below. In some embodiments, the gain of gain block 514 can be changed depending upon the type of media, e.g. writeable or premastered, that OPU 103 is currently over.

The output signal from cross-talk summer 513 is input to FES sample integrity test 515. Sharp peaks may occur in the FES signal as a result of many factors, including defects in optical media 102, dust, and mechanical shocks. These signals occur as a dramatic change from the typical FES signal that has been observed at integrity test 515. In some embodiments, signals of this type may be on the order of 10 to 500 microseconds in duration. In many instances, the resulting FES signal may indicate an apparent acceleration of actuator arm 104 that is physically impossible. It would be detrimental to overall operation of drive 100 for focus servo algorithm 501 to respond to such sporadic inputs since, if there is a response by focus servo algorithm 501, recovery to normal operation may take a considerable amount of time. Therefore, integrity test 515 attempts to detect such signals in the FES signal and cause focus servo algorithm 501 to ignore it by filtering the signal out.

Integrity test 515 inputs a defect signal, which can be the defect signal output from disturbance detector 440 shown in FIG. 4. Essentially, upon receiving a defect signal, integrity test 515 creates a low-pass filtered version of the FES signal to substitute for the defective FES signal. In some embodiments, a defect flag can be set each time this occurs so that error recovery can be initiated if too many defects, resulting in filtered FES signals, are experienced. Use of the low-pass filtered FES signal over a long period of time can cause phase-margin problems in focus servo algorithm 501, which can affect the stability of drive 100.

In some embodiments, sample integrity test 515 may low-pass filter FES signal at its input and subtract the filtered FES signal from the received input FES signal. If a peak in the difference signal exceeds a threshold value, then the low-pass filtered FES signal is output from integrity test 515 instead of the input FES signal and a defect flag is set or a defect counter is incremented. The occurrence of too many defects in too short a time can be communicated to an error recovery algorithm. See the System Architecture Disclosures.

In some embodiments, the change in the FES signal between adjacent cycles can be monitored. If the change, measured by the difference between the FES signal in the current cycle and the previous cycle, is greater than a threshold value, then the low-pass filtered FES signal is output from integrity test 515 instead of the input FES signal and a defect flag can be set and the defect counter incremented.

In some embodiments, FES sample integrity test 515 may be disabled. Disabling FES sample integrity test 515, in some embodiments, may occur during focus acquisition so that focus servo algorithm 501 can better respond to transient effects. In some embodiments, FES sample integrity test 515 may be disabled during multi-track seek algorithm 557 and during one-track jump algorithm 559. In some embodiments, FES sample integrity test 515 may be disabled while track following during a read to write transition.

The output signal from FES sample integrity test 515 is input to TES OK detector 517. If a low pass filtered (e.g., 200 Hz $2^{nd}$ order low pass) version of the absolute value of the FES signal FES' output from integrity test 515 exceeds a TES OK threshold value, then a tracking error signal TES can not be trusted. In reality, if the FES signal deviates significantly from its best focus value, then the TES signal can become small. A small TES signal indicates to tracking servo algorithm 502 that tracking is good, which is not the case. Instead, focus has deviated so that tracking is no longer reliable. Under these conditions, an error recovery algorithm can be initiated. See the System Architecture Disclosures.

In some embodiments of the invention, the FES signal FES' is input to seek notch filter 590. Seek notch filter 590 is adjusted to filter out signals at the track crossing frequency when a multi-track seek operation is being performed. Even though there is a TES-FES cross-coupling correction at summer 513, not all of the TES signal will be filtered out of the FES signal, especially during a multi-track seek operation. Therefore, notch filter 590 can be enabled during a multi-track seek operation in order to help filter more of the TES-FES cross coupling from the FES signal. When not enabled, notch filter 590 does not filter and the output signal from filter 590 matches the input signal to filter 590.

The FES signal output from notch filter 590 can be input to low frequency integrator 516. The low frequency integrator provides further gain at low frequencies as opposed to high frequencies. Since the responses to which focus actuator 206 should respond, as discussed above, occur at low frequencies, there is a large incentive in focus servo loop 501 to increase the gain at low frequencies and place emphasis on the servo response at those frequencies. In order to further emphasis the low frequencies, in some embodiments low frequency integrator 516 can be a $2^{nd}$ Order low frequency integrator. Integrator 516 provides additional error rejection capability for low frequency disturbances such as DC bias, external shock and vibration. An example transfer function for low frequency integrator 516 is shown in FIG. 5C. Low frequency integrator 516, for example, can be particularly sensitive to frequencies less than about 100 Hz in order to boost servo response to frequencies less than 100 Hz.

The output signal from integrator 516 is input to phase lead 518. Phase lead 518 provides phase margin or damping to the system for improved stability and transient response. In some embodiments, for example, phase lead 518 can be sensitive to frequencies greater than about 500 Hz. Again, in some embodiments of the invention, phase lead 518 can be a second order phase lead. Further, in some embodiments integrator 516 can be disabled during focus acquisition in order to allow focus servo system algorithm 501 to better respond to transient effects during a focus acquisition procedure. An example transfer function for phase lead 518 is shown in FIG. 5D.

In some embodiments, low frequency integrator 516 and phase lead compensation 518 are accomplished with second order filters instead of first order filters. A second order low frequency integrator provides more low frequency gain, providing better error rejection, than a first order integrator. Additionally, a second order phase lead compensator provides increased phase advance or phase margin at the servo open loop bandwidth than that of a first order phase lead compensator. The second order phase lead compensator also causes less high frequency amplification than that of a first order phase lead for the same amount of phase advance at the crossover.

The output signal from phase lead 518 can be input to a notch filter 519. Notch filter 519 filters out signals at frequencies that, if acted upon by focus servo algorithm 501, would excite mechanical resonances in drive 100, for example in actuator arm 104. In general, notch filter 519 can include any number of filters to remove particular frequencies from the FES signal output from phase lead 518. In some embodiments, notch filter 519 filters out any signal that can excite a mechanical resonance of actuator arm 104 that occurs at around 6 KHz in some embodiments of actuator arm 104.

The output signal from notch filter 519 is input to summer 521. Summer 521 further receives a signal from focus close 535. Focus close 535, during operation, provides a bias control effort to servo loop 501. In some embodiments, focus close 535 provides a focus acquire signal that is summed with the output signal from notch filter 519. In some embodiments, the focus acquire signal operates through focus actuator 206 to first move OPU 103 away from optical disk 102 and then to move OPU 103 back towards optical disk 102 until an FES signal is acquired, after which the focus acquire signal is held constant. When the focus acquire signal is held constant at the bias control effort, servo algorithm 501 operates with the FES signal measured from the A, C, E, B, D, and F values and is therefore a closed loop (with a variation in the FES signal resulting in a corresponding correction in the focus control that is applied to focus actuator 206).

The output signal from summer 521, then, is input to loop gain 522. Loop gain 522 applies a gain designed to set the open-loop bandwidth of servo algorithm 501 to be a particular amount. For example, in some embodiments the open-loop bandwidth is set at about 1.5 kHz, which means that the open loop frequency response of the entire servo loop (including OPU positioner 104, signal processing, and algorithm 501) is 0 dB at 1.5 kHz. Although focus loop gain calibration 522 is further discussed below., in essence a sine wave generated in sine wave generator 528 is input to summer 523, resulting in a modulation of focus control which translates into a modulation of the measured FES signal. The resulting response in the signal from summer 521 is monitored by discrete Fourier transform (DFT) 527, and DFT 525 in combination with gain calibration 526 in order to set the gain of loop gain amplifier 524. In some embodiments where the transfer function at 1.5 kHz should be unity, the sine wave generator provides a 1.5 kHz sine wave function to summer 523 and gain calibration 526 set the gain of loop gain 524 so that the overall gain of the 1.5 kHz component of the signal output from summer 521 is equal to the overall gain of the 1.5 KHz component of the signal output from summer 523.

The output signal from loop gain 524 is input to multiplexer 531, along with a lowpass filtered version formed in filter 529 and a signal from sample and hold (S/H) 530. During normal operation, multiplexer 531 is set to output the output signal from loop gain 524. Although much of the optical cross-talk is canceled from the control effort signal at summer 513, there is still enough cross talk so that, while OPU 103 is crossing tracks on optical media 102, a track crossing component of the control effort will appear in the output signal of loop gain 524. In some embodiments, seek operations are accomplished at fairly high rates, resulting in a track crossing signal of the order of a few kHz. Therefore, during a seek operation a low-pass filtered version of the output signal from loop gain 524 can be substituted for the signal from loop gain 524. In some embodiments, the output signal from a sample and hold (S/H) 530 circuit can be substituted for the signal from loop gain 524 by multiplexer 531. The effects of changing FES as OPU 103 passes over multiple tracks can then be prevented from translating into a corresponding movement of OPU 103.

In a one-track jump operation, there is a similar concern about effects on the FES signal from crossing tracks (i.e., TES-FES crosstalk). In some embodiments, in a one-track jump, the output signal from sample and hold (S/H) 530 is output from multiplexer 531. Sample and hold (S/H) 530 holds the output signal to match that of previous output signals so that the resulting control effort is simply held constant through the one-track jump operation.

The output signal from multiplexer 531 is input to summer 533. The output signal from summer 533 is, then, the control effort signal that is input to focus DAC 464 (FIG. 4) from DSP 416 and then to power driver 340 to result in a current being applied to focus actuator 206 to provide focus. In summer 533, the output signal from multiplexer 531 is summed with an output signal from feed-forward loop 532. Feed-forward loop 532 inputs the output signal from multiplexer 531 and attempts to predict any regularly occurring motion of OPU 103 relative to optical media 102. These motions occur, for example, because optical media 102 is not flat and the surface of optical media 102 will vary in a regular way as optical media 102 is spun. As a result, left alone, there will be a FES generated having the same harmonic as the rotational rate of optical media 102. Feed-forward loop 532 provides these harmonics to summer 533 so that the control effort includes these regular harmonics. In that case, the FES signal calculated from signals A, C, E, B, F, D will not include these regular harmonics. In some embodiments, feed-forward loop 532 responds to multiple harmonics of any such regular motion of OPU 103 so that none of the harmonics are included in the calculated FES signal.

In order to determine if the focus is OK, a sum of all of the detector signals A, C, E, B, D and F is calculated in summer 534 and the resultant sum is input to Focus OK block 536. Focus OK block 536 compares the overall sum with a focus threshold value generated by FES Gain calibration 510 and, if the sum is greater than the focus threshold, indicates a focus OK condition. If, however, the sum is less than the focus threshold, then a focus open signal is generated by focus OK block 536. In some embodiments, focus OK block 536 may indicate an open focus condition only after the sum signal has dropped below the focus threshold for a certain period of time. This will prevent a defect situation (e.g., a dust particle) from causing servo algorithm 501 to lose (i.e., open) focus.

The output signal from summer 534 is also input to defect detector 591. Defect detector 591 monitors a high-pass filtered sum signal to identify the presence of media defects. In some embodiments, if the high-pass filtered sum signal exceeds a threshold value then the presence of a defect is indicated. In some embodiments, defect detector 591 can determine whether or not changes in the sum signal from summer 534 are the result of changes in laser power (for example in transitions from read to write or write to read or in spiraling over previously written data) as media defects. In some embodiments, defect detector 591 will "time-out" if the defect appears to remain present for a long period of time, which under that condition may indicate other than a media defect.

In some embodiments, defect detector 591 detects defects by detecting sudden changes in the sum signal. A change in laser power can result in a sudden changes in the sum signal which can be falsely identified as a defect. In some embodiments, a laser servo controller can inform defect detector 591 of changes in laser power. Once defect detector 591 is notified of a change, then defect detector can delay for a time period (for example about 5 ms) to allow the sum signal and transients from a sum signal low pass filter in defect detector 591 to settle before proceeding to detect detects. Notification of defect detector 591 before a laser power change can reduce the risk of falsely identifying a defect. In some embodiments, defect detector 591, which can be executed on DSP 416, can monitor the focus sum threshold value, which can be changed in by microprocessor 432 when laser power is changed. Defect detector 591 can then by notified of changes in laser power by the change in focus sum threshold value.

Additionally, the sum signal can change when crossing media types (e.g., from premastered to writeable or from writeable to premastered). In some embodiments, multi-track seek algorithm 557 knows when a boundary crossing will occur. In some embodiments, multi-track seek algorithm 557 can inform defect detector 591 when a boundary is crossed so that a false defect detection at a boundary crossing does not occur. In some embodiments, the defect threshold value, the threshold value against which the sum signal is compared to detect defects, can be set large enough to not respond to changes in reflectivity associated with a media type boundary change. However, if the defect threshold value is set too high defects may not be detected.

Sliding Notch Filter 595 can reduce the effects of optical cross-talk (TES into FES) during multi-track seek operations. Multi-track seek controller 557 can be a velocity controlled servo controller. Sliding notch filter 595 can track the seek reference velocity of multi-track seek controller 557. For example, the maximum reference velocity could be 10 kHz and the minimum reference velocity could be 2 kHz. Sliding notch filter 595 can vary it's center frequency from 10 kHz to 2 kHz as a function of the seek reference velocity multi-track seek controller 557.

Tracking servo algorithm 502, in many respects, is similar in operation to focus servo algorithm 501. In some embodiments, tracking servo algorithm 502, when closed, inputs detector signals A, C, B, and D and calculates a tracking error signal TES from which a tracking control effort is determined. In some embodiments a coarse tracking control effort, which is output from loop gain calibration 562, and a coarse tracking control effort, which is output from feed-forward control 585, can be output.

Detector signals A and C are input to block 538, which calculates a tracking error signals $TES_1$ according to $$TES_1 = (A-C)/(A+C),$$

such as is described with FIG. 2P. Detector signals B and D are input to block 539, which calculates $TES_2$ according to $$TES_2 = (B-D)/(B+D),$$

such as described with FIG. 2Q. The difference between $TES_1$ and $TES_2$ is calculated in summer 540 to form a TES input signal, as is described with FIG. 2R. The TES input signal responds to variation in the tracking motion of OPU 103 (as controlled by tracking actuator 201) as discussed above with the analog versions of signals A, C, E, B, D, and F, for example, with FIGS. 2M through 2R. In some embodiments, further processing of the TES signal may be performed, for example to reduce cross-talk.

The TES signal output from summer 540 is input to summer 541, where it is summed with an offset value. The offset value is determined by TES offset calibration 542. The output signal from offset summer 541 is input to TES gain 543, which calibrates the peak-to-peak value of the TES signal in accordance with a TES gain calibration algorithm 544. As discussed above, the TES signal as a function of tracking position is a sine wave. As discussed below, in some embodiments the TES offset value can be determined to be the center point between the maximum and minimum peaks of the TES sine wave. Additionally, in some embodiments the TES offset value can be affected by a determination of the optimum value of the TES offset value for data reads or writes and may vary for differing tracking positions across optical media 102. In some embodiments, the TES gain calibration is set so that the peak-to-peak value of the resulting TES signal output from TES gain is at a preset peak-to-peak value. The preset peak-to-peak value is selected to provide the best dynamic range over the range of tracking motion of OPU 103.

Information regarding the peak-to-peak value of the TES signal as a function of position on optical media 102 can be determined in TES P-P 545. In an open tracking situation, the TES signal varies through its range of motions as tracks are crossed by OPU 103. TES P-P 545, in some embodiments, records the highest and lowest values of the TES signal as the peak-to-peak values. In some embodiments, an average of the highest and lowest values of the TES signal is recorded as the peak-to-peak values. The peak-to-peak values can be input to Offset calibration 542 which calculates the center point and gain calibration 544, which calculates the gain required to adjust the peak-to-peak values to the preset value.

The TES signal output from offset 541 is input to TES gain 543. TES gain 543 can, in some embodiments, be calibrated by TES offset calibration 542. Calibration algorithms, such as TES offset calibration 542, are further described below.

The TES signal output from TES gain 543 is input to TES inverse non-linearity 546. TES inverse non-linearity 546 operates to linearize the TES signal around the operating point determined by the TES offset, as was discussed above with respect to FES inverse non-linearity 511. Calibration 547 can calculate the gain of TES non-linearity 546 for various values of TES offset to linearize the TES signal as a function of position about the operating point.

The output signal from TES inverse non-linearity 546 is input to TES sample integrity test 548. TES sample integrity test 548 operates with the TES signal in much the same fashion as FES sample integrity test 515 operates with the FES signal, which is discussed above. In some embodiments, TES sample integrity test 548 can be enabled with an enablement signal. When TES sample integrity test 548 is not enabled, then the output signal from TES sample integrity test 548 is the same as the input signal to TES sample integrity test 548.

The input signal to TES sample integrity test 548 and the input signal to FES sample integrity test 515 and a defect signal produced by defect detector 591 are input to write abort algorithm 537, which determines whether, in a write operation, the write should be aborted. If it appears from FES or TES that TES or FES is too large (i.e., one of TES and FES has exceeded a threshold limit), then write abort 537 aborts a write operation to the optical media 102 by providing an abort write flag. However, if TES or FES exceeds the threshold limits and defect detector 591 indicates a defect, the write is not aborted. In some embodiments, low pass filtered FES and TES values are utilized to determine whether FES or TES are too large. Low pass filtered FES and TES values can essentially include the DC components of the FES and TES signals. A programmable number N, for example 2, consecutive samples with TES or FES above limits and a defect indicated are allowed before write abort 537 aborts a write operation. Aborting the write can prevent damage to optical media 102 due to the high power of laser 218, which crystallizes the amorphous material on the writeable portion of optical media 102. Further, damage to adjacent track data can also be prevented.

The output signal from TES sample integrity test, TES', is, in a closed tracking situation, input to low frequency integrator 549 and then to phase lead 550. Low frequency integrator 549 and phase lead 550 operate similarly to low frequency integrator 516 and phase lead 518 of focus servo algorithm 501. Again, in order to provide better response to low frequency portions of TES, low frequency integrator 516 and phase lead 518 can be second order filters. As discussed previously, a second order low frequency integrator provides more low frequency gain, providing better error rejection, than a first order integrator. Additionally, a second order phase lead compensator provides increased phase advance or phase margin at the servo open loop bandwidth than that of a first order phase lead compensator. The second order phase lead compensator also causes less high frequency amplification than that of a first order phase lead for the same amount of phase advance at the crossover.

The output signal from phase lead 550 is input to notch filter 551. Notch filter 551 can be calibrated by notch calibration 552. Again, notch filter 551 prevents control efforts having frequencies that excite mechanical resonances in actuator arm 104. These mechanical resonances can be well known in nature (depending on the structure of actuator arm 104) but may vary slightly between different drives. The output signal from notch filter 551 can be input to a second notch filter 553 in order that fixed and known resonances can be filtered. Notch filter 551 and notch filter 553 can each include multiple notch filters.

In some embodiments, the output signal from notch filter 553 is input to a retro-rocket loop gain amplifier 830. Retro rocket 830 provides additional gain to tracking servo loop 501 after execution of a multi-track seek operation in order to more aggressively close tracking on a target track. Retro rocket 830 is enabled by multi-track seek controller 557.

In a closed-tracking mode, switch 556 is closed and the output signal from notch filter 553 is input to multiplexer 558. Again, in a closed tracking mode, multiplexer 558 provides the output signal from notch filter 553 to loop gain calibration 562. As discussed above with respect to focus loop gain calibration 522, loop gain calibration 562 arranges that the frequency response at a selected frequency is 0 dB. To do that, a sine wave generated in generator 568 is added to the control effort in summer 563 and the response in input signal to gain calibration 562 is monitored. The input signal is provided through Discrete Fourier Transform (DFT) 567 to gain calibration 566, along with the output signal from summer 563 processed through DFT 565. Gain calculation 566, then, sets the gain of loop gain 564 so that the open loop gain has 0 dB of attenuation at that frequency. The bandwidth set by loop gain calibration 562 may differ from the bandwidth set by focus loop gain calibration 522.

Switch 556 is closed by close tracking algorithm 555. When tracking is open, the TES signal is a sine wave as tracks pass below OPU 103. The period of the sine wave represents the time between track crossings. Tracking can be closed near, for example, the positive sloping zero-crossing of the TES versus position curve (see FIG. 2R). If a track closing is attempted at a zero-crossing with the improper slope, tracking servo algorithm 502 will operate to push OPU 103 into a position at the zero-crossing with the proper slope.

In some embodiments, TZC detector 554 receives the TES' signal from TES sample integrity test 548 and determines the track zero-crossings TZC and the TZC period, which indicates how fast tracks are crossing under OPU 103. In some embodiments, TZC can be input from tracking crossing detector 454 and that TZC value can be utilized to compute the TZC period. If the track crossings are at too high a frequency, then tracking algorithm 502 may be unable to acquire tracking on a track. However, in another part of the rotation of optical media 102 the track crossing frequency will become lower, providing an opportunity to acquire tracking. In some embodiments, close tracking algorithm 555 can reduce the angular speed of spin motor 101 if the track crossing frequency is too high.

Therefore, when close tracking algorithm 555 is commanded to close tracking, close tracking algorithm 555 monitors the TZC period and, when the TZC period gets high enough (i.e., the frequency of track crossings gets low enough), tracking algorithm 555 closes switch 556 to close tracking servo loop algorithm 502 to operate closed loop on a track. However, there can be large transients when switch 556 is closed because OPU 103 can have some initial velocity with respect to the track when switch 556 is closed. Therefore, the lower the frequency of crossing (indicating a lower speed of OPU 103 with respect to the tracks), the lower the transients caused by closing switch 556. Prior and during closing of switch 556, the low frequency integrator 549 is disabled by a enable signal from close tracking algorithm 555.

In some embodiments, the output signal from loop gain 564 provides a fine control effort. In some embodiments, tracking DAC 468 (FIG. 4) is an 8-bit digital-to-analog converter. Tracking actuator 201, however, needs to move OPU 103 from the inner diameter (ID) of optical media 102 to the outer diameter (OD) of optical media 102. Therefore, although actuator arm 104 must move OPU 103 from ID to OD, while tracking is closed small motions of OPU 103 around the tracking position are required. For example, in some embodiments when tracking is closed OPU 103 moves in the range of approximately ±70 nm around a central position. Further, in some embodiments a full stroke from ID to OD is approximately ¼ inch to a ½ inch. In addition to the large dynamic range required to move OPU 103 from ID to OD on optical media 102, there is also a spring force in the mounting of spindle 203 of actuator arm 104 to overcome.

Therefore, in some embodiments of the invention a second DAC converter can be utilized as a coarse actuator control while the control effort from loop gain 564 can be utilized as a fine actuator control. The tracking control effort signal output from loop gain 564, then, is input to tracking DAC 468 (FIG. 4). Tracking DAC 468 can have any number of bits of accuracy, but in some embodiments includes an 8-bit digital to analog converter.

In some embodiments, a coarse tracking control effort is generated by bias feed-forward control 585. The coarse tracking control effort generated by bias feed-forward control 585 can be the low-frequency component of the tracking control effort produced by loop gain 564. The coarse tracking control effort, then, can be communicated to microprocessor 432, which can then transfer the coarse control effort to power driver 340 (FIG. 3A) through serial interface 458. A second digital-to-analog converter in power driver 340, in some embodiments having an accuracy of 14 bits, receives the coarse control effort from microprocessor 432 through serial interface 458. In power drive 340, the analog course control effort is then summed with the analog fine control effort from DAC 468 to provide the whole tracking control current to tracking actuator 201. Therefore, microprocessor 432 can determine the low frequency component of the tracking control effort in order to bias tracking actuator 201 while DSP 416, executing tracking servo algorithm 502, determines the fine tracking control effort to hold OPU 103 on track.

In some embodiments, the output signal from loop gain 564 is input to anti-skate algorithm 593. Anti-skate algorithm 593 receives a direction signal from direction detector 592 and an anti-skate enable signal from tracking skate detector 561. Anti-skate algorithm 593, when enabled, determines which TES slope is stable and which is unstable. The stable slope will be different for the two opposite directions of motion of OPU 103 relative to optical media 102. For example, if a positive sloping TES signal is stable when OPU 103 is traveling from the inner diameter (ID) to the outer diameter (OD), the negative sloping TES signal is stable when OPU 103 is traveling from the OD to the ID. Anti-skate algorithm 593, then, prevents tracking control loop 502 from closing on an unstable slope, which can prevent further skating from attempting to close on the unstable slope. During periods when the tracking error signal indicates an unstable slope, a substitute tracking control effort can be substituted for the tracking control effort received from tracking servo system 502. Anti-skate algorithm 593 allows tracking control algorithm 502 to more easily close onto a track once a significant disturbance has caused the tracking servo to slide across several tracks (i.e. skate).

Bias control 585 receives the control effort signal from loop gain 564 through anti-skate algorithm 502. Low pass filter 569, which can be a 200 Hz second order filter, receives the tracking control effort and passes only the low frequency component. The sign of the signal output from low pass filter 569 is detected in sign 570. The sign adds a set amount (for example +1, 0, or −1) to a track and hold circuit that includes summer 574 and feedback delay 575. With 0 inputs to summer 574, the output signal from summer 574 will be the last output signal received, as is stored in delay 575. Sign 570, then, determines whether to increase the bias value of the coarse control effort or decrease the bias value of the coarse control effort. Since the decision to increase or decrease the coarse control effort occurs only during an interrupt cycle of microprocessor 432, and since a single increment or decrement is made per cycle, the course control effort resulting from bias forward control 585 varies very slowly (for example, one increment every 2 ms).

In operations, bias control 585 essentially removes the low frequency component of the fine tracking control effort output from loop gain 564 by transferring the low frequency control effort to coarse control effort output from bias control 585. A constant control effort appearing on the fine tracking control effort, for example, will eventually be totally transferred to the coarse tracking control effort output from bias control 585. However, if the interaction between the fine tracking control effort and the coarse tracking control effort is too fast, there can be stability problems. Therefore, there is incentive to make bias control 585 respond slowly to changes in the low frequency component of the tracking control effort output from loop gain 564. The incrementing or decrementing of the coarse control effort output from bias control 585 occurs during the regular interrupt time (Ts) for operating microprocessor 432, which can in some embodiments be about 2 milliseconds.

In a closed tracking mode, the coarse control effort signal output from summer 578 changes very slowly. However, during seek operations there is a need to change the coarse control effort signal much more quickly. Therefore, during seek operations, the output signal from low pass filter 569 is further filtered through low pass filter 571. A portion (indicated by K multiplier in block 576) is added in summer 574 to the coarse control effort and to summer 578, whose output is the coarse control effort. Therefore, during seek operations the coarse control effort output from bias control 585 can change quickly. Low pass filter 571 allows frequencies low enough (e.g., less than about 20 Hz) to allow the seek control effort to increase the coarse control effort faster than the incremental changes allowed by switch 573 but is of low enough frequency that other disturbances do not affect the coarse control effort output by summer 578.

Additionally, the output signal from low pass filter 569 is input to off-disk detection algorithm 572, which monitors very low frequency components. Since very low frequency components of the TES are amplified a great deal through integrator 549 and phase lead 550, an essentially DC component of TES will have a large gain and, therefore, will be a large component of the tracking control effort output from loop gain 564. This low frequency component is not filtered by low-pass filter 569 and, therefore, is input to off-disk detection algorithm 572. If a large DC signal is observed over a period of time, off-disk detection algorithm 572 concludes that OPU 103 is outside of the operational range of optical media 102 and provides an error message to microprocessor 432. Microprocessor 432, as described in the System Architecture disclosures, then takes the appropriate error recovery steps.

In some embodiments, a calibrated tracking feed-forward control 579 can also be included. Feed-forward control 579 can determine any regular variations in the tracking control effort produced by loop gain 564 and insert a corresponding harmonic effort into the tracking control effort in order to anticipate the required motion of OPU 103. Those harmonics, then, would be subtracted from the TES.

When close tracking algorithm 555 closes tracking, in some embodiments integrator 549 and sample integrity test 548 may be disabled when switch 556 is first closed. This will increase the damping, at the cost of reduced low frequency gain, in tracking servo loop algorithm 502. Once switch 556 is closed, close tracking algorithm 555 may wait some time for any transient effects to decay before enabling integrator 549 and then enabling sample integrity test 548. In other words, before the low frequency components of TES are boosted by integrator 549, servo loop algorithm 502 and actuator arm 104 have settled close to the desired tracking position.

The TES' signal from sample integrity test 548 can also be input to multi-track seek controller 557, one track jump control 559, and tracking skate detector 561. Multi-track seek controller 557, in a multi-track seek operation, supplies a control effort to multiplexer 558 which, when selected, causes actuator arm 104 to move OPU 103 near to a target track on optical media 102. After OPU 103 is at or near the target track, then close tracking algorithm 555 can be activated to close tracking at or near the target track. One track jump algorithm 559, which can be calibrated by a calibration algorithm 560, outputs a control effort signal to multiplexer 558 which, when selected, moves OPU 103 by one track. In some embodiments, a large motion of OPU 103 can be undertaken by multi-track seek controller 557 and then one track jump control 559 can operate to move OPU 103 closer to the target track before tracking is closed by close tracking algorithm 555. Tracking skate detector 561 monitors FES' and indicates when tracking has been opened. If tracking skate detector 561 indicates an open tracking condition, then tracking may need to be reacquired. Furthermore, tracking skate detector 561 enables anti-skate algorithm 593. A signal can be sent to microprocessor 432 so that microprocessor 432 can execute error recovery algorithms, which in this case may involve reacquiring tracking long enough to determine the position of OPU 103 and then performing a seek operation to move OPU 103 to the selected track and reacquiring tracking at the selected track. See the System Architecture Disclosures.

FIGS. 5E and 5F show an embodiment of tracking skate detector 561. As shown in FIGS. 5E and 5B, tracking skate detector 561 receives the TES' signal from TES sample integrity test 548. As shown in FIG. 5F, as OPU 103 moves across tracks the TES' signal shows a sinusoidal signal. The absolute value of the TES' signal is calculated in block 594. The output signal from absolute value block 594 is then input to low pass filter 595. In effect, low pass filter 595 can act as an integrator. The output signal from low pass filter 595 is input to compare block 598 where it is compared with an anti-skate threshold. The output signal from compare block 598 is input to threshold counter 599. If the output signal from low pass filter 595 exceeds the anti-skate threshold more than a maximum number of clock cycles, then counter 599 sets the enable anti-skate flag, enabling anti-skate algorithm 593.

The output signal from low pass filter 595 is also input to compare block 596. Compare block 596 compares the output signal from low pass filter 595 with a skate threshold, which is typically larger than the anti-skate threshold. The output signal from compare block 596 is input to counter 597. If the skate threshold is exceeded for a maximum number of cycles, then counter 597 outputs a skate detected flag. The skate detected flag can then indicate that tracking is open.

FIG. 5G shows an embodiment of direction sensor 592. Direction sensor 592 determines the direction that optical pick-up unit 103 is traveling radially across the surface of optical pick-up unit 103. Summer 5001 sums the optical signals from outside elements of detectors 225 and 226 (FIG. 2D), elements 231, 233, 234 and 236, to form a direction sum signal. In some elements, more or less than two detectors are including in optical pick-up unit 103. The direction sum signal from summer 5001 includes both DC and AC components. The DC component of the direction sum signal represents the laser intensity of laser 218. The AC component of the direction sum signal is dominated by a quadrature signal, which looks similar to TES when crossing tracks except that it is 90 degrees out of phase with the TES. In some embodiments, for example, the direction sum signal can be 90 degrees phase advanced when traveling from the inner diameter (ID) to the outer diameter (OD) of optical media 102 (FIG. 1B) and 90 degrees phase lagged when traveling from OD to ID of optical media 102.

The direction sum signal is input to sample and hold 5002 while the TES, for example from the output signal from summer 541, is input to sample and hold 5003. Media defects on optical media 102 can cause erroneous direction sum signals and TES signals, therefore the Sample and Hold S/H functions 5002 and 5003 hold the high pass filter input signals constant during the presence of a media defect, indicated by the defect signal from defect detector 591.

The output signals from sample and holds 5002 and 5003 are input to high pass filters 5004 and 5005, respectively. The disk reflectivity of optical media 102 varies as a function of disk angular orientation resulting in an undesirable AC signal at the first harmonic of the rotation frequency of optical media 102. The High Pass filter cutoff frequency of filters 5004 and 5005, then, can attenuate the first harmonic reflectivity variation signal. The output signal from High Pass filter 5004, SumHp, is an AC signal representing the quadrature component from the sum signal. Block 5006 converts the analog SumHp signal into a digital logic signal SumHpD, depending on whether SumHp is greater than or less than zero. High Pass Filter 5004 introduced a phase shift into the resulting SumHpD. High Pass Filter 5005 introduces the same phase shift into the TES in order to form a TESHpD signal, which then has a matching phase shift. Similarly, block 5007 converts the TESHpD signal into a logic signal by comparing the TESHpD signal with zero. Logic blocks 5007, 5008, 5009, 5010 and 5011 together perform the following logic function:

Direction'=(*TESHpD* AND $\overline{SumHpD}$) OR ($\overline{TESHpD}$ AND Sum*HpD*)

The polarity of the direction sensor changes between Mastered and Write-able media. Inverter 5012 inverts Direction' and switch 5013 outputs a direction signal from the output signal of inverter 5012 or from direction', depending on whether OPU 103 is over mastered or write-able media.

FIG. 6 shows an embodiment of a close tracking algorithm 555 (FIG. 5B). Close tracking algorithm 555 closes tracking servo algorithm 502 and therefore acquires tracking. In step 601, algorithm 555 receives a command to close tracking. The close tracking command can originate from microprocessor 432 or from another algorithm executing in DSP 416. Once the close tracking command is received, algorithm 555 proceeds to step 611

In step 611, the TES gain is set based on the peak-to-peak value of the TES signal. In some embodiments, the TES gain can be set for groove crossings or bumps. From step 611, algorithm 555 proceeds to step 602.

In step 602, algorithm 555 determines the TZC period in order to determine the track crossing speed, indicating the relative velocity between OPU 103 and the tracks on optical media 102. The track crossing speed is related to the period of track crossing parameter TZC, which can be determined from TZC detector 554 or can be calculated from TES'.

After the track crossing speed is determined in step 602, algorithm 555 checks for a time-out condition in step 603 by determining whether too much time has passed since the close tracking command was received in step 601. If too much time has passed, a microprocessor time-out flag is set and microprocessor 432 proceeds to an error recovery routine. Otherwise, algorithm 555 proceeds to step 604.

Step 604 determines if the track crossing rate is too high to close tracking. Step 604 can determine if the track crossing rate is too high, for example, by comparing the TZC period with a track close threshold. If the threshold is not exceeded, then the track crossing rate is too high and algorithm 555 returns to step 602. If the track crossing rate is low enough, then algorithm 555 continues to step 605.

In step 605, close tracking algorithm 555 closes switch 556, thereby closing the tracking servo loop. When switch 556 is first closed, integrator 549 and integrity test 548 are disabled to allow better response of the tracking servo loop while transient effects decay. Once switch 556 is closed, algorithm 555 proceeds to step 606.

In step 606, algorithm 555 delays long enough for transient effects from closing switch 556 to decay. Once a particular delay time period has elapsed, algorithm 555 proceeds to step 607 where integrator 549 is enabled. Enabling integrator 549 introduces a new set of transient effects. Therefore, once integrator 549 is enabled, algorithm 555 proceeds to step 608, which waits for another delay time. Once the second delay time has elapsed, algorithm 555 proceeds to step 609 where TES sample integrity test 548 is enabled.

Once step 609 is complete, algorithm 555 proceeds to stop 610 where a tracking closed flag can be sent to either microprocessor 432 or DSP 416, depending on where the original close tracking command originated. In some embodiments of the invention, algorithm 555 is performed as a join effort between both microprocessor 432 and DSP 416. For example, microprocessor 432 may command DSP 416 to close loop in step 601. DSP 416 receives TZC period in step 602 and checks to see if the TZC is below a TZC threshold in step 604. Meanwhile, microprocessor 432 begins a time-out clock. If DSP 416 has not closed switch 556 within the time-out period, then microprocessor 432 proceeds to error recovery. Once switch 556 is closed, DSP 416 will not proceed on this algorithm until, in step 607, microprocessor 432 tells DSP 416 to enable integrator 549. Microprocessor 432 controls the relative timing, while the DSP 416 is slaved and only responds to commands from microprocessor 432. Further, once integrator 549 is enabled in step 607, microprocessor 432 then can tell DSP 419 to enable sample integrity test 548. In some embodiments, without commands from microprocessor 432, DSP 419 will not change state.

Figures 2, 7A:
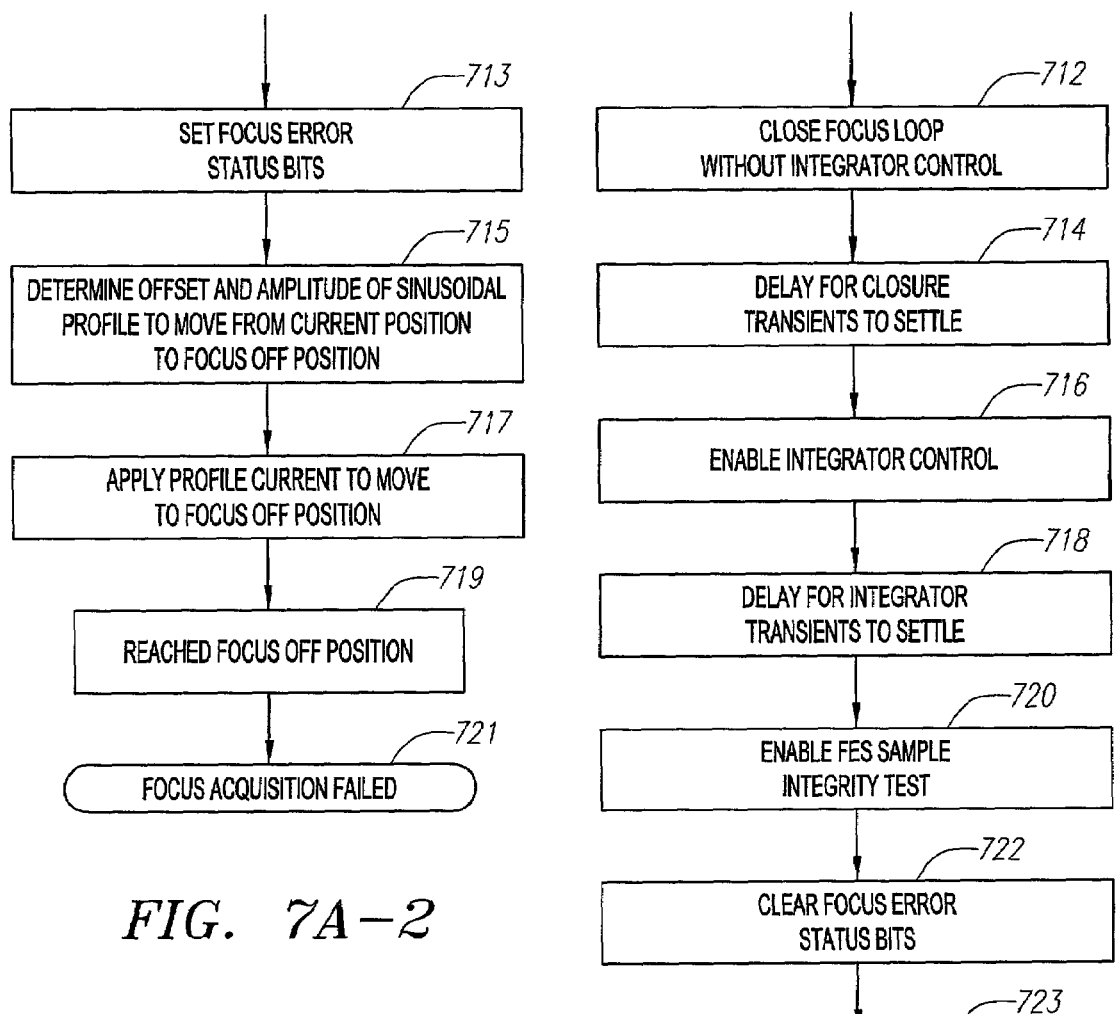

FIG. 7A shows a block diagram of an embodiment of focus close algorithm 535. Focus close algorithm 535 asserts control efforts onto the focus control effort through summer 521. In some embodiments, summer 521 may be replaced with a switch or multiplexer circuit that chooses a control effort originating from focus close algorithm 535 or from notch filter 519.

Algorithm 535, in some embodiments, starts with a control effort so that OPU 103 is positioned away from optical media 102 (i.e., the distance between OPU 103 and optical media 102 is larger than the focus distance). Algorithm 535 then generates a control effort to move OPU 103 closer to optical media 102 until the control effort is appropriate for a focus distance. Once OPU 103 is near the focus distance, then algorithm 535 holds its contribution to the control effort constant while the focus servo loop 501 generates the additional focus control effort required to maintain closed loop focus.

In step 701, a focus acquire flag is set. The focus acquire flag can be set by a routine executing in microprocessor 432 or in DSP 416. In step 703, algorithm 535 determines whether the actuator is positioned appropriately to start a focus acquisition procedure. This can be tested by setting a range of values for the current focus control effort or by comparing with a threshold value for the focus control effort. In some embodiments, the current in focus actuator 206 is zero and algorithm 535 needs to push OPU 103 away from optical media 102.

If the control effort for focus actuator 206 is not positioned appropriately, then algorithm 535 must generate a focus control effort appropriate to move OPU 103 to an acceptable starting point. In addition, algorithm 535 should provide a control effort that moves OPU 103 in such a way as to not excite mechanical resonances in actuator arm 104. For example, if a focus control effort profile is generated by algorithm 535 that simply sets the focus control effort to a value calculated to be the value at the acquisition starting position, many mechanical resonances are likely to be excited in actuator arm 104. Should mechanical resonances in actuator arm 104 become excited, there may be transient motions generated with large decay times, increasing significantly the amount of time required for focus acquisition. In some embodiments, in step 704 algorithm 535 generates a sinusoidal starting focus control effort profile which moves OPU 103 to an acquisition starting position in a smooth fashion.

Figure 7B:
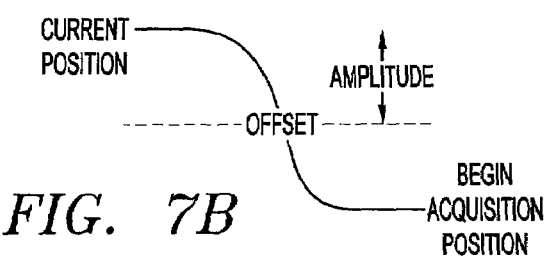

FIG. 7B shows an example of a starting focus control effort profile generated in step 704. Step 704 generates a sine wave with one peak being at the current focus control effort (indicating the current position of OPU 103 relative to optical media 102) and the opposite peak being at the acquisition starting position control effort. The starting focus control effort can be applied to focus actuator 206 in step 705 by adding the starting focus control effort into the focus control effort at summer 521. This method of positioning elements, in both the focus and the tracking directions, can be widely utilized. In other words, whenever OPU 103 needs to be positioned relative to optical media 102, a smooth control effort as described above can be generated and applied. The resulting smooth motion of OPU 103 can reduce excitations of mechanical resonances which may be obtained by application of more abrupt control efforts.

If, in step 703, OPU 103 is already at an appropriate starting acquisition position, then algorithm 535 proceeds to step 706. Additionally, after the starting control effort is applied to focus actuator 206, then algorithm 535 proceeds to step 706.

Figure 7D:
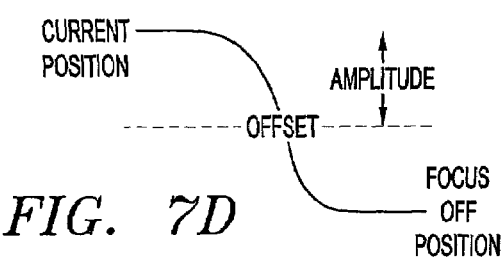
Figure 7C:
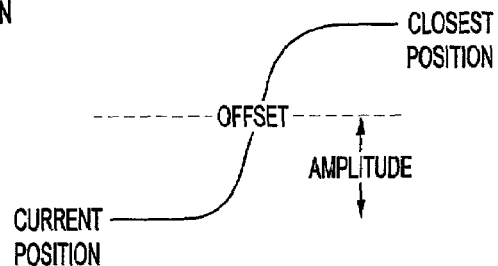

In step 706, algorithm 535 generates an acquisition control effort that moves OPU 103 from the starting acquisition position through the best focus position. Algorithm 535, in some embodiments, can provide the focus acquisition control effort required to move OPU 103 from the starting acquisition position through the best focus position. However, again if mechanical resonances are excited in actuator arm 104, it may take some time for the transient oscillations to damp out. Therefore, in some embodiments, step 706 calculates a sinusoidal focus acquisition control effort between the starting acquisition position and the control effort corresponding to a position close to optical media 102. In some embodiments, the position close to optical media 102 may be the closest position that OPU 103 can be moved toward optical media 102. Such a focus acquisition control effort profile is shown in FIG. 7C.

Once the focus acquisition control effort profile is calculated, then in step 707 DSP 416 is enabled to monitor the sum signal from summer 534, which generates the sum of all of the detector signals A, B, C, D, E, and F, and the FES signal output signal from summer 513 in order to determine when focus has been acquired. In step 708, the focus acquisition control effort according to the focus acquisition control effort profile calculated in step 706 is applied through summer 521 to the focus control effort, and therefore applied to focus actuator 206 in order to physically move OPU 103 through the best focus position.

In step 710, algorithm 535 monitors the closure criteria during the application of the focus acquisition control effort profile. If the closure criteria is not satisfied, then algorithm 535 proceeds to step 711. In step 711, algorithm 535 checks to see if the closest position has been reached. If in step 711, it is determined that OPU 103 has not yet reached the closest position, then algorithm 535 proceeds to step 708 to continue to apply the focus acquisition control effort profile as the focus control effort.

Step 710 can determine whether OPU 103 is close to the focus position, in some embodiments, by the sum signal output from summer 534. In that case, if the sum signal is above a focus sum threshold determined by FES gain calibration 510, then OPU 103 is near to the focus position. Furthermore, close to the focus position the FES signal will be near zero. Therefore, in some embodiments the closure criteria of step 710 can be that the sum signal is above a sum threshold and the FES signal is below an FES threshold.

If in step 710 algorithm 535 determines that the closure criteria is satisfied, algorithm 535 proceeds to step 712. In step 712, algorithm 535 closes the focus loop without integrator 516 being enabled. Algorithm 535 then sets the current focus control effort to the bias control effort. In that case, step 712 maintains the focus control effort from the acquisition focus control effort profile when the closed criteria was satisfied. The acquisition focus control effort is held constant by algorithm 535 when focus is closed as long as focus remains closed.

In step 714, algorithm 535 delays for transient effects to decay before turning integrator 516 on in step 716. Algorithm 535 can further delay in step 718 for transient effects to decay before enabling FES sample integrity test 515 in step 720. Once focus is closed and integrator 516 and sample integrity test 515 are enabled, a focus acquisition complete flag can be set in step 723. In some embodiments, the "begin acquisition position" of step 704 may be recalibrated and stored for future executions of algorithm 535 in step 723.

If the closure condition of step 710 is not met, algorithm 535 proceeds to closest position check step 711. If algorithm 535 determines in step 711 that OPU 103 is at a closest position to optical media 102, then algorithm 535 sets a focus error bit in step 713. In some embodiments, the closest position can be the physically closest distance that OPU 103 can be from optical media 102. In some other embodiments, however, the closest position refers to a closest allowable position that can be a predetermined value.

Once the focus error bit is set in step 713, algorithm 535 can proceed to step 715. In step 715, algorithm 535 determines a sinusoidal tracking control effort profile that moves OPU 103 away from optical media 102 to a focus off position. As before, the sinusoidal tracking control effort can be determined, as is shown in FIG. 7D, by fitting a half sine wave between the closest position and the focus off position. A focus control effort according to the sinusoidal tracking control effort is applied to focus actuator 206 in step 717. Once OPU 103 has reached the focus off position in step 719, then algorithm 535 exits in a failed condition in step 721. If focus acquisition fails, then error recovery routines can be initiated as is described in the System Architecture disclosures. In some embodiments, the error recovery routines can attempt to execute focus close algorithm 535 multiple times or change the "Begin Acquisition Position" in step 704 of algorithm 535 shown in FIG. 7A.

FIGS. 8A and 8B illustrate an embodiment of multi-track seek algorithm 557. FIG. 8A shows a block diagram of an embodiment of multi-track seek algorithm 557 while FIG. 8B shows signals as a function of time for performing a multi-track seek function according to the present invention.

FIG. 8B shows the TES, tracking control effort, FES, and focus control effort signals during a multi-track seek operation performed by algorithm 557. During time period 821, focus servo algorithm 501 and tracking servo algorithm 502 are both on and tracking. At the beginning seek period 822, algorithm 557 generates a seek tracking control effort profile which includes an acceleration tracking control effort 825 and a deceleration tracking control effort 827. A coasting or clamped tracking control effort 826 can also be included between acceleration effort 825 and deceleration effort 827.

The TES signal, then, begins to sinusoidally vary when acceleration tracking control effort 825 is applied to tracking actuator 360. The period of the sinusoidal variation indicates the track crossing velocity. During acceleration, the period is decreasing indicating an increasing track crossing velocity. In some embodiments, seek algorithm 557 may clamp velocity at a particular value. Further, acceleration control effort 825 and deceleration control effort 827 may be calculated by controlling the actual acceleration of OPU 103 relative to optical media 102 as measured with the varying period of the sinusoidal TES. In FIG. 8B, a track crossing velocity curve that may be generated by seek algorithm 557 is shown, which indicates a constant acceleration the period when acceleration tracking control effort 825 is applied and a constant deceleration the period when deceleration tracking control effort 827 is applied. During period 823, seek algorithm 557 reacquires a tracking on condition in tracking servo algorithm 502.

In some embodiments, during the seek operation the FES control effort is selected in multiplexer 531 to be the low-pass filtered focus control effort output by low pass filter 529 in order that TES-FES crosstalk effects are minimized. In some embodiments, the output signal from sample and hold 530 is selected by multiplexer 531 during seek operations. In some embodiments, seek cross-talk notch filter 590 can also be enabled during the seek operation in order to reduce the effects of the sinusoidal TES on FES. Therefore, in operation seek algorithm 557 in some embodiments adjusts multiplexer 531 to receive the focus control effort from filter 529 and can enable notch filter 590. Algorithm 557 also adjusts multiplexer 558 to receive a tracking control effort generated by algorithm 557, turning tracking servo algorithm 502 off. Algorithm 557 then generates and applies a seek tracking control effort profile, which is responsive to the velocity of OPU 103, and moves OPU 103 to a target track on optical media 102. The velocity of OPU 103 can be determined by measuring the period of the sinusoidally varying TES. Once algorithm 557 completes the actual move of OPU 103, then tracking is reacquired in close tracking algorithm 555 and multiplexer 558 is reset to receive the focus control effort signal from notch filter 553 through switch 556. Further, multiplexer 531 is reset to pass the signal output from loop gain 524 as the focus control effort.

FIG. 8A shows a block diagram of an embodiment of algorithm 557. The TES' signal output from TES sample integrity test 548 is received by Track Zero Crossing (TZC) detector 801. TZC detector 801 determines the track crossings and, in some embodiments, each time a track is crossed generates a pulse signal. In some embodiments of the invention, algorithm 557 may read the TZC signal from track crossing detector 454 (see FIG. 4). In some embodiments, TZC detector 801 receives a defect signal from defect detector 591. The defect signal disables the TZC detector output from generating a pulse during the presence of a media defect. The TZC signal is input to TZC counter 802 and TZC period 803. TZC detector 554 of FIG. 5B includes TZC detector 801 and TZC period 803. TZC counter 802 counts the number of tracks crossed. The Direction signal from Direction Detection 592 determines the direction TZC counter 802 counts. For example, if a direction reversal occurs near the end of a seek possibly due to an external disturbance, then the counter will increment instead of decrement. This assures the seek crosses the correct number of tracks. TZC period 803 calculates the time period between successive track crossings. Seek completion detection 816 monitors the number of tracks crossed from TZC counter 802 and indicates whether seek is complete. Seek complete detection 816, therefore, also indicates the number of tracks remaining to the target track. In addition, seek complete detection 816 can output a retro-rocket signal which can enable retro-rocket gain 830. In some embodiments, seek completion 816 indicates that the seek is completed when the count exceeds the target count and when the TES signal has an appropriate slope in which to close tracking.

In some embodiments, TZC counter 802 receives a signal indicating each full rotation of optical media 102. During seek operations, optical media 102 continues to rotate. The rotations can cause additive seek length error to the actual seek length if the seek servo simply counts track crossings in TZC counter 802 instead of taking the track spiral into account. Predicting the number of disk rotations based upon seek length could be used; however, this method does not account for seek time variations caused by outside factors such as, for example, mechanical disturbances. TZC counter 802, by incrementing the TZC count during seeks on each rotation of optical media 102, can prevent errors in seek length.

A velocity profile is calculated in reference velocity calculation 805. The velocity profile calculated in reference velocity calculation 805 can, as shown in FIG. 8B, be optimized to move OPU 103 to the target track in a minimum amount of time without exciting resonances and stop OPU 103 at or very near the target track. FB velocity calculation 806 receives the measured track crossing period from TZC period 803 and calculates the actual velocity of OPU 103. The difference between the reference velocity calculation from calculation 805 and the actual velocity as calculated by calculation 806 is formed in summer 807, which outputs a velocity error value. In some embodiments, the output signal from calculation 806 is input to a sign block 818 which, based on the direction signal from direction detector 592, multiplies the calculated FbVEL value from block 806 by the sign of the direction signal.

In some embodiments, FB Vel calculation 806 calculates the velocity based on the time between half-track crossings. In some embodiments, at higher velocities, two consecutive half-track periods can be averaged. The sampling rate of algorithm 557 is the half-track crossing rate, which can be quite low (e.g. 2 kHz at track capture) resulting in a low bandwidth closed loop seek servo. The low bandwidth leaves the seek servo vulnerable to shock and vibration disturbances during the critical track capture phase of the seek operation. It is desirable to achieve good velocity regulation particularly when approaching the track capture phase of the seek. This bandwidth can be improved, and thus the velocity regulation upon track capture can be improved, by calculating the derivative of the TES when the TES is within a reasonable linear range of it's sinusoidal curve while crossing tracks. The derivative measurement is averaged with the most recent half track crossing measurement to filter some of the inherent noise effects associated with differentiation. Additionally, the positive and negative slopes of the TES are not symmetric, therefore, a balance gain is applied to one of the TES slopes to eliminate the effect of this asymmetry on the derivative calculation. In these embodiments, then, the FbVEL parameter is given by FbVEL=[(K1/TzcPeriod)+K2*d(TES)/dt]/2, where K2=K2a for track enter slopes and K2=K2b for half track center slopes. Typically, K2a=−0.7K2b.

The velocity error from summer 807 is multiplied by a constant $K_3$ in step 809 and input to summer 813. Further, velocity error is summed with the sum of velocity errors measured during previous clock cycles in summer 810, multiplied by constant $K_4$ in step 812, and added to the output value from step 809 in summer 813. Summer 810 acts as an integrator, integrating the velocity error. The output value from summer 813 is input to multiplexer 814. The output signal from multiplexer 814 is input to loop gain 815, which generates a tracking control effort. The tracking control effort output by loop gain 815 is part of the seek tracking control effort profile which moves OPU 103 to the target track in a controlled fashion.

In some embodiments, the tracking control effort output from multiplexer 814 can be a clamped acceleration effort generated by acceleration clamp 808. Acceleration clamp 808 monitors the acceleration of OPU 103 from the velocity error determined in summer 807 and, if a maximum acceleration value is exceeded, limits the tracking control effort to be the maximum acceleration value.

In some embodiments, the TES' signal is also input to boundary detector 817. In general, multi-track seeks can cross boundaries between writeable 151 and pre-mastered 150 portions of optical media 102 (FIG. 1B). The operation of direction sensor 592 as well as many operating parameters, including the TES gain, TES offset, FES gain, FES offset, and cross-talk compensation parameters from cross-talk calibration 579 will be different depending on whether OPU 103 is over a writeable or pre-mastered portion of optical media 102. Boundary detector 817 includes a multi-point positive and negative TES peak averaging algorithm, which is executing during seek operations. Boundary detector 817 then monitors the TES peak-to-peak amplitude during seeks. Before initiating a seek operation, algorithm 557 knows the type of media (i.e. pre-mastered, grooves, or write able, bumps) that OPU 103 is over. Microprocessor 432 can inform algorithm 557, which is usually operating on DSP 416, whether or not the seek operation takes OPU 103 from one type of media to another. If a boundary crossing is detected, then boundary detector 817 can monitor to determine when the boundary has been crossed.

Boundary detector 817 detects the boundary crossing by identifying when the TES peak-to-peak amplitude (TESPP), for example calculated by the multi-point peak averaging, by more than a threshold value (for example 25% of TESPP).

TesPP Change=|TesPP(k)−TesPP(k−2)| where k represents the measurement number.

If the threshold value is set too high, the boundary crossing algorithm may miss boundary crossings. Alternatively, if the threshold value is set too low, the boundary crossing algorithm may erroneously detect boundary crossings. In some embodiments, a default threshold can be utilized for a first boundary crossing on a newly inserted disk. When the boundary is detected, the measured change in TES peak-to-peak value can be averaged with the default threshold to drive the threshold amplitude in the direction of the actual change in TES peak-to-peak for the specific one of media 102. The averaging process can continue for all subsequent boundary crossings while the specific one of media 102 is in drive 100. The threshold, then, can be set to the averaged threshold for all future boundary crossings in that specific media 102.

In some embodiments, consecutive TesPP measurements are not compared because one of these measurements may straddle a boundary between media when making the multi-point peak averaging measurement. At that point, boundary detector 817 determines that the boundary has been crossed and switches the media sensitive operating parameters to parameters appropriate for the new media.

FIGS. 9A and 9B shows a flow chart of an embodiment of seek algorithm 557. In seek initialization 901, seek command 902 is issued, for example by microprocessor 432. Further, an acceleration flag, a seek direction flag, a TZC period, and a seeklength (indicating target track) are set in initialization 903. In some embodiments, laser power may be reduced during a seek operation. Therefore, in seek initialization 901, laser power can be reduced as well. Upon completion of the seek operation, laser power can be reset to a read power level.

In step 904, a TZC period count variable is incremented. In step 905, the TZC period count variable is checked against the current TZC period variable and, if at least half or some other fraction of the most recently measured TZC period has not elapsed, algorithm 557 proceeds to skip TZC period and counter calculations 803 and 802. If the condition of step 905 is met, then algorithm 557 proceeds to crossing detection 906. Crossing detection 906 indicates a crossing TZC if the TES' value crosses 0. Crossing detection 906 includes amplitude hysterisis in addition to the temporal hysterisis provided in step 905, i.e., that the next TZC crossing can not be indicated again for at least half the old TZC period value, which prevents noise from falsely indicating a TZC crossing.

FIG. 9C illustrates the TZC detection algorithm performed by TZC detector 801. TZC detector 801 provides a change in state on each zero crossing. As shown, however, TZC detection 906 of TZC detector 801 provides a change of state on each detected zero crossing. TZC detection 906, from step 905, is enabled to change after about ½ the TZC period. Additionally, in step 906, the TZC crossing provides a low threshold value and a high threshold value so that, on an increasing TES' signal, the TZC zero is detected at the high threshold value and on a decreasing TES' signal detects the TZC zero at the low threshold. A amplitude hysterisis is then provided.

In step 907, algorithm 557 indicates whether the TZC value has changed, indicating a track crossing. If not, then calculation of TZC period and updating of track counting in steps 803 and 802 are skipped. If the TZC value has changed, then algorithm 557 proceeds to block 908. In block 908, if the acceleration flag is not set or if the current count for TZC period (the TZC period count variable) is less than some multiple (for example twice) of the most recently measured TZC period or if the TZCSkip flag is set, then algorithm 557 proceeds to step 909, else algorithm 557 proceeds to step 910 which sets the TZC skip flag. From step 910, algorithm 557 then proceeds to step 913, which resets the TZC period count to zero. If the conditions of step 908 are met, then algorithm 557 proceeds to step 909.

Step 909 checks whether the currently detected TZC pulse is the first pulse and, if so, proceeds to step 913 where the TZC period count variable is set to 0. Otherwise, algorithm 557 proceeds to step 911 which sets the TZC period to the current TZC period count. Algorithm 557 then clears the TZCskip flag in step 912 before resetting the TZC period count in step 913.

Steps 908 through 912, perform a TZC period integrity test. In some embodiments, the TZC period is checked against the previously measured TZC period (i.e., the TZC period of cycle k is compared with the TZC period of cycle k−1). An error is generated if the TZC period of cycle k varies substantially from the TZC period of cycle k−1. In some embodiments, since a new zero crossing is not detected until at least ½ the TZC period of cycle k−1 (see step 905), and step 908 checks to be sure that the TZC period in the kth cycle is less than twice the TZC period in the k−1th cycle, then the TZC period is restrained to be between ½ TZC period and 2 the TZC period of the k−1th cycle (i.e., TZCperiod(k−1)/2<TZCperiod(k)<2*TZCperiod (k−1). In some embodiments, the range can be extended. For example, in some embodiments TZCperiod (k−1)/4<TZCperiod (k)<4*TZCperiod(k−1).

In step 914, the direction is checked, for example by checking the direction signal from direction detector 592 (FIG. 5A), so that the TZC count variable can either be decremented in block 915 or incremented in block 916, depending on direction. Algorithm 557 then proceeds to step 917.

In step 917, algorithm 557 checks if the current calculated reference velocity, which is a constant times the TZC count parameter calculated in block 802 of FIG. 8A, is greater than a maximum value of the reference velocity. If the reference velocity is greater than half the value of the maximum, then the TZC period value is averaged with previous TZC period values in step 918, which can have the effect of smoothing the actual velocity measurement. Algorithm 557 then proceeds to step 919 of seek completion detection 816.

Step 919 checks the current value of the TZC count to see if the required number of tracks have been crossed. If not, then algorithm 557 proceeds to step 922 of algorithm 805. If the number of track crossings is correct, then algorithm 557 checks in step 920 to see if the TES' has the correct slope. If not, the algorithm 557 proceeds to step 922. If the slope is correct, then algorithm 557 sets a seek completion flag in step 921 and exits. Tracking can then be reacquired in tracking close algorithm 555.

In step 922, a reference velocity is calculated. The reference velocity is greater than a minimum reference velocity by a value proportional to the track crossing count TZC count. The sign of the reference velocity is the sign of the TZC Count. For example, a 100 track seek toward the inner diameter (ID) would initialize the TZC count with +200 (since TZC counter counts half tracks) and the counter would decrement (assuming the direction sensor determines that OPU 103 is moving toward the ID) for each half track crossing until reaching the destination track with a count of 0. Thus, the reference velocity would be positive for seeks toward the ID. A 100 track seek toward the OD would cause the TZC counter to be initialized with a negative 200 value. The counter would increment (assuming the direction sensor determines that OPU 103 is moving toward the OD) until reaching 0 at the destination track. The reference velocity has a negative sign for seeks toward the OD.

In step 923, the reference velocity calculated in step 922 is compared with a maximum reference velocity and, if the maximum reference velocity is exceeded, then the reference velocity is reset to the maximum reference velocity in step 924. In step 806, the actual velocity of OPU 103 is calculated. The actual velocity (FbVEL) is proportional to the reciprocal of the TZC period variable, which is calculated in block 803 of FIG. 8A. Step 807, then, calculates the velocity error as the difference between the reference velocity and the actual velocity. Algorithm 557 then proceeds to step 934.

In step 934, algorithm 557 checks for the first change in sign of the velocity error signal. If the sign of the velocity error has not yet changed since the start of seek, then the seek acceleration phase continues. If the first change in the velocity error sign is detected, then the acceleration flag is cleared in step 935. During the initial phase of the seek (a.k.a. acceleration phase), the velocity of OPU 103 must be accelerated until it's velocity reaches the reference velocity. Until then, the velocity error can be large. It is desirable to not allow multi-track seek control compensator's integrator, which includes summer 813, from operating during the initial phase of seek because it will integrate this large velocity error resulting in a significant feedback velocity overshoot of the reference velocity. In addition, the control effort during this acceleration phase of a multi-track seek operation is clamped by clamp 808 to avoid accelerating too fast which could also cause significant overshoot of the reference velocity. Otherwise, algorithm 557 sets the seek control effort proportionally to the seek control variable in step 815. Algorithm 557 then proceeds to step 804 where tracking phase lead 550 can be updated to properly initialize it's states in order to reduce the time required to reacquire tracking in close tracking algorithm 555. From step 935, algorithm 557 proceeds to step 927.

In step 927, if OPU 103 is accelerating, then a seek control variable is set to the velocity error in step 928. In step 929, the seek control variable is compared with a maximum acceleration variable and, if the maximum acceleration variable is exceeded, then seek control is set to maximum acceleration in step 930. If not exceeded, then algorithm 930 proceeds to step 934.

If step 927 determines that there is no acceleration, then algorithm 557 proceeds to step 931. If the velocity error is greater than a maximum velocity error, and there has not been too many successive corrections, then algorithm 557 proceeds to step 933, which sets the seek control variable to be a constant times the velocity error plus a value proportional to an integral of the velocity error, as shown in FIG. 8A as steps 809, 813, 810, 811, and 812. If the maximum velocity error is not exceeded in step 931, then velocity error is set to 0 in step 932 and seek control is set to a value proportional to the velocity error integral in step 933. Algorithm 557 then proceeds to step 815.

In some embodiments, completing a seek operation in algorithm 557 also begins a time limited tracking loop high gain mode, which can be referred to as a "retro rocket." Seek completion detector 816 can enable retro-rocket gain 830 The tracking servo phase lead compensator 550 (FIG. 5A) states know about the tracking and velocity error at the instant of the seek to tracking transition as a result of properly initializing the phase lead compensator. Therefore, tracking servo 502 knows whether to accelerate or decelerate for capturing the destination track center. By significantly increasing the tracking loop gain (bandwidth) for a predetermined number of servo samples (for example 5), tracking servo 502 can more aggressively acquire the destination track. Time constraining the duration of the increased tracking loop gain can prevent the instabilities caused by mechanical resonances from growing unbounded and thus destabilizing the system. The net effect of applying the retro-rockets is a very aggressive closed loop track capture converged upon track center quickly followed by a nominal bandwidth very stable tracking control system closed on the destination track.

In some embodiments, algorithm 557 is executed as part of a control loop on DSP 416. In those embodiments, seek algorithms may be executed, for example, every 20 μs (i.e., 50 kHz). However, as more filly discussed below, detector signals A, B, C, D, E, and F are available every 10 μs, or at 100 kHz. In some embodiments, algorithm 557 may be solely operated on DSP 416 so that the full 100 kHz availability of data is available.

FIG. 10B shows a block diagram of a one-track jump algorithm 559. FIG. 10A illustrates the TES, tracking control effort, FES, and focus control effort during a one-track jump algorithm. The TES and FES signals shown are the output signals from summer 506. The TES and FES signals shown in FIG. 10B are measured scope traces from output pwm's 474, who's output signals are centered about reference voltages, e.g. from block 462 (FIG. 4). As shown in FIG. 10A, a one-track jump algorithm starts in a tracking mode 1001 and includes an acceleration period 1002, a coast period 1003, and a deceleration period 1004. Once deceleration period 1004 is complete, a settling period 1008 is followed by a focus on 1005 and a tracking integrator on 1006. At which time, a tracking and focus period 1007 is initiated.

In FIG. 10A, during tracking period 1001 both focus servo algorithm 501 and tracking servo algorithm 502 are on, therefore drive 100 is tracking and focusing on a starting track. During acceleration period 1002, one-track jump algorithm 559 applies an acceleration tracking control effort to tracking DAC 468 which accelerates OPU 103 in the desired tracking direction for a fixed time. During coast period 1003, one-track jump algorithm 559 holds the tracking control effort at the level applied before the one track jump algorithm begins. In some embodiments, coast period 1003 is held until the TES signal output from sample integrity test 548 changes sign, indicating a half-track crossing. Finally, during deceleration period 1004 one-track jump algorithm 557 applies a deceleration tracking control effort to tracking DAC 468. As shown, the acceleration tracking control effort of acceleration period 1002 and the coast period 1003, and the deceleration tracking control effort of deceleration period 1004 causes TES to pass though one period of the TES versus position curve, indicating a single track crossing. At some time 1006 after deceleration period 1004 ends, one-track jump algorithm 559 re-enables low frequency integrator 549, which was disabled but not reset when algorithm 559 began. Further, during acceleration period 1002, coast period 1003, deceleration period 1004 and until time 1005 after deceleration period 1004, sample and hold 530 holds the focus control effort at a constant level. When one-track jump algorithm 559 completes, servo control algorithm 500 re-enters a mode of tracking both focus and track position.

In some embodiments, the time scale on FIG. 10A is of the order of hundreds of microseconds so that, for example, the numbered divisions are on the order of 200 microseconds. In some cases, one-track jump algorithm 559 can be executed in DSP 416 since microprocessor 432 may be unable to respond fast enough.

FIG. 10B shows schematically a block diagram of one-track jump algorithm 559. Tracking compensation 1011 includes integrator 549, phase lead 550, and notch filters 551 through 553. Therefore, the output signal from tracking compensation 1011 is the tracking control effort generated through the closed tracking servo system 502 that is input to multiplexer 558. Multiplexer 558 in FIG. 10B is represented by a switch. Track jump state machine 1010, when one track algorithm 559 is initiated, controls multiplexer 558 so that the tracking control effort generated by algorithm 559 is ultimately applied to tracking actuator 201 instead of the tracking control effort signal generated by tracking compensation 1011. In FIG. 10B, the tracking control effort output from tracking DAC 468 is input to summer 1020 which is located in power driver 340. As was discussed above, the tracking control effort output from DAC 468 is summed with the bias control effort by summer 1020 in power driver 340. Plant 1021 includes tracking actuator 201 as well as OPU 103 and actuator arm 104.

The tracking control effort from tracking compensation 1011 is low pass filtered in filter 1012 and input to sample and hold 1017. During execution of one-track jump algorithm 559, the output signal from sample and hold 1017 is fixed at a constant value. The constant tracking control effort output from sample and hold 1017 is summed with the one-track jump tracking control profile generated in algorithm 559 at summer 1016.

The one-track jump tracking control profile includes an acceleration pulse generated by pulse amplifier 1013 and a deceleration pulse generated by pulse amplifier 1014. Track jump state machine 1010 controls the amplitude and duration of acceleration and deceleration pulses. Track jump state machine 1010 further controls the direction of the one-track jump by determining the sign of the amplitudes of the acceleration and deceleration pulses generated by pulse amplifiers 1013 and 1014.

In some embodiments, the amplitude and duration of acceleration and deceleration pulses are set during a calibration step in calibration algorithm 560. In some embodiments, the amplitude and duration of acceleration and deceleration pulses may change as a function of position of OPU 103 over optical media 102. Further, although in FIG. 10B, the jump control effort profile is shown as including a positive and negative square wave pulse, in some embodiments acceleration pulse and deceleration pulse may include sinusoidal wave pulses in order to avoid exciting mechanical resonances in actuator arm 104.

Track jump state machine 1010, then, first latches sample and hold 1017, shuts off low frequency integrator 549, and latches sample and hold 530, then applies the acceleration pulse from pulse amplifier 1013. State machine 101 then monitors the TES' signal for a sign change. When the sign change is detected, state machine 1010 applies the deceleration pulse generated by pulse amplifier 1014. If a sign change is not detected within a set period of time, then track jump state machine 1010 indicates a failed jump condition. In those circumstances, error recovery routines (See System Architecture disclosures) will recover from this condition.

Once the deceleration pulse has ended, state machine 1010 switches multiplexer 558 to receive tracking control efforts from tracking compensation 1011, and delays for a period of time to allow transient effects to decay. State machine 1010 then turns focus back on (by setting multiplexer 531 to accept the focus control effort rather than the output signal from sample and hold 530) and re-enables integrator 549.

In some embodiments, one-track jump algorithm 559 shown in FIG. 10B, for example, can further include notch filters 551 and 553 for receiving the one-track jump control effort profile output from summer 1016. Further, as is shown and discussed further below, algorithm 559 can be executed on DSP 416 in a timer interrupt mode. In some embodiments, one track algorithm 559 initiates phase lead 550 so that phase lead 550 is initiated to the proper state when tracking is closed following the one-track jump operation. Initializing phase lead 550 improves dynamic response during the close tracking operation. Further, during a one-track jump algorithm, the focus control signal can be set to the output of sample and hold 530, which holds the output signal from low-pass filter 529 during the one-track jump operation.

FIG. 11 shows a block diagram of a DSP firmware architecture 1100 according to the present invention. As discussed above, microprocessor 432 and DSP 416 can communicate through mailboxes 434. Initialization block 1101, main loop block 1102, timer interrupt block 1103, and sensor interrupt block 1120 represent algorithms executing on DSP 416. In initialization 1101, all of the filter states in FIGS. 5A and 5B are set to zero and all initializations are accomplished. Main loop 1102 represents an infinite loop that actually does nothing, since in most embodiments DSP 416 is interrupt driven. Timer interrupt 1103 executes one-track jump algorithm 559.

Focus and tracking servo algorithms are executed as part of sensor interrupt 1120. Sensor interrupt 1120 is available when all of the detector sensor signals A, B, C, D, E and F are available at decimation filters 414-1 and 414-6 (FIG. 4). Therefore, in some embodiments (for example), there is a sensor interrupt at a frequency of 100 kHz frequency, which occurs every 10 μs. Therefore, every 10 μs DSP 416 receives a sensor interrupt which initiates sensor interrupt code 1120 shown in FIG. 11.

In step 1104, algorithm 1120 determines which algorithm to execute, focus or tracking. Focus servo algorithm 501 and tracking servo algorithm 502 alternate, therefore each is executed every 20 μs. Therefore, focus and tracking loops are sampled at 20 μs or 50 kHz rather than interrupting every 20 μs and executing both focus and tracking algorithms. In this fashion, there is a lower time delay between sampling detector signals A, B, C, D, E, and F. In some embodiments, a third loop in algorithm 1120 can execute a spin-motor servo algorithm (see the Spin Motor Servo System disclosures). However, DSP 416 operates very fast but has limited resources in terms of memory.

If algorithm 1120 executes focus servo algorithm 501, then an FES' signal is calculated in step 1111. The FES' signal is the output signal from sample integrity test 515, therefore step 1111 includes focus servo algorithm 501 through integrity test 515. In some embodiments, defect detection algorithm 591 can then be calculated, providing a defect signal to a write abort algorithm which may be operating on microprocessor 432.

When the FES' signal is calculated in step 1111, algorithm 1120 proceeds to step 1112. In step 1112, algorithm 1120 determines if focus is on. In some embodiments, algorithm 1120 determines that focus is on or off by checking a bit flag in a control word held in mailboxes 434. If focus is off, then algorithm 1120 is finished with the focus operation and proceeds to step 1114. If focus is on, the algorithm 1120 finishes the operations of focus servo algorithm 501 in step 1113. After step 1113, then algorithm 1120 proceeds to step 1114.

If tracking servo algorithm 502 is chosen in step 1104, then algorithm 1120 proceeds to step 1105. In step 1105, tracking servo algorithm 502 through TES sample integrity test 548 is executed to calculate a TES' value. Algorithm 1120 then proceeds to step 1106. In step 1106, algorithm 1120 determines if a seek operation is being undertaken, in some embodiments by checking a seek flag set in a control word held in mailboxes 434.

If a seek operation is being undertaken, then algorithm 1120 proceeds to seek algorithm 557 in step 1107. Step 1107 can perform many of the steps described with FIGS. 8A, 8B, 9A and 9B describing seek algorithm 557. Additionally, some of the steps shown in FIGS. 9A and 9B can be performed through tasks in multiplexer 1116, as described below. For example, seek initialization 901 can be performed as tasks in multiplexer 1116.

If there is no current seek operation, or when step 1107 is completed, algorithm 1120 proceeds to step 1108. In step 1108 algorithm 1120 determines whether tracking is on or not. If tracking is on, then algorithm 1120 proceeds to step 1109 where the remaining portion of track servo algorithm 502 is executed. If tracking is off, or when step 1109 is completed, algorithm 1120 proceeds to step 1110. Usually, algorithm 1120 either executes step 1107, step 1109, or neither. However, in some cases a seek operation may finish in step 1107 and then tracking should be turned on in step 1109, in which case both steps 1107 and 1109 are executed during the same interrupt.

In step 1110, minimum and maximum calculations on any variable can be calculated. The particular variable can be chosen by microprocessor through mailboxes 434. Step 1110 allows variables to be monitored and trace data to be kept for calibration routines or monitoring routines. From step 1110, algorithm 1120 proceeds to step 1114.

In step 1114, algorithm 1120 determines if the drive is in the coast mode of a one-track jump. If step 1114 indicates a coast mode of a one-track jump, which in some embodiments can be determined by checking the appropriate bit flag in a control register of mailboxes 434, then algorithm 1120 proceeds to step 1115. Step 1115 determines if the deceleration step of the one-track jump should be started and, if so, starts the deceleration step. Once step 1115 is complete, or if step 1114 determines that there is no one-track jump operation, then algorithm 1120 proceeds to multiplexer 1116.

One track jump algorithm 559, as discussed with FIGS. 10A and 10B, execute in a timer interrupt mode. However, algorithm 1120 operates every 10 microseconds, which allows steps 1114 and 1115 to execute every 10 microseconds, in embodiments operating at a frequency of 100 kHz. The timer interrupt from one track jump algorithm 559 has a lower interrupt priority than sensor interrupts that trigger algorithm 1120. Sensor interrupt allows step 1114 to start deceleration in step 1115.

Multiplexer 1116 includes tasks that can be done after either the tracking loop or the focus loop processing is completed if any of the execution time is available before the next sensor interrupt. Typically, the tasks included in multiplexer 1116 can be tasks that do not need to be serviced as frequently as do focus and tracking algorithms. For example, one task that can fall into multiplexer 1116 is TES OK 517. As discussed before, TES OK 517 checks the FES signal and, if the FES signal is too high, determines that the TES signal is unreliable. However, tracking servo algorithm 502 does not need to be immediately shut down, so the TES OK task can wait until its turn in multiplexer 1116. In some embodiments, multiplexer 1116 can include 16 tasks. Another example of a task that can be included in multiplexer 116 include reading new variables from mailboxes 434 and updating variables used in other areas of algorithm 1120. In that fashion, if microprocessor 432 adjusts a gain or offset value utilized in focus servo algorithm 501 or tracking servo algorithm 502, then a task in multiplexer 1116 can read that gain or offset and update the appropriate variables. Some tasks that may be executed in multiplexer 1116 include focus loop OK algorithm 536, turn focus off algorithm (when commanded to do so), clear focus bad flag, zero the states of low frequency integrator 549, move the TES and FES gain and offset variables from mailboxes to internal variables, zero the low pass filter states of skate detector 561 if skate detector 561 is disabled, close tracking algorithm 555, initialize one-track jump algorithm 559, reset the jump status, initialize the seek variables of multi-track seek algorithm 557 and begin the seek, reset the seek status, clear write-abort status of write abort algorithm 537, seek length spiral compensation in algorithm 557, calibrate notch filter coefficients of notch calibration algorithms 520 and 552, provide general purpose mailbox communications.

From multiplexer 1116, algorithm 1120 proceeds to update status mailbox 1117, which writes status bits to mailboxes 434 as required. For example, error interrupts to microprocessor 432 can be set at step 1117. Algorithm 1120 then proceeds to step 1118 where diagnostic data can be maintained.

In some instances, algorithm 1120 may take more time to complete one cycle than there is time between sensor interrupts. In that case, some sensor interrupts may be missed. However, if too many interrupts are missed or if there is not enough idle time between interrupts, there can be instabilities developed in some embodiments.

Example Embodiments of Calibration Algorithms

In some embodiments, dynamic calibrations can be performed on components of drive 100 in order to dynamically optimize operation of drive 100. Several calibration algorithms have been mentioned in the preceding discussion on signal processing, including the following calibrations: detector offset calibration 548 (FIG. 5A) and detector gain calibration 583 (FIG. 5A), which calibrates the offset and gain parameters for offsets 402-1 through 402-6 (FIG. 4) and amplifiers 404-1 through 404-6 (FIG. 4), respectively; FES offset calibration 508 for calibrating the FES offset applied to summer 507 (FIG. 5); FES gain calibration 510 for calibrating FES gain amplifier 509 (FIG. 5); inverse non-linearity calibration 512 which calibrates inverse non-linearity algorithm 511 (FIG. 5); TES-to-FES cross-coupling gain calibration 579 for calibrating TES-to-FES cross-coupling gain 514, which cancels at least partially TES-to-FES cross coupling in the FES signal; notch calibration 520 for calibration of notch filter 519; focus loop gain calibration 522 for calibrating the loop gain of focus servo algorithm 501; calibrated feed-forward gain 532; TES offset calibration 542 for setting the TES offset applied in summer 541; TES Gain calibration 544 which set the gain of gain 543; inverse nonlinearity calibration 547 which calibrates inverse nonlinearity algorithm 546; notch calibration 552 which calibrates notch filter 551; calibration algorithm 560 which calibrates one-track jump algorithm 559; loop gain calibration 562 for calibrating TES servo algorithm 502; and calibrated feed-forward algorithm 579. In some embodiments of the invention, further calibrations can be added. For example, low frequency integrators 516 and 549 may be calibrated.

FIG. 12A shows a block diagram of an example calibration life-time for drive 100. As indicated by state 1201, many calibrations within drive 100 are set, or at least initially set, when drive 100 is fabricated. These settings can, for example, include initial values for controlling power supplies or for calibrating motor servo parameters. FIG. 12B shows a chart of an example of several operating parameters and when those parameters can be calibrated and at what stage in calibration those parameters are calibrated. Initial default values for tracking and focus servo system parameters can also be initialized during initial drive calibration 1201. For example, offset and gain values from detector offset calibration 584 and detector gain calibration 583, notch filter calibrations 520, and notch filter calibration 552 can be set at this time. In operation, calibration algorithm 1201 can load default values for each of the calibration parameters and adjust them for the particular characteristics of drive 100 operating with a standardized optical media 102.

Once the particular factory calibration parameters are determined in initial calibration 1201, then in some embodiments factory calibration values can be stored in program memory 330, which can include a flash memory. In some embodiments, media specific calibration parameters, which can, for example, include detector input parameters to detector offsets 402-1 through 402-6 and gains 404-1 through 404-6, FES offset from calibration 508, TES offset from calibration 542, FES gain from calibration 510, TES gain from calibration 544, focus loop gain parameters from loop gain 522, tracking loop gain parameters from TES loop gain 562, calibration parameters for inverse non-linearity functions algorithms 511 and 546 (FES inverse non-linearity parameters and TES inverse non-linearity parameters, respectively), notch filter parameters for notch filters 519 and 551, and one track jump calibrations 560, can be written onto optical media 102 so that, when drive 100 "wakes up" with a particular optical media, the best operating parameters for optical media 102 can be read and utilized. In some embodiments, the best average operating parameters can be stored in program memory 330 and drive 100 can start with those parameters. The average parameters stored in program memory can be updated each time drive 100 is calibrated.

Initial calibration 1201 can also be repeated during a rework or repair calibration 1202. Calibration 1201, then, can be repeated when drive 100 is, for some reason, returned for repair.

Calibration cycle 1203 represents normal, in-service, calibrations for drive 100. Calibration 1203 can be executed, for example, whenever a new optical media 102 is loaded, when drive 100 is started, and during an error recovery algorithm (see the Microcode System Architecture disclosures). In some embodiments, when drive 100 is initially started (i.e., "wakes up"), cycle 1203 receives default values for calibration parameters from flash memory 330. In some embodiments, media specific calibration parameters can be read from optical media 102. In some embodiments, default values for drive specific and media specific parameters can be stored in program memory 330 (FIG. 3) and loaded when drive 100 is powered. In some embodiments, temporary media specific parameters can be stored in memory 330 so that, when drive 100 is re-started, the preceding parameters can be utilized. Since drive 100 may often be started with the same optical media as when it was shut down, stored parameters can save time in "waking-up" drive 100.

In some embodiments, default parameters may be changed over time. As drive 100 ages, many of the default parameters can become very different from the initial calibration parameters required to operate drive 100. Therefore, in some embodiments of drive 100, the actual drive parameters may be re-stored as default parameters. In some embodiments, an average of the actual drive parameters with the default parameters may be re-stored as default parameters. However, if drive 100 is operated in extreme environments or if optical media 102 is particularly problematic (e.g., if optical media 102 is severely not flat due to exposure to heat or other warping environments), then the actual parameters required to operate under those conditions should not replace or alter the current default parameters. Therefore, in some embodiments if the current parameters vary beyond threshold values from the default parameters, the default parameters are not replaced or altered by these parameters.

FIG. 12B shows drive specific parameters which are calibrated. In general, as discussed above, optical media 102 can have a pre-mastered portion (which is read only) and a writable portion (which is read/write). In general, operating parameters are calibrated for operation of drive 100 under all of these conditions, i.e. read operation over the writable portion of optical disk 102, write operation over the writable portion of optical disk 102, and read operation over the pre-mastered portion of optical disk 102.

FIG. 13A shows an embodiment of a calibration sequence 1350 for calibrating over each media type of an optical media 102 and for read and write, where appropriate, modes over those media types. In general, optical media 102 can have several media types and several regions with differing media types.

Sequence 1350 starts with step 1351 where a first set of conditions is set. For example, the first set of conditions can be a read mode over a pre-mastered portion of optical media 102. In step 1352, preamplifier 310 (FIG. 3A) is set for the correct mode (e.g., read or write). In step 1353, laser power to laser servo 105 is set to the appropriate power for that mode. In step 1354, OPU 103 is positioned over the selected media type (e.g., pre-mastered or writable). In step 1301, a calibration algorithm 1301 is executed. Calibration algorithm 1301 executes a sequence of calibration routines that are appropriate for the selected mode and selected media type and stores the operating parameters for use in disk drive 100. In step 1355, sequence 1350 checks to determine if all combinations of operating modes and media types have been calibrated. If there are more combinations, then sequence 1350 proceeds to step 1357 where the next combination of operating mode and media type is selected. From step 1357, sequence 1350 proceeds to step 1352 to calibrate the next combination. When all combinations are calibrated, algorithm 1350 finishes at step 1356.

FIG. 13B shows an embodiment of an example calibration routine 1301 which can be executed either during initial drive state 1201 or rework state 1202. Calibration routine 1301 shown in FIG. 13B, for example, would be appropriate for a read mode calibration of premastered media. In some embodiments, as illustrated in state 1203, calibration algorithm 1301 can be executed whenever drive 100 is started-up or whenever a new optical media 102 is inserted into drive 100. When algorithm 1301 is initiated in step 1302, algorithm 1301 reads default calibration parameters from program memory 330 (FIG. 3). Algorithm 1301 then proceeds to step 1303.

In step 1303, algorithm 1301 executes detector offset calibration algorithm 584 and detector gain calibration 583 in order to calibrate offsets 401-1 through 401-6 and amplifiers 404-1 through 404-6 to optimally receive detector signals $A_R$, $B_R$, $C_R$, $D_R$, $E_R$ and $F_R$. Once OPU input parameters Offset and Gain are calibrated, spin motor 101 can bring optical media 102 to a starting rotational speed at which point algorithm 1301 proceeds to step 1304.

In step 1304, algorithm 1301 executes FES Gain calibration 510 to calibrate the FES Gain parameter to gain amplifier 509. At this point, focus loop 501 can be closed and algorithm 1301 then proceeds to step 1305 where algorithm 1301 executes FES offset calibration 508, optimizing the FES Offset parameter to summer 507. Algorithm 1301 then proceeds to step 1306 where algorithm 1301 executes TES offset calibration 542. Algorithm 1301 then executes TES gain calibration 544 in step 1307. Algorithm 1301 then executes TES offset calibration 542 again in step 1308. In some embodiments, TES offset calibration 542 and TES gain calibration 544 may alternately be executed until the values of the TES offset and the TES gain acceptably converge. Further, in some embodiments FES gain calibration 510 and FES offset calibration 508 may be alternately executed until the FES gain parameter and the FES offset parameters converge.

In the embodiment of algorithm 1301 shown in FIG. 13B, once the TES offset parameter has been re-calibrated in step 1308, algorithm 1301 proceeds to step 1309 to execute focus loop-gain calibration 522. Tracking loop 502 is closed before algorithm 1301 executes tracking loop-gain calibration 585 in step 1310. Algorithm 1301 then proceeds to step 1311, where TES/FES crosstalk gain calibration 579 is executed. Once TES/FES crosstalk gain calibration 579 is executed, algorithm 1301 then executes focus loop gain calibration 522 in step 1312 and tracking loop gain calibration 585 in step 1313. In some embodiments, tracking loop gain calibration 585, focus loop gain calibration 522, and TES/FES crosstalk gain calibration 579 can be sequentially executed until the calibration parameters converge.

In step 1314, algorithm 1301 calibrates notch filters 519 and 551 by executing notch calibration 520 and notch calibration 552. Again, in some embodiments of the invention, algorithm 1301 may proceed again through steps 1303 through 1314 until all of the resulting calibration parameters have converged.

In step 1315, algorithm 1301 loads the new calibration parameters into program memory 330. In some embodiments, program memory 330 is a flash memory. In some embodiments, the new parameters may be written onto optical media 102 so that optical media 102 can be started each time with these optimized parameters. Again, in some embodiments if the new calibration parameters (operating parameters) of drive 100 differ beyond a threshold value from the old operating parameters, then the new calibration parameters may not be stored or may not be stored to replace the old operating parameters (the stored parameters). New calibration parameters that vary significantly from the old operating parameters may be stored until a new calibration operation is performed and, if the new calibration parameters from the new calibration operation also vary significantly, then the new calibration parameters may be stored. In some embodiments, an average of the new calibration parameters and the old calibration parameters can be stored in order that operating parameters not vary to quickly. In some embodiments, operating parameters may be allowed to vary by a maximum amount so that if the new calibration parameters differ from the old operating parameters by an amount over the maximum amount, than the old operating parameters varied by the maximum amount are stored in place of the new calibration parameters. In some embodiments, the new calibration parameters are stored in a flash memory of program memory 330. In some embodiments, some of the operating parameters can be written onto optical media 102 instead. Writing operating parameters onto optical media 102 directly can be useful for storing parameters that closely depend on the particular optical media.

In some embodiments of the invention, further calibrations may also be executed in algorithm 1301, including calibration 560 for calibrating one-track jump algorithm 559, inverse non-linearity calibrations 512 and 547, and calibrations related to decimation filters 414-1 through 414-6.

FIGS. 14A and 14B show embodiments of step 1302 of FIG. 13. Algorithm 1302 calibrates OPU input parameters A, B, C, D, E and F by setting the offset values of each of offsets 402-1 through 402-6 and the gain values of each of variable amplifiers 404-1 through 404-6. In some embodiments, step 1302 may include a calibration of decimation filters 414-1 through 414-6 as well. The embodiment shown in FIG. 14A performs a dark-current calibration of the OPU input parameters. The embodiment shown in FIG. 14B performs a calibration of the OPU input parameters with light scattering present.

The embodiment of step 1303 shown in FIG. 14A starts with step 1401 where parameters can be passed to step 1303. In some embodiments, the parameters include a gain parameter bFrontEndGain and a calibration type flag bCalTypeFlag. The gain parameters indicate the gains of each of amplifiers 404-1 through 404-6. Algorithm 1303, then, includes aspects of detector offset calibration 584 and detector gain calibration 583.

In some embodiments, the gains and offsets of gains 404-1 through 404-6 and offsets 402-1 through 402-6 can be performed with laser off, i.e. a dark-current calibration. In some embodiments, the gains and offsets of gains 404-1 through 404-6 and offsets 402-1 through 402-6 can be performed with laser on and without optical media 102 in order to adjust for the presence of light scattering in OPU 103. FIG. 14A illustrates a dark current calibration. FIG. 14B illustrates an adjustment to calibrate for light scattering.

In some embodiments, as shown in FIG. 14A, the gain of variable amplifiers 404-1 through 404-6 is fixed while the offset values of offsets 402-1 through 402-6 are calibrated. In some other embodiments, the gain of amplifiers 404-1 through 404-6 can also be adjusted according to a calibration criteria (for example that the dynamic range of the outputs from decimation filters 414-1 through 414-6 should be a fixed peak-to-peak value).

In step 1402, algorithm 1302 switches to a high power mode. In high power mode drive 100 is operational, as opposed to sleep mode. Operating voltages are brought to their operating values and power is available to laser 218 of OPU 103 and spin motor 101.

From step 1402, algorithm 1302 executes step 1404. In step 1404, algorithm 1302 determines the gains of each of amplifiers 404-1 through 404-6 based on the gain parameter input at step 1401, bFrontEndGain. In some embodiments, the gain of each of amplifiers 404-1 through 404-6 is set to bFrontEndGain. The value of the gains for each of amplifiers 404-1 through 404-6 can be stored in a gain array 1414. In some embodiments, the parameter bFrontEndGain may include a different gain value for each of amplifiers 404-1 through 404-6. The gain parameters, then, can be set during a factory calibration or a re-work calibration and stored in program memory 330. In some embodiments, the gain values for each of amplifiers 404-1 through 404-6 are set to fill the operating range of digital to analog converters 410-1 and 410-2 (FIG. 4).

In step 1405 the laser is set on or off depending on the bCalTypeFlag parameter input during step 1401. If the laser is off, then the calibration is a dark current calibration, zeroing the output of decimators 414-1 through 414-6 when the laser power is off. A calibration with laser 218 on can further eliminate systematic light scattering in OPU 103.

In steps 1406 through 1411, the offset values for each of offsets 402-1 through 402-6 is set. In some embodiments, the offset value is set so that the output signal from decimators 414-1 through 414-6 is zero during calibration. In a laser-on calibration, steps 1406 through 1411 can, in some embodiments, be executed with a standard optical media 102 in drive 100 to provide standard reflections. In some embodiments, no optical media 102 is utilized or a light absorbing material in substitution for optical media 102 can be utilized. Each of blocks 1406 through 1411 updates part of an offset array 1415, which stores the offset values for offsets 402-1 through 402-6. Algorithm 1303 then exits in step 1413, indicating any error conditions that have occurred (such as offset values out of range, laser failed to function, or command was aborted, for example).

FIG. 14B shows an embodiment of an input signal offset and gain calibration algorithm according to the present invention that includes offsets for stray light. Detectors 225 and 226 (FIG. 2B) of OPU 103, for example, receive light from laser 218 that has not been reflected from optical media 102. This "stray light" causes sensor offsets that can affect tracking servo system 502 and focus servo system 501 (FIGS. 5A and 5B). One particular issue is that when the power of laser 218 is shifted from read power to write power, for example, the amount of stray light measured at detectors 225 and 226 shifts, resulting in shifts in the tracking error signal offset and focus error signal offsets that optimize operation of optical disk drive 100. In some cases, the shift can be large enough to cause a write abort condition to be indicated by write abort 537 or to cause writing of data with uncontrolled tracking error signal offsets and focus error signal offsets.

FIG. 14B shows an embodiment algorithm 1302 that calibrates input signal offsets for read laser powers and write laser powers. Optical disk drive 100, then, can automatically shift input signal offsets so as to eliminate shifts in offset due to operating changes in the power of laser 218.

In step 1450 of algorithm 1302, optical disk drive 100 is powered full on except that spin driver 101 is not operating. Further, optical media 102 is removed from optical disk drive 100 so that no light is reflected back into OPU 103 from optical media 102. When optical disk drive 100 is power on, all voltage levels are brought to operating parameters and the drive is "awake" instead of in sleep mode.

In step 1451, input signal gains, e.g. the gains of each of gain adjusts 404-1 through 404-6, are calibrated in read mode. In some embodiments, the input signal gains for each of the input signals, signals $A_v$, $B_v$, $C_v$, $D_v$, $E_v$ and $F_v$ shown in FIG. 4, is set to constant values. In some embodiments, the input signal gains for each of the input signals can be set so as to fill the dynamic range of analog-to-digital converters 410-1 and 410-2 when the read power level is set.

In step 1452, the input signal gains can be set for a write power level of laser 218. Again, the input signal gains can be set to constant levels. Further, the input signal gains can be set in order to fill the dynamic range of analog-to-digital converters 410-1 and 410-2 when the write power level is set.

In step 1453, a dark current input offset calibration is performed. An embodiment of this input offset calibration is shown in FIG. 14A.

In step 1454 the laser power of laser 218 is set at read power. In some embodiments, read power is set nominally at 0.25 mW. Additionally, the input sensor gains of gain adjustments 404-1 through 404-6 are set for read power and other channel gains and offsets in preamp 310 (FIG. 3) can be set for read operation. Further, input signal offsets of offsets 4021 through 402-6 can be zeroed. In step 1455, digitized values of the input signals (e.g., $A_f$, $B_f$, $C_f$, $D_f$, $E_f$ and $F_f$ in FIG. 4) are measured. In some embodiments, the digitized values of the input signals are averaged over multiple samples after a time delay from setting the power level of laser 218. For example, the time delay can be about 10 msec. Additionally, 256 samples of each of the digitized input signals can be acquired and averaged to determine the stray light values. Input signal offsets for read power levels, then, can be set to values such that the digitized input signals are a predetermined value, for example zero.

In step 1456, laser power and other channel parameters (e.g., input signal gains and parameters of preamp 310) are set for write mode. In some embodiments, write laser power is nominally at about 1.1 mW. In some embodiments, write laser power can be set at about 1.5 times read power and input signal offsets for any other laser power can be interpolated from the input signal offsets at these values. In some cases, the measured stray light is substantially linear with laser power.

In step 1457, the input signal offsets for write power are measured. The input signal offsets of offset blocks 402-1 through 402-6 can be zeroed and the digitized values of the input signals are measured. The input signal offsets appropriate for write operations are set such that the digitized values are at a predetermined value, for example zero. Again, a time delay, for example of about 10 ms, can be executed before measurement of the digitized values. Again, an average of the digitized input signals over many samples, for example 256, can be utilized to set the input signal offsets.

In some embodiments, the read power level can be set nominally to 0.25 mW and the write power level is nominally 1.1 mW. In some embodiments, two points are utilized in calibration, e.g. the read power level and 1.5 times the read power level, and read and write offsets are interpolated from these points.

Input signal offset values for no laser power (dark current), read powers, and write power can then be stored, for example in memories 320 and 330 (FIG. 3). During operation of optical disk drive 100, input signal offsets appropriate for read operations are loaded when optical disk drive 100 is in read mode and input signal offsets appropriate for write operations are loaded when optical disk drive 100 is in write mode. In some embodiments, if other laser powers are set (for example, a reduced laser power during multi-track seek operations) appropriate input signal offsets can be determined by linear interpolations using the input signal offsets at read power and at write power. When switching between read mode and write mode, the appropriate input signal parameters can be set in order to minimize transients in focus servo system 501 and tracking servo system 502.

Frequent calibration of the dark current offset can correct for thermal drift of the analog electronics of drive 100. For example, offset calibration 1302 of FIG. 14A can be performed whenever focus is closed. A method of calibration for thermal drift can include opening tracking and focus servos and shutting laser power off, measuring the dark current offsets by monitoring the digitized values output from analog to digital converters 410-1 and 410-2 or decimators 414-1 through 414-6, and adjusting the stray light values for each of a read mode (i.e., with operating parameters set for read operations) and a write mode (i.e., with operating parameters set for write operations). Once the stray light values have been adjusted for the new dark current offset values, focus and tracking can be reacquired. In some embodiments, average dark current offsets can be measured. In some embodiments, detector inputs can be disabled and dark current samples can be read while tracking and focus servo systems remain closed.

The write power stray light values can be measured during manufacturing at one know laser power, for example 1.1 mW. In some embodiments, an adaptive calibration is performed to adjust the laser power to optimize write error rates. The actual write power during operation of drive 100, then, will vary. A stray light adjustment algorithm scales the stray light correction values based on the actual write laser power using a linear interpolation. These scaled write stray light values are added to the periodically measured dark offset values and stored whenever the dark offset values are measured. In write mode disk 100 utilizes the write values and in read mode disk 100 utilizes the read values. Input offsets, then, are always accurate for the laser power being used and transients in tracking servo system 502 and focus servo system 501 can be minimized. If stray light is not considered in the input offset, tracking servo system 502 and focus servo system 501 will experience shifts when laser power changes. With stray light offset calibration, a looser tolerance for stray light can be accommodated.

FIGS. 15A and 15B illustrate an embodiment of focus gain calibration 510, which can be executed in step 1304 of calibration algorithm 1301 of FIG. 13. FIGS. 15A and 15B also illustrate calibration of a focus sum threshold value. FIG. 15A shows a block diagram of algorithm 510 while FIG. 15B illustrates graphically signals and actuator motions initiated by focus gain calibration 510. In step 1501, algorithm 510 is called. In step 1502, default values for the FES gain of FES gain 509 and the FES offset of offset summer 507 are loaded. As was discussed above, the starting FES offset and FES gain parameters can be input from optical media 102 in some embodiments and, in some embodiments, can be input from program memory 330.

In step 1503, algorithm 510 generates a focus control effort that moves OPU 103 sinusoidally from its present position to an extreme point of OPU 103. The extreme point is the point furthest away or the point closest to optical media 102. This step is graphically illustrated in the actuator position graph during time period 1. From the extreme point of OPU 103, OPU 103 is sinusoidally moved to the opposite extreme and back to the extreme point in step 1504, as is indicated in time period 2 in FIG. 15B. During this movement, the sum signal from summer 534 is monitored. An example of the sum signal from summer 534 is shown in FIG. 15B on the same time axis as is the actuator position signal. The peak values of the sum signal are also determined in step 1504. In some embodiments, the peak value of the sum signal is the average of the two peak values measured as OPU 103 is moved from the first extreme position to the opposite extreme position and back to the first extreme position. The peak sum signal and the sum of peak sum signals can be stored in variables 1507, along with a counter for the number of peak values stored.

In step 1505 of algorithm 510, a reasonable sum threshold is calculated. The reasonable sum threshold is set based on the peak sum signal calculated in step 1504. In some embodiments, the reasonable sum threshold is set to be half of the peak sum signal calculated in step 1504. However, any reasonable value can be utilized for the reasonable sum threshold (such as, for example, between about 30% to about 90% of the peak sum signal). As the reasonable sum threshold is lowered the focus control becomes more lax. Conversely, as the reasonable sum threshold is increased it becomes increasingly easier to lose focus. The reasonable sum threshold is output to focus OK algorithm 536 and is further utilized to determine whether there is sufficient focus to indicate a focus closed condition to other algorithms executing on drive 100.

From step 1505, algorithm 510 proceeds to step 1506. In step 1506, algorithm 510 moves OPU 103 from the first extreme to the opposite extreme and measures a focus control effort FCSOFFA that occurs at the threshold indicated by the reasonable sum threshold value calculated in step 1505. Further, another sum threshold peak is measured to be added to the sum peak variables 1507. In step 1508, algorithm 510 moves OPU 103 back to the extreme position and measures a focus control effort FCSOFFB as the sum signal again crosses the threshold indicated by the reasonable sum threshold value. Again, the sum signal peak is tabulated and recorded in variables 1507. A threshold in-focus control effort, the offset control effort FCSOFF, then, can be calculated as the average of the two threshold control efforts FCSOFFA and FCSOFFB. The movement of OPU 103 and the resulting sum signals as steps 1506 and 1508 are executed as is shown in FIG. 15B at times 3 and 4, respectively.

In some embodiments of algorithm 510, in particular those embodiments that are executed on microprocessor 432, algorithm 510 controls OPU 103 through DSP 416. In step 1509, algorithm 510 from microprocessor 432 communicates the threshold value to DSP 416. DSP 416 then monitors the sum signal from summer 507 and compares the sum signal to the calibrated threshold value to determine, for example, if focus is bad (e.g., algorithm 536), if focus can be closed (e.g., algorithm 535), or if a defect is detected (e.g., algorithm 591).

In step 1510, algorithm 510 moves OPU 103 to the position indicated by the focus offset control effort FCSOFF calculated in step 1508. In some embodiments, OPU 103 is moved to FCSOFF in a sinusoidal fashion in order to avoid exciting mechanical resonances which can be excited with motions of OPU 103 that are not smooth.

Algorithm 510 then proceeds to step 1511. In step 1511, a smaller sinusoidal perturbation around the FCSOFF control effort is applied to focus actuator 206 in order to sinusoidally move OPU 103 about the threshold focus position indicated by the reasonable sum threshold value of the sum signal by a small amount (e.g., half the amplitude required to make the sum signal drop below the reasonable sum threshold). As OPU 103 is oscillated about the threshold value, the FES signal output from summer is monitored. The FES signal can be sampled a number of times (e.g., 300 times) at each point and the FES peak maximum and FES peak minimum values can be stored in variables 1512. In some embodiments, step 1511 monitors the FES signal through four oscillations of OPU 103, however any number of oscillations can be monitored. FIG. 15B shows in time period 6 the sinusoidal movement of OPU 103 and the FES signal.

In step 1513, the average maximum value of the FES signal and the average minimum value of the FES signal through the oscillations executed in step 1511 are calculated from variables 1512. Additionally, the average peak-to-peak value of the FES signal is calculated in step 1513. Additionally, in some embodiments peak sum signals are added to previous peak sum signals and a running total is stored.

In step 1514, a new gain value is calculated from the values obtained from the average peak-to-peak value of the FES signal calculated in step 1513. In some embodiments, the gain is calculated so that the average peak-to-peak value of the FES signal is a predetermined value. In some embodiments, the gain is calculated so that the maximum and minimum peak-to-peak values are at a predetermined value. Once the gain value is calculated, step 1514 transfers the gain value through mailboxes 434. In some embodiments, the calculations of steps 1513 and 1514 can be performed by DSP 416. In some embodiments, the calculations of steps 1513 and 1514 can be performed by microprocessor 432 with the FES peak values determined by DSP 416. In step 1514, the new gain value is written to mailboxes 434 for transfer to DSP 416 or to microprocessor 432, depending on which of DSP 416 or microprocessor 432 performs the calculation.

Steps 1511, 1513, and 1514 can be repeated a number of times, for example four times, in order to converge on the best calibrated gain values. In step 1515, microprocessor 432 updates sensor threshold mailboxes 1515 with a value, for example, of half the average peak sum signal to be implemented by focus servo algorithm 501. In step 1516, the new gain values for FES gain 509 are stored, for example in program memory 330. In step 1517, algorithm 510 moves OPU 103 away from optical media 102 before exiting algorithm 510 in step 1518.

FIGS. 16A, 16B and 17 show embodiments of FES offset calibration 508. In some embodiments, FES offset calibration 508 optimizes the FES Offset value for best servo operation, as shown in FIG. 16. In some embodiments, FES offset calibration 508 optimizes the FES Offset value for best read/write operation, which is shown in FIG. 17. In some embodiments, FES offset calibration 508 executes algorithm 508 shown in FIGS. 16A and 16B and algorithm 508 shown in FIG. 17 and calculates an FES offset calibration which compromises between optimum servo-system consideration and optimum read/write considerations. FIG. 16C shows a graph of the TES peak-to-peak signal as a function of FES offset curve. If the FES offset is enough to move off of the flat portion of the curve, then the TES peak-to-peak signal will get smaller and the TES gain will need to change.

FIG. 16A shows an embodiment of focus offset calibration 508 that includes an optimum servo calibration. Algorithm 508 starts when called at step 1601. In step 1602, algorithm 508 checks to be sure that focus servo algorithm 501 indicates that focus is closed and the spin servo indicates that optical media 102 is spinning. See the Spin Motor Servo System disclosures. If focus is not closed or optical media 102 is not spinning, then algorithm 508 returns after setting an error flag in step 1607. If an abort condition is detected, then algorithm 508 exits through step 1609 after setting an abort flag.

If both focus is closed and optical media 102 is spinning, then algorithm 508 proceeds to step 1603 where tracking is turned off. When tracking is turned off, i.e. tracking servo algorithm 502 is not closed, then the TES signal becomes a sinusoidal signal as the tracks pass under OPU 103. In step 1604, the TES settings (including TES Gain and TES offset values as well as the current tracking control signal) are stored. In step 1605, the TES gain is set to a default value (for example 0x20) and the TES offset is set to 0. If algorithm 508 is primarily executed on microprocessor 432, these parameters can be communicated to DSP 416 in mailboxes 434 where DSP 416 monitors the TES signal output from TES gain 543 during execution of algorithm 508.

In step 1606, FES offset is set to zero. In step 1608, algorithm 508 monitors the peak-to-peak value of the TES signal output from TES gain 543 while decrementing the focus offset value. The focus offset value is decremented by a set amount during each step. The TES peak-to-peak value can be generated by TES P-P algorithm 545. During step 1608, FES offset is decremented by a set amount and, if the TES peak-to-peak value increases, then a best FES offset value is set to the FES offset value. If, during a set number of decrements, the peak-to-peak TES signal decreases, then step 1608 stops decrementing and exits. In some embodiments, if a best FES offset value is located (i.e., indicating that a peak in the TES peak-to-peak value versus FES offset curve has been located), then algorithm 508 proceeds to step 1612. In some embodiments, once a peak in the TES peak-to-peak value is located, the focus offset value may be stepped through the peak with a finer increment in order to better locate the peak and provide a better value of the focus offset value. If an error is discovered (e.g., the TES peak-to-peak value is below a threshold peak-to-peak value) then algorithm 508 can exit with an error-flag set at step 1607. If an abort command is received, algorithm 508 can exit with an abort indication in step 1609.

In some embodiments, or if a peak in the TES peak-to-peak curve has not been located, algorithm 508 proceeds to step 1610, where the FES offset value is reset to 0 or, in some embodiments, is set to the best FES offset value.

In step 1611, algorithm 508 increases by a set amount the FES offset value in order to determine if a maximum TES peak-to-peak value can be located in the increasing FES offset direction. Again, if the measured TES peak-to-peak value is greater than the TES peak-to-peak value for the current best FES offset value, then the best FES offset value is set to be the current FES offset value. In some embodiments of the invention, algorithm 508 in step 1611 can increment beyond a maximum in the measured TES peak-to-peak value by a number of increment steps where the TES peak-to-peak value decreases for each increment in the FES offset value before exiting. Again, an error condition can be indicated by exiting algorithm 508 through step 1607 and an abort condition can be indicated by exiting algorithm 508 through step 1609. Further, in some embodiments once a TES peak-to-peak value is located with the set amount of incrementation, a finer increment value can be utilized to more accurately find the TES peak-to-peak value. In some embodiments, algorithm 508 may search by incrementing the FES offset first and then decrementing the FES offset second (e.g., reversing steps 1608 and 1611 in FIG. 16A).

From step 1611 or step 1608, algorithm 508 proceeds to step 1612. In step 1612, the FES offset value output from FES offset calibration can be set to the best FES offset value. In step 1613, algorithm 508 restores the TES gain and TES offset values that were saved in step 1605. In step 1614, algorithm 508 restores tracking on (i.e., by closing tracking in tracking servo algorithm 502), provided that tracking was on in step 1602. Algorithm 508 exits at step 1615.

FIG. 16B shows another embodiment of FES offset calibration algorithm 508. Again, FES offset calibration algorithm 508 begins at step 1601 with a call to FESOffsetCal. In step 1650, algorithm 508 makes sure that voltages are brought to their operating levels (rather than remaining in a sleep mode). Step 1652 represents the top of a loop which ends at return step 1615. Step 1653 traps an abort request. The remainder of the embodiment of algorithm 508 shown in FIG. 16B is shown in state machine format. In state 1671, the focus offset value is initialized to a starting value, for example 0x20. Algorithm 508 then proceeds to state 1670. If optical media 102 is not spinning or focus is not closed, then state 1670 starts optical media 102 spinning and closes focus in focus servo algorithm 501, as shown in block 1602. Otherwise, state 1670 transitions based on the parameter bCalStep. In the embodiment shown in FIG. 16B, algorithm 508 can transitions to a measure baseline state 1655, a measure coarse negative state 1659, a current best offset up state 1661, measure coarse positive state 1663, current best offset down 1665, measure fine 1667, or final loop gain calibration state 1678. On a failure or error condition, algorithm 1670 can transition from state 1670 or from any other state to command retry state 1672.

State 1672 can transition back to state 1670 to retry a particular command a set number of times. If the current command is not successfully completed within that set number of times, then algorithm 508 can transition from state 1672 to command cleanup state 1673. In state 1673, algorithm 508 performs cleanup functions to recover from the failure or from an abort command and transitions to final flags state 1676. If an abort command is detected, then algorithm 508 transitions through state 1674 to abort state 1675. From state 1675, algorithm 508 transitions to command cleanup state 1673.

State 1670 can transition to final flags state 1676 when bCalSel is set to Final Flags Step. In state 1676, algorithm 508 sets the exit flags. If an error is detected, then algorithm 508 can transition through state 1656 to command retry state 1672. Otherwise, algorithm 1676 transitions to command complete state 1677 for exit at return 1615. State 1677 can set error flags if errors are detected and can set a flag indicating successful completion if algorithm 508 was successfully completed.

In step 1670, if bCalStep indicates a measure baseline function, then algorithm 508 transitions to measure baseline state 1655. State 1655 measures the baseline value of the TES peak-to-peak curve by calculating the minimum and maximum value of the TES signal, as shown in block 1658. If state 1655 indicates an error, then algorithm 508 transitions through state 1656 to state 1672. If no error is indicated, the bCalStep is set to perform a coarse negative function and algorithm 508 transitions through state 1657 back to state 1670.

If bCalStep is set to perform a coarse negative function, then algorithm 508 transitions from state 1670 to state 1659. In state 1670, algorithm 508 decrements the focus offset value to maximize the TES peak-to-peak value. If a maximum value is found by decrementing the focus offset value, then the focus offset value is set to that value. In some embodiments, as shown in block 1660, a loop gain calibration of focus servo system 501 can be performed in state 1660. If state 1659 indicates an error, then algorithm 508 transitions through state 1656 to state 1672. Otherwise, bCalStep is set to current best offset up and algorithm 508 transitions through state 1657 to state 1670.

In state 1670, algorithm 508 transitions to state 1661 if bCalStep is set to current best offset. In state 1661, algorithm 508. State 1659 finds the best FES offset possible by decreasing the offset. State 1661 smoothly goes to the best offset found in state 1659. If state 1661 indicates an error, the algorithm 508 transitions through state 1656 to state 1672. Otherwise, algorithm 1661 can set bCalStep to measure coarse positive and algorithm 508 can transitions through step 1657 to state 1670. In some embodiments, a loop gain calibration on focus servo loop 501 can be performed in state 1661 as indicated in block 1662.

From state 1670, if bCalStep is set to measure coarse positive, then algorithm 508 transitions to state 1663. In state 1663 the best FES offset can be found by increasing FES offset. If an error is detected in state 1663, then algorithm 508 transitions through state 1656 to state 1672. Otherwise, bCalStep can be set to calculate the current best offset down and algorithm 508 can transitions through state 1657 to state 1670. In some embodiments, a loop gain calibration can be performed in state 1663 as indicated in block 1664.

If bCalStep is set to calculate the current best offset down, then algorithm 508 transitions to state 1665. In state 1665, algorithm 508 smoothly goes to the best FES offset found in state 1663. If an error is detected in state 1665, then algorithm 508 transitions through state 1656 to state 1672. Otherwise, algorithm 508 can set bCalStep to measure fine bothways and transition through state 1657 to state 1670. In some embodiments, a loop gain calibration of focus servo loop 501 can also be performed in state 1665.

If bCalStep is set to measure fine bothways, then algorithm 508 transitions from state 1670 to state 1667. In state 1667, algorithm 508 starts at the best FES offset and gain determined by states 1659 and 1663 and take fine steps, in both positive and negative directions, to find a point where the TES peak-to-peak becomes significantly reduced. If an error is detected in state 1667, then algorithm 508 transitions through state 1656 to state 1672. Otherwise, bCalStep can be set to loop gain cal and algorithm 508 can transition through state 1657 back to state 1670.

If bCalStep is set to loop gain cal, then algorithm 508 transitions from state 1670 to state 1678. In state 1678 a loop gain calibration is performed on the focus servo system 501. bCalStep can then be set to final flags and algorithm 508 can transition back to state 1670.

FIG. 17 shows a focus offset calibration algorithm 508 that provides a best read/write focus offset value. Algorithm 508 of FIG. 17 is a focus offset jitter calibration starting at step 1701. In step 1702, algorithm 508 of FIG. 17 a seek operation is performed, for example by performing multi-track seek algorithm 557, to position OPU 103 over a section of optical media 102 which contains readable data. When step 1702 is complete, both focus servo 501 and tracking servo 502 are closed.

In step 1705, algorithm 508 of FIG. 17 adjusts the Focus Offset value. In step 1706, algorithm 508 adjusts the total open loop gain of the focus servo loop (i.e., with focus servo algorithm 501 and the plant) to provide a unity response at a crossover frequency. The crossover frequency is the frequency where the open loop transfer function for the focus servo loop (i.e., including focus servo algorithm 501 and the plant) is unity. In some embodiments, the crossover frequency is about 1.5 kHz. In step 1708, data jitter is measured. Additionally, jitter can be measured by monitoring the byte error rate in a read operation. In some embodiments, jitter can be measured by comparing the phase measurement from slicer 422 (FIG. 4) with the sync mark detector of block 426 (FIG. 4), for example.

In step 1709, algorithm 508 checks to see if the data jitter has been minimized. If not, then algorithm 508 returns to step 1705 to adjust FES offset further. Otherwise, in step 1710 algorithm 508 sets FES offset to the optimum value and exits in step 1711.

FIGS. 18 and 19 show an embodiment of TES Offset Calibration 542 which may be executed in steps 1306 and 1308 of calibration algorithm 1301 of FIG. 13. Again, TES Offset calibration 542 may include either an offset calibration based on optimum servo operation, as is shown in FIG. 18, or an offset calibration based on optimum read/write operation, as is shown in FIG. 19. In some embodiments, offset calibration 542 may include embodiments based both on best servo operation and best read/write operation and may provide a TES Offset value that is a compromise between the TES offset based on best servo operation, as is shown in FIG. 18, and the TES offset based on optimum read/write operation, as is shown in FIG. 19. The compromise tracking error signal offset, for example, can be a weighted average between the TES offset that optimizes servo function and the TES offset that optimizes read function. Changing the TES offset often means that OPU 103 is not tracking over track centers, but off the track center. Therefore, drive 100 may be less stable. For example, a bump in one direction may more easily lose tracking. Additionally, other parameters, for example tracking loop gain, may be incorrect for the particular TES offset.

In FIG. 18, TES offset algorithm 542 is initiated at step 1801 where it is called. In step 1802, algorithm 542 checks whether focus is closed in focus servo algorithm 501 and that spin motor 101 is spinning (see the Spin Motor Servo System disclosures). If an error is detected (for example if focus is on but optical media 102 is not spinning), then algorithm 542 exits through step 1808 while setting an error flag. Error recovery routines are further described in the System Architecture disclosures. If an abort condition is detected, then algorithm 542 exits through step 1809 indicating an abort.

Algorithm 542 then proceeds to step 1803. In step 1803, if tracking is on algorithm (i.e., tracking servo system 502 is closed), 542 proceeds to step 1804 to shut tracking off. Once tracking is off, algorithm 542 proceeds to step 1805. In step 1805, the current TES gain and the current TES offset are saved. In step 1806, the TES offset value is set. In some embodiments, the TES offset can be set to zero. In other embodiments, the TES offset may be left at the current TES offset value or may be set at another default value. In some embodiments, algorithm 542 may also reset the TES gain value at step 1806 to a default value. In some embodiments, the TES gain value is left at the current TES gain value. Algorithm 542 then proceeds to step 1807.

In step 1807, algorithm 542 checks to be sure that focus servo algorithm 502 indicates a focus closed condition. If focus is lost, then algorithm 542 can exit through step 1808 indicating an error message. Again, if an abort condition exists, then algorithm 542 can exit through step 1809. Algorithm 542 then proceeds to step 1810.

In step 1810, algorithm 542 determines the minimum and maximum values of the TES signal. Since tracking is off, the TES signal is a sinusoidal signal that transitions a period of the sine wave as a track passes beneath OPU 103. From averaging the minimum and maximum values, the center of the sinusoidal TES signal can be determined. This measured TES offset signal can be stored as variable s_lSignalOffset. In some embodiments, the average minimum and maximum values over a number of periods of the TES signal can be utilized to determine the measured TES offset signal.

In step 1811, algorithm 542 checks whether the measured TES offset value is zero. If it is, then in step 1812 a counter is set to iCalNum+1. If not, then iCount is incremented and algorithm 542 proceeds to step 1813. In step 1813, an offset is set to the TES offset minus the measured TES offset. In step 1814, the calculated offset is truncated. In step 1815, the TES offset is set to the offset value calculated in step 1814. In step 1816, the counter iCount is checked to determine if it is less than iCalNum+1. If so, then algorithm returns to step 1807. In step 1807, if iCount is equal to iCalNum then a time-out error condition can be set and algorithm 542 can exit through step 1808.

If iCount is greater than iCalNum, indicating that an optimum TES offset value has been found, then algorithm proceeds to step 1817 where the optimum TES Offset value is stored. The TES gain value is also reset in step 1817. In step 1818, algorithm 542 closes tracking in tracking servo algorithm 502 if tracking was on when algorithm 542 was called. Algorithm 542 can then exit normally through step 1819.

FIG. 19 shows a TES offset calibration algorithm 542 that sets the TES offset based on optimum read/write conditions. Algorithm 542 as shown in FIG. 19 is called at step 1901. In step 1902, OPU 103 is position over readable data on optical media 102. In some embodiments, OPU 103 is positioned over the middle of the optical media 102. In some embodiments, OPU 103 is positioned over optical media 102 and multi-track seek algorithm 557 is utilized to position OPU 103 over readable data on optical disk 102. In step 1903 algorithm 542 closes focus in focus servo algorithm 501 and in step 1904 algorithm 542 closes tracking in tracking servo algorithm 502.

In step 1905, algorithm 542 adjusts the TES offset value. The TES offset value may be incremented in either direction (i.e., increasing or decreasing). If incrementing the TES offset value in the first direction is not successful, then algorithm 542 can increment the TES offset value in a second direction. Further, the starting TES offset value may be the optimum TES offset value calculated by algorithm 542 as shown in FIG. 18.

In step 1906, the TES gain is set to provide a total open-loop gain of unity at a TES crossover frequency. The TES crossover frequency is the frequency that the open loop gain is set to unity. In some embodiments, the TES crossover frequency is about 1.8 kHz. In step 1907, data jitter is measured. Data jitter can be measured as described with step 1708 of FIG. 17. In step 1908, algorithm 542 checks to see if the data jitter determined in step 1907 is at a minimum. If not (i.e., if the data jitter continues to decrease as TES offset is incremented), then algorithm 542 returns to step 1905.

An optimum TES offset value can be determined when data jitter had been decreasing with additional TES offset increments but now is increasing. If an optimum TES offset value has been located, algorithm 542 proceeds to step 1909 where the TES offset value is stored. Algorithm 542 can then exit at step 1910.

FIG. 20 shows an embodiment of TES gain calibration 544, which can be executed in step 1307 of calibration algorithm 1301 shown in FIG. 13. Algorithm 544 is called at step 2001 and proceeds to step 2002. An initial value of the TES gain can be passed to algorithm 544. The initial value can be the current value of the TES gain or a default value of the TES gain. In step 2002, algorithm 544 determines that focus is closed in focus servo algorithm 501 and that optical media 101 is spinning. If focus is not closed or optical media 101 is not spinning, algorithm 544 exits with an error flag set in step 2006. If an abort condition is detected during step 2002, algorithm 544 exits with an abort flag set through step 2007. If step 2002 exits normally, algorithm 544 proceeds to step 2003. In step 2003, if tracking is on, algorithm 544 proceeds to step 2004 to turn tracking off and then proceeds to step 2005, else algorithm 544 proceeds to step 2005. In some embodiments, OPU 103 can be positioned over a particular zone or a particular media type on optical medium 102 in step 2002.

In step 2005, algorithm 544 checks for a focus closed condition (a focus closed condition can be indicated by the focus OK flag set by focus OK algorithm 536). If focus has opened, then algorithm 544 can exit with an error flag through step 2006. Again, if an abort condition is detected, algorithm 544 can exit with an abort flag set through step 2007. If focus is closed and no error or abort conditions are detected, then algorithm proceeds to step 2008.

In step 2008, algorithm 544 determines the minimum and maximum values of the TES sinusoidal signal. Step 2008 may include TES P-P algorithm 545. In particular, algorithm 544 determines the peak-to-peak value s_lPeakPeak of TES. In step 2009, a gain factor is calculated based on the peak-to-peak value determined in step 2009 and a reference peak-to-peak value TES_GAIN_REF. In some embodiments, the gain factor is a ratio between the reference peak-to-peak value and the measured peak-to-peak value of the TES signal. In step 2010, algorithm 544 checks to be sure that the gain factor is between a lower and upper limit, for example between 0.25 and 4, to insure that the TES gain is not varied too quickly or too slowly. If the gain factor is outside of the range, then the gain factor can be reset to be the extreme value in the range.

In step 2011, a gain value is set to the TES gain times the gain factor. In step 2012, algorithm 544 checks to be sure that the gain value is between set limits (for example between −128 and +128). If the TES gain (the gain value) is outside of the set limits, then an error flag can be set. Otherwise, the TES gain is set to the gain value in step 2013 and algorithm 544 proceeds to step 2014.

In step 2014, if counter iCount is less than a maximum and the gain factor is not 1, then algorithm 544 returns to step 2005. In step 2005, iCount is incremented and an error condition may be set resulting in algorithm 544 exiting through step 2006 if iCount is the maximum iCount. If the gain factor is one, then algorithm 544 has converged on a TES gain value and proceeds to step 2015. In step 2015, algorithm 544 turns tracking on if it was on when algorithm 544 started in step 2001 and exits normally at step 2016.

FIG. 21 shows a loop gain calibration algorithm 2100 which can be either focus loop gain calibration 522 executed in step 1309 of calibration 1301 of FIG. 13 or tracking loop gain calibration 562 executed in step 1310 of calibration 1301 of FIG. 13. Both focus loop gain calibration 522 and tracking loop gain calibration 562 operate in essentially the same fashion. In focus loop gain calibration 522 a sine wave disturbance at the desired cross-over frequency is generated in sine wave generator 528 and applied through summer 523 to the focus control effort. A discrete Fourier transform from DFT 527 of the focus control effort before summer 523 is compared with a discrete Fourier transform from DFT 525 of the disturbance in gain calculation 526 to determine the gain of loop gain amplifier 524 so that the overall open loop gain at the cross-over frequency is 0 dB. Similarly, in tracking loop gain calibration 562 a sinusoidal disturbance at a tracking cross-over frequency (which, in general, can be different from the focus cross-over frequency) is generated by a sine wave generator 568 and applied to the tracking control effort through summer 563. A discrete Fourier transform from DFT 567 of the tracking control effort before summer 523 is compared with a digital Fourier transform from DFT 565 of the disturbance is compared in gain calculation 566. The gain of loop gain 564 can be set so that the tracking total open loop gain is 0 dB. In some embodiments, the cross-over frequency for focus loop calibration 522 can be about 1.5 kHz and the cross-over frequency for tracking loop gain calibration 562 can be about 1.8 kHz.

In FIG. 21, loop gain algorithm 2100 represents the generalized loop gain calibration algorithm which can be executed as focus loop gain calibration 522 or tracking loop gain calibration 562. Algorithm 2100 is started at step 2101 when it is called. Algorithm 2100 then proceeds to step 2102. In loop gain algorithm 2100, the loop that is currently being calibrated is closed. In some embodiments, focus loop gain calibration 522 can be executed without closing tracking. However, for tracking loop gain calibration 562 both focus and tracking are closed.

In step 2102, algorithm 2100 executes a Bode algorithm at the crossover frequency. An embodiment of the Bode algorithm is further described in FIG. 22. In essence, the Bode algorithm executed in step 2102 disturbs the loop at the frequency indicated (in step 2102 at the crossover frequency), performs a discrete Fourier transform (DFT) on both the disturbance and the resulting measured signal, compares the two transforms, and returns gain values for the indicated frequency within the range of frequencies. Therefore, in step 2102 the Bode algorithm returns the total loop gain at the crossover frequency.

Once the loop gain at the crossover frequency is obtained in step 2102, it is inverted in step 2103 and multiplied by the current gain value from block 2105 in step 2104 to form the new loop gain value. The new loop gain value is the gain value required so that the loop gain of the output signal from loop gain amplifier (amplifier 524 in focus loop gain 522 or amplifier 564 in tracking loop gain 562) at the crossover frequency is, for example, 0 dB. In some embodiments, in order to obtain a larger dynamic range with a limited number of available bits, the gain of the loop gain amplifier is segregated into a gain and a shift term. The total gain being the gain$*2^{shift}$. Therefore, in some embodiments algorithm 2100 spreads the new loop gain value into a gain and a shift term in step 2106. For example, in some embodiments data is sent in 16 bit words and the loop gain value can be segregated into a 12 bit gain term and a 4 bit shift term. A much larger dynamic range can be realized with only a slight loss in resolution. In step 2107, algorithm 2100 saves the new gain of the loop gain amplifier. Algorithm 2100 exits normally in step 2108.

FIG. 22 shows an embodiment of a GetBode algorithm 2200 which can be executed in step 2102 of loop gain calibration algorithm 2100 of FIG. 21. In general, a Bode algorithm determines the frequency response of any pair of signals in a servo loop by disturbing the loop (for example at summer 523 or 563 in FIG. 5b) with a known disturbance and measuring the response of the loop to that disturbance. Bode algorithm 2200 starts when called at step 2201. Several parameters can be passed to Bode algorithm 2200, including a start frequency and an end frequency, a parameter indicating which loop to disturb (either tracking or focus), an oscillator amplitude value (which may be different for tracking servo loop or focus servo loop), the number of averages to compute, whether or not notch filters in the loop will remain active during the calibration, whether or not tracking must stay closed during the calibration, whether autogain is turned on or off, and whether to use floating or fixed point math. Step 2202 indicates an initialization step. Step 2203 indicates the top of a loop, which finishes when the calibration sequence of algorithm 2200 is completed.

The remainder of algorithm 2200 is shown in state diagram format. From step 2204, algorithm 2200 enters introduction state 2217 where software pointers are initialized to point to the variables representing the transfer functions numerator and denominator (e.g., TES, FES, and Tracking Control Efforts). Additionally, introduction state 2217 turns off auto jump back if it is enabled. From introduction state 2217, algorithm 2200 enters a memory allocation state 2204. In memory allocation state 2204, algorithm 2200 allocates sufficient memory to perform the Bode calculation of algorithm 2200. In some embodiments, allocation of memory can be done separately for each frequency because the trace length can be different for each frequency. A trace length inversely proportional to the frequency can yield better frequency resolution.

If insufficient memory is available, algorithm 2200 transitions to free memory state 2214 where any memory which is already allocated is freed. From free memory state 2214, algorithm 2200 transition can transition back to state 2214 if Bode calculations are to be done on further frequencies or to calibration finished state 2215, which closes the loop started in step 2203, if the calculation is finished. If there is not sufficient memory available to perform the calculation, algorithm 2200 can exit at step 2216, indicating an insufficient memory error condition.

If state 2204 allocates sufficient memory, then algorithm 2200 transition to state 2205. In state 2205, algorithm 2200 tests to insure that focus is closed and, if indicated, tracking is closed. If focus is open, then state 2205 closes focus. If tracking is open and should be closed, then state 2205 closes tracking. If there is not enough memory, algorithm 2206 can transition to free memory state 2215 to free additional memory.

Once the requested loops are closed in state 2205, algorithm 2200 transitions to state 2206. In state 2206, an oscillator operating at a selected frequency is turned on. On the first pass through algorithm 2200, the selected frequency is the start frequency. On subsequent passes, the selected frequency is between the start frequency and the end frequency. The oscillator applies a sinusoidal disturbance to the focus or the tracking loop, as indicated. The amplitude of the disturbance depends on previous measurements. For example, if there is a positive slope in the response data the amplitude can be decreased and if there is a negative slope the amplitude can be increased. Algorithm 2206 then transitions to either state 2207 if an auto-gain is set on or to collect samples 2208 if auto gain is set off. If auto-gain is on, the disturbance amplitude is adjusted so that the maximum peak-to-peak values for TES and FES are sufficiently close to a target value. If either TES or FES are too large, the disturbance amplitude is decreased. If both are too small the disturbance amplitude is increased. In some embodiments, TES and FES can be monitored directly for frequencies below a threshold frequency, for example about 8 kHz, while the peak-to-peak values are monitored at frequencies above this frequency. Autogain state 2207 can be looped with validate samples 2210 to ramp up the disturbance amplitude. In validate samples state 2210, algorithm 2200 verifies that focus is still closed and, if required, tracking is still closed. Algorithm 2200 transitions through the loop including state 2207 and 2210 until the amplitude of the disturbance generated in state 2206 is set. When complete, algorithm 2200 transitions to state 2208.

In state 2208, trace data is taken. Trace data includes data with the disturbance and data measured from the control effort. As an example, state 2206 may turn sine wave generator 528 on and state 2208 then collects trace data from the input signal to summer 523 and trace data from the output signal from summer 523, trace 1 and trace 2, respectively. Once trace data for both trace 1 and trace 2 is taken for a sufficient amount of time, algorithm 2200 transitions to state 2209.

In state 2209, the disturbance turned on in state 2206 is shut off and algorithm 2200 transitions to state 2210. In state 2210, algorithm 2200 verifies that focus is still closed and, if required, tracking is still closed. In some embodiments, algorithm 2200 can also check whether trace data in trace 1 and trace 2 has a sufficient peak-to-peak amplitude. If trace data is not valid, for example because loops have opened, then algorithm 2200 transitions to state 2211. In state 2211, algorithm 2200 attempts to repeat the measurement of the trace data. If focus or tracking loops have opened, then the amplitude of the sinusoidal disturbance started in state 2206 can be decreased. Once algorithm 2200 has adjusted parameters (e.g., the amplitude of the sinusoidal disturbance), then algorithm 2200 transitions back to state 2205. If too many retries have been attempted, then algorithm 2200 can transition to state 2213 and set an error flag.

If algorithm 2200 finds valid data in state 2210, algorithm 2200 transitions to state 2212. In state 2212, the amplitude of both trace 1 and trace 2 data at the frequency of the sinusoidal disturbance is calculated. Once the calculations are completed in state 2212, algorithm 2200 transitions to state 2213. In state 2213, the ratio between the amplitude of trace 1 to the amplitude of trace 2 is calculated. Algorithm 2200 then transitions to state 2214. Algorithm 220 can free the memory utilized in the previous calculation. If an error flag has been set or if the Bode calculation is complete, then algorithm transitions to state 2215 and then finishes at state 2216. Otherwise, algorithm 2200 increments the frequency and transitions to state 2204 to allocate memory for the calculation at the next frequency.

FIG. 23 shows an embodiment of a discrete Fourier transform algorithm 2300 (DFT) that can be utilized with Get Bode algorithm 2200 of FIG. 22. DFT algorithm 2300 can be utilized anywhere, for example in DFT algorithms 527, 525, 567, and 565. In some embodiments, fixed point math can be utilized to execute the calculations described. In some embodiments, floating point math can be executed. Although algorithms executed with fixed point math can be much faster, algorithms executed with floating point math are more accurate and less prone to overflow problems.

Algorithm 2300 starts when called at step 2301. In step 2302, variables R and I are initialized. In step 2303, further variables RealComp and ImagComp are set to zero and the trace pointer is set to 0. In step 2304, algorithm 2300 checks to see if the sine and cosine coefficients (R and I) exist for the current point on the trace indicated by the trace pointer. If not, then the sine and cosine coefficients R and I can be computed in step 2305. Otherwise, algorithm 2300 proceeds to step 2306. In step 2306, algorithm 2300 checks for a missed sample to assure that it keeps the sine and cosine sample instants time aligned with the measured waveforms time instants. If a sample is missed in the measurement, then the algorithm must skip a sample in the sine and cosine coefficient before performing the product. If not, then algorithm 2300 accumulates the product of the trace with the sine and cosine coefficients in step 2307. Additionally, the trace pointer can be incremented in step 2307. In step 2308, the pointers to the sine and cosine coefficients are incremented. In step 2309, if there is more trace data, algorithm 2300 returns to step 2304. If all of the trace data has been processed, then algorithm 2300 proceeds to step 2310 where the amplitude of the accumulation computed in step 2307 is computed. In step 2311, the amplitudes are accumulated. In step 2312, if there are more averages to be processed, algorithm 2300 proceeds to step 2303. Otherwise, algorithm 2300 computes the average amplitude in step 2303 and exits at step 2314.

FIG. 24 shows an embodiment of TES-to-FES Cross Talk Gain Calibration algorithm 579. As shown in FIGS. 5A and 5B, cross-talk gain calibration 579 disturbs the tracking control effort by adding in a sinusoidal disturbance from sinewave generator 581 to summer 563. Crosstalk Gain calibration 579 then measures the FES output from cross-talk summer 513, calculates the single point DFT at the disturbance frequency, and adjusts a gain in ratio calculation 582, which normalizes the frequency component in FES to the output of sine wave generator 581, in order to minimize the frequency component present in FES. The frequency of the perturbation induced by sine wave generator 581 is chosen to provide the best overall calculation. In general, crosstalk is not a strong function of frequency. Therefore, whatever frequency that is convenient (i.e. stable) can yield good results. In some embodiments, one of the cross-over frequencies can be utilized, for example 1.5 kHz or 1.8 kHz.

FIG. 24 shows a block diagram of an algorithm for performing crosstalk calibration 579. Before executing crosstalk calibration 579, focus and tracking are both on. Algorithm 579 is called in step 2401 with both focus and tracking on. In step 2402, algorithm 579 initializes variables. In step 2403, algorithm 579 starts a loop that finishes when algorithm 579 determines that calibration of the crosstalk gain parameter to cross-coupling gain 514 is determined.

The remainder of algorithm 579 is shown in state function format. In state 2404, algorithm 579 allocates sufficient memory to perform the algorithm. If sufficient memory is not available, algorithm 579 transitions to step 2409 which frees any memory that has been allocated. Algorithm 579 then transitions to step 2410 where the loop started in step 2403 is terminated. Finally, algorithm 579 exits with an error flag set at step 2411.

If there is sufficient memory so that algorithm 579 allocates memory in state 2404, then algorithm transitions to state 2405. In state 2405, algorithm 579 sets an initial crosstalk gain that can be utilized in cross-coupling gain 514 (FIG. 5A). Algorithm 579 can set the initial crosstalk gain by reading default values from a default file or by reading the last crosstalk gain value from program memory 330 or by reading the last crosstalk gain value utilized with optical media 102 from optical media 102. Further, the best cross-talk gain value is set to the initial cross-talk gain variable. Once the initial value of the crosstalk gain parameter is set, algorithm 579 transitions to state 2406.

In state 2406, algorithm 579 performs a Bode calculation by, for example, calling GetBode algorithm 2200 of FIG. 22. GetBode algorithm 2200 inputs a disturbance into the tracking loop at the desired frequency, for example at the tracking crossover frequency (e.g., 1.8 kHz). GetBode algorithm 2200, as executed in state 2406, measures the FES output from summer 513, and calculates the amplitude of the FES at the disturbance frequency. The returned value from the Bode Calculation performed within state 2406, then, is the signal component amplitude at the frequency of the disturbance. If the amplitude is lower at this crosstalk gain than the lowest so far, then the best crosstalk gain variable is set to the gain value. If the crosstalk does not have a smaller amplitude at the present crosstalk gain value, then algorithm 579 transitions to state 2407.

In state 2407, algorithm 579 increments or decrements the cross-talk gain and returns to state 2406. In some embodiments, algorithm 579 may start at an initial gain and increment through a range of gains in order to determine the best cross-talk gain. In some embodiments, algorithm 579 can start at an initial gain and move the gain in a first direction. If the cross-talk is increased by a move in the first direction, then algorithm 579 can move the cross-talk gain in the opposite direction from the first direction until a cross-talk gain that provides a minimum amount of TES-FES cross-talk is found. In some embodiments, algorithm 579 can search well beyond a located minimum (for example about 5 increments) to insure that the located minimum is actually a minimum.

In state 2406, when algorithm 579 discovers that it has checked each gain value or if a gain value that results in a minimum amount of cross-talk has been found, state 2406 transitions to state 2408. In state 2408, algorithm 579 stores the new cross-talk gain value and transitions to state 2409. In state 2409, algorithm 579 frees the memory allocated in state 2404 and transitions to state 2410. In state 2410, algorithm 579 ends the search loop and exits normally at step 2411.

FIG. 25 shows an embodiment of a notch filter calibration algorithm 2500. Algorithm 2500, for example, can be notch filter calibration 552 in tracking servo algorithm 502 or notch filter calibration 520 in focus servo tracking algorithm 501. Notch calibration algorithm 2500 is called in step 2501. In step 2502, algorithm 2500 performs a Bode calculation by, for example, calling Get Bode algorithm 2200 of FIG. 22 in order to obtain the frequency response curve of the appropriate control loop within a particular frequency range. The frequency response curve indicates the amplitude of the discrete Fourier transform at selected frequencies within the frequency range. In some embodiments, Get Bode algorithm 2200 of FIG. 22 provides ratios of single point DFTs at discrete frequencies in the frequency range. For example, notch calibration 520 can calibrate notch filter 519 in the range of about 3 to about 5 kHz. Get Bode algorithm 2200 returns an array providing the amplitude of the frequency response for, for example, the focus servo loop or the tracking servo loop. In step 2503, algorithm 2500 locates maximum peaks in order to determine the frequencies at which maximum responses are obtained. In some embodiments of the invention, peaks over a threshold value are targeted so that frequencies corresponding to responses above a certain amount are found. In some embodiments, a certain number of peaks are found, regardless of the magnitude of the actual response. The frequencies at which maximum responses are obtained are passed out of routine 2500, for example to a notch filter which filters the control signal at those frequencies. Algorithm 2500 then exits at step 2504.

If notch calibration algorithm 2500 is being executed as notch calibration 520, then the Bode algorithm 2500 disturbs the focus control effort and reads the responsive FES signal at the output of phase lead 518. The frequencies at which maximum responses are measured are passed to notch filter 519 so that a notch filter can be established around those frequencies. If notch calibration algorithm 2500 is being executed as notch calibration 552, then the Bode algorithm 2500 disturbs the tracking control effort and reads the responsive TES signal at the output of phase lead 550. The frequencies at which maximum responses are measured are passed to notch filter 551.

In some embodiments, focus is closed before algorithm 2500 is called as notch calibration 520. In some embodiments, focus and tracking are closed before algorithm 2500 is called as notch calibration 552.

FIG. 26 shows an embodiment of a feed-forward algorithm 2600. Feed-forward algorithm 2600 can be utilized as feed-forward block 532 in focus servo algorithm 501 and feed-forward block 579 in tracking servo algorithm 502. Feed-forward algorithm 532 monitors the focus control effort output from multiplexer 531 for harmonic variations which, for example, can be the result of warping of optical media 102, bearing wear of spin motor 101, or other factors which can cause a periodic variation in the FES signal. Similarly, feed-forward algorithm 579 monitors the tracking control effort for periodic variations. Once detected, the periodic variation in the FES signal can be anticipated by feed-forward algorithm 532 and OPU 103 can be moved with the same periodicity and an appropriate amplitude so that the periodic variation is effectively removed from FES. Similarly, periodic variations in TES can be anticipated by feed-forward algorithm 579 and control arm 104 can be moved periodically to remove these variations from TES.

Therefore, when operating fully and settled, feed-forward algorithm 532 and feed-forward algorithm 579 monitors the focus control effort and the tracking control effort and provide periodic control efforts that result in the removal of the effects of the anticipated motion from the FES and TES signals, respectively.

In some embodiments, algorithm 2600 removes periodic variations which are harmonics of the spin frequency of optical media 102 (i.e., of the rotation frequency of spin motor 101). Therefore, the output signal from algorithm 2600, the period variations, can be expressed as A sin ωt+B cos ωt, where ω is the rotation frequency of spin motor 101. The output signal from feed-forward algorithm 532, then, is input to summer 533 and the output signal from feed-forward algorithm 579 is input to summer 578.

Turning to algorithm 2600 of FIG. 26, a square-wave clock signal is provided which has a frequency equal to the frequency of spin motor 101 times the length of a sine-wave look-up table utilized to generate the sine wave. A delay parameter is also passed to algorithm 2600 which determines the number of clock cycles to delay before re-sampling the input signal and updating the parameters of the output signal from summer 2616. Further, the number of cycles to sample is input to algorithm 2600.

The input signal is received by multipliers 2602 and 2603. In general, the input signal is of the form $$f(t) = a \sin \omega t + b \cos \omega t + g(t),$$

where a and b are the coefficients of periodic control effort yet to be removed from the control effort and g(t) is the control effort which does not include a component of the spin-motor frequency. Upon startup, the entire amount of the periodic correction can be included in the input signal f(t) and therefore a=A and b=B. During operation, small corrections on the output parameters A and B are included in the input signal f(t).

The input signal f(t) is multiplied by sin(ωt) in multiplier 2602 and multiplied by cos(ωt) in multiplier 2603. The output signal from multiplier 2602, f(t)sin ωt, is input to multiplexer 2609 and the output signal from multiplier 2603, f(t)cos ωt, is input to multiplexer 2608.

Countdown timer 2605, can be loaded with the delay parameter and, on each clock cycle, counts down. During the delay period, countdown timer 2605 outputs a select signal that selects the grounded input to multiplexers 2609 and 2608. Once countdown timer 2605 reaches zero (indicating the end of the delay period), then timer 2605 outputs a select signal to multiplexers 2609 and 2608 which selects the output signals from multipliers 2602 and 2603, respectively.

The output signals from multiplexer 2609 and 2608 are input to summers 2610 and 2611, respectively. Summer 2610 sums its input with its output. Summer 2610 starts each sampling period with a zero'd output signal. Between the end of the delay period and the end of the sample period set by the signal DFTCYCLES, summer 2610 sums the signal f(t)sin ωt over DFTCycles of periods of the sine wave. Therefore, at the end of that summation, the output signal from summer 2610 is related to the coefficient a, all other products in f(t) being zero'd due to the summation. Similarly, summer 2611 sums f(t)cos ωt over DFTCYCLES number of periods so that the output signal from summer 2611 is related to the coefficient b.

The number of cycles DFTCYCLES times the length of the sinetable is calculated in multiplier 2606 and summed with the delay in summer 2607. Countdown timer 2617, then, counts down over the delay and the period in which summers 2610 and 2611 are accumulating. At the end of the countdown period, countdown timer 2617 enables summers 2612 and 2613 before starting the next period. During the period when summers 2612 and 2613 are enabled, the output signal from summers 2610 and 2611, respectively, are added into the values already present. Summers 2612 and 2613, then, hold the output values until, once again. summers 2610 and 2611 are finished accumulating. The output signals from 2612 and 2613 are multiplied by the sine function and the cosine function, respectively, and added in summer 2616 to provide an output signal of the form A sin ωt+B cos ωt, which is added to the control effort. The coefficients A and B are updated on each accumulation period. Each accumulation period, essentially, takes a single point DFT of the input signal to determine the ω frequency component of the input signal and outputs that component.

In some embodiments of the invention, the calibrated parameters are different for different track locations on optical media 102. For example, the OPU gain and offset values may be different between writeable and premastered portions of optical media 102. In some embodiments, optical media 102 may be zoned with a number of zones. In some embodiments, zones of the number of zones can include both writable and premastered portions. As such, parameters can be calibrated for operation of different media types as well as different zones. FIGS. 27A and 27B show an embodiment of an algorithm 2700 for calibrating parameters in different regions of optical media 102.

Algorithm 2700 is called at step 2701. In step 2702, a command state parameter is set to calibration initialization. The top of the calibration loop is started in step 2703. After step 2703, until the calibration loop is completed, the algorithm is described by a state diagram. From step 2703, algorithm 2700 enters state 2704. In state 2704, calibration parameters are initialized. Additionally, a current zone parameter is set to the first zone to be calibrated.

Algorithm 2700 then transitions to state 2705. In state 2705, algorithm 2700 checks whether all zones have been calibrated. If all of the zones have been calibrated, then algorithm 2700 transitions from state 2705 to state 2713. In state 2713, the calibrated parameters are stored. In some embodiments, some or all of the parameters are stored in program memory 330. In some embodiments, some or all of the parameters can be stored on optical media 102.

If algorithm 2700 determines that all of the zones are not calibrated, then in state 2705, algorithm 2700 performs a seek operation to position actuator arm 104 at a particular zone of optical media 102. State algorithm 2705 determines a desired track position for the current zone and, in step 2706, calls seek algorithm 557 to position OPU 103 into the desired zone of optical media 102. In some embodiments, before seek algorithm 557 is called, algorithm 2700 may turn focus and tracking on, if focus and tracking are currently off.

If the seek algorithm initiated by algorithm 2706 fails then algorithm 2700 transitions from state 2705 to state 2710. In state 2710, a cleanup algorithm is executed. The cleanup algorithm may, for example, position OPU 103 at a parking position and may open focus and tracking. From state 2710, algorithm 2700 exits with an error flag set.

If, while in state 2705, algorithm 2700 detects an abort command, then algorithm 2700 transitions to state 2712. In state 2712, algorithm 2700 acknowledges the abort command and transitions to state 2710 to execute the cleanup algorithm.

If, in state 2705, the seek was successful, then algorithm 2700 transitions to state 2707. In state 2707, algorithm 2700 performs the calibrations, for example by calling a zone calibration algorithm 2711. Zone calibration algorithm 2711 executes individual calibration routines in order to calibrate the parameters within the current zone. In state 2707, if an abort condition is detected, then algorithm 2700 transitions to state 2712. If an error condition is detected (for example, if one of the calibration routines returns an error condition), then algorithm 2700 transitions to state 2709.

In state 2709, algorithm 2700 increments a retry counter. If the retry counter is above a certain value, then algorithm 2700 transitions to state 2710 to exit. If the retry counter is still at acceptable levels, then algorithm 2700 transitions to state 2705 to attempt another try at calibrating the current zone. In some embodiments, algorithm 2700 may try to calibrate a particular zone several (e.g., about 3) times before executing a failed exit in state 2710.

In state 2707, if the calibration algorithms are executed without error, the algorithm 2700 transitions to state 2708. In state 2708, the results of the calibration are stored in one or more arrays 2715. Further, the current zone is incremented to point at the next zone and algorithm 2700 transitions to state 2705 to perform calibrations in the new current zone.

FIG. 27B shows an embodiment of zone calibration algorithm 2711 which is called from state 2707 of algorithm 2700. Algorithm 2711 is called at step 2730. In step 2731, a command initialize flag is set. In step 2732, drive 100 is brought to full power if drive 100 had previously been asleep (or in lower power mode). In step 2733, the top of a calibration loop is started. In step 2734, and throughout algorithm 2711, if an abort condition is detected then algorithm 2711 transitions to state 2751 where the abort condition is acknowledged. Algorithm 2700 then transitions to state 2750 where any cleanup routines (for example, parking OPU 103 or turning focus and tracking off) are executed. From state 2750, algorithm 2700 transitions to state 2754 where error and abort flags are set. Algorithm 2700 then transitions to state 2753 where algorithm 2700 exits the loop started with step 2733. Finally, algorithm 2711 exits at step 2756 with any abort or error flags set.

From step 2734, with no abort condition detected, algorithm 2711 transitions to state 2735. In state 2735, tracking and focus are both turned off, if they are on, in step 2736. Further, operating parameters (e.g., OPU Offsets, OPU Gains, FES Offsets, FES Gains, FES Loop Gain, Notch filter parameters, TES offsets, TES gains, TES loop gains, TES-FES cross-talk gain) for the current zone are loaded. If an error condition is detected in state 2735, then algorithm 2711 transitions to state 2737. In state 2737, if only an acceptable number of retries have been attempted, then algorithm 2711 transitions back to state 2735 to retry initializing operating parameters and turning tracking and focus off. If an unacceptable number of retries have been attempted, algorithm 2711 transitions to state 2750 to eventually exit at step 2756 with error flags set. If no errors are detected in state 2735, then algorithm 2711 transitions to state 2739.

In state 2739, algorithm 2711 starts spin motor 101. As discussed in the Spin Motor disclosures, state 2739 can call algorithms to stop the motor, start the motor, and set the spin speed in block 2738. If an abort flag is detected, algorithm 2711 can transition to state 2751. If an error is detected, then algorithm 2711 transitions to state 2740. In state 2740, a retry is started. If too many retries have been attempted, then algorithm 2711 transitions to state 2750 to eventually exit at step 2756 with error flags set. If not too many retries have been attempted, then algorithm 2711 transitions back to state 2739 to attempt to start spin motor 101 again.

If motor 101 is successfully started in state 2739, algorithm 2711 transitions to state 2741. In state 2741, algorithm 2711 turns laser 218 on and executes focus gain calibration 510. An embodiment of focus gain calibration 510 is shown in FIGS. 15A and 15B, which have been previously discussed. If an error is detected, then algorithm 2711 transitions to state 2740 which, if not too many retries have been attempted, transitions to state 2739 to retry states 2739 and 2741. Again, if too many retries are attempted, algorithm 2711 transitions from state 2740 to state 2750. If an abort condition is detected in state 2741, then algorithm 2711 transitions to state 2751.

If algorithm 2711 in state 2741 successfully turns laser 218 on and executes a focus gain calibration in step 2742, then algorithm 2711 transitions to state 2743. In state 2743, algorithm 2711 turns focus on. In steps 2744, state 2473 can start and stop motor 101, can set the motor speed of motor 101 to be appropriate for the current zone being calibrated, and can turn focus on by calling algorithm 535. An embodiment of algorithm 535 is shown in FIG. 7A.

If an error is detected in state 2743, then algorithm 2711 transitions to state 2747 to attempt a retry. If not too many retries have been attempted, algorithm 2711 transitions back to state 2743 to again attempt to close focus. If too many retries have been attempted, then algorithm 2711 transitions to algorithm 2750 to shut laser 218 off, stop motor 101 and park OPU 103 before setting error flags in state 2754 and exiting with error flags set in step 2756. If an abort condition is detected, algorithm 2711 transitions to state 2751.

If state 2743 successfully closes focus, then algorithm 2711 transitions to state 2745. In state 2745, calibration algorithms that operate with focus closed can be executed. These algorithms, in step 2746, include focus loop gain calibration 522 (an embodiment of which is shown in FIG. 21), FES offset calibration 508 (embodiments of which are shown in FIGS. 16 and 17), TES Offset calibration 542 (embodiments of which are shown in FIGS. 18 and 19), and TES Gain Calibration 544 (an embodiment of which is shown in FIG. 20).

If an error is detected in state 2745, then algorithm 2711 transitions to state 2747 to retry the calibrations. If too many retries have been attempted, then algorithm 2711 transitions to state 2750 to turn tracking and focus off, turn laser 218 off, and shut motor 101 down before exiting at step 2756 with error flags set. If not too many retries have been attempted, then algorithm 2711 transitions back to state 2743 to attempt to close focus and execute the calibration algorithms of step 2746 again.

If state 2745 executes the calibrations of step 2746 successfully, then algorithm 2711 transitions to state 2748. In state 2748, algorithm 2711 closes focus and tracking. Furthermore, tracking is closed at a particular track identified by a target PSA value. The target PSA track is within the current zone. State 2748 may, in step 2749, execute algorithms to start and stop motor 101, execute focus close algorithm 535, execute close tracking algorithm 555, and execute seek algorithm 557 and one-track jump algorithm 559 in order to position OPU 103 at the target PSA (position address).

If state 2748 detects an error, then algorithm 2711 transitions to state 2752. In state 2752, algorithm 2711 checks to see if the allowable number of retries has been exhausted. If not, then algorithm 2711 transitions back to state 2748 to attempt to close focus and tracking on the track identified by the target PSA once again. If the number of retries has been exhausted, the algorithm 2711 transitions to state 2750 to shut laser 218 off, open tracking and focus, shut motor 101 off, and eventually exit at step 2756 with error flags set. If an abort condition is detected, algorithm 2711 transitions to state 2751.

If state 2748 successfully closes focus and tracking at the target PSA, then algorithm 2711 transitions to state 2755. In state 2755 calibration algorithms with both focus and tracking closed can be executed. These algorithms, examples of which are shown in step 2757, includes tracking loop gain calibration 562 (an embodiment of which is shown in FIG. 21), focus loop gain calibration 522 (an embodiment of which is shown in FIG. 21), and TES-FES crosstalk calibration 579 (an embodiment of which is shown in FIG. 24).

If an error is detected in state 2755, then algorithm 2711 transitions to state 2752 to attempt a retry as discussed above. If no error is detected, then algorithm 2711 transitions to state 2754. In state 2754, no error flags are set and algorithm 2711 prepares for a normal exit. In state 2753, algorithm 2711 signals that the loop started in step 2733 is completed and algorithm 2711 exits in step 2756.

As shown in FIG. 27A, algorithm 2711 is executed through each defined zone on optical media 102. Therefore, a set of calibrated operating parameters is stored with operating parameters which are appropriate for each zone of optical media 102.

Figures 2, 27B:
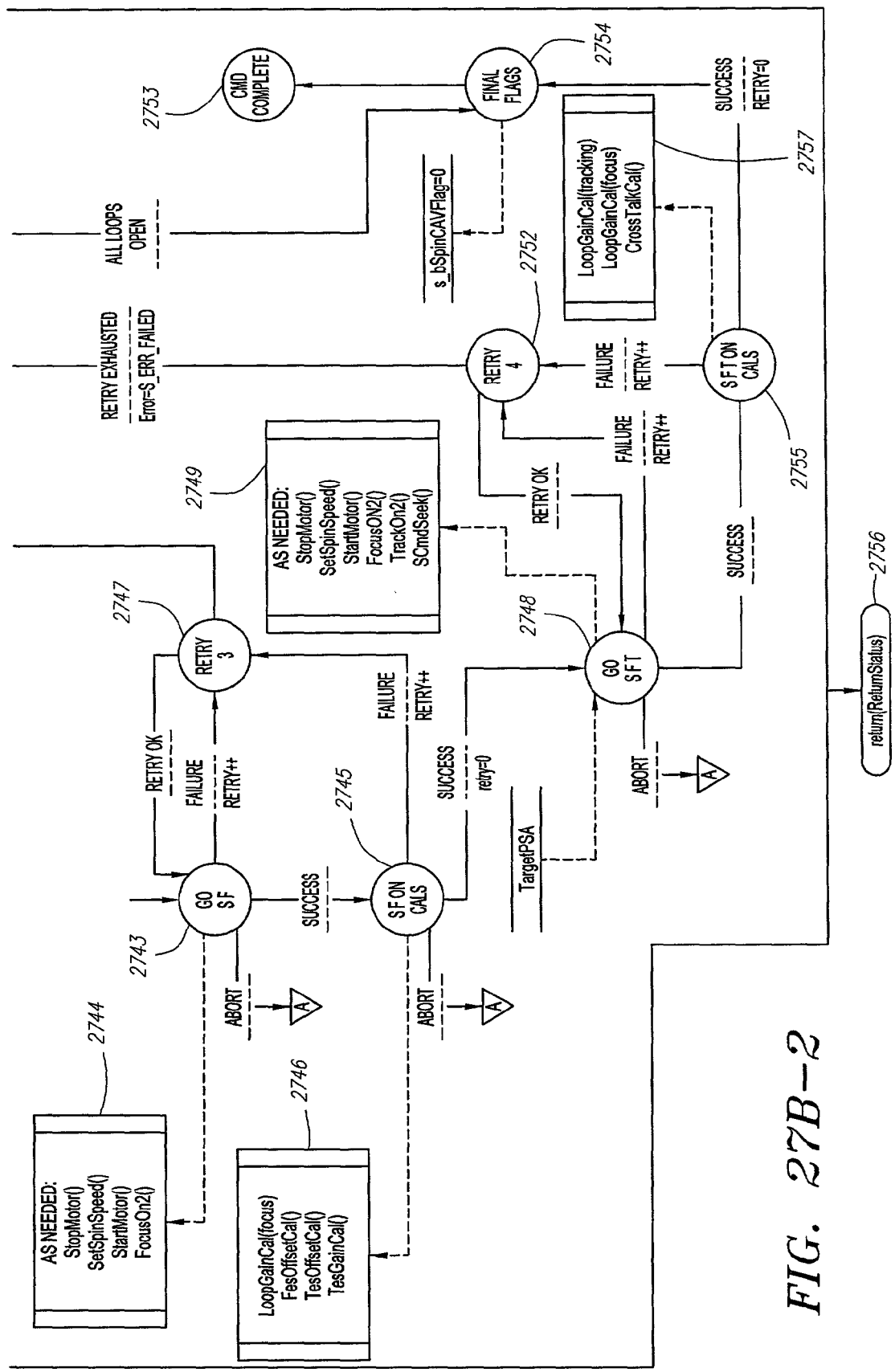

FIG. 28 shows an embodiment of inverse non-linearity calibration 512 in focus servo algorithm 501 and inverse non-linearity calibration 547 in tracking servo algorithm 502. Non-linearity calibrations 512 and 514 sets a gain versus offset (either TES offset or FES offset) table which linearizes the TES or FES signals around the offset values. Non-linearity calibrations 512 and 514 can be calibrated during algorithm 1301 of FIG. 13. Further, non-linearity calibrations 512 and 514, in some embodiments, may be executed during zone calibration algorithm 2700 of FIG. 27. FIG. 28 shows an embodiment of algorithm 2800 which builds a table of FES gain, TES gain, TES offset, tracking loop gain and TES-FES crosstalk as a function of FES offset. In general, algorithm 2800 may provide a table of FES gain versus FES offset, TES gain versus TES offset, or other combinations of parameters that result in linear operation of a digital servo system.

In FIG. 28, algorithm 2800 starts when called at step 2801. In step 2802, algorithm 2800 sets a CMD_INIT flag. In step 2803, algorithm 2800 turns power on so that drive 100 is fully functional (rather than asleep). Step 2804 starts the top of a loop. If an abort condition is determined, then algorithm 2800 transitions to state 2822 where the abort command is acknowledged. Algorithm 2800 then transitions to state 2823 which shuts drive 100 down, for example, by opening tracking and opening focus, shutting laser 218 off, and shutting motor 101 off. Algorithm 2823 then transitions to state 2820 where abort flags can be set. Algorithm 2800 then transitions to 2821 to signal that the loop started with step 2804 is complete before exiting at step 2825 with an abort flag set.

If no abort condition is detected in step 2805, then algorithm 2800 transitions to state 2806. In state 2806, operating parameters for drive 100 as well as the non-linearity look up table initial parameters are loaded. Further, an initial offset is set in state 2806.

If an error is detected in state 2806, for example a mailbox communications error, then algorithm 2800 transitions to state 2823. Algorithm 2800 then shuts drive 100 off (i.e., tracking off, focus off, laser 218 off, motor 101 off) and transitions to state 2820. In state 2820, error flags are set. As shown in block 2824, normal calibration values can be restored from memory 320 or 330 (FIG. 3). Algorithm 2800 then transitions to state 2821 which ends the loop started in step 2804. Algorithm 2800 then exits at step 2825.

If no errors are detected in state 2806, then algorithm 2800 transitions to state 2807. In state 2806, algorithm 2800 initiates a set of OPU offset values, indicated by arrays 2826. These values are specific offsets used throughout algorithm 2800. In state 2807, algorithm 2800 sets the FES offset. Algorithm 2800 then calibrates the FES gain in algorithm 510. Further, algorithm 2800 sets a doing FES flag to TRUE and a doing TES flag to FALSE in state 2807. Algorithm 2800 then transitions to state 2808.

In state 2808, algorithm 2800, in step 2809, insures that tracking and focus are on. If an error is detected in state 2808, the algorithm 2800 transitions to recovery state 2818. If too many recoveries have been attempted in recovery state 2818, then algorithm 2800 transitions to state 2823 and eventually exits with an error flag set in step 2825. If no error is detected in state 2808, then algorithm continues to state 2809.

If the doing FES flag is TRUE, then algorithm 2800 transitions to state 2809. In state 2809, algorithm 2800 measures the focus loop gain at a cross-over frequency. The cross-over frequency can be, for example, 1.5 kHz. Algorithm 2800 may, for example, call GetBode algorithm 2200 in FIG. 22 in step 2810. If the loop gain at the cross-over frequency is close to unity, then algorithm 2800 sets the doing TES flag to TRUE and transitions back to state 2808. If the loop gain is not yet unity, then algorithm 2800 transitions to state 2811.

In state 2811, the FES gain is adjusted. In some embodiments, the FES gain is adjusted in a first direction and if the loop gain is determined to be farther from unity than with the last adjusted FES gain, then the FES gain is adjusted in the opposite direction. Once the FES gain is adjusted in state 2811, then algorithm 2800 transitions to state 2809 to re-measure the loop gain with a new FES gain. Again, if an error is detected in state 2809, then algorithm 2800 transitions to state 2818 to attempt a retry.

From state 2808 if doing TES is TRUE, then algorithm 2800 transitions to state 2812. In state 2812, algorithm 2800 executes the TES gain calibration algorithm 544 and the TES offset calibration 542. If an error is detected in state 2812, then algorithm 2800 transitions to state 2818 to attempt a retry. If no error is detected in state 2812, then algorithm 2800 transitions to state 2813

In state 2813, algorithm 2800 executes tracking loop gain calibration 562 in step 2815. If an error is detected in state 2813, then algorithm 2800 transitions to state 2818. If no error is detected, then algorithm 2800 sets the doing FES flag to FALSE and the doing TES flag to FALSE and transitions to state 2816.

In state 2816, algorithm 2800 executes TES-FES crosstalk gain calibration 579. In some embodiments, as shown in block 2817, algorithm 2800 can move OPU 103 to a particular position on optical medium 102, for example the outer rim. Algorithm 2800 then transitions to state 2819. In state 2819, the results of the linearity calibration for the selected FES offset is stored in arrays 2826. Algorithm 2800 may, for example, store the results in flash memory 330. If algorithm 2800 determines that algorithm 2800 is not finished (i.e., values for each FES offset have not been determined), then algorithm 2800 transitions back to state 2807 to pick the next FES offset value. If algorithm 2800 determines that all of the FES offset values have been considered, then algorithm 2800 transitions to state 2820.

In state 2820, drive 100 is shut off and normal exit flags are set. Algorithm 2800 then transitions to state 2821, which ends the loop started with step 2804. Algorithm 2800 then exits normally at step 2825.

From algorithm 2800, a table of FES gain, TES gain, TES offset, tracking loop gain, and TES-FES crosstalk gain is tabulated for each value of FES offset. These parameters are then set during operation in inverse non-linearity algorithms 511 and 546. In some embodiments, the FES and TES calculations are very sensitive to the current focus position (the FES offset value). Algorithms 512 and 547 build a table of gains which account for the nonlinear effects in FES and TES. Blocks 511 and 546, then, can use these tables of gains to change the FES and TES gains in order to keep the response linear.

FIG. 29 shows an embodiment of a head load algorithm 2900. When drive 100 is started, the position of the OPU over optical media 102 is unknown. Head load algorithm 2900 allows drive 100 to be started and focus and tracking to be closed over a valid portion (i.e., a portion with tracks) of optical media 102. The tracking control signal (bias signal) required to position OPU 103 in an open loop mode over the tracks of optical media 102 can be quite variable due to mechanical and electronic parameter variation and the physical orientation of drive 100. Head load algorithm 2900 starts at step 2901, where optical media 102 is spun up by starting spindle driver 101. In step 2902, OPU 103 is biased against the inner stop. In other words, the tracking control effort is set at a value that insures that OPU 103 is positioned against the inner stop. Algorithm 2900 then moves to step 2903. In step 2903, algorithm 2900 closes focus, for example with focus close algorithm 535. In step 2904, the bias signal is incremented to move OPU 103 slightly away from the inner stop. In step 2905, the TES peak to peak value is calculated. In some embodiments, in step 2902 OPU 103 is positioned at any extreme position (e.g., at the inner diameter of optical media 102 or the outer diameter of optical media 102).

In some embodiments, optical media 102 has an inner portion 153 (FIG. 1B) that includes a bar code pattern over about ½ of the circumference. The TES amplitude, while over the bar code pattern, is similar to the TES amplitude when over premastered portion 150, but the TES waveform is different. FIGS. 30A and 30B show examples of the TES amplitude with OPU 103 over the bar code area (BCA) of optical media 102. For comparison, FIG. 30C shows an example of the TES during a close tracking algorithm. In step 2905, algorithm 2900 collects TES signal data for approximately one revolution of optical media 102. In step 2906, algorithm 2900 calculates the mean of the TES signal data collected in step 2905.

In step 2907, algorithm 2900 calculates a limit range based on the mean calculated in step 2905 and compares each sampled data in the TES data taken in step 2905 with that limit range. Algorithm 2900 counts the number of samples that are within the limits.

In step 2908, algorithm 2900 compares the count from step 2907 to a threshold limit. If the count is over the threshold limit, then OPU 103 is over a readable portion of optical media 102 (i.e., a portion with tracks) and algorithm 2900 proceeds to step 2909. Otherwise, algorithm 2900 returns to step 2904 to move OPU 103 out another increment.

Algorithm 2900 continuous to move OPU 103 away from the inner diameter of optical media 102 until algorithm 2900 determines that OPU 103 is over a portion of optical media 102 with tracks. In step 2910, algorithm 2900 closes tracking. In some embodiments, track crossing detector 454 can be utilized to determine if OPU 103 is moving to fast. In some embodiments, a fixed time delay after incrementing the bias signal to actuator arm 104 can be utilized.

When a newly inserted optical media 102 is inserted and drive 100 is started, the tracks under OPU 103 are of an unknown type (e.g., they could be in a writeable portion or a premastered portion of optical media 102). As discussed above, there are many operating parameters that are media dependent (e.g., TES gain and offset, FES gain and offset). The media type can be determined by starting with parameters appropriate for a premastered portion of optical media 102 and monitoring the TES peak-to-peak signal with focus closed. The TES peak-to-peak signal is much larger (for example by about twice) for writeable tracks than for premastered tracks. In some embodiments, algorithm 2900 includes step 2909 executed before tracking is closed in step 2910. In step 2903, operating parameters appropriate for writeable portions of optical disk 102 are loaded. In step 2909, if the TES peak-to-peak signal is below a threshold value then algorithm 2900 loads operating parameters appropriate to a premastered portion instead.

In some embodiments, the threshold value can be set to be between 50% and 100% of an expected peak-to-peak value for the TES over writeable media. If the threshold value is set too high or too low, however, there is a greater likelihood of media miss-identification, resulting in loading of incorrect operating parameters.

CD ROM Appendix A is a computer program listing appendix that includes source codes for an embodiment of the present invention. A directory of CD ROM Appendix A is given in Appendix B. Both CD ROM Appendix A and Appendix B are herein incorporated by reference in this application in their entirety.

The above detailed description describes embodiments of the invention that are intended to be exemplary. One skilled in the art will recognize variations that are within the scope and spirit of this disclosure. As such, the invention is limited only by the following claims.

APPENDIX A

See attached CD-ROM Copy 1 or Copy 2

APPENDIX B

(Directory of CD ROM Appendix A)

| DATE CREATED | TIME | BYTES | FILENAME |
|---|---|---|---|
| 08/09/01 | 05:50p | 17,301 | Defin__h.txt |
| 08/10/01 | 02:13p | 85,660 | dservo__c.txt |
| 08/09/01 | 05:47p | 33,958 | dspmem__h.txt |
| 08/09/01 | 05:45p | 292,400 | dspp__c.txt |
| 08/09/01 | 05:44p | 292,400 | dsp_p__c.txt |
| 08/09/01 | 05:47p | 4,287 | engpar__h.txt |
| 08/09/01 | 05:43p | 7,688 | Focu__h.txt |
| 08/09/01 | 05:48p | 3,764 | indus__h.txt |
| 08/09/01 | 05:49p | 69,191 | rpmtbl__h.txt |
| 08/09/01 | 05:47p | 96,378 | scmd__c.txt |
| 08/09/01 | 05:49p | 7,414 | SineTb__h.txt |
| 08/09/01 | 05:46p | 8,819 | sintrp__c.txt |
| 08/09/01 | 05:45p | 327,430 | smain__c.txt |
| 08/09/01 | 05:50p | 27,961 | smain__h.txt |
| 08/09/01 | 05:48p | 97,596 | sspin__c.txt |
| 08/09/01 | 05:46p | 189,471 | stint__c.txt |
| 08/09/01 | 05:45p | 57,381 | stools__c.txt |
| 08/09/01 | 05:51p | 2,185 | stools__h.txt |
| 08/09/01 | 05:51p | 302,470 | sutil__c.txt |
| 08/09/01 | 05:51p | 30,265 | sxtrn__h.txt |
| 08/09/01 | 05:51p | 11,063 | TrackC__h.txt |
| 08/09/01 | 05:45p | 25,479 | XYram__h.txt |

We claim:

1. A method of calibrating a notch filter in an optical disk drive's digital servo system, comprising:
   digitizing sensor signals from an optical pickup unit within the optical disk drive;
   within a digital signal processor, calculating a focus error signal or a tracking error signal from versions of the digitized sensor signals;
   perturbing the digital servo system by adjusting either the focus error signal or the tracking error signal responsive to a perturbing signal to provide an adjusted error signal;
   obtaining a frequency response curve of the adjusted error signal within the digital servo system over a range of frequencies in response to the perturbation of the digital servo system;
   searching the frequency response curve for at least one frequency having a peak frequency response; and
   setting notch filter parameters of the notch filter to filter signals in the digital servo system at the at least one frequency.

2. The method of claim 1, wherein the digital servo system includes a focus servo system.

3. The method of claim 1, wherein the digital servo system includes a tracking servo system.

4. The method of claim 1, wherein the frequency response curve of the digital servo system is a discrete Fourier transform.

5. The method of claim 1, wherein the range of frequencies is about 3 to about 5 kHz.

6. A digital servo system, comprising:
   an optical pick-up unit;
   an analog-to-digital converter coupled to receive versions of signals from detectors in the optical pick-up unit and provide digital signals;
   a digital signal processor coupled to receive the digital signals and operable to generate a focus error signal or a tracking error signal therefrom;
   wherein the at least one processor executes an algorithm that
   perturbs the digital servo system by adjusting either the focus error signal or the tracking error signal responsive to a perturbing signal to provide an adjusted error signal;
   obtains a frequency response curve of the digital servo system's adjusted error signal over a range of frequencies in response to the perturbation of the digital servo system;
   searches the frequency response curve for at least one frequency having a peak frequency response; and
   sets notch filter parameters of a notch filter to filter signals in the digital servo system at the at least one frequency.

7. The system of claim 6, wherein the digital servo system includes a focus servo system.

8. The system of claim 6, wherein the digital servo system includes a tracking servo system.

* * * * *